(12) United States Patent
Yamaguchi et al.

(10) Patent No.: US 10,139,568 B2
(45) Date of Patent: Nov. 27, 2018

(54) OPTICAL FIBER SPLICING TOOL AND OPTICAL FIBER SPLICING METHOD

(71) Applicants: FUJIKURA LTD., Tokyo (JP); NIPPON TELEGRAPH AND TELEPHONE CORPORATION, Tokyo (JP)

(72) Inventors: Takashi Yamaguchi, Sakura (JP); Takaharu Matsuda, Sakura (JP); Kazuhiro Takizawa, Sakura (JP); Kazutoshi Takamizawa, Tsukuba (JP); Yuuji Aoyagi, Tsukuba (JP); Atsushi Daido, Tsukuba (JP); Masahiro Ida, Tuskuba (JP)

(73) Assignees: FUJIKURA LTD., Koto-ku, Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 56 days.

(21) Appl. No.: 14/770,334

(22) PCT Filed: Feb. 28, 2014

(86) PCT No.: PCT/JP2014/055159
§ 371 (c)(1),
(2) Date: Aug. 25, 2015

(87) PCT Pub. No.: WO2014/133157
PCT Pub. Date: Sep. 4, 2014

(65) Prior Publication Data
US 2016/0011378 A1    Jan. 14, 2016

(30) Foreign Application Priority Data

Feb. 28, 2013  (JP) ................................ 2013-040044
Feb. 28, 2013  (JP) ................................ 2013-040096

(Continued)

(51) Int. Cl.
    G02B 6/38    (2006.01)
    G02B 6/255   (2006.01)

(52) U.S. Cl.
    CPC .......... *G02B 6/3803* (2013.01); *G02B 6/2553* (2013.01); *G02B 6/3802* (2013.01); *G02B 6/3806* (2013.01)

(58) Field of Classification Search
    CPC ....... G02B 6/38; G02B 6/3802; G02B 6/3805
    See application file for complete search history.

(56) References Cited

U.S. PATENT DOCUMENTS 5,963,699 A     10/1999  Tanaka et al.
2005/0226566 A1 10/2005  Sasaki et al.
(Continued)

FOREIGN PATENT DOCUMENTS

CN    1742219 A     3/2006
CN    101034192 A   9/2007
(Continued)

OTHER PUBLICATIONS

Communication dated Dec. 15, 2015 from the Japanese Patent Office issued in corresponding Application No. 2013-040123.
(Continued)

*Primary Examiner* — Sung Pak
*Assistant Examiner* — Hoang Tran
(74) *Attorney, Agent, or Firm* — Sughrue Mion, PLLC

(57) ABSTRACT

An optical fiber splicing tool of the invention include: an optical fiber splicing unit that includes: an optical fiber grasper that grasps a first optical fiber at a mechanical splice; and a guide target that is slidable along a guide provided at a connecting jig that fixes a second optical fiber to be butt-jointed to the first optical fiber; and a connecting jig that includes: a guide that guides the optical fiber splicing unit; and an optical fiber fixer that fixes the second optical fiber.

(Continued)

The optical fiber splicing unit provides a first flexure width between one end side of the mechanical splice and the optical fiber grasper, and a second flexure width shorter than the first flexure width is ensured between the other end side of the mechanical splice and the optical fiber fixer when butt-jointing is carried out.

12 Claims, 80 Drawing Sheets

(30) Foreign Application Priority Data

| Feb. 28, 2013 | (JP) | 2013-040123 |
| Feb. 28, 2013 | (JP) | 2013-040124 |
| Feb. 28, 2013 | (JP) | 2013-040125 |

(56) References Cited

U.S. PATENT DOCUMENTS

| 2006/0153515 A1 | 7/2006 | Honma et al. |
| 2007/0211997 A1 | 9/2007 | Saito et al. |
| 2011/0119904 A1 | 5/2011 | Nishioka et al. |

FOREIGN PATENT DOCUMENTS

| EP | 2 743 744 A1 | 6/2014 | |
| JP | 06-062428 U | 9/1994 | |
| JP | 10-274721 A | 10/1998 | |
| JP | 2000-121863 A | 4/2000 | |
| JP | 2005128139 A | 5/2005 | |
| JP | 2007-178786 A | 7/2007 | |
| JP | 2008-107602 A | 5/2008 | |
| JP | 2009-069293 A | 4/2009 | |
| JP | 2010-145951 A | 7/2010 | |
| JP | 2011-095454 A | 5/2011 | |
| JP | 2011-117985 A | 6/2011 | |
| JP | WO2013/022071 * | 8/2012 | ............... G02B 6/38 |
| JP | 2013-37235 A | 2/2013 | |
| TW | 342461 B | 10/1998 | |
| TW | 201011362 A1 | 3/2010 | |
| WO | 2013/022071 A1 | 2/2013 | |

OTHER PUBLICATIONS

Communication dated Dec. 15, 2015 from the Japanese Patent Office issued in corresponding Application No. 2013-040096.
Communication dated Mar. 17, 2017, from the Indonesia Patent Office in counterpart Indonesia application No. P00201505222.
Taiwanese Office Action issued in TW 103107003 dated Mar. 25, 2015.
Japanese Office Action issued in JP 2013-040044 dated Jul. 28, 2015.
Japanese Office Action issued in JP 2013-040096 dated Jul. 28, 2015.
Japanese Office Action issued in JP 2013-040123 dated Jul. 28, 2015.
Japanese Office Action issued in JP 2013-040124 dated Jul. 28, 2015.
Japanese Office Action issued in JP 2013-040125 dated Jul. 28, 2015.
Communication dated Sep. 12, 2016, issued by the European Patent Office in corresponding European Application No. 14757196.2.
Communication dated Jul. 25, 2017 from the State Intellectual Property Office of the P.R.C. in counterpart Application No. 201480009669.5.
Communication dated Sep. 14, 2017, issued by the Canadian Intellectual Property Office in corresponding Canadian Application No. 2,901,986.
Communication dated Mar. 16, 2018, from European Patent Office in counterpart application No. 14 757 196.2.
Communication dated Sep. 24, 2015 from the Japanese Patent Office in counterpart application No. 2013-040124.
Communication dated Sep. 24, 2015 from the Japanese Patent Office in counterpart application No. 2013-040044.
Communication dated Sep. 15, 2015 from the Japanese Patent Office in counterpart application No. 2013-040125.
Communication dated Sep. 24, 2015 from the Japanese Patent Office in counterpart application No. 2013-040123.

* cited by examiner

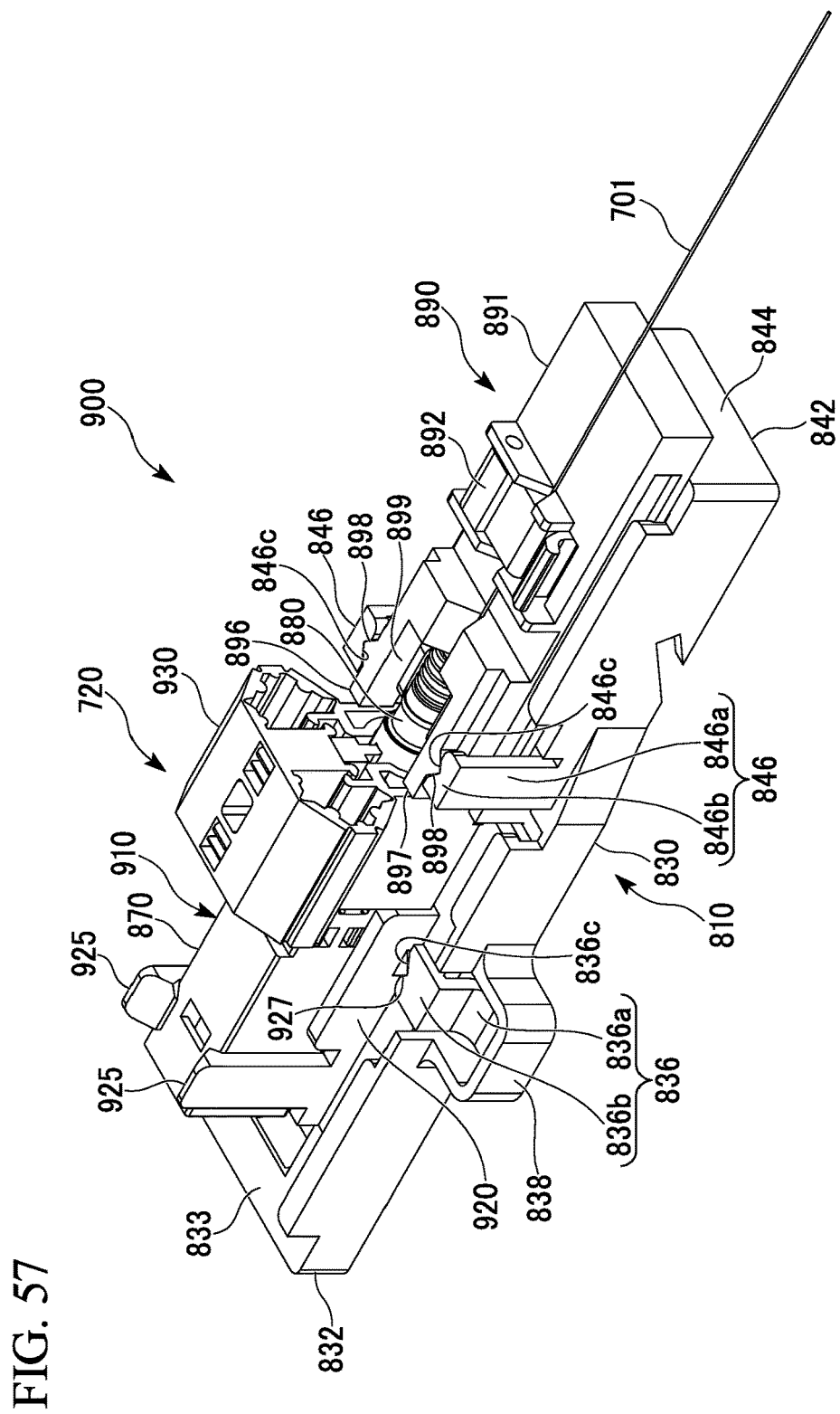

OPTICAL FIBER SPLICING TOOL AND OPTICAL FIBER SPLICING METHOD

CROSS REFERENCE TO RELATED APPLICATIONS

This is a National Stage of International Application No. PCT/JP2014/055159 filed Feb. 28, 2014, claiming priority based on Japanese Patent Application No. 2013-040044 filed Feb. 28, 2013, Japanese Patent Application No. 2013-040096 filed Feb. 28, 2013, Japanese Patent Application No. 2013-040123 filed Feb. 28, 2013, Japanese Patent Application No. 2013-040124 filed Feb. 28, 2013, and Japanese Patent Application No. 2013-040125 filed Feb. 28, 2013, the contents of all of which are incorporated herein by reference in their entirety.

TECHNICAL FIELD

The present invention relates to an optical fiber splicing tool and an optical fiber splicing method.

Particularly, the present invention relates to a cable outer coating grasping member that is incorporated into an optical fiber cable having a structure into which an optical fiber and a pair of tensile strength members are implanted in an outer coating made of a synthetic resin material and that is thereby available to hold an optical fiber cable with respect to a housing of an optical connector.

Particularly, the present invention relates to a mechanical splicing tool having an interposing member that is interposed between elements of a mechanical splice that grasps optical fiber between the elements thereof.

This application claims priority from Japanese Patent Application No. 2013-040044 filed on Feb. 28, 2013, Japanese Patent Application No. 2013-040096 filed on Feb. 28, 2013, Japanese Patent Application No. 2013-040123 filed on Feb. 28, 2013, Japanese Patent Application No. 2013-040124 filed on Feb. 28, 2013, and Japanese Patent Application No. 2013-040125 filed on Feb. 28, 2013, the contents of which are incorporated herein by reference in their entirety.

BACKGROUND ART

Patent Document 1 discloses an optical fiber splicer having a pair of graspers that grasps two optical fibers and a holding member that butt-joints ends of optical fibers to each other and holds them.

In order to ensure a force of butt-jointing the optical fibers to each other, the optical fiber splicer is designed to be able to produce flexure of an optical fiber.

Additionally, Patent Document 1 discloses an optical fiber splicer including a holding member (mechanical splice) that butt-joints ends of optical fibers to each other and holds them.

An insertion unit (mechanical splicing tool) having an insertion member is used in this optical fiber splicer.

The insertion unit inserts an insertion member between the holding members and thereby can form a space between the holding members between which an optical fiber can be inserted.

It is desirable that attachment and removal operations be easily carried out by use of the insertion unit.

In the case where two or more optical fiber splicers for a splicing operation using an optical fiber splicing tool are used, it is necessary to prevent optical fibers from being erroneously spliced due to mishandling.

Moreover, for data communication service using an optical fiber (FTTH: Fiber To The Home), a drop optical fiber cable (hereinbelow, also referred to as a drop optical cable) that is dropped and drawn to a subscriber form a trunk optical fiber cable or the like is used, and an indoor optical fiber cable (hereinbelow, also referred to as an optical indoor cable) is used as an indoor optical fiber in the subscriber's house or the like.

An optical fiber cable (hereinbelow, also referred to as a fiber-embedded cable) is heavily used as a drop optical cable and an optical indoor cable, which is configured to include an optical fiber and a pair of tensile strength members embedded in an outer coating where the outer coating is formed in a rectangular shape in cross section and is made of a synthetic resin material.

As an optical connector that is incorporated into a drop optical cable or an optical indoor cable, a connecter is often used which has a grasping member locking portion in the housing thereof. The grasping member locking portion locks an outer coating grasping member fixed to a cable end portion.

The optical connector can hold the fiber-embedded cable in the housing thereof via the outer coating grasping member that locks the grasping member locking portion.

Conventionally, an integrally-molded product made of resin as described in, for example, Patent Document 2, which is configured to include: an extended grasping member main body that is formed in a U-shape in cross section; and a lid that is openably and closably attached to the grasping member main body with a thin hinge portion interposed therebetween, is widely used as an outer coating grasping member.

Grasping claws are provided to protrude from inner surfaces that face both side wall portions of the grasping member main body, and the grasping claws grasp and fix the fiber-embedded cable accommodated between both the side wall portions thereof to both the sides thereof and ensures a cable-holding force.

The grasping claws are triangular in cross section, formed in a projected shape that is vertically extended from an inner surface of the bottom of the grasping member main body, and formed at the positions face each other on the inner surface of both the side wall portions of the grasping member main body.

Additionally, protruding claws, that are formed in a projected shape and are cut into an outer coating of a cable accommodated between both the side wall portions of the grasping member main body, are provided on the inner surface of the bottom of the grasping member main body, on the inner surface that faces the inner surface of the bottom of the grasping member main body when the lid closes a grasping member main body, and at the positions opposed to each other.

The grasping claws provided on both the side wall portions of the grasping member main body, the bottom of the grasping member main body, and the protruding claws of the lid closing the grasping member main body are cut into the outer coating of the fiber-embedded cable that is accommodated between both the side wall portions of the grasping member main body, and the outer coating grasping member is thereby securely incorporated into the fiber-embedded cable (refer to FIGS. 10 to 13 or the like in Patent Document 2).

Patent Document 3 discloses an optical-connector assembling jig that is provided with a jig body part to which an optical connector is attached and a fiber holder which holds an optical fiber to be connected to the optical connector.

When splicing of an optical fiber is carried out by use of the optical-connector assembling jig, an optical fiber is inserted into the optical connector by sliding the fiber holder toward the optical connector on the jig body part.

PRIOR ART DOCUMENTS

Patent Documents

[Patent Document 1] Japanese Unexamined Patent Application, First Publication No. 2010-145951
[Patent Document 2] Japanese Unexamined Patent Application, First Publication No. 2011-95454
[Patent Document 3] Japanese Unexamined Patent Application, First Publication No. 2009-69293

SUMMARY OF INVENTION

Problems to be Solved by the Invention

In the aforementioned optical fiber splicer, in order to produce a flexure on an optical fiber, a sufficient distance between both the grasper and the holding member is necessary, and an excess length of the optical fiber which should be ensured becomes long.

Therefore, in the case where it is difficult to ensure an excess length of the optical fiber or the like, malfunction may be caused, and improvement is desired to easily carry out the splicing operation.

As described in last four rows in paragraph 0004 and shown in FIGS. 8A and 8B of Patent Document 2, various cross-sectional sizes of fiber-embedded cables are present.

In Patent Document 2, FIG. 8 (a) shows a drop optical cable having a cross-sectional size of 2.0×3.1 mm and FIG. 8 (b) shows a so-called small-diameter optical indoor cable having 1.6×2.0 mm.

Conventionally, in the case of using an outer coating grasping member for fixing a drop optical cable having a size of 2.0×3.1 mm and a small-diameter optical indoor cable having a size of 1.6×2.0 mm, a grasping member outer coating for exclusive use for each cross-sectional size of a cable is generally prepared in terms of ensuring a proper cable-holding force.

The preparation of a grasping member outer coating for exclusive use for each cross-sectional size of a cable causes a degree of labor for management to increase and results in an increase in the cost therefor.

In consideration of this, a grasping member outer coating is proposed in which, for example, the distance between the apexes of the grasping claws which are opposed to each other and are provided on both the side wall portions of the grasping member main body is set to realize the grasping claws that cut into the outer coatings of two types of fiber-embedded cables having cross-sectional sizes different from each other (for example, an outer coating grasping member disclosed in Claim 1, FIGS. 3 to 5, or the like of Patent Document 2).

However, in the outer coating grasping member, due to workability of pushing the cable having a large cross-sectional size into the grasping member main body, it is not easy to increase a force of holding a cable having a small cross-sectional size.

Particularly, in the outer coating grasping member, as a distance between the apexes of the grasping claws of the grasping member main body which are opposed to each other is set small in order to increase the force of holding the cable having a small cross-sectional size, the grasping claw is deeply cut into the outer coating of the cable having a large cross-sectional size.

In the case where, for example, a distance between the apexes of the grasping claws is smaller than 1.20±0.05 mm disclosed in Patent Document 2, a force necessary to push a drop optical cable having a size of 2.0×3.1 mm into the grasping member main body increases, and there is a possibility that it affects the workability of the push therefor.

In the optical-connector assembling jig disclosed in Patent Document 3, an optical fiber to be connected to an optical connector needs a sufficient excess length for connection.

Therefore, in the case where it is difficult to ensure an excess length of the optical fiber or the like, malfunction may be caused, and improvement is desired in terms of workability for splicing.

The invention has an object to provide an optical fiber splicing tool and an optical fiber splicing method which makes splicing operation easy by shortening a necessary excess length of the optical fiber and which can ensure a sufficient force of butt-jointing optical fibers to each other.

The invention has an object to provide a mechanical splicing tool by which attachment and removal operations of a mechanical splice become easy.

The invention has an object to provide an optical fiber splicing tool which prevents optical fibers from being incorrectly spliced.

The invention was made with respect to the above-described problems and has an object to provide a cable outer coating grasping member which can easily ensure a large cable-holding force that is to be applied to two types of fiber-embedded cables having cross-sectional sizes different from each other.

The invention has an object to provide an optical fiber splicing tool and an optical fiber splicing method which can carry out a splicing operation even in the case where it is difficult to ensure an excess length of the optical fiber at the time of connecting an optical fiber to an optical connector.

Means for Solving the Problems

An optical fiber splicing tool according to a first aspect of the invention includes: an optical fiber splicing unit that includes: a mechanical splice holder that holds a mechanical splice; an optical fiber grasper that grasps a first optical fiber at one end side of the mechanical splice; and a guide target that is slidable along a guide provided at a connecting jig that fixes a second optical fiber to be butt-jointed to the first optical fiber; and a connecting jig that includes: a guide that guides the optical fiber splicing unit; and an optical fiber fixer that fixes the second optical fiber, wherein the optical fiber splicing unit provides a first flexure width between one end side of the mechanical splice and the optical fiber grasper, and a second flexure width shorter than the first flexure width is ensured between the other end side of the mechanical splice and the optical fiber fixer when butt-jointing is carried out.

It is preferable that the first flexure width be less than or equal to 10 mm when butt-jointing is carried out.

It is preferable that a groove that prevents the guide target from being separated from the connecting jig be formed in the guide.

It is preferable that the first optical fiber be an optical fiber that is drawn from a terminal of an optical fiber cable and that the optical fiber grasper be a cable grasping member that grasps a terminal of the optical fiber cable.

It is preferable that the optical fiber splicing tool according to the first aspect of the invention include a cable outer coating grasping member.

In this case, the cable outer coating grasping member includes: a grasping member main body including side wall portions that are provided on the respective right and left of a bottom wall; and a lid that is openably and closably provided to the grasping member main body with a hinge interposed therebetween, a first cable groove into which a first optical fiber cable is to be fitted and a second cable groove into which a second optical fiber cable is to be fitted are ensured between both the side wall portions of the grasping member main body so that centers of groove widths thereof coincide with each other, the second cable groove is formed so as to extend from one end of the first cable groove and has a width narrower than that of the first cable groove, and the second optical fiber cable has a cross-sectional size smaller than that of the first optical fiber cable, a plurality of grasping claws that have a triangular cross section and extend in a depth direction of the first cable groove and the second cable groove are formed on inner surfaces of both the side wall portions of the grasping member main body so as to face each other, and a first protruding claw that cuts into an outer coating of the first optical fiber cable accommodated in the first cable groove and a second protruding claw that cuts into an outer coating of the second optical fiber cable accommodated in the second cable groove are formed on an inner surface of a bottom wall of the grasping member main body and on an inner face side that is opposed to an inner surface of a bottom wall of the grasping member main body when the lid closes the grasping member main body.

In the cable outer coating grasping member of the optical fiber splicing tool according to the first aspect of the invention, it is preferable that, of the grasping claws, first grasping claws which face each other at both sides of the first cable groove protrude, from virtual extensions of inner surfaces of side wall portions which face each other at both sides of the second cable groove, toward in a center side thereof in the groove width of the first cable groove.

In the cable outer coating grasping member of the optical fiber splicing tool according to the first aspect of the invention, it is preferable that the first cable groove be configured to be capable of fitting the first optical fiber cable having a rectangular shape in cross section, which has a width of 2.0 mm and a height of 3.1 mm in cross-sectional sizes, thereinto so that a width direction thereof is aligned along a groove width direction, the second cable groove be configured to be capable of fitting the second optical fiber cable having a rectangular shape in cross section, which has a width 1.6 mm and a height 2.0 mm in cross-sectional sizes, thereinto so that a width direction thereof is aligned along a groove width direction, as a result of closing the lid on the grasping member main body in the case where the first optical fiber cable is fitted into the first cable groove or in the case where the second optical fiber cable is fitted into the second cable groove, the grasping member main body and the lid be capable of forming a rectangular cylindrical body that accommodates the first optical fiber cable or the second optical fiber cable, a distance between ridges of the first grasping claws which face each other be 1.5±0.1 mm, a distance between the inner surfaces of the side wall portions which face each other with the second cable groove interposed therebetween be 1.7±0.15 mm, and a distance between ridges of second grasping claws of the grasping claw which face each other at both sides of the second cable groove be 1.15±0.05 mm.

In the cable outer coating grasping member of the optical fiber splicing tool according to the first aspect of the invention, it is preferable that the second cable groove be formed to have a groove depth shallower than that of the first cable groove, the inner surface of the bottom wall of the grasping member main body include: a first groove bottom surface that is positioned at a groove bottom of the first cable groove; and a second groove bottom surface that is formed at a groove bottom of the second cable groove and is parallel to the first groove bottom surface, and a virtual plane, that is parallel to the first and second groove bottom surfaces and passes through a center between apexes of the first protruding claws which face each other, pass through a center between apexes of the second protruding claws which face each other.

In the cable outer coating grasping member of the optical fiber splicing tool according to the first aspect of the invention, it is preferable that, regarding the first protruding claws which face each other, a protruding length of a lid-side first protruding claw provided to protrude from the lid, which is from a lid inner surface, be longer than a protruding length of a main-body-side first protruding claw provided to protrude from the grasping member main body, which is from the first groove bottom surface, and that, regarding the second protruding claws which face each other, a protruding length of a lid-side second protruding claw provided to protrude from the lid, which is from a lid inner surface, be longer than a protruding length of a main-body-side second protruding claw provided to protrude from the grasping member main body, which is from the second groove bottom surface.

In the cable outer coating grasping member of the optical fiber splicing tool according to the first aspect of the invention, it is preferable that a difference in level that is contactable to an end face of the first optical fiber cable is provided between the first groove bottom surface and the second groove bottom surface.

In the cable outer coating grasping member of the optical fiber splicing tool according to the first aspect of the invention, it is preferable that a distance between apexes of the first protruding claws which face each other be longer than a distance between apexes of the second protruding claws which face each other.

It is preferable that the optical fiber splicing tool according to the first aspect of the invention include a mechanical splicing tool.

In this case, the mechanical splicing tool is a mechanical splicing tool that clamps a pair of butt jointed optical fibers between elements by elastic action of a spring and thereby maintains a state where the optical fibers are spliced, the mechanical splicing tool including: an interposing member that interposes between elements of a mechanical splice and thereby maintains a state where the elements are pressed and opened; and a ring-shaped interposing member driving unit that is used to remove the interposing member interposed between the elements of the mechanical splice from between the elements, wherein the interposing member includes: a trunk that is supported by an interposing member support provided on the interposing member driving unit; an interposing-end support that extends from the trunk in a center axis direction of the interposing member driving unit; and a plurality of interposing-end portions that are provided to protrude from the extending interposing-end support, each of which is to be interposed between the elements of the mechanical splice, wherein the interposing member support is formed on a facing wall portion, the facing wall portion faces an interposing-member inserting hole via an inside space of the interposing member driving unit, and the interposing-member inserting hole allows the interposing member to protrude outward, and wherein the interposing member driving unit is configured so that, when a lateral pressure is applied to the interposing member driving unit in a circumferential direction thereof and in the direction of approaching both side wall portions located between the facing wall portion and the interposing-member inserting hole to each other, the interposing member driving unit is deformed so that a distance between the interposing member support and the interposing-member inserting hole increases, an outward protrusion amount of the interposing member with respect to the interposing member driving unit is reduced, and the interposing-end portions of the interposing member is removable from between the elements.

In the mechanical splicing tool of the optical fiber splicing tool according to the first aspect of the invention, it is preferable that the interposing-end support be elastically deformable.

In the mechanical splicing tool of the optical fiber splicing tool according to the first aspect of the invention, it is preferable that a plurality of interposing members be provided on the interposing member driving unit via the interposing member support.

In the mechanical splicing tool of the optical fiber splicing tool according to the first aspect of the invention, it is preferable that the mechanical splice be held between a pair of protruding wall portions of a unit base, the protruding wall portions face each other and that the interposing-end support be fitted between the paired protruding wall portions and the movement thereof in a width direction thereof be restricted.

In the mechanical splicing tool of the optical fiber splicing tool according to the first aspect of the invention, it is preferable that the interposing member driving unit be fitted into a fitting recess formed on the protruding wall portion and the movement thereof in a longitudinal direction thereof be restricted.

An optical fiber splicing method according to a second aspect of the invention includes: using an optical fiber splicing tool, the optical fiber splicing tool including: an optical fiber splicing unit that includes: a mechanical splice holder that holds a mechanical splice; an optical fiber grasper that grasps a first optical fiber at one end side of the mechanical splice; and a guide target that is slidable along a guide provided at a connecting jig that fixes a second optical fiber to be butt-jointed to the first optical fiber; and a connecting jig that includes: a guide that guides the optical fiber splicing unit; and an optical fiber fixer that fixes the second optical fiber, wherein the optical fiber splicing unit provides a first flexure width between one end side of the mechanical splice and the optical fiber grasper, and a second flexure width shorter than the first flexure width is ensured between the other end side of the mechanical splice and the optical fiber fixer when butt-jointing is carried out; moving the optical fiber splicing unit along the guide of the connecting jig in the direction of approaching the optical fiber fixer; applying a force to the first optical fiber that is inserted through one end side of the mechanical splice and the second optical fiber that is inserted through the other end side of the mechanical splice in a butt-jointing direction; and causing the first optical fiber to be flexurally deformed at one end side of the mechanical splice and causing the second optical fiber not to be flexurally deformed at the other end side of the mechanical splice.

An optical fiber splicing tool according to a third aspect of the invention includes: a first optical fiber splicing unit that holds one optical fiber; a first optical fiber fixer that fixes the other optical fiber that is to be butt-jointed to said one optical fiber; and a connecting jig on which they are to be mounted wherein the connecting jig includes: a holder that holds the first optical fiber fixer; and a guide that guides the first optical fiber splicing unit in the direction of approaching the first optical fiber fixer wherein the holder is capable of holding a second optical fiber fixer instead of the first optical fiber fixer wherein the guide is capable of guiding a second optical fiber splicing unit in the direction of approaching the second optical fiber fixer instead of the first optical fiber splicing unit wherein the first optical fiber fixer includes: a base body on which the other optical fiber is fixed; and a pair of extended portions that extends from the base body toward the guide wherein a leading-end portion of the first optical fiber splicing unit is capable of entering into a first unit accommodation space that is ensured between the extended portions wherein the second optical fiber fixer includes: a base body on which the other optical fiber is fixed; and a pair of extended portions that extends from the base body toward the guide wherein a leading-end portion of the second optical fiber splicing unit is capable of entering into a second unit accommodation space that is ensured between the extended portions wherein a first entry prevention portion that prevents the second optical fiber splicing unit from entering into the first unit accommodation space is formed at at least one of the extended portions of the first optical fiber fixer, and a second entry prevention portion that prevents the first optical fiber splicing unit from entering into the second unit accommodation space is formed at at least one of the extended portions of the second optical fiber fixer.

It is preferable that the first optical fiber splicing unit include a first mechanical splice that causes said one optical fiber that is inserted through one end side to be butt-jointed to the other optical fiber that is inserted through the other end side and that the second optical fiber splicing unit includes a second mechanical splice that causes said one optical fiber that is built in a ferrule to be butt-jointed to the other optical fiber.

It is preferable that the first entry prevention portion be a projecting portion that protrudes toward the first unit accommodation space and that the second entry prevention portion be a projecting portion that protrudes toward the second unit accommodation space.

It is preferable that the paired extended portions of the first optical fiber fixer be formed at one side portion and the other side portion of the base body, that the paired extended portions of the second optical fiber fixer be formed at one side portion and the other side portion of the base body, that the first entry prevention portion be formed at the extended portion of the one side portion, and that the second entry prevention portion be formed at the extended portion of the one side portion.

It is preferable that the first optical fiber fixer and the second optical fiber fixer have different colors, that at least one portion of the first optical fiber splicing unit have the same basic color as that of the first optical fiber fixer, and that at least one portion of the second optical fiber splicing unit have the same basic color as that of the second optical fiber fixer.

An optical fiber splicing tool according to a fourth aspect of the invention includes: an optical fiber splicing unit that includes an optical connector provided with a first optical fiber; and a connecting jig that causes the first optical fiber to be butt-jointed to a second optical fiber wherein the optical connector includes: a ferrule that incorporates the first optical fiber therein; and a splicing mechanism that causes the first optical fiber to be butt-jointed to the second optical fiber, and wherein the connecting jig includes: an optical fiber fixer that fixes the second optical fiber; and a guide that guides the optical fiber splicing unit toward the optical fiber fixer.

It is preferable that the optical fiber splicing unit include a guide target that holds the optical connector, and that the guide target slidably move along the guide in the direction of approaching the optical fiber splicing unit.

It is preferable that the guide target include a base and a pair of elastic locking ends that protrudes from the base, and that the paired elastic locking ends include a locking projected portion that is engaged with the optical connector held between them.

It is preferable that the locking projected portion be lockable to the optical connector in a predetermined region in the extending direction of the optical connector and have an inclined inner edge of which the protrusion height is gradually reduced in the extending direction toward the end thereof.

An optical fiber splicing method according to a fifth aspect of the invention includes: using an optical fiber splicing tool that includes: an optical fiber splicing unit that includes an optical connector provided with a first optical fiber; and a connecting jig that causes the first optical fiber to be butt-jointed to a second optical fiber, the optical connector including: a ferrule that incorporates the first optical fiber therein; and a splicing mechanism that causes the first optical fiber to be butt-jointed to the second optical fiber, and the connecting jig including: an optical fiber fixer that fixes the second optical fiber; and a guide that guides the optical fiber splicing unit toward the optical fiber fixer, wherein, as a result of causing the optical fiber splicing unit to move along the guide of the connecting jig in the direction of approaching the optical fiber fixer, the first optical fiber is butt-jointed to the second optical fiber.

Effects of the Invention

According to the first aspect and the second aspect of the invention, as a result of causing the optical fiber splicing unit that holds the first optical fiber to approach the optical fiber fixer along the guide of the connecting jig, butt-jointing can be carried out while flexural deformation occurs only in the first optical fiber.

Since it is not necessary to ensure a distance necessary to cause flexural deformation of the second optical fiber between the optical fiber fixer and the mechanical splice, it is possible to arrange the optical fiber fixer in proximity to the mechanical splice.

For this reason, even in the case where an excess length of the second optical fiber which can be ensured is short, it is possible to reliably carry out butt-jointing, and a splicing operation becomes easy.

In addition, a force of butt-jointing is ensured due to elastic action generated by the flexurally-deformed first optical fiber, and it is possible to sufficiently obtain the reliability of splicing thereof.

The cable outer coating grasping member of the optical fiber splicing tool according to the first aspect of the invention includes: the first cable groove into which the first optical fiber cable is fitted; and the second cable groove into which the second optical fiber cable having the cross-sectional size smaller than that of the first optical fiber cable.

The cable outer coating grasping member can accommodate two kinds of optical fiber cables having the cross-sectional sizes different from each other in the corresponding cable grooves that are suitable for fitting fixation.

Moreover, the cable outer coating grasping member can individually set each of the protruding lengths of the grasping claws from the side wall portions of the grasping member main body in the first cable groove and the second cable groove.

Consequently, the cable outer coating grasping member can easily ensure a large cable-holding force to hold each of the first and second optical fiber cables.

According to the mechanical splicing tool of the optical fiber splicing tool according to the first aspect of the invention, since the interposing-end portions are provided at a plurality of portions of the interposing-end support in the extending direction thereof so as to protrude therefrom, it is possible to remove the interposing-end portions from the mechanical splice as a result of applying a lateral pressure to the interposing member driving unit.

Since the interposing-end support is formed so as to extend in the central axis direction of the interposing member driving unit, as a result of operating the interposing member driving unit, it is also possible to reliably operate the interposing-end portions that are separated from the interposing member driving unit in the extending direction thereof.

According to the optical fiber splicing tool according to the third aspect of the invention, in the case where the optical fiber splicing unit is not regularly combined with the optical fiber fixer, since the first entry prevention portion or the second entry prevention portion prevents the optical fiber splicing unit from approaching the optical fiber fixer, a splicing operation cannot be carried out, and an incorrect operation can be reliably prevented.

According to the fourth aspect and fifth aspect of the invention, since the connecting jig is provided with the guide that guides the optical fiber splicing unit toward the optical fiber fixer, as a result of moving the optical connector toward the optical fiber fixer without movement of the optical fiber fixer, it is possible to carry out the splicing of the optical fibers.

Consequently, even in the case where an excess length of the optical fiber is short, it is possible to reliably carry out the splicing of the optical fibers.

BRIEF DESCRIPTION OF THE DRAWINGS

FIG. 57 is a perspective view showing an optical fiber splicing tool according to a fifth embodiment of the invention.

EMBODIMENTS FOR CARRYING OUT THE INVENTION

Figure 1:
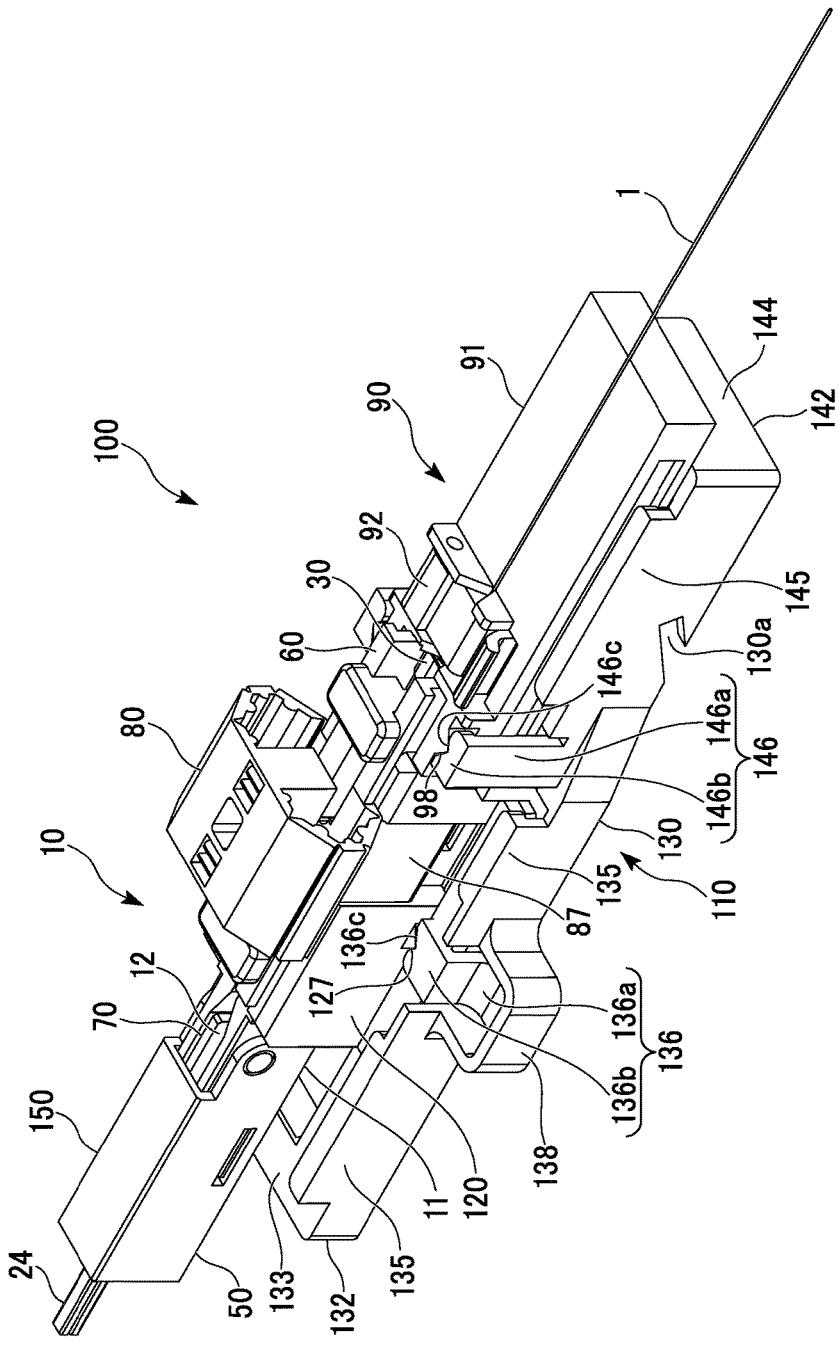
FIG. 1 is a perspective view showing an optical fiber splicing tool according to the first embodiment of the invention.
Figure 2:
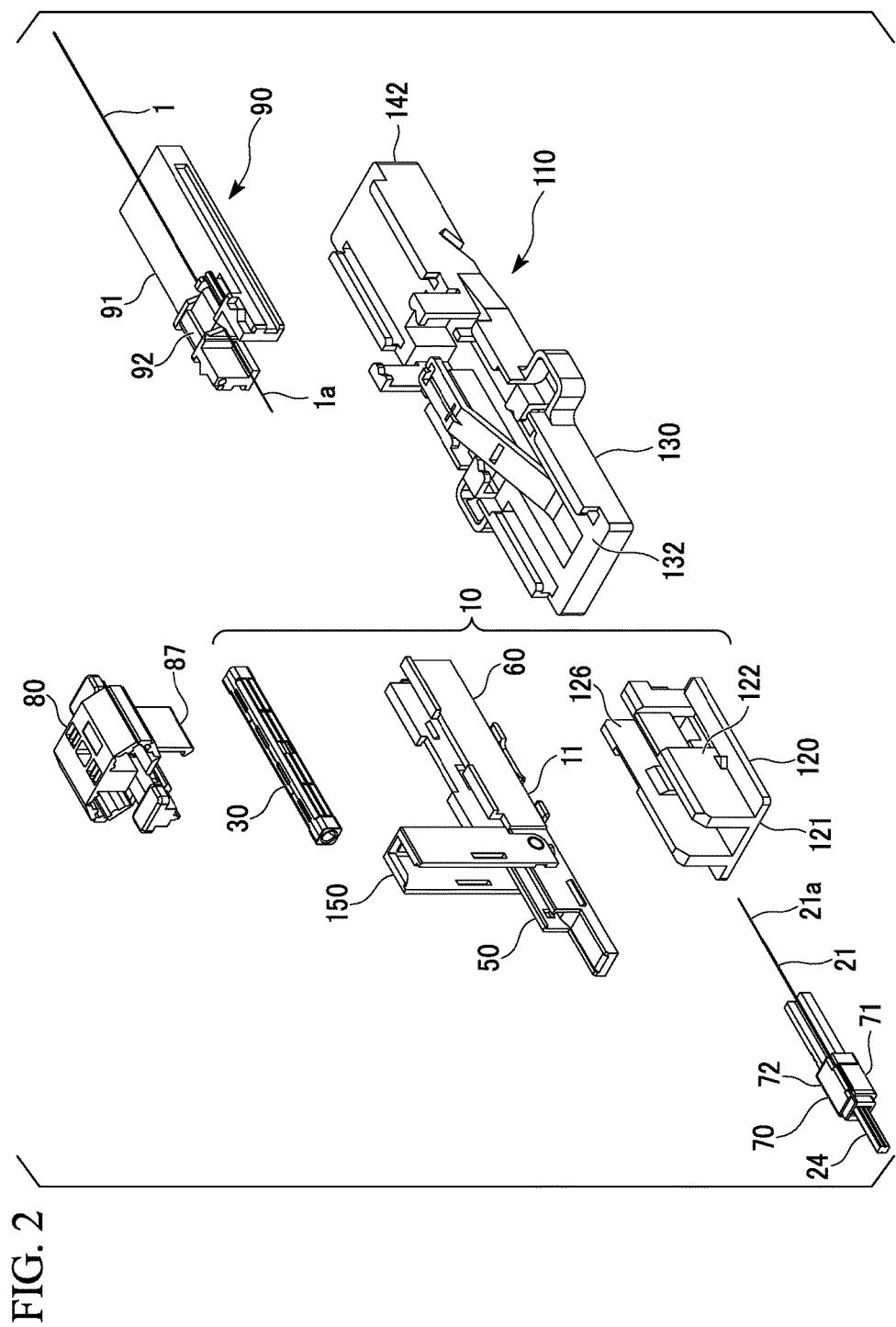
FIG. 2 is an exploded perspective view showing the optical fiber splicing tool according to the first embodiment of the invention.

Hereinafter, the invention will be described based on preferred embodiments with reference to drawings.

In these drawings which are utilized in the following explanation, appropriate changes have been made in the scale of the various members, in order to represent them at scales at which they can be easily understood.

The embodiments are specifically explained for appropriate understanding the scope of the present invention, and does not limit the present invention unless otherwise specified.

First Embodiment

As shown in FIGS. 1 to 4, an optical fiber splicing tool 100 includes: an optical fiber splicing unit 10 that is attached to a terminal 24a of an optical fiber cable 24; and a connecting jig 110 that holds a fiber holder 90 (optical fiber fixer) that grasps an inserted optical fiber 1 to be butt-jointed to an extended optical fiber 21 drawn from the terminal 24a.

The vertical direction in the following explanation may be defined in accordance with the vertical direction shown in FIG. 3.

The optical fiber splicing unit 10 includes: a mechanical splice 30 that causes the extended optical fiber 21 (first optical fiber) drawn from the terminal of the optical fiber cable 24 to be butt-jointed to the inserted optical fiber 1 (second optical fiber) and thereby grasps and fixes them; a cable grasping member 70 (optical fiber grasper) that grasps the optical fiber cable 24; a unit base 11 that holds them; and a slider 120 (guide target).

Regarding the optical fiber splicing unit 10, the direction of approaching the fiber holder 90 (the right direction shown in FIG. 3) is referred to as front and the direction opposite thereto is referred to as rear.

In addition, the mechanical splice is simply referred to as "splice".

As shown in FIGS. 2, 5, 6, and 16, the unit base 11 includes: a mechanical splice holder 60 (hereinbelow, referred to as a splice holder 60) that detachably holds the splice 30; and a grasping member holding portion 50 by which the cable grasping member 70 that detachably grasps the terminal 24a of the optical fiber cable 24 is held.

The splice holder 60 includes: a base body 61; a one-side-protruding wall portion 62 that is provided upright at one side edge of the base body 61; an another-side-protruding wall portion 63 that is provided upright at the other side edge of the base body 61; a front-side-protruding wall portion 64 that is provided at the forward end of the one-side-protruding wall portion 62; and a rear-side-protruding wall portion 65 that is provided at each of the back ends of the protruding wall portions 62 and 63.

The splice holder 60 accommodates the splice 30 in a splice storage space 67 that are ensured between the one-side-protruding wall portion 62 and the another-side-protruding wall portion 63, which are opposed to each other, and can and hold it.

Fitting recesses 62c and 63c into which an interposing member driving unit 82 (pressure-receiving wall 86) of a splicing tool 80 is fitted are formed on the upper edges of the protruding wall portions 62 and 63 and at the intermediate position in the longitudinal direction thereof.

Figure 6:
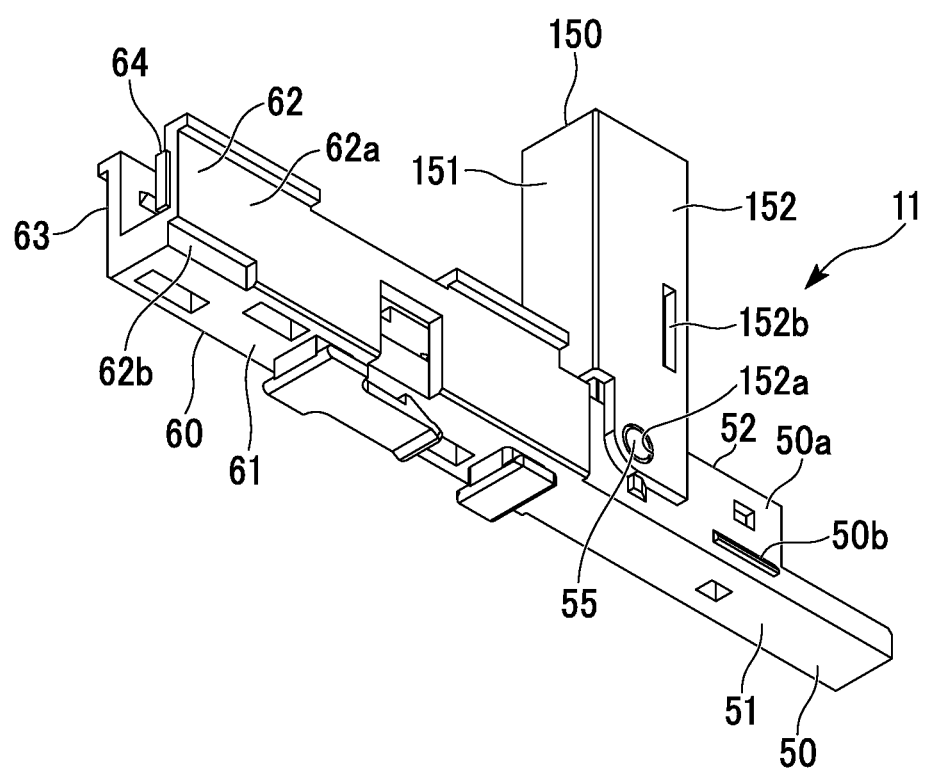
FIG. 6 is a perspective view showing a unit base according to the first embodiment of the invention.

As shown in FIG. 6, a checking recess 62b, into which a checking protuberance 96b of the fiber holder 90 can be inserted when the forward-end portion of the optical fiber splicing unit 10 is accommodated in a unit accommodation space 99 of the fiber holder 90, is formed on an outer surface 62a of the one-side-protruding wall portion 62 (corresponding to the one-side-extended portion 96 of the fiber holder 90).

The checking recess 62b is formed in a groove shape extending in the front-back direction thereof.

The separation distance between the front-side-protruding wall portion 64 and the rear-side-protruding wall portion 65 is set depending on the length of the splice 30 in the longitudinal direction, and the displacement of the splice 30 with respect to the base body 61 in the front-back direction is restricted by the front-side-protruding wall portion 64 and the rear-side-protruding wall portion 65.

The splice holder 60 can removably hold the splice 30.

Figure 17:
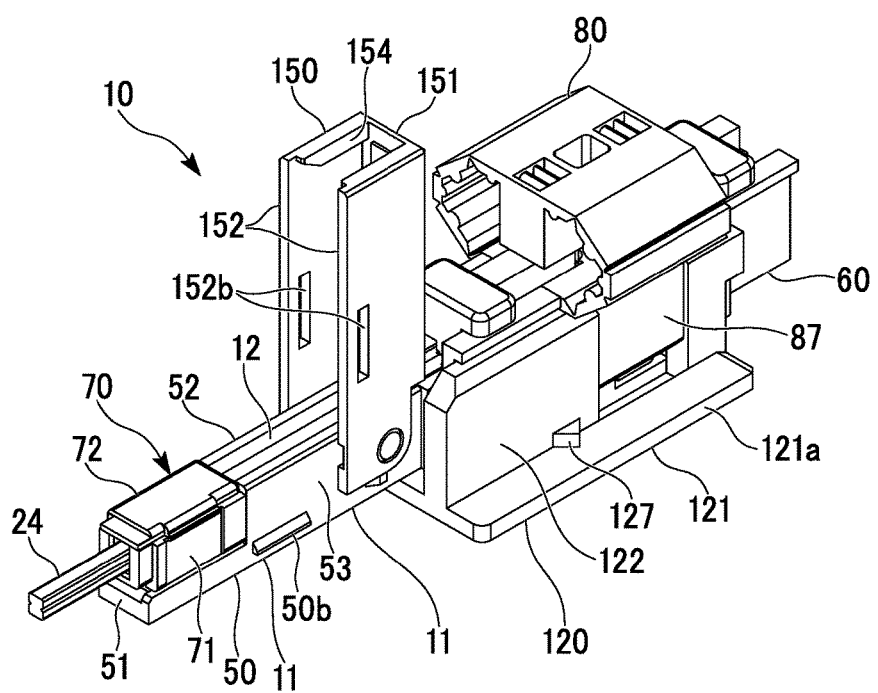
FIG. 17 is a flow sheet showing steps of assembling the optical fiber splicing tool according to the first embodiment of the invention.

As shown in FIGS. 6 and 17, the grasping member holding portion 50 includes: a base body 51; a one-side-protruding wall portion 52 that is provided upright one side edge of the base body 51; an another-side-protruding wall portion 53 that is provided upright at the other side edge of the base body 51; and a lever member 150 that positions the cable grasping member 70. The grasping member holding portion can hold the cable grasping member 70 on the base body 51.

Figure 12:
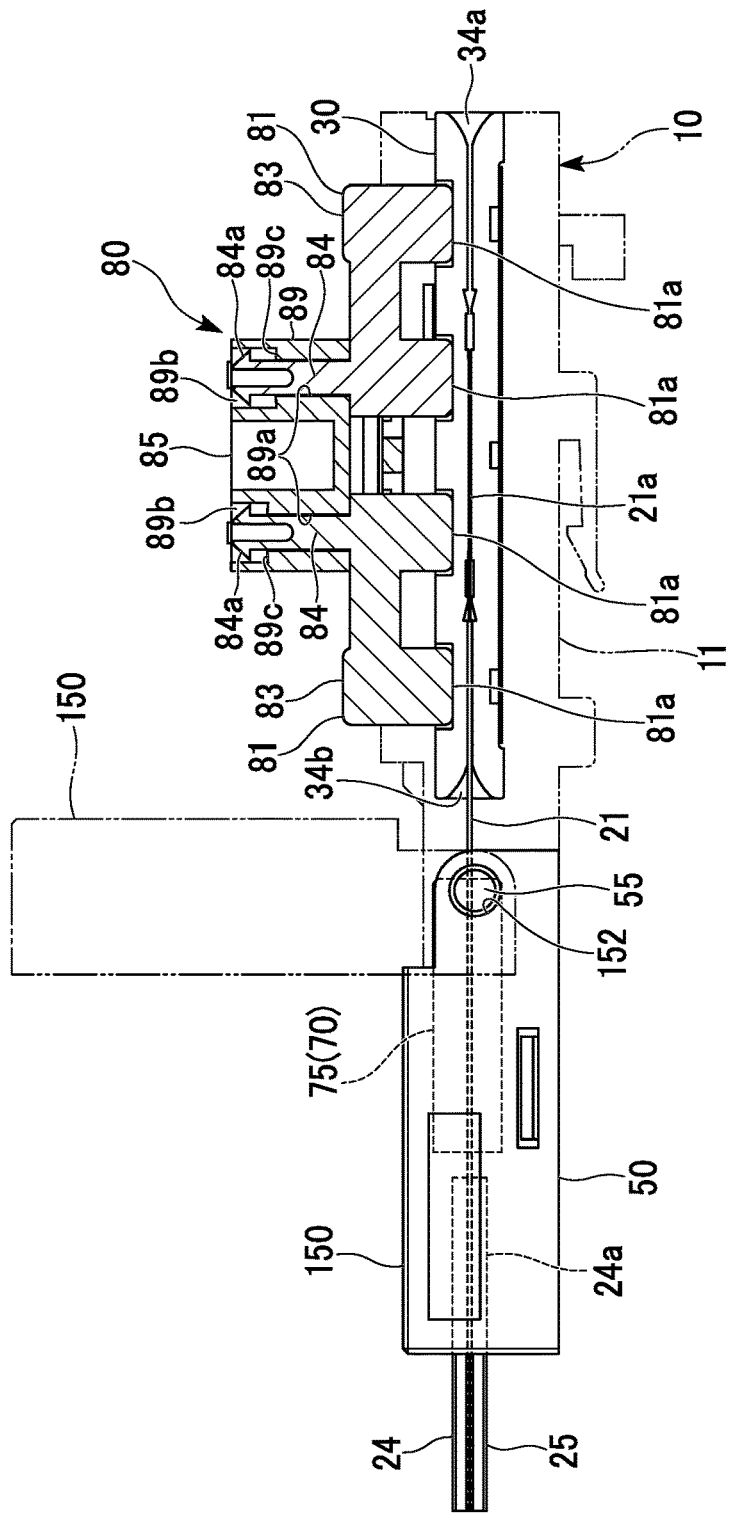
FIG. 12 is a cross-sectional view as seen from side, partially showing a state in which an interposing member according to the first embodiment of the invention is inserted between the elements of the mechanical splice.

As shown in FIGS. 6, 12, and 17, the lever member 150 includes: a cover plate 151 with which the cable grasping member 70 held by the grasping member holding portion 50 is to be covered; side plates 152 provided at both the sides thereof; and a backward-movement restriction end 154.

The lever member 150 rotates around a rotation shaft 55 of both side portions of the grasping member holding portion 50 and thereby can switch between a regulated position at which the cable grasping member 70 is held and the backward movement thereof is restricted (position indicated by a solid line shown in FIG. 12) and a standby position at which the backward movement of the cable grasping member 70 is not restricted (position indicated by a chain double-dashed line shown in FIG. 12).

The side plates 152 have bearing holes 152a into which the rotation shaft 55 provided to protrude from both the side portions of the grasping member holding portion 50 is inserted.

The lever member 150 is pivotally provided to the grasping member holding portion 50 by inserting the rotation shaft 55 into the bearing holes 152a.

At the regulated position, the lever member 150 can restrict the backward movement of the cable grasping member 70 with respect to the unit base 11 as a result of disposing the backward-movement restriction end 154 (refer to FIG. 17) at the back side of the cable grasping member 70.

The side plates 152 have engagement holes 152b that are to be engaged with engagement protrusions 50b protruding from external faces 50a of the grasping member holding portion 50.

The lever member 150 can be maintained to be positioned at the regulated position by causing the engagement protrusions 50b to engage with the engagement holes 152b.

It is preferable that the grasping member holding portion 50 and the splice holder 60 be integrally formed.

For example, they may be an integral molding product made of plastic.

In other cases, as modified examples, a structure may be adopted in which the grasping member holding portion 50 has a plate-shaped guide member (not shown in the figure) on which the cable grasping member 70 is slidably mounted.

As the guide member moves forward along with the cable grasping member 70, the guide member is accommodated inside the grasping member holding portion 50.

Figure 3:
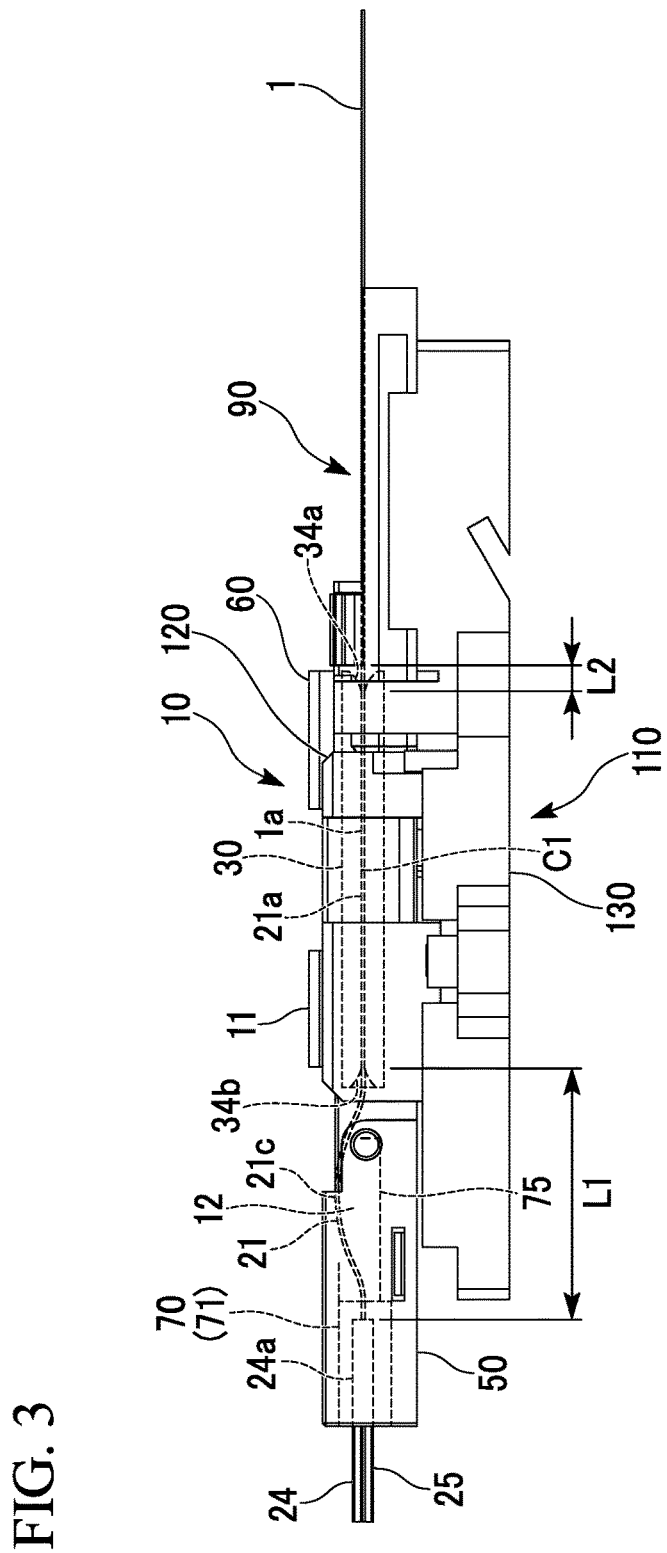
FIG. 3 is a side view showing the optical fiber splicing tool according to the first embodiment of the invention.
Figure 4:
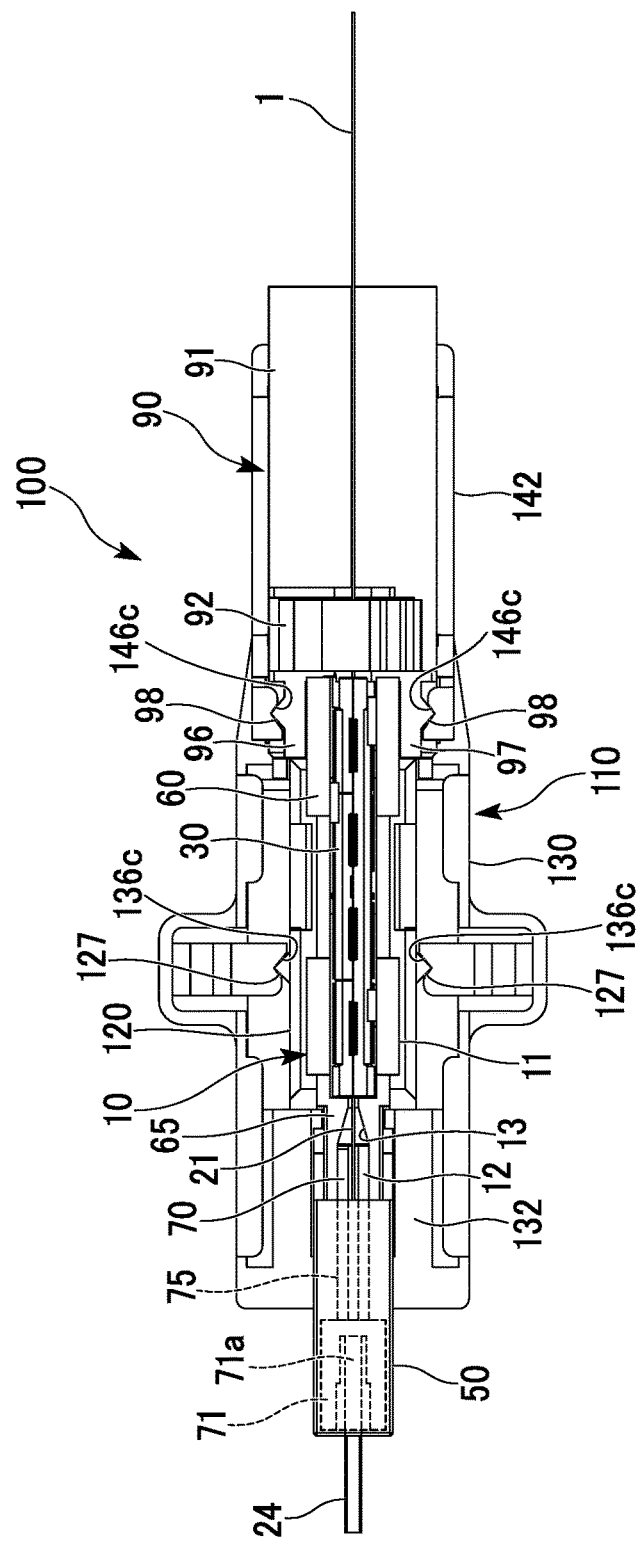
FIG. 4 is a plan view showing the optical fiber splicing tool according to the first embodiment of the invention.
Figure 5:
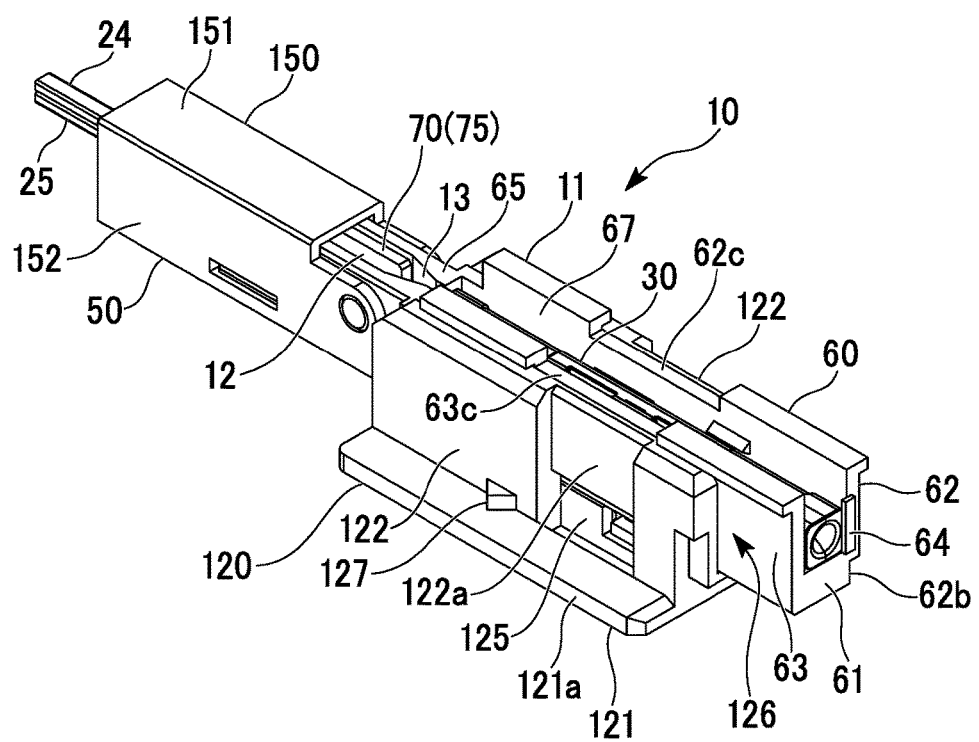
FIG. 5 is a perspective view showing an optical fiber splicing unit according to the first embodiment of the invention.

As shown in FIGS. 4 and 5, an optical fiber guiding portion 13 that guides the front end of the extended optical fiber 21 in a direction to a tapered-opening portion 34b of the splice 30 (refer to FIG. 3) is provided between the grasping member holding portion 50 and the splice holder 60 where the extended optical fiber protrudes from a front-side protrusion portion 75 of the cable grasping member 70.

The optical fiber guiding portion 13 has an inner surface inclined toward the center portion of the tapered-opening portion 34b and can guide the front end of the extended optical fiber 21 into the tapered-opening portion 34b of the splice 30 when inserts the cable grasping member 70 into the grasping member holding portion 50.

A flexible space 12 in which the extended optical fiber 21 can flexibly deform is ensured inside the unit base 11 and between the splice 30 and a grasping base 71 of the cable grasping member 70.

Figure 7:
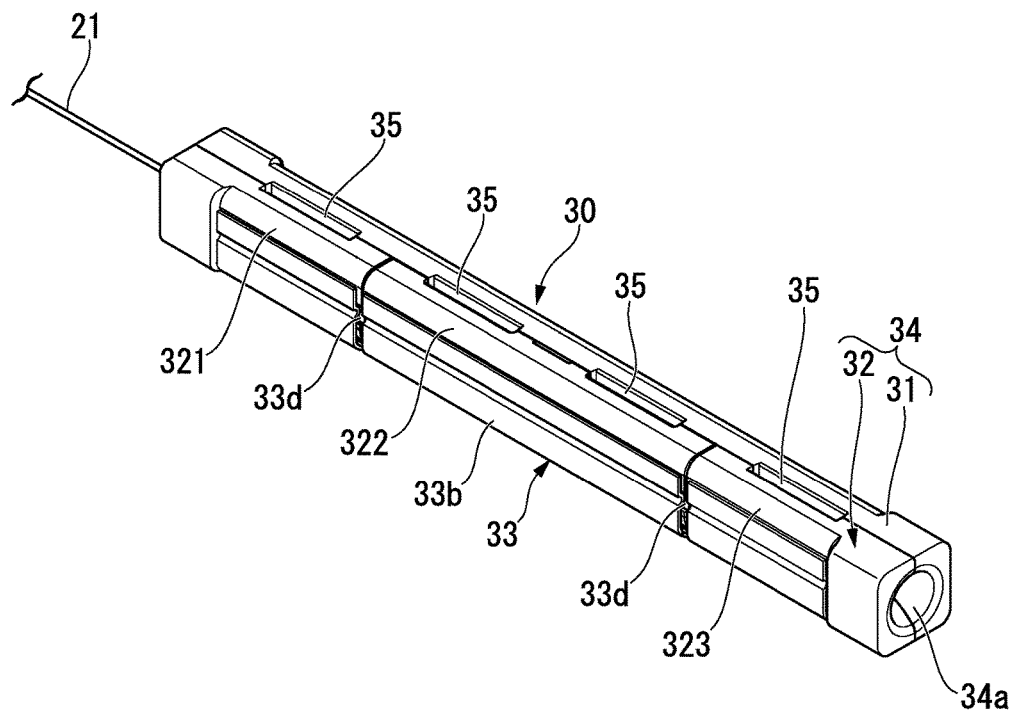
FIG. 7 is a perspective view showing an example of a mechanical splice according to the first embodiment of the invention.
Figure 8:
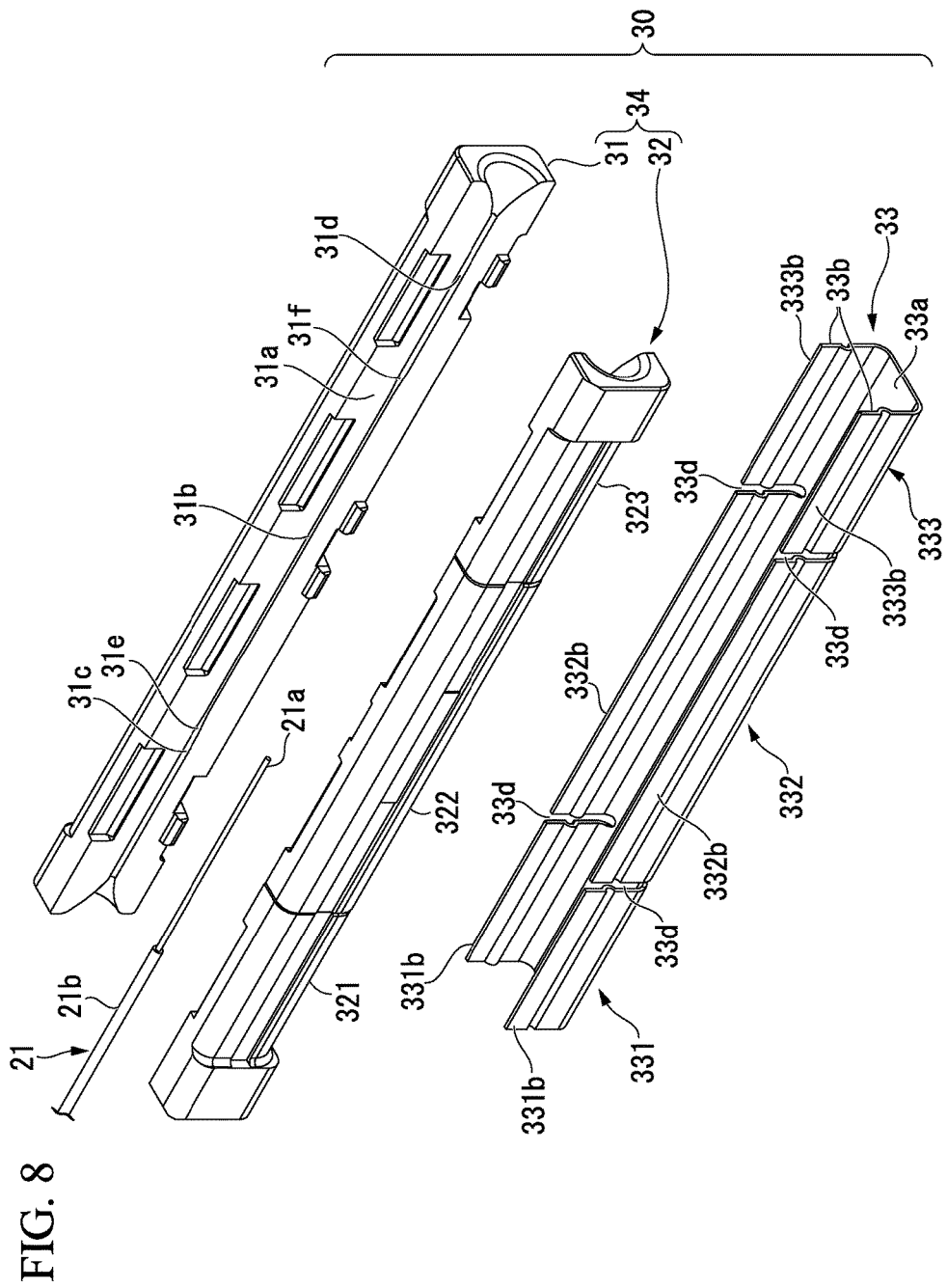
FIG. 8 is an exploded perspective view showing a structure of the mechanical splice according to the first embodiment of the invention.
Figure 9:
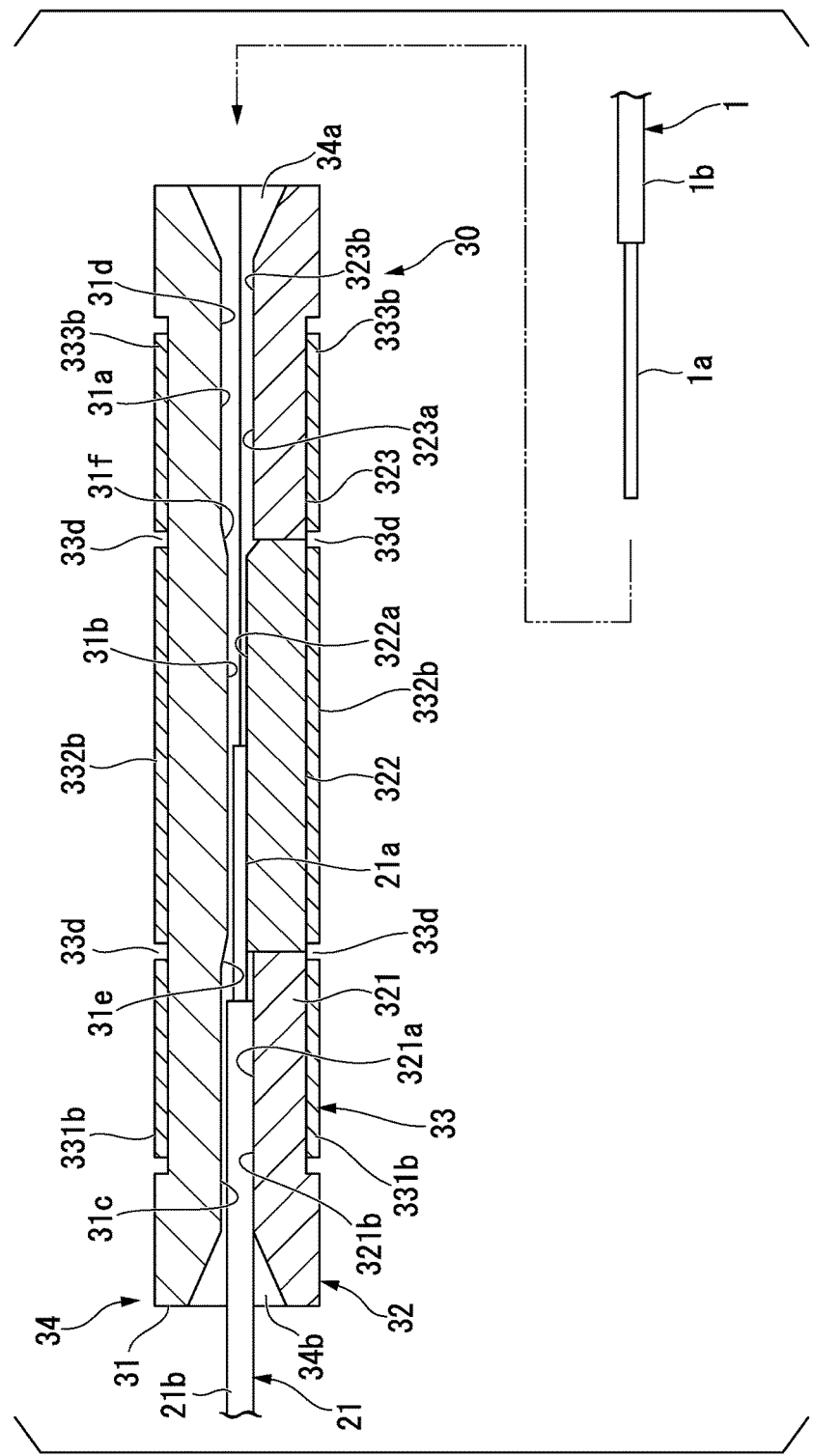
FIG. 9 is a cross-sectional view illustrating insert and grasping states of an optical fiber in the mechanical splice according to the first embodiment of the invention.

As shown in FIGS. 7 to 9, the splice 30 includes: an elongated-plate-shaped base member 31; a press lid 32 that is constituted of three lid members 321, 322, and 323 which are arrayed and placed along the longitudinal direction of the base member 31; and an elongated-shaped clamping spring 33 that elastically applies a force to them in a direction in which they connect to each other and are closed.

The base member 31 (base-side element) and the lid members 321, 322, and 323 (lid-side element) constitutes a halved grasping member 34.

The splice 30 will be described, particularly, the side thereof (the left side of FIG. 9) into which the extended optical fiber 21 is inserted is defined as back, and the opposite side thereof (the right side of FIG. 9) is defined as front in the longitudinal direction.

Of three lid members (lid side element) 321, 322, and 323 configuring the press lid 32 of the splice 30, a lid member that is located at the backmost position and represented as reference numeral 321 is also referred to as a rear lid member, and a lid member that is located at the foremost position and represented as reference numeral 323 is also referred to as a front lid member.

Additionally, a lid member that is located between the rear lid member 321 and the front lid member 323 and represented as reference numeral 322 is also referred to as a middle lid member.

As shown in FIGS. 8 and 9, an opposed face 31a facing the lid members 321, 322, and 323 is formed on the base member 31 of the splice 30 in the entire longitudinal direction thereof.

An alignment groove 31b that extends along the longitudinal direction of the base member 31 is formed on the center portion in the longitudinal direction of the opposed face 31a (in the extending direction thereof).

The alignment groove 31b positions a bare optical fiber 21a exposed at the front end of the extended optical fiber 21 and a bare optical fiber 1a exposed at the front end of the inserted optical fiber 1 to each other with a high level of precision so that they can be butt jointed (optical splice), and the alignment groove aligns the centers thereof with each other.

The alignment groove 31b is, for example, a V-groove (a groove having a V-shape in cross section).

The alignment groove 31b is not limited to the V-groove, for example, a groove having a semicircular shape in cross section, a U-groove, (a groove having a U-shape in cross section), or the like may be adopted.

The alignment groove 31b is formed at the portion that faces the middle lid member 322 of the opposed face 31a of the base member 31.

Coated-portion insertion grooves 31c and 31d, each of which has a groove width wider than that of the alignment groove 31b, are formed at the portion that faces the rear lid member 321 of the opposed face 31a and at the portion that faces the front lid member 323.

The coated-portion insertion grooves 31c and 31d are formed at both sides of the alignment groove 31b in the longitudinal direction of the base member 31 so as to extend along the longitudinal direction of the base member 31.

Tapered grooves 31e and 31f, which have a tapered shape and have a groove width that gradually becomes small in the direction from the coated-portion insertion grooves 31c and 31d to the alignment groove side 31b, are formed between the coated-portion insertion groove 31c and the alignment groove 31b and between the coated-portion insertion groove 31d and the alignment groove.

The coated-portion insertion grooves 31c and 31d are communicated with the alignment groove 31b through the tapered grooves 31e and 31f, respectively.

A coated-portion insertion groove 323b, into which the coated portion of the inserted optical fiber 1 is inserted, is formed at the position corresponding to the coated-portion insertion groove 31d of the base member 31 and at the opposed face 323a of the front lid member 323.

A coated-portion insertion groove 321b, into which the coated portion of the inserted optical fiber 1 is inserted, is formed at the position corresponding to the coated-portion insertion groove 31c of the base member 31 and at the opposed face 321a of the rear lid member 321.

A tapered-opening portion 34a, which is provided at each of the front lid member 323 and the base member 31 and which is formed of a recess having a tapered shape gradually becomes fine in the direction from the front-edge face thereof to the rear side, opens at the front end of the halved grasping member 34 of the splice 30.

The rear end (back end) of the tapered-opening portion 34a is communicated with the coated-portion insertion grooves 323b and 31d.

A tapered-opening portion 34b, which is provided at each of the rear lid member 321 and the base member 31 and which is formed of a recess having a tapered shape gradually becomes fine in the direction from the rear-edge face thereof to the front side, opens at the back end of the halved grasping member 34 of the splice 30.

The front end (back end) of the tapered-opening portion 34b is communicated with the coated-portion insertion grooves 321b and 31c.

As shown in FIG. 7, in the halved grasping member 34 of the splice 30, interposing member insertion holes 35, into which an interposing-end portion 81a of an interposing member 81 to be inserted, open at the side face (hereinbelow, may be referred to as an exposed side) which is exposed to a side opposite to the back plate part 33a of the clamp spring 33.

The interposing member insertion holes 35 are formed at four portions in total, at two positions corresponding to a back-end portion and a forward-end portion of the middle lid member 322 and at positions corresponding to the centers of the rear lid member 321 and the front lid member 323 in the longitudinal direction of the base member 31.

As shown in FIGS. 7 to 9, the clamp spring 33 is formed of a single metal plate by shaping and is configured so that side plate parts 33b are provided at the entire longitudinal area of the elongated plate-shaped back plate part 33a in the longitudinal direction so as to protrude from both sides of the back plate part 33a and so as to be perpendicular to the back plate part 33a.

In the splice 30, opposed faces 31a, 321a, 322a, and 323a, at which the base member 31 faces the three lid members 321, 322, and 323, are sandwiched between the paired side plate parts 33b in the direction substantially perpendicular to the direction in which a pair of the side plate parts 33b of the clamp spring 33 makes a space.

One of the side plate parts 33b comes into contact with the base member 31, and the other of the side plate parts 33b comes into contact with the press lid 32.

The paired side plate parts 33b of the clamp spring 33 are separated into three parts corresponding to the three lid members 321, 322, and 323 of the press lid 32 of the splice 30 by cut portions 33d.

The clamp spring 33 includes: a first clamp spring portion 331 holding the rear lid member 321 and the base member 31; a second clamp spring portion 332 holding the middle lid member 322 and the base member 31; and a third clamp spring portion 333 holding the front lid member 323 and the base member 31.

A pair of side plate portions of the first clamping spring portion 331 is represented as reference numeral 331b, a pair of side plate portions of the second clamping spring portion 332 is represented as reference numeral 332b, and a pair of side plate portions of the third clamping spring portion 333 is represented as reference numeral 333b.

As shown in FIG. 9, an end of the extended optical fiber 21 is inserted through one end of the elongated halved grasping member 34 of the splice 30 in the longitudinal direction to the center portion thereof in the longitudinal direction.

Hereinbelow, a portion of the extended optical fiber 21 which is between the base member 31 and the press lid 32 forming the halved grasping member 34 may be referred to as an insertion end.

Regarding the insertion end of the extended optical fiber 21, the front-end thereof, that is, the part of the bare optical fiber 21a is located between the base member 31 and the middle lid member 322, and the portion having a coating 21b is disposed between the base member 31 and the rear lid member 321.

As a result of inserting the other optical fiber 1 between the base member 31 and the middle lid member 322 through the front side of the splice 30, the front end of the optical fiber 1 (hereinbelow, may be referred to as an inserted optical fiber) can be butt-jointed to the front end of the extended optical fiber 21 (the front end of the insertion end).

Additionally, due to elastic action of the clamp spring 33, it is possible to grasp and fix the extended optical fiber 21 and the inserted optical fiber 1 that was brought into contact with the optical fiber 21 between halved elements of the splice 30, that is, between the base member 31 (base-side element) and the press lid 32 (lid side element).

As shown in FIGS. 8 and 9, the portion of the bare optical fiber 1a of the insertion end of the inserted optical fiber 1 which is exposed at the front end is disposed between the base member 31 and the middle lid member 322 and the portion (coated portion) thereof having a coating 1b is disposed between the base member 31 and the front lid member 323.

Figure 14A:
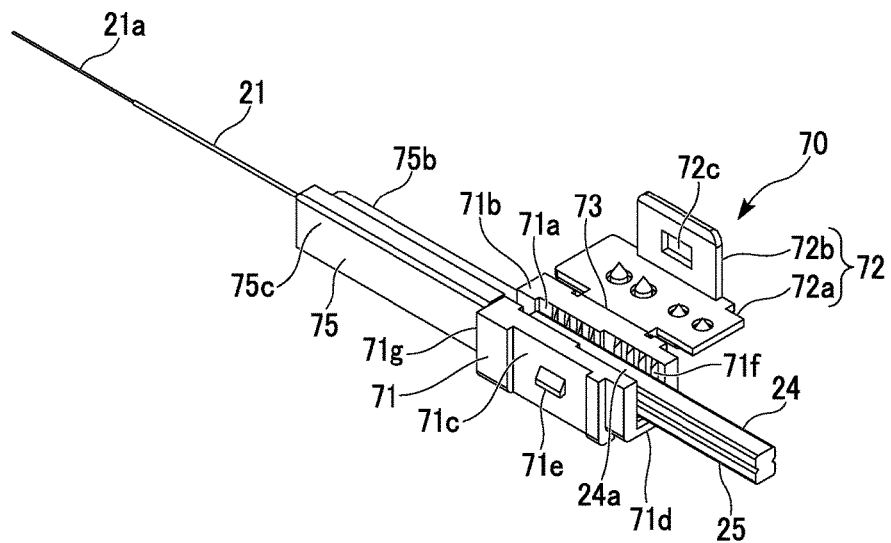
FIG. 14A is a perspective view as seen from one of sides, showing a cable grasping member according to the first embodiment of the invention.

As shown in FIG. 14A, the cable grasping member 70 includes: a grasping base 71 that has a cable-fitting groove 71a into which the optical fiber cable 24 is fitted; a press lid 72 that is pivotally provided to one of side wall portions 71b and 71c of the cable-fitting groove 71a in the groove-width direction of the grasping base 71; and the front-side protrusion portion 75 that protrudes from the grasping base 71.

In the grasping base 71, a pair of the side wall portions 71b and 71c are provided upright on a bottom wall 71d, and the cable-fitting groove 71a is ensured between them.

A plurality of grasping protrusions 71f that grasp the terminal 24a of the optical fiber cable 24 are formed on the surfaces at which the side wall portions 71b and 71c face each other.

The grasping protrusion 71f of the cable grasping member 70 shown as an example in the drawing are protuberances which have a triangular shape in the cross-sectional face and extend in the depth direction of the cable-fitting groove 71a.

The press lid 72 includes: a top panel portion 72a that is coupled to the first side wall portion 71b of the grasping base 71 via the thin portion 73; and a lock plate portion 72b that is formed at the top panel portion 72a vertically from the end portion of the top panel portion 72a on the opposite side of the thin portion 73.

Since the thin portion 73 functions as a hinge, the press lid 72 can rotate around the axis line extending along the extending direction of the cable-fitting groove 71a.

In particular, the other of the paired side wall portions 71b and 71c of the grasping base 71 is also referred to as a second side wall portion 71c.

Figure 14B:
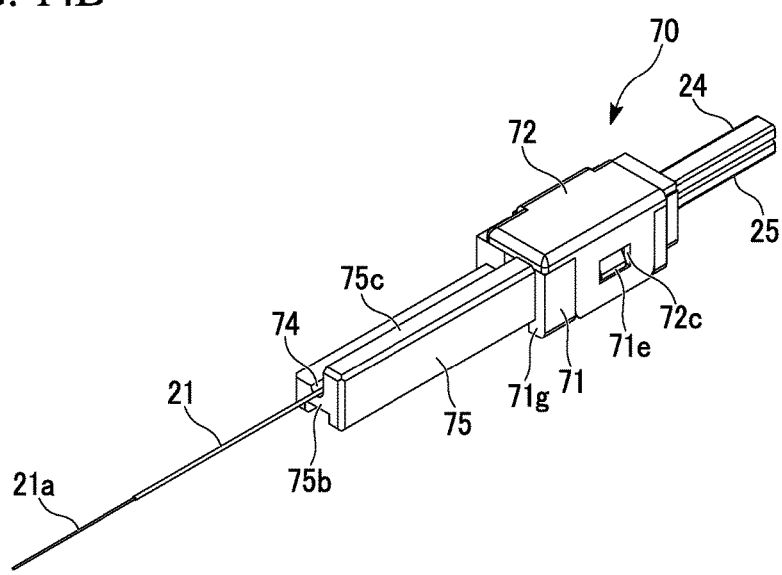
FIG. 14B is a perspective view as seen from the other of the sides, showing the cable grasping member shown in FIG. 14A.

As shown in FIG. 14B, in the case where the top panel portion 72a closes the cable-fitting groove 71a (closed state), a locking claw 71e on the outer surface of the second side wall portion 71c is engaged with a locking window hole 72c, and the press lid 72 can thereby stably maintain the closed state with respect to the grasping base 71.

The cable grasping member 70 is preferably an integral molding product made of plastic.

The front-side protrusion portion 75 is formed by an L-shaped plate including a bottom wall 75b and a side wall portion 75c that is provided to protrude from an upper surface side of the bottom wall 75b and is formed to protrude from the forward-end portion 71g of the grasping base 71 in the extending direction of the cable-fitting groove 71a.

An optical-fiber holding groove 74 that accommodates the extended optical fiber 21 therein is formed on an upper surface of the bottom wall 75b in the extending direction of the front-side protrusion portion 75.

The optical-fiber holding groove 74 is formed to open upward and thereby does not restrict upward movement of the extended optical fiber 21 that is accommodated in the inside thereof.

Consequently, a portion of the extended optical fiber 21 which is held by the optical-fiber holding groove 74 can be flexibly deformed upward.

As shown in FIG. 14A, in the case where the press lid 72 is in an opened state and in the case of inserting the terminal 24a of the optical fiber cable 24 into the cable-fitting groove 71a, the grasping protrusions 71f of the side wall portions 71b and 71c of the grasping base 71 come into contact with the side surfaces of the outer coating 25 of the optical fiber cable 24, and the terminal 24a of the optical fiber cable 24 is thereby grasped and fixed thereto.

It is preferable that the forward end of the outer coating 25 of the optical fiber cable 24 reach to the forward end of the cable-fitting groove 71a.

As shown in FIG. 14B, as a result of locking the press lid 72 to the side wall portion 71c to be in a closed state, the cable grasping member 70 is attached to the terminal 24a of the optical fiber cable 24.

As shown in FIG. 5, the slider 120 includes a substrate 121 and a pair of side wall portions 122 that are provided upright on an upper surface thereof.

The slider 120 can hold the unit base 11 in a unit storage space 126 that is a space between the side wall portions 122.

Recess portions 122a are formed on outer surfaces of the side wall portions 122. Engagement walls 87 of the splicing tool 80 are fitted into the recess portions 122a, and the positions of the engagement walls 87 in the front-back direction thereof are determined.

The locking protrusions 127 that are to be engaged with engagement recesses 136c of elastic locking ends 136 of the connecting jig 110 are formed on outer surfaces of the side wall portions 122 so as to protrude outward therefrom.

The shape of the locking protrusion 127 when seen in a plan view is preferably a tapered shape (for example, triangular shape) having the length in the back and forth direction where the length thereof increases in the direction from the protuberance edge to the base end side.

Hole portions 125 into which protruding claws 87a of the engagement walls 87 are to be inserted are formed on the side wall portions 122.

Figure 16:
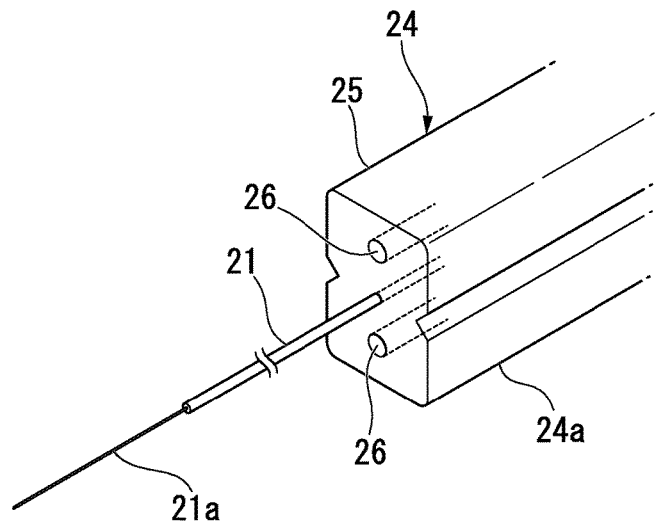
FIG. 16 is a perspective view showing an example of a structure of an optical fiber cable according to the first embodiment of the invention.

As shown in FIG. 16, the optical fiber cable 24 is used as an optical drop cable, a light indoor cable, or the like, and is an optical fiber cable that has a substantially rectangular shape in cross section and has a structure in which, for example, the optical fiber 21 is integrally implanted in a resin-coating member 25 (may be referred to as an outer coating) with a pair of linear tensile strength bodies 26 that extends parallel to the optical fiber 21 in the longitudinal direction thereof.

The optical fiber 21 is disposed at the center portion in the cross-sectional face of the optical fiber cable 24, and the pair of tensile strength bodies 26 is located at the positions that are separated from the optical fiber 21 toward both sides of the optical fiber cable 24 in the longitudinal direction of the cross-sectional face.

The optical fiber 21 is a coated optical fiber such as an optical core fiber, a bare optical fiber, or the like.

The extended optical fiber 21 and the inserted optical fiber 1 are a coating-attached optical fiber such as an optical core fiber, a bare optical fiber, or the like.

In an example of the drawing, as the extended optical fiber 21 and the inserted optical fiber 1, a single core optical fiber is adopted.

A bare optical fiber 21a is exposed at the front end (fore end) of the insertion end of the extended optical fiber 21.

As a result of butt jointing a bare optical fiber 1a exposed at the front end of the inserted optical fiber 1 to the bare optical fiber 21a located at the front end of the insertion end of the extended optical fiber 21, butt-jointing connection between the extended optical fiber 21 and the inserted optical fiber 1 in the splice 30 is realized.

As shown in FIGS. 1 and 10 to 12, the splicing tool 80 can be attached to the splice 30.

The splicing tool 80 includes: two interposing members 81 that includes the interposing-end portions 81a that expand a space between the base member 31 of the splice 30 and the press lid 32; the sleeve-shaped interposing member driving unit 82 that drives the interposing members 81; and a pair of the engagement walls 87 that protrude from the interposing member driving unit 82.

As shown in FIG. 12, the two interposing members 81 are attached to the interposing member driving unit 82 in the axis line direction thereof (front-back direction) so as to be separated from each other.

The interposing member 81 includes: trunks 84 that are supported by an interposing member support 89 provided on the interposing member driving unit 82; interposing-end supports 83, each of which extends from the trunk 84 in the center axis direction of the interposing member driving unit 82; and the interposing-end portions 81a that are provided at a plurality of portions (two portions shown as an example in the drawing) on the interposing-end support 83 in the extending direction thereof so as to protrude therefrom.

The interposing-end portions 81a are formed separately from each other in the longitudinal direction of an interposing-member main body 83.

Figure 10:
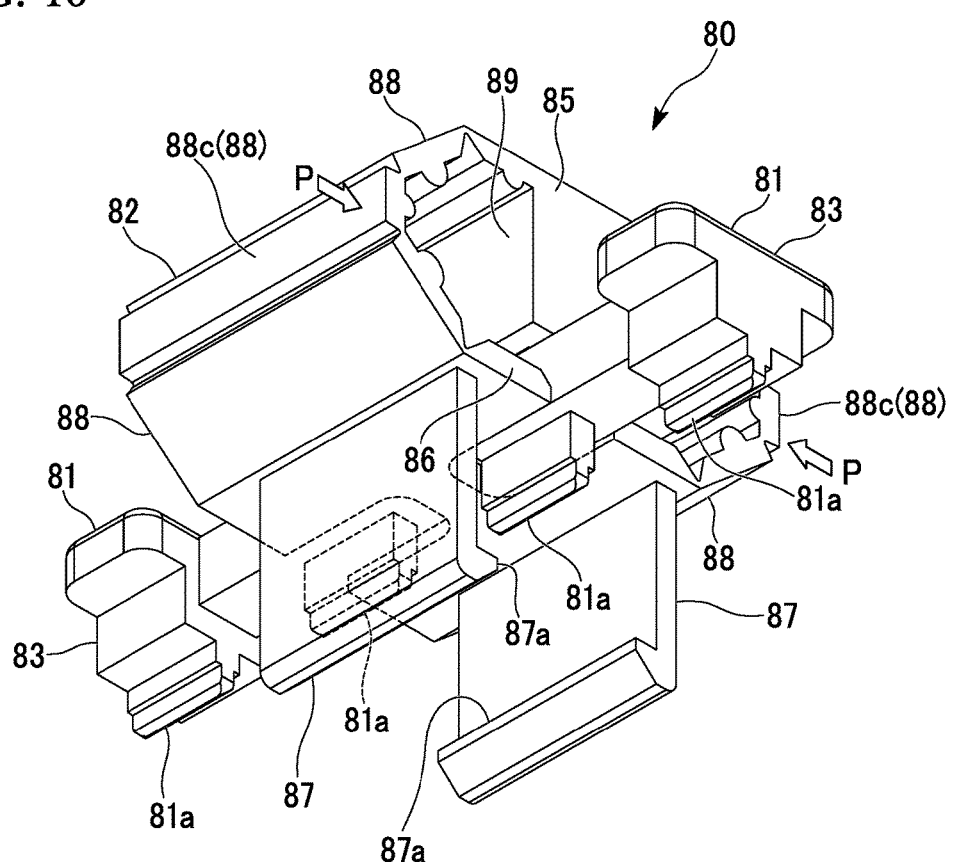
FIG. 10 is a perspective view showing a splicing tool according to the first embodiment of the invention.

As shown in FIGS. 10 and 12, the interposing member driving unit 82 includes: the pressure-receiving wall 86 that faces the splice 30; an opposed wall portion 85 that faces the pressure-receiving wall 86; and drive-part side wall portions 88 that are located at both right and left sides and connect the pressure-receiving wall 86 and the opposed wall portion 85.

As the pressure-receiving wall 86 fits into the fitting recesses 62c and 63c of the protruding wall portions 62 and 63, movement of the splicing tool 80 in the front-back direction thereof with respect to the unit base 11 is restricted, and the position thereof is fixed.

The interposing member support 89 is formed on a lower surface of the opposed wall portion 85 of the interposing member driving unit 82 so as to protrude toward the pressure-receiving wall 86, and have through holes 89a that are formed therein and extend in this direction (vertical direction).

In the through holes 89a, a recess portion 89b having a stepped surface 89c is formed.

As shown in FIG. 12, the trunk 84 is attached to the interposing member driving unit 82 through the through hole 89a.

Engaging claws 84a are formed on the side surfaces of the end (extending end portion) of the trunk 84 so as to protrude outward therefrom.

The engaging claw 84a is engageable with the stepped surface 89c in the through hole 89a.

Figure 11:
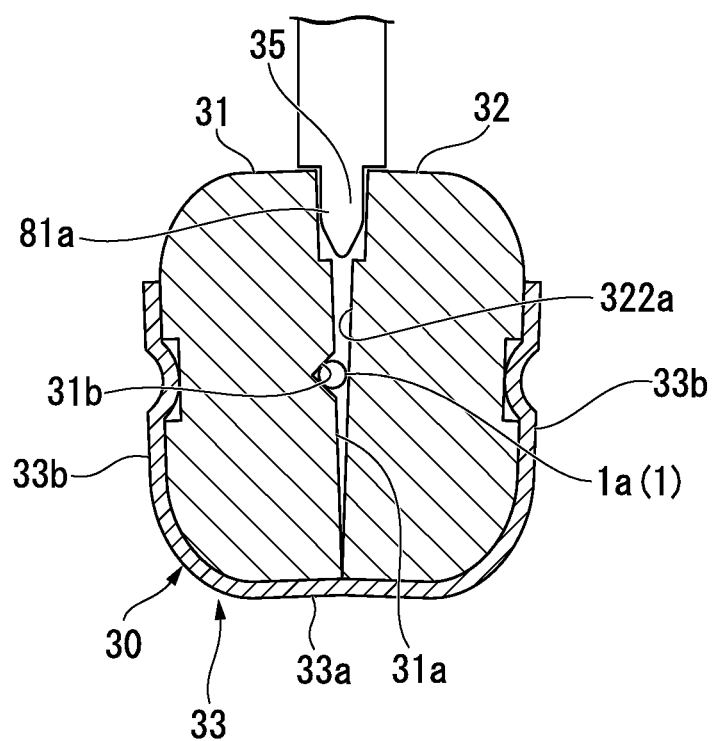
FIG. 11 is a cross-sectional view showing a state in which an interposing member according to the first embodiment of the invention is inserted between the elements of the mechanical splice.

As shown in FIG. 11, the splicing tool 80 is attached to the splice 30 in a state where the interposing-end portions 81a is interposed between the base member 31 of the splice 30 and the press lid 32.

As shown in FIG. 10, the splicing tool 80 presses both the side portions (drive-part side wall portions 88) of the interposing member driving unit 82 and can thereby cause them to come close to each other (refer to the lateral pressure P).

That is, as a result of applying the lateral pressure P to the drive-part side wall portions 88 (pressing plate portion 88c) and thereby making the separation distance between the pressing plate portions 88c shorter, the drive-part side wall portions 88 are deformed, the separation distance between the pressure-receiving wall 86 and the opposed wall portion 85 increases, the trunk 84 that is engaged with the stepped surface 89c moves upward, and it is possible to remove the interposing-end portions 81a from the splice 30.

The engagement walls 87 are formed to protrude from the side portions of the pressure-receiving walls 86 toward the outside of the interposing member driving unit 82.

The protruding claws 87a that protrude inward are formed on the protruding end portions of the engagement walls 87.

The engagement walls 87 are to be disposed in the recess portions 122a of the slider 120 and can cause the protruding claws 87a to be engaged with the lower edges (inner edge of the hole portions 125) of the side wall portions 122; therefore, the splicing tool 80 is attached to the splice 30 in a state of holding the unit base 11 and the slider 120 and the relative movement thereof is restricted.

Figure 15:
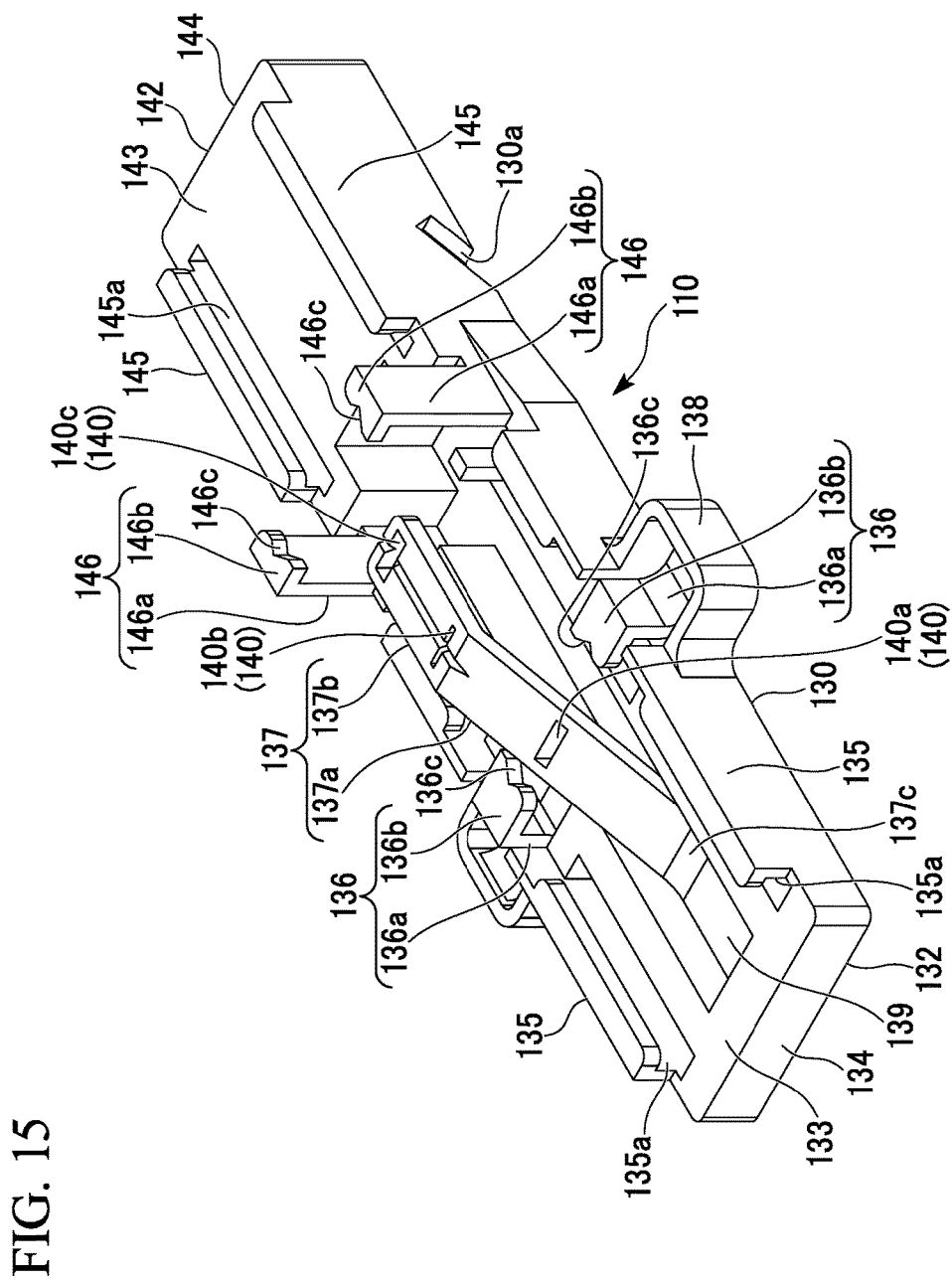
FIG. 15 is a perspective view showing a connecting jig according to the first embodiment of the invention.

As shown in FIG. 15, the connecting jig 110 is provided with a jig base 130 that includes: a first guide 132 that guides the optical fiber splicing unit 10; and a second guide 142 (fiber holder part) that holds the fiber holder 90.

The first guide 132 includes: a table 134 having a slide surface 133 formed thereon and causes the optical fiber splicing unit 10 to slidably move; and guide wall portions 135 that are provided on both the side ends thereof so as to protrude therefrom.

The paired guide wall portions 135 are formed so as to extend in the direction (front-back direction) in which the first guide 132 is formed; as both side edges 121a of the substrate 121 of the slider 120 mounted on the slide surface 133 come into contact with the guide wall portions, movement of the optical fiber splicing unit 10 in the width direction thereof can be restricted.

Grooves 135a, which restrict the optical fiber splicing unit 10 from being removed upward (restricts movement of the optical fiber splicing unit 10 in a direction away from the connecting jig 110), are formed on the lower inner surfaces of the guide wall portions 135.

The groove 135a is formed in the direction (front-back direction) in which the first guide 132 is formed. As both the side edge portions 121a of the substrate 121 are inserted into the grooves, it is possible to restrict the slider 120 from being removed upward.

The paired elastic locking ends 136 that position the optical fiber splicing unit 10 on the first guide 132 are formed on the jig base 130.

The elastic locking ends 136 are configured to include: curved-plate portions 136a protruding toward the slide surface 133 from the projected portions 138 that are provided to protrude outward from both sides of the first guide 132 in the width direction thereof; plate-shaped engagement end portions 136b that are provided to protrude from the front ends of the curved-plate portions; and engagement recesses 136c which are formed at the engagement end portions and into which the locking protrusions 127 of the slider 120 are to be inserted.

The curved-plate portion 136a is formed in a circular arc plate shape that is curved along the axis line extending in the front-back direction of the first guide 132.

The protruding end of the curved-plate portion 136a is located upper than the slide surface 133.

The engagement end portion 136b is formed above the slide surface 133 so as to protrude inward from the protruding end of the curved-plate portion 136a.

The engagement recesses 136c of the engagement end portions 136b are formed in a cut-off shape and at a substantially center portion between the back and forth positions of the engagement end portions 136b, at which the protuberance edges of the engagement end portions 136b are depressed.

When the locking protrusion 127 of the slider 120 is inserted into the engagement recess 136c and the elastic locking end 136 is engaged with the locking protrusion 127, it is possible to restrict the movement of the slider 120 relative to the first guide 132 in the front-back direction thereof.

In this state, the elastic locking ends 136 sandwiches the slider 120 therebetween due to the elastic action of the curved-plate portions 136a and stably holds the slider 120.

The elastic locking ends 136 function as a locking mechanism that engages with the optical fiber splicing unit 10 (slider 120) that moves forward along the first guide 132 and thereby restricts the forward and backward movement thereof.

The second guide 142 includes: a table 144 having a slide surface 143 formed thereon and causes the fiber holder 90 to slidably move; and guide wall portions 145 that are provided on both the side ends thereof so as to protrude therefrom.

The paired guide wall portions 145 are formed so as to extend in the direction (front-back direction) in which the second guide 142 is formed; as both side edges of the fiber holder 90 mounted on the slide surface 143 come into contact with the guide wall portions, movement of the fiber holder 90 in the width direction thereof can be restricted.

A pair of elastic locking ends 146 that position the fiber holder 90 are formed on the jig base 130.

The elastic locking ends 146 are configured to include: protruding plates 146a that protrude from the jig base 130; plate-shaped engagement end portions 146b that are provided to protrude from the front ends of the protruding plates; and engagement recesses 146c which are formed at the engagement end portions and into which locking protrusions 98 of the fiber holder 90 are to be inserted.

The engagement end portion 146b is formed above the slide surface 143 so as to protrude inward from the protruding end of the protruding plate 146a.

The engagement recesses 146c of the engagement end portions 146b are formed in a cut-off shape and at a substantially center portion between the back and forth positions of the engagement end portions 146b, at which the protuberance edges of the engagement end portions 146b are depressed.

When the locking protrusion 98 of the fiber holder 90 is inserted into the engagement recess 146c and the elastic locking end 146 is engaged with the locking protrusion 98, it is possible to restrict the movement of the fiber holder 90 relative to the second guide 142 in the front-back direction thereof.

In this state, the elastic locking ends 146 sandwiches the fiber holder 90 therebetween due to the elastic action of the protruding plate 146a and stably holds the fiber holder 90.

The elastic locking ends 146 function as a locking mechanism that engages with the fiber holder 90 that moves forward along the second guide 142 and thereby restricts the forward and backward movement thereof.

Groove 139 which extends in the direction (front-back direction) in which the first guide 132 is formed is formed on the slide surface 133 of the first guide 132.

An elastic protrusion 137 that protrudes upward from the slide surface 133 is formed on the bottom portion of the groove 139.

The elastic protrusion 137 includes: a sloped plate 137a that extends in the front-back direction and gradually rises up in the direction of approaching the second guide 142; and an extending plate 137b that extends parallel to the slide surface 133 from the extending end of the sloped plate 137a in the front-back direction.

Figure 19A:
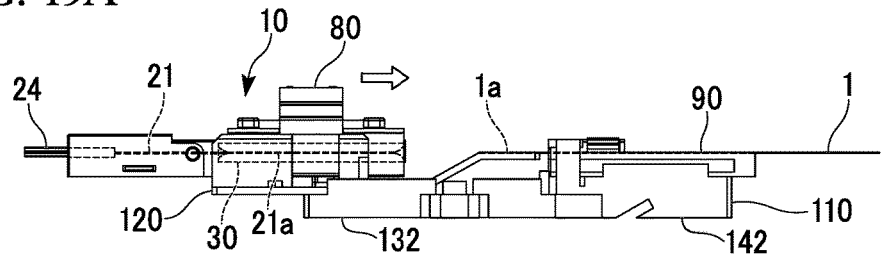
FIG. 19A is a flow sheet showing steps of assembling the optical fiber splicing tool according to the first embodiment of the invention.

It is preferable that the position in height of the upper surface of the extending plate 137b be the position adjacent to the inserted optical fiber 1 that extends from the fiber holder 90 which is positionally-fixed on the second guide 142 (refer to FIG. 19A).

The elastic protrusion 137 can be elastically bended and deformed at a base part 137c.

Therefore, when the optical fiber splicing unit 10 moves forward on the slide surface 133, the sloped plate 137a is pressed downward by the optical fiber splicing unit 10 and is accommodated in the groove 139, and the elastic protrusion 137 does not interfere with the forward movement of the optical fiber splicing unit 10.

It is possible to form, on the elastic protrusion 137, one or a plurality of displays 140 that are used to check the position of the inserted optical fiber 1 that protrudes from the fiber holder 90 toward the mechanical splice 30.

In the drawing shown as an example, the display 140 is a recess portion or a hole portion formed on the sloped plate 137*a* or the extending plate 137*b*.

In other cases, as long as the display 140 is identifiable, the configuration thereof is not limited to the drawing shown as an example, and the display may be a projected portion or may be formed by coloring.

In the drawing shown as an example, the display 140 includes: a display 140*a* used to check the position of the front end of the inserted optical fiber 1 before adjusting the length thereof by use of an optical fiber cutter (not shown in the figure); a display 140*b* used to check the position of the front end of the bare optical fiber 1*a* of the inserted optical fiber 1; and a display 140*c* used to check the position of the front end of the coating 1*b* of the inserted optical fiber 1.

The display 140*a* is formed on the sloped plate 137*a*.

The displays 140*b* and 140*c* formed on the extending plate 137*b* at different positions in the longitudinal direction thereof.

As a result of checking the front end of the inserted optical fiber 1 against the display 140 (140*a* to 140*c*), it is possible to easily check the length to be processed (the length of the inserted optical fiber 1 before adjusting the length thereof, the length up to the front end of the bare optical fiber 1*a*, and the length up to the front end of the coating 1*b*) of the inserted optical fiber 1 that protrudes from the fiber holder 90, it is possible to carry out a splicing operation with a high degree of accuracy.

A cutout 130*a* that is used to temporarily place the optical fiber splicing tool 100 therein is formed under the second guide 142 of the jig base 130.

The cutout 130*a* is formed so as to gradually rise from the lower edge of the second guide 142 rearward in the diagonal direction.

In a state where, for example, the edge portion of a case of a closure (not shown in the figure) is inserted into the cutout 130*a*, the optical fiber splicing tool 100 can be temporarily placed by being engaged with the case.

Figure 13:
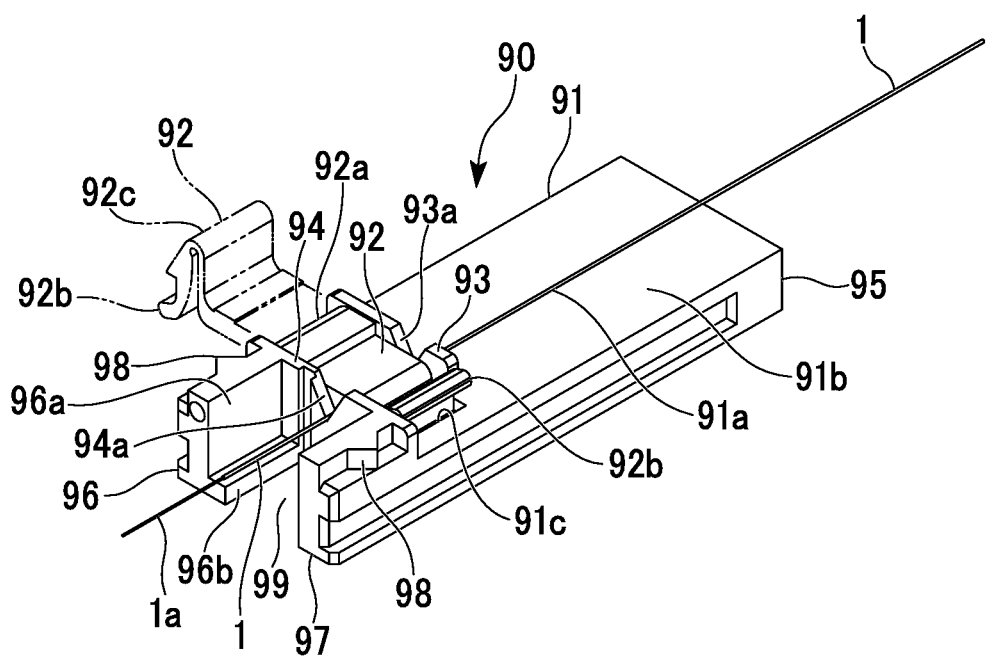
FIG. 13 is a perspective view showing a fiber holder according to the first embodiment of the invention.

As shown in FIG. 13, an optical fiber holder 90 includes: a base 91; and a lid 92 that is rotatably coupled to the base 91 at a base part 92*a* serving as a hinge, presses the inserted optical fiber 1 provided on the base 91 onto the base 91 by the lid 92, and can grasp and fix it.

Regarding the fiber holder 90, the direction of approaching the optical fiber splicing unit 10 may be referred to as forward (the left direction in FIG. 3) and the opposite direction thereof may be referred to as backward.

The base 91 includes: a base body 95; a one-side-extending wall portion 96 that extends forward from one side portion of the front-edge face thereof; and an another-side-extending wall portion 97 that extends forward from the other side portion of the front-edge face of the base body 95.

The forward-end portion of the optical fiber splicing unit 10 can be accommodated in the unit accommodation space 99 ensured between the one-side-extended portion 96 and the other-side-extended portion 97.

A first holding wall portion 93 including a positioning recess portion 93*a* that accommodates the inserted optical fiber 1 therein and a second holding wall portion 94 including a positioning recess portion 94*a* are formed on the upper surface 91*b* of the base 91 (base body 95).

The second holding wall portion 94 is formed in front of the first holding wall portion 93 so as to be separated from the first holding wall portions 93.

A linear positioning groove 91*a* that extends in the front-back direction from the positioning recess portion 93*a* through the positioning recess portion 94*a* is formed on the upper surface of the base 91 (base body 95).

The positioning groove 91*a* is a groove used to fix the position of the inserted optical fiber 1 and may be formed in, for example, in a substantially V-shape in cross section, in a substantially U-shape in cross section, a semicircular shape in cross section, or the like.

The locking protrusions 98 which are to be engaged with the engagement recesses 146*c* of the elastic locking ends 146 are formed on the outer-side faces of the one-side-extended portion 96 and the other-side-extended portion 97 so as to protrude toward the outside.

The shape of the locking protrusion 98 when seen in a plan view is preferably a tapered shape (for example, triangular shape) having the length in the back and forth direction where the length thereof increases in the direction from the protuberance edge to the base end side.

The checking protuberance 96*b* that protrudes inward and extends in the front-back direction is formed on the inner surface 96*a* on the lower edge of the one-side-extended portion 96.

In a state where the upper surface 91*b* of the base 91 is covered with the lid 92 (closed state), the lid 92 is disposed between the holding wall portions 93 and 94.

A locking protuberance 92*c* is formed near the leading-end portion 92*b* positioned at the end portion opposite to the base part 92*a* (hinge) of the lid 92. The locking protuberance can be detachably fitted into the locking recess portion 91*c* formed on the base 91.

The lid 92 causes the locking protuberance 92*c* to be engaged with the locking recess portion 91*c* of the base 91 in a state where the upper surface 91*b* of the base 91 is covered with the lid (closed state), presses the inserted optical fiber 1 onto the base 91 (base body 95), and can grasp and fix it.

The lid 92 and the base 91 may be integrally formed together.

As shown in FIG. 3, a first flexure width L1 is formed between the back end of the splice 30 and the cable grasping member 70.

The flexure width means the length of the optical fiber at which there is a possibility that flexural deformation occurs when butt-jointing is carried out.

In the drawing shown as an example, the first flexure width L1 is the distance between the back end of the splice 30 and the cable grasping member 70, which corresponds to the portion at which the extended optical fiber 21 is exposed. Particularly, the first flexure width corresponds to the linear distance between the back end of the tapered-opening portion 34*b* of the splice 30 and the forward end of the cable-fitting groove 71*a* of the grasping base 71.

As described hereinbelow, when the optical fibers 1 and 21 are butt-jointed to each other in the splice 30, a predetermined flexure width (for example, the second flexure width L2 shown in FIG. 3) is ensured between the front-end side of the splice 30 and the fiber holder 90 in the process until the optical fiber splicing unit 10 further moves forward and reaches the forward-movement limit position (refer to FIG. 19D) after the optical fibers 1 and 21 are brought into contact with each other (refer to FIG. 19C).

In the drawing shown as an example, the second flexure width L2 is the distance between the splice 30 and the fiber holder 90, which corresponds to the portion at which the inserted optical fiber 1 is exposed. Particularly, the second flexure width corresponds to the linear distance between the back end of the tapered-opening portion 34a of the splice 30 and the forward end (the forward end of the lid 92) of the grasping portion due to the lid 92 of the fiber holder 90.

The second flexure width L2 is shorter than the first flexure width L1.

For this reason, it is possible that, in the first flexure width L1, flexural deformation 21c occurs relatively easier than that in the second flexure width L2.

The first flexure width L1 is greater than or equal to, for example, 10 mm (more preferably, 20 mm or more), the second flexure width L2 is less than or equal to, for example, 10 mm (preferably, 6 mm or less, more preferably, 4 mm or less).

As a result of making the first flexure width L1 larger, it is possible to reduce a loss that is generated due to sharp curvature of an optical fiber.

The upper limit of the first flexure width L1 is, for example, 40 mm (preferably 30 mm).

As described in the embodiment, in the case of providing the distance from the back end of the tapered-opening portion 34a of the splice 30 to the forward end thereof or in the case of providing a space between the splice 30 and the fiber holder 90 at the forward-movement limit position, the lower limit of the second flexure width L2 is approximately 2 mm.

The force F (buckling stress) required to generate flexural deformation in the optical fiber having the flexure width L in the butt-jointing direction can be expressed by the following formula (Euler's formula).

$$F = \frac{4\pi^2 EI}{L^2} \quad \text{(Equation 1)}$$

(F: buckling stress, E: Young's modulus of optical fiber, I: second moment of area of optical fiber, L: flexure width)

In consideration of a loss in force or the like due to displacement of the axes of the optical fibers at the butt-jointed portion, in order to generate the flexural deformation (buckling) in the first flexure width L1, it is preferable that there is a sufficient large difference between the buckling stress of the extended optical fiber 21 and the buckling stress of the inserted optical fiber 1.

For example, it is preferable that the buckling stress of the extended optical fiber 21 be two or more times the buckling stress of the inserted optical fiber 1.

That is, in the case where the flexure width L1 is given, the flexure width L2 is determined so that the buckling stress of the extended optical fiber 21 is two or more times the inserted optical fiber 1.

Consequently, it is possible to reliably produce the flexural deformation 21c in the extended optical fiber 21 without producing flexural deformation in the inserted optical fiber 1.

Next, a method of splicing the extended optical fiber 21 to the inserted optical fiber 1 using the optical fiber splicing tool 100 (optical splice) will be described with reference to FIGS. 17 to 19E.

As shown in FIG. 17, in advance, the interposing-end portions 81a is interposed in the grasping member 34 of the splice 30 by attaching the splicing tool 80 to the optical fiber splicing unit 10, and the splice 30 is in a state where the inserted optical fibers 1 and 21 freely move in the insertion and removal direction.

Figure 18:
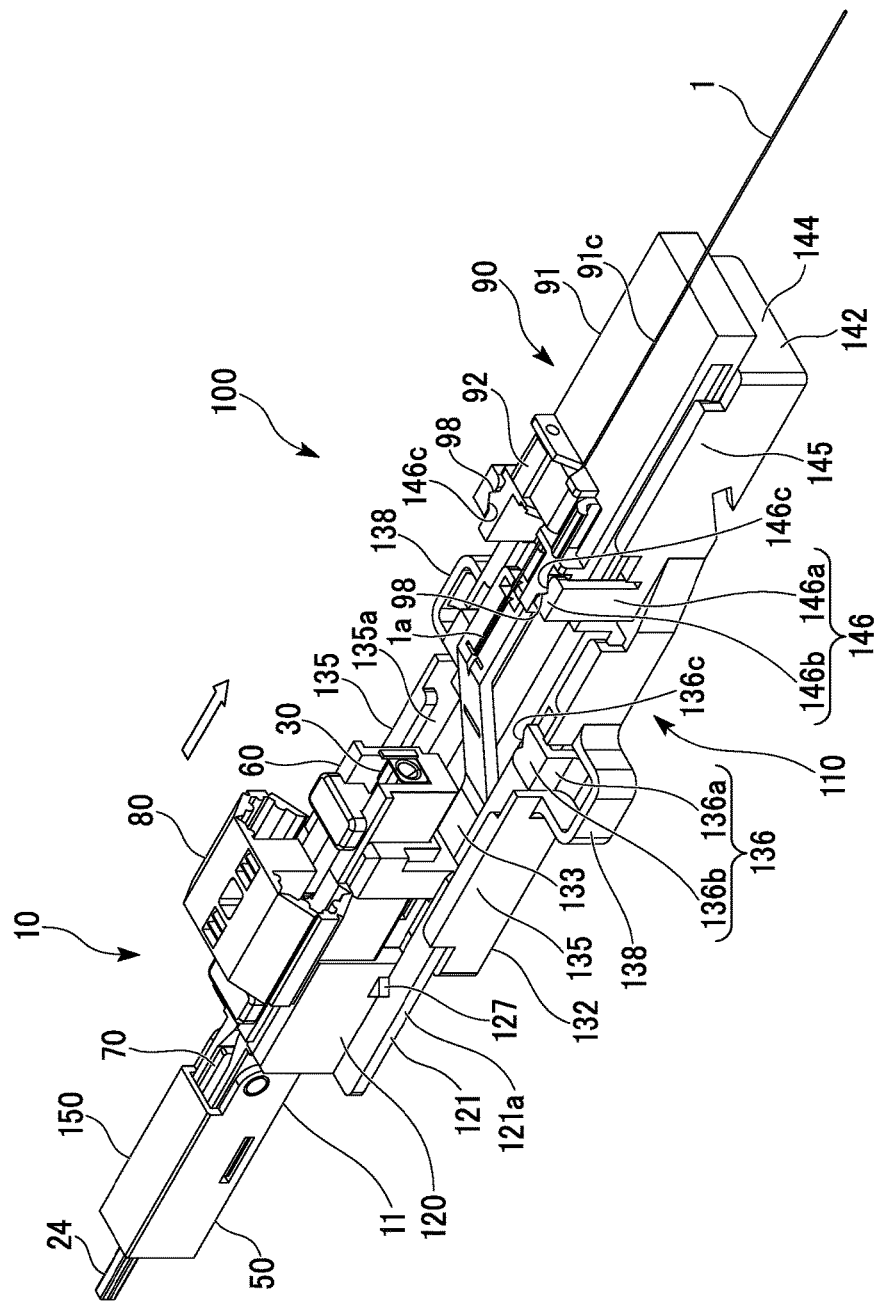
FIG. 18 is a flow sheet showing steps of assembling the optical fiber splicing tool according to the first embodiment of the invention.

As shown in FIG. 18, the inserted optical fiber 1 is disposed in the positioning groove 91a of the base 91, is pressed onto the base 91 by the lid 92, and is thereby held and fixed.

The inserted optical fiber 1 is fixed to the fiber holder 90 while ensuring a predetermined forward protruding length.

In the case where flexure is not produced in the inserted optical fiber 1, the protruding length of the inserted optical fiber 1 from the fiber holder 90 is determined such that the bare optical fibers 1a and 21a are brought into contact with each other at the optimal position in the splice 30.

For example, when the positions of the optical fiber splicing unit 10 and the fiber holder 90 are fixed by the elastic locking ends 136 and 146, the protruding length can be the length at which the front end of the bare optical fiber 1a reaches the center position of the splice 30.

The fiber holder 90 is mounted on the slide surface 143 of a second rail portion 142 and causes the locking protrusions 98 to be engaged with of the engagement recesses 146c of the elastic locking ends 146.

Accordingly, the fiber holder 90 is sandwiched between the elastic locking ends 146 in a state of being stably held and positioned on the slide surface 143.

Next, as shown in FIG. 17, as a result of causing the cable grasping member 70 grasping the optical fiber cable 24 to be mounted on the grasping member holding portion 50 and to move forward on the base body 51, the extended optical fiber 21 is inserted into one end side of the splice 30.

When the optical fiber splicing unit 10 is located at the forward-movement limit position (described below), the protruding length of the extended optical fiber 21 from the forward end of the cable-fitting groove 71a of the grasping base 71 is slightly longer than the distance up to the bare optical fiber 21a of the extended optical fiber 21 in the splice 30.

By rotating the lever member 150, the backward movement of the cable grasping member 70 is restricted.

As shown in FIGS. 18 and 19A, the optical fiber splicing unit 10 is mounted on the slide surface 133 of the first guide 132 of the connecting jig 110.

Movement of the optical fiber splicing unit 10 in the width direction thereof is restricted by the guide wall portion 135.

Subsequently, the optical fiber splicing unit 10 moves forward in the direction toward the fiber holder 90.

In the movement of the optical fiber splicing unit 10, since both the side edge portions 121a of the substrate 121 are inserted into the grooves 135a of the inner surfaces of the side wall portions 135 and the slider 120 is thereby restricted from being removed upward, it is possible to position the inserted optical fiber 1 with precision.

When the optical fiber splicing unit 10 on the slide surface 133 moves forward toward the fiber holder 90, since the sloped plate 137a of the elastic protrusion 137 is pressed downward by the optical fiber splicing unit 10 and is accommodated in the groove 139, the elastic protrusion 137 does not interfere with the forward movement of the optical fiber splicing unit 10.

Figure 19B:
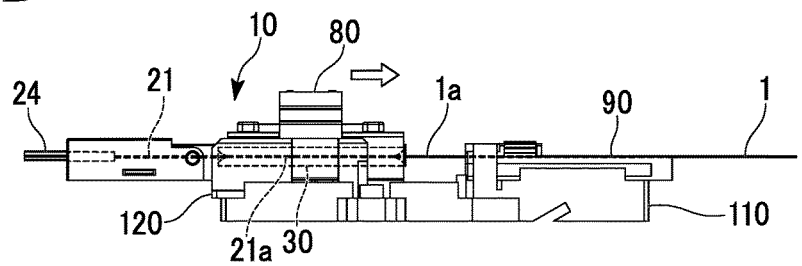
FIG. 19B is a flow sheet showing steps of assembling the optical fiber splicing tool according to the first embodiment of the invention.

As shown in FIG. 19B, due to the forward movement of the optical fiber splicing unit 10, the inserted optical fiber 1 is inserted into the coated-portion insertion grooves 31d and 323b of the splice 30 in the splice holder 60.

Figure 19C:
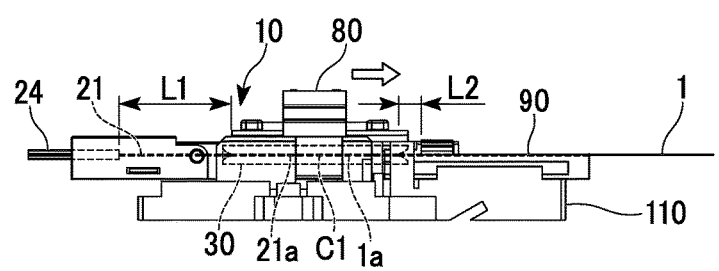
FIG. 19C is a flow sheet showing steps of assembling the optical fiber splicing tool according to the first embodiment of the invention.

As shown in FIG. 19C, as the optical fiber splicing unit 10 further moves forward, the bare optical fiber 1a of the inserted optical fiber 1 is inserted into the alignment groove 31b and is butt-jointed to contact with the front end of the bare optical fiber 21a of the extended optical fiber 21.

Reference sign C1 represents the butt-jointing position.

Figure 19D:
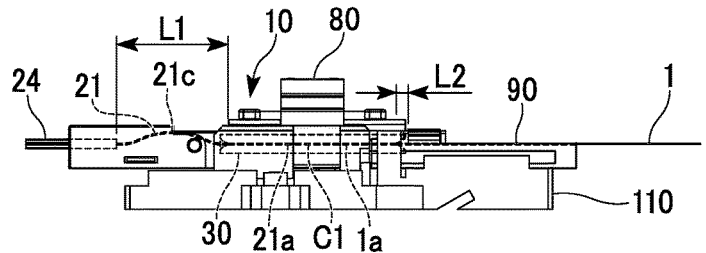
FIG. 19D is a flow sheet showing steps of assembling the optical fiber splicing tool according to the first embodiment of the invention.

As shown in FIG. 19D, the optical fiber splicing unit 10 further moves forward, the locking protrusions 127 are engaged with the engagement recesses 136c of the elastic locking ends 136.

Because of this, the optical fiber splicing unit 10 is sandwiched between the elastic locking ends 136 in a state of being stably held and positioned on the slide surface 133.

The position of the optical fiber splicing unit 10 is referred to as a forward-movement limit position.

The forward-end portion of the optical fiber splicing unit 10 is accommodated in the unit accommodation space 99 ensured between the one-side-extended portion 96 and the other-side-extended portion 97 of the fiber holder 90.

The second flexure width L2 shorter than the first flexure width L1 is ensured between the front-end side of the splice 30 and the fiber holder 90 in the process until the optical fiber splicing unit 10 further moves forward and reaches the forward-movement limit position (refer to FIG. 19D) after the optical fibers 1 and 21 are brought into contact with each other (refer to FIG. 19C).

Since the buckling stress of the extended optical fiber 21 having the relatively long first flexure width L1 is relatively low (however, in the case where the optical fibers 1 and 21 are the same kind of optical fiber), flexural deformation (buckling) is produced in the extended optical fiber 21 between the splice 30 and the cable grasping member 70 in advance.

The flexure once occurs in the extended optical fiber 21, thereafter, flexure does not occur in the inserted optical fiber 1 between the splice 30 and the fiber holder 90.

Figure 19E:
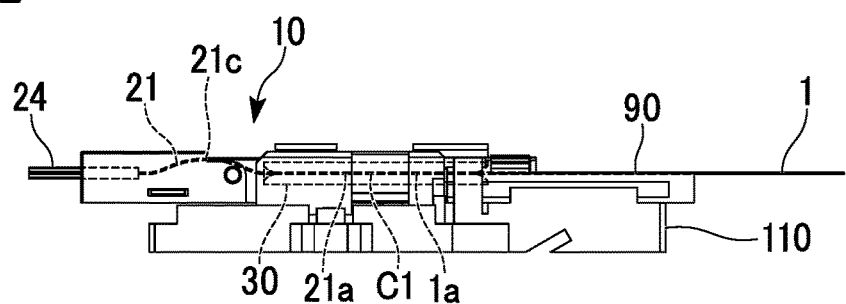
FIG. 19E is a flow sheet showing steps of assembling the optical fiber splicing tool according to the first embodiment of the invention.

Subsequently, as shown in FIGS. 19E and 10, the interposing-end portions 81a is detached from the splice 30 by applying the lateral pressure P to both sides of the interposing member driving unit 82 of the splicing tool 80.

After the interposing-end portions 81a is removed from the splice 30, the halved grasping member 34 of the splice 30 holds and fixes the bare optical fibers 1a and 21a while maintaining a butt-jointed state due to elastic action of the clamping spring 33.

Therefore, the operation of butt-jointing (optical splicing) the extended optical fiber 21 to the inserted optical fiber 1 in the splice 30 is completed.

As a result of grasping and fixing the extended optical fiber 21 and the inserted optical fiber 1 by the halved grasping member 34 of the splice 30 after completion of the splicing operation, it is possible to stably maintain a state where the bare optical fibers 1a and 21a are butt-jointed to each other.

Most of the flexural deformation 21c of the extended optical fiber 21 is surrounded by the grasping member holding portion 50 of the unit base 11 and the lever member 150 and is protected from an external force.

The optical fiber splicing tool 100 that splices the extended optical fiber 21 and the inserted optical fiber 1 can be disposed and housed in an optical fiber splicing box (for example, a closure, an optical termination box, or the like).

According to the optical fiber splicing tool 100, a force of butt-jointing between the bare optical fibers 1a and 21a is ensured by the elastic action of the extended optical fiber 21 due to the flexural deformation 21c, and it is possible to butt-joint the bare optical fibers 1a and 21a to each other.

Thus, when the splicing tool 80 is removed and the optical fibers 1 and 21 are fixed in a butt-jointed state, a high degree of reliability is obtained.

According to the optical fiber splicing tool 100, as a result of causing the optical fiber splicing unit 10 that grasps the optical fiber cable 24 to come close to the fiber holder 90 along the first guide 132 of the connecting jig 110, the flexural deformation 21c is only produced in the extended optical fiber 21, and butt-jointing of the optical fibers 1 and 21 can be carried out.

Since it is not necessary ensure the distance for the flexural deformation of the inserted optical fiber 1 between the fiber holder 90 and the splice 30, the fiber holder 90 can be arranged adjacent to the splice 30.

Therefore, even in the case where the excess length of the inserted optical fiber 1 which can be ensured is short, it is possible to reliably carry out the butt-jointing, and the splicing operation becomes easy.

Consequently, a force of butt-jointing in the splicing of the optical fibers 1 and 21 is ensured by the elastic repulsion force generated due to the flexural deformation 21c, and it is possible to sufficiently obtain the reliability of splicing thereof.

Additionally, since a design to cause the fiber holder 90 to be close to the splice 30 is possible, it is possible to reduce the size of the optical fiber splicing tool 100. Therefore, it is advantageous in terms of space saving when housing in an optical joint box (closure or the like) is carried out.

In the optical fiber splicing tool 100, even where a force is generated in the direction in which the extended optical fiber 21 is drawn into the inside of the outer coating 25 depending on the difference in linear coefficient of expansion between the outer coating 25 and the extended optical fiber 21 and variation in ambient temperature, since the flexural deformation 21c is produced in the extended optical fiber 21, the application of excessive tension to the extended optical fiber 21 is prevented, and damage to the optical fiber is prevented.

In the optical fiber splicing tool 100, since the splice holder 60, the cable grasping member 70, and the fiber holder 90 are integrated and the relative position between the terminal 24a of the optical fiber cable 24 and the inserted optical fiber 1 is thereby always constant, excessive force is not applied to the extended optical fiber 21 and the inserted optical fiber 1 during an operation of the accommodation thereof to the optical fiber splicing box or the like, and it is possible to prevent damage thereto.

In the optical fiber splicing tool 100, since it is possible to splice the optical fibers 1 and 21 as a result of causing the optical fiber splicing unit 10 to come close to the fiber holder 90 on the jig base 130, the fiber holder 90 may be fixed to the jig base 130.

In addition, the fiber holder 90 may also be formed integrally with the jig base 130.

In the aforementioned example, when the optical fibers 1 and 21 are butt-jointed using the optical fiber splicing tool 100, a step of inserting the inserted optical fiber 1 into the splice 30 after inserting the extended optical fiber 21 into the splice 30 is adopted; however, the order of the steps of inserting optical fibers into the splice 30 is not limited to this.

That is, by inserting the inserted optical fiber 1 into the splice 30 in advance, by subsequently introducing the cable grasping member 70 into the unit base 11, and by inserting the extended optical fiber 21 into the splice 30, the optical fibers 1 and 21 may be butt-jointed.

Specific constitutions of a splice, an interposing member, and a fiber holder are not limited as long as they are applied to a technical concept of the invention.

The inserted optical fiber is not particularly limited and may be adopted to, for example, an optical fiber that is installed in a vertical hole (for example, a hoistway used for an elevator) provided at each floor of a construction including a plurality of floors, indoor optical fibers, optical fibers that are provided in an optical composite electronic device, or the like.

Second Embodiment

Hereinafter, a cable outer coating grasping member according to a second embodiment of the invention will be described with reference to drawings.

In the second embodiment, identical reference numerals are used for the elements which are identical to those of the first embodiment, and the explanations thereof are omitted or simplified here.

Particularly, a cable outer coating grasping member 410 will be described with reference to FIGS. 20 to 22, 24, 25A, and 25B in which the upper side thereof is referred to as upper, the lower side thereof is referred to as lower.

Figure 23:
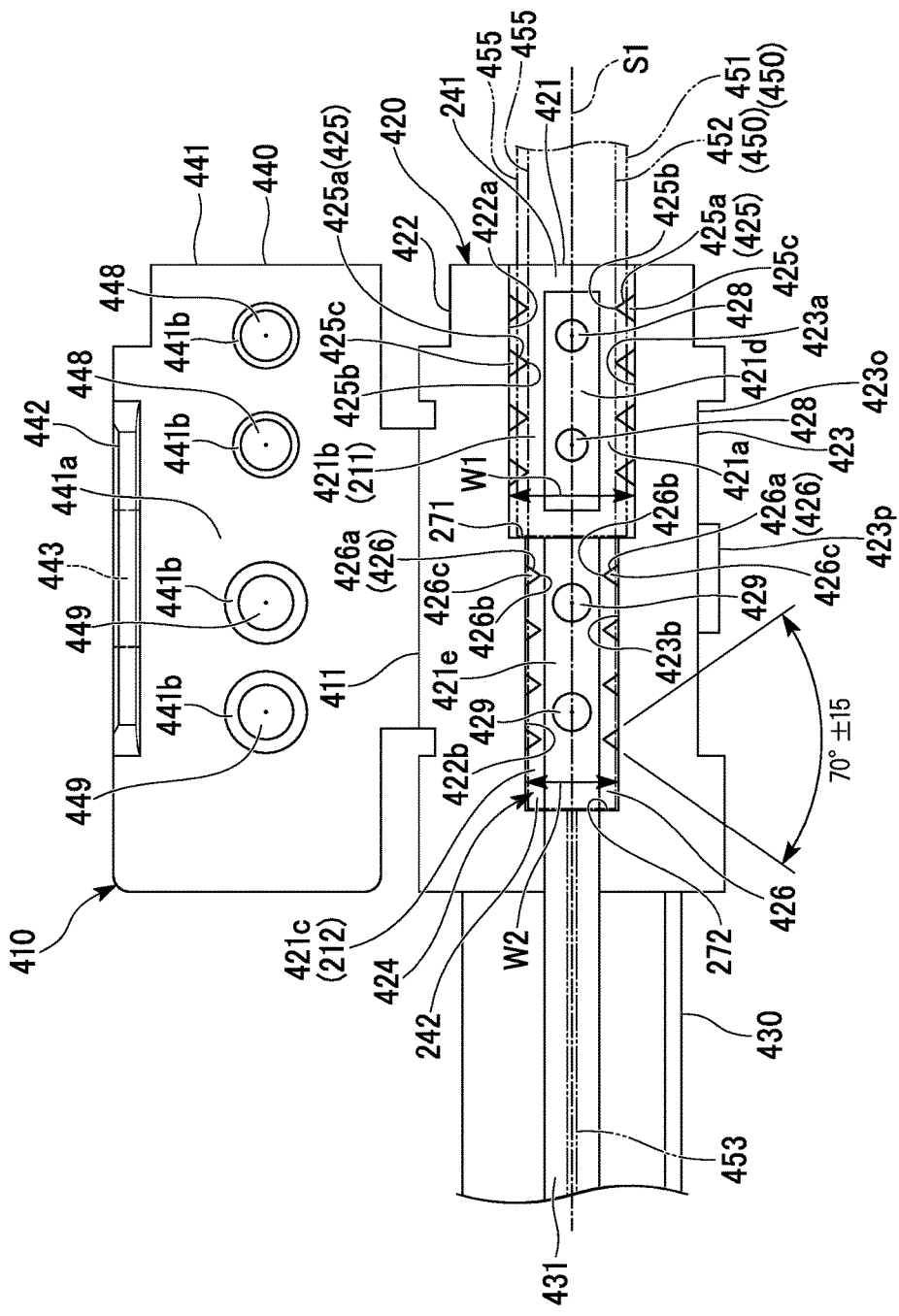
FIG. 23 is a plan view showing a structure of the cable outer coating grasping member shown in FIG. 20.

In FIG. 23, the front side of the paperface is upper and the back side of the paperface is lower.

The cable outer coating grasping member 410 shown in FIGS. 20 to 22 (hereinbelow, also simply referred to as an outer coating grasping member) includes: an elongated-shaped grasping member main body 420 having a cable-fitting groove 424 formed therein, an optical fiber cable 450 that is formed in a rectangular shape in cross section is to be fitted into the groove; a fiber support portion 430 that extends from the forward end of the grasping member main body 420; and a lid 440 that is openably and closably provided to the grasping member main body 420 with a hinge 411 interposed therebetween.

The hinge 411 supports the lid 440 rotatably relative to the grasping member main body 420 around the axis extending in the longitudinal direction of the grasping member main body 420.

The grasping member outer coating 410 shown as an example in the drawing is an integrally-molded product made of a plastic.

Specifically, the hinge 411 is a thin hinge formed by thinning the boundary portion between the grasping member main body 420 of the outer coating grasping member 410 and the lid 440.

The lid 440 can be manually rotated with respect to the grasping member main body 420.

The grasping member main body 420 is substantially configured so that side wall portions 422 and 423 are provided on the right and the left of an elongated-plate shaped bottom wall 421 (the right and the left in FIG. 22), respectively.

The paired side wall portions 422 and 423 protrude from both the right side and the left side of the bottom wall 421 toward one-face side (upper surface side) of the bottom wall 421 and are perpendicular to the bottom wall 421.

Furthermore, the paired side wall portions 422 and 423 are formed so as to extend along the edges that are both the right side and the left side of the bottom wall 421 and extend in the longitudinal direction of the bottom wall 421.

The paired side wall portions 422 and 423 are formed over the full length in the longitudinal direction of the bottom wall 421.

The cable-fitting groove 424 substantially occupies the entire inside region surrounded by the bottom wall 421 and the paired side wall portions 422 and 423.

The cable-fitting groove 424 opens at the entire side on a side opposite to the bottom wall 421 via the cable-fitting groove 424 and at the end (back end) on a side opposite to the fiber support portion 430 in the longitudinal direction of the grasping member main body 420 (front-back direction) extending in the longitudinal direction of the bottom wall 421.

The forward end of the cable-fitting groove 424 communicated with a fiber accommodation groove 431 that is cut-formed so as to extend in the direction from the forward end of the fiber support portion 430 to the forward-end portion of the grasping member main body 420.

Figure 20:
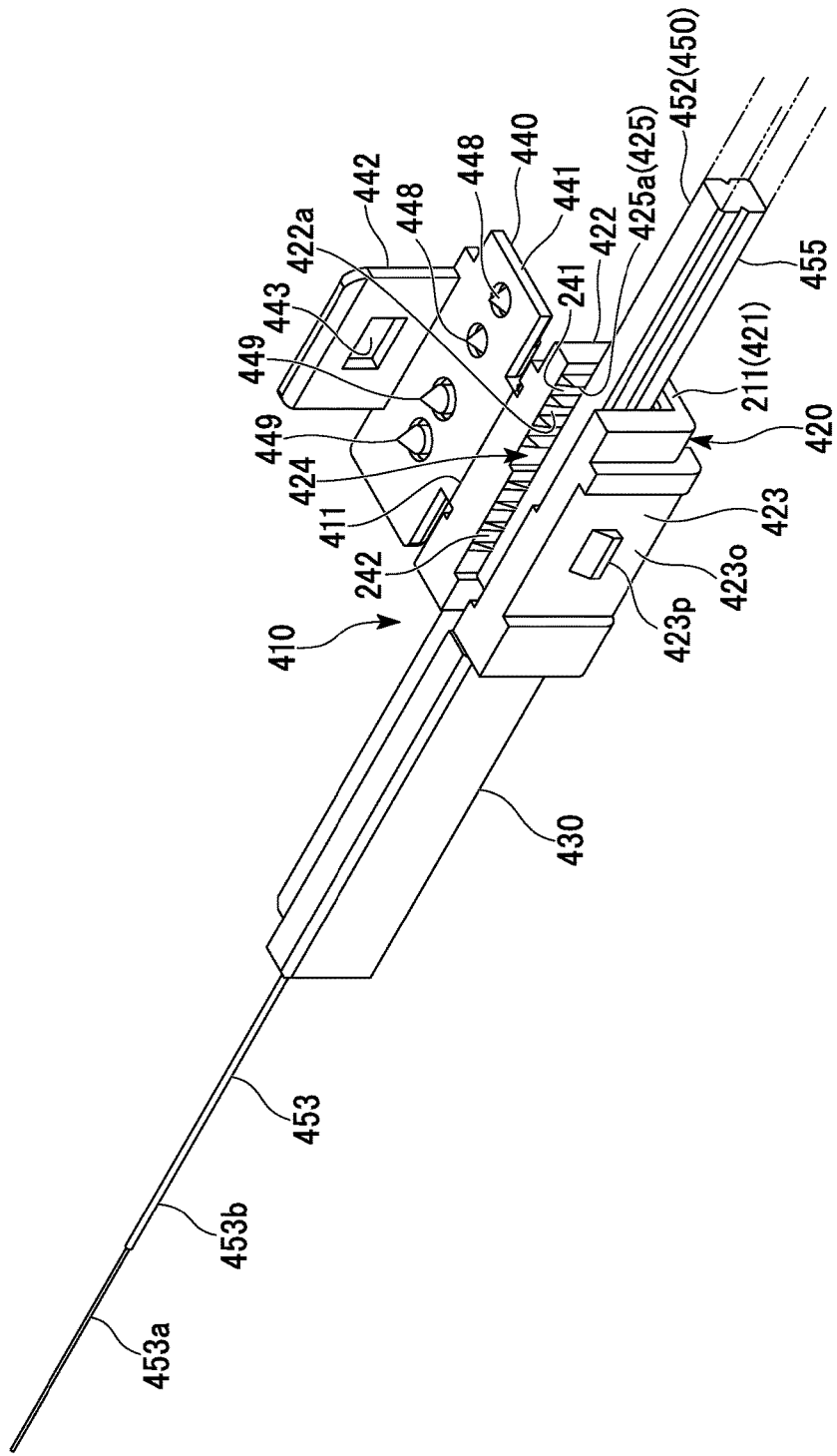
FIG. 20 is a general perspective view showing a cable outer coating grasping member according to a second embodiment of the invention.
Figure 21:
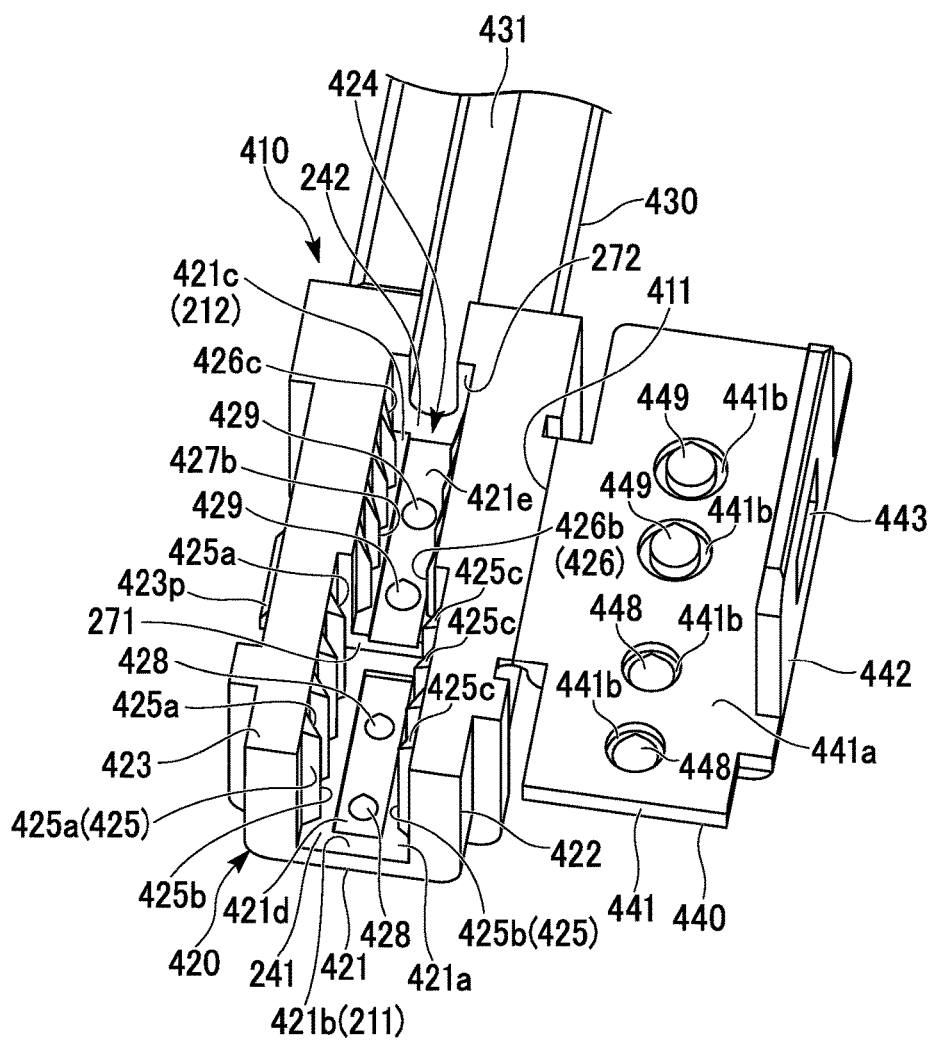
FIG. 21 is a perspective view showing the cable outer coating grasping member shown in FIG. 20 as seen from the back side thereof.
Figure 22:
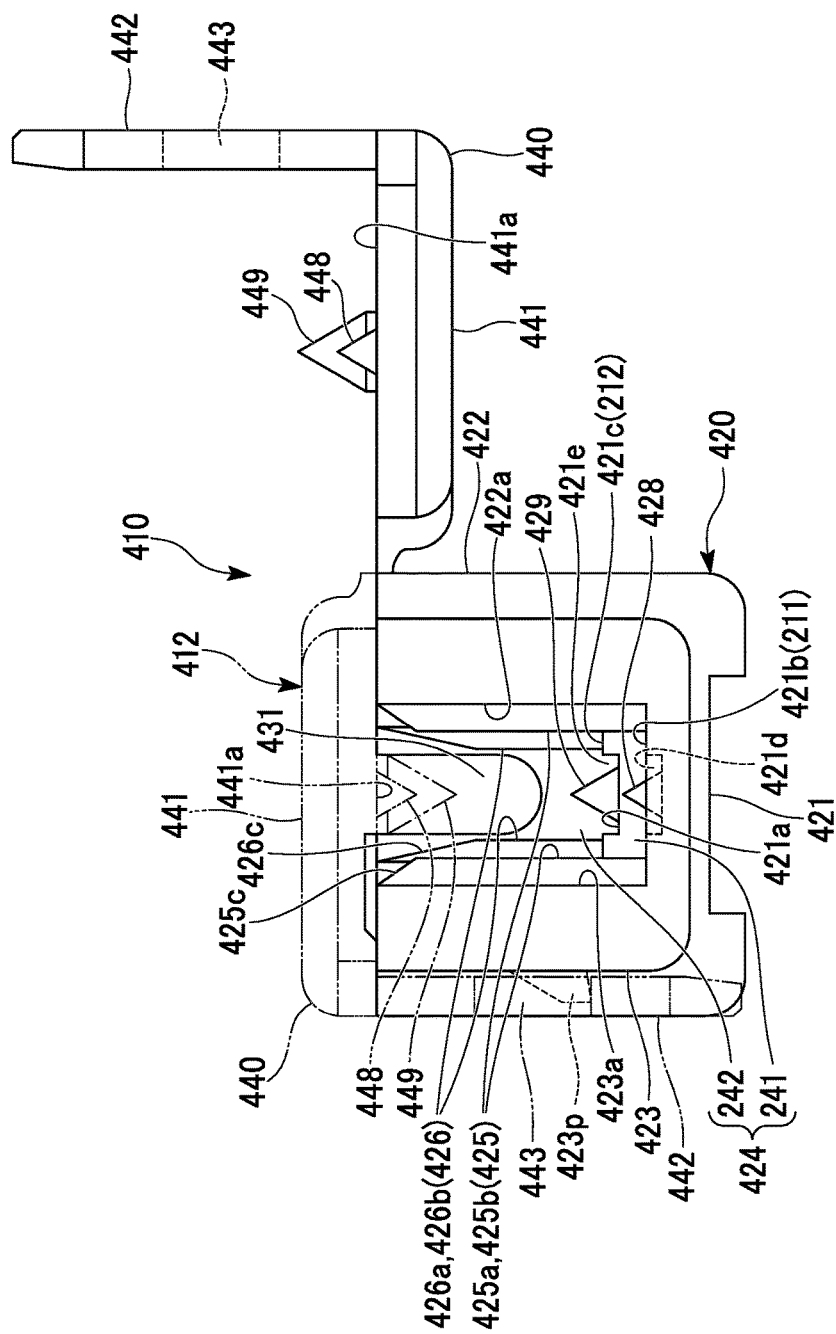
FIG. 22 is a rear view showing the cable outer coating grasping member shown in FIG. 20 as seen from the back side thereof.

In FIGS. 20 to 22, the horizontal direction of the bottom wall 421 coincides with the direction of the interval of the paired side wall portions 422 and 423 that are provided separately from each other with the cable-fitting groove 424 interposed therebetween.

The thin hinge 411 is provided between the lid 440 and one of the paired side wall portions 422 and 423 of the grasping member main body 420.

Hereinbelow, of the paired side wall portions 422 and 423 of the grasping member main body 420, the member (side wall portion represented by reference numeral 422 in FIGS. 20 to 22) that is coupled to the lid 440 with the thin hinge 411 interposed therebetween is also referred to as a first side wall portion 422, and the other thereof is also referred to as a second side wall portion 423.

The thin hinge 411 is provided between the protruding end on a side opposite to the bottom wall 421 of the first side wall portion 422 and the lid 440.

The lid 440 includes a plate-shaped lid body 441 and an engagement protrusion 442 that is provided to protrude from the lid body 441.

The one end of the lid body 441 is coupled to the first side wall portion 422 with the thin hinge 411 interposed therebetween.

The engagement protrusion 442 is provided perpendicular to the lid body 441 so as to protrude from the other end on the opposite side of said one end that is connected to the end of the thin hinge 411 of the lid body 441.

The thin hinge 411 is formed by making a plastic forming the outer coating grasping member 410 thinner than the thickness of the first side wall portion 422 of the grasping member main body 420 and the thickness of the lid body 441 of the lid 440.

In other cases, the outer coating grasping member 410 is not limited to integrally-molded product made of a plastic, for example, a configuration having a lid 440 different from the grasping member main body 420 may be adopted.

It is only necessary that, as the hinge 411, a hinge is adopted which causes the lid 440 to manually rotate around the axis extending in the longitudinal direction of the grasping member main body 420 and causes the lid to be coupled to the grasping member main body 420, and it is not limited to a thin hinge.

Regarding the configuration having a lid 440 separated from the grasping member main body 420, for example, a rotation shaft or the like which is integrated together with or separated from one or both of the first side wall portion 422 and the lid 440 may be adopted as the hinge 411.

The solid line shown in FIG. 22 represents an opened state where the lid 440 opens with respect to the grasping member main body 420.

Moreover, a closed state where the lid 440 is closed with respect to the grasping member main body 420 is indicated by the chain double-dashed line shown in FIG. 22.

The lid 440 is rotatable around the thin hinge 411 with respect to the grasping member main body 420.

Due to rotation around the thin hinge 411, for example, an opened state with respect to the grasping member main body 420 can be switched to a closed state by the lid 440.

As indicated by the chain double-dashed line shown in FIG. 22, when the lid 440 closes the grasping member main body 420, the lid body 441 comes into contact with the protruding end face (the end face on the opposite side of the bottom wall 421) of the second side wall portion 423 protruding from the bottom wall 421 of the grasping member main body 420 and covers the cable-fitting groove 424.

At this time, the grasping member main body 420 of the outer coating grasping member 410 and the lid 440 forms a rectangular cylindrical body 412.

As indicated by the solid line shown in FIG. 22, the lid 440, that is in the opened state with respect to the grasping member main body 420, is separated from the protruding end portion of the paired side wall portions 422 and 423 and opens the cable-fitting groove 424.

An inner surface 441a that faces the cable-fitting groove 424 of the lid body 441 of the lid 440 that closes the grasping member main body 420 is positioned so as to face the inner surface 421a of the bottom wall 421 of the grasping member main body 420.

An engagement protrusion 441 of the lid 440 is formed near the inner surface 421a of the lid body 441 and in a plate shape that protrudes from the lid body 441 and is perpendicular to the lid body 441.

An engagement protrusion 423p is provided to protrude from the side surface (outer side face 423o) on the opposite side of an inner surface 423a that faces the cable-fitting groove 424 of the second side wall portion 423 of the grasping member main body 420, and the engagement protrusion is to be engaged with the engagement protrusion 441 of the lid 440 that closes the grasping member main body 420.

As the lid 440 that closes the grasping member main body 420 causes the engagement protrusion 441 to be engaged with the engagement protrusion 423p of the grasping member main body 420, rotation in the opening direction is restricted, a state of closing the grasping member main body 420 can be maintained.

When the engagement protrusion 441 is not engaged with the engagement protrusion 423p of the grasping member main body 420, the lid 440 can manually rotate with respect to the grasping member main body 420.

In a state where the engagement protrusion 441 is engaged with the engagement protrusion 423p of the grasping member main body 420, rotation of the lid 440 with respect to the grasping member main body 420 is restricted.

An engagement window hole 443, into which the engagement protrusion 423p of the grasping member main body 420 can be inserted when the grasping member main body 420 is closed by the lid body 441, is formed on the engagement protrusion 441.

When the grasping member main body 420 is closed by the lid body 441, as the engagement protrusion 441 causes the engagement protrusion 423p of the grasping member main body 420 to be inserted into the engagement window hole 443 and to be engaged with the engagement protrusion 423p, the rotation in the opening direction is restricted.

Moreover, as the engagement protrusion 423p of the grasping member main body 420 is inserted into the engagement window hole 443, the engagement protrusion 441 overlaps the outer side face 423o of the second side wall portion 423 of the grasping member main body 420.

In the drawing shown as an example, specifically, the rectangular cylindrical body 412 formed by the grasping member main body 420 of the outer coating grasping member 410 and the lid 440 is configured to causes the engagement protrusion 441 of the lid 440 that closes the grasping member main body 420 to be engaged with the engagement protrusion 423p of the grasping member main body 420 and to maintain a state where the lid 440 closes the grasping member main body 420.

Additionally, in the rectangular cylindrical body 412, the engagement protrusion 441 of the lid 440 overlaps the outer side face 423o of the second side wall portion 423 of the grasping member main body 420.

Figure 24:
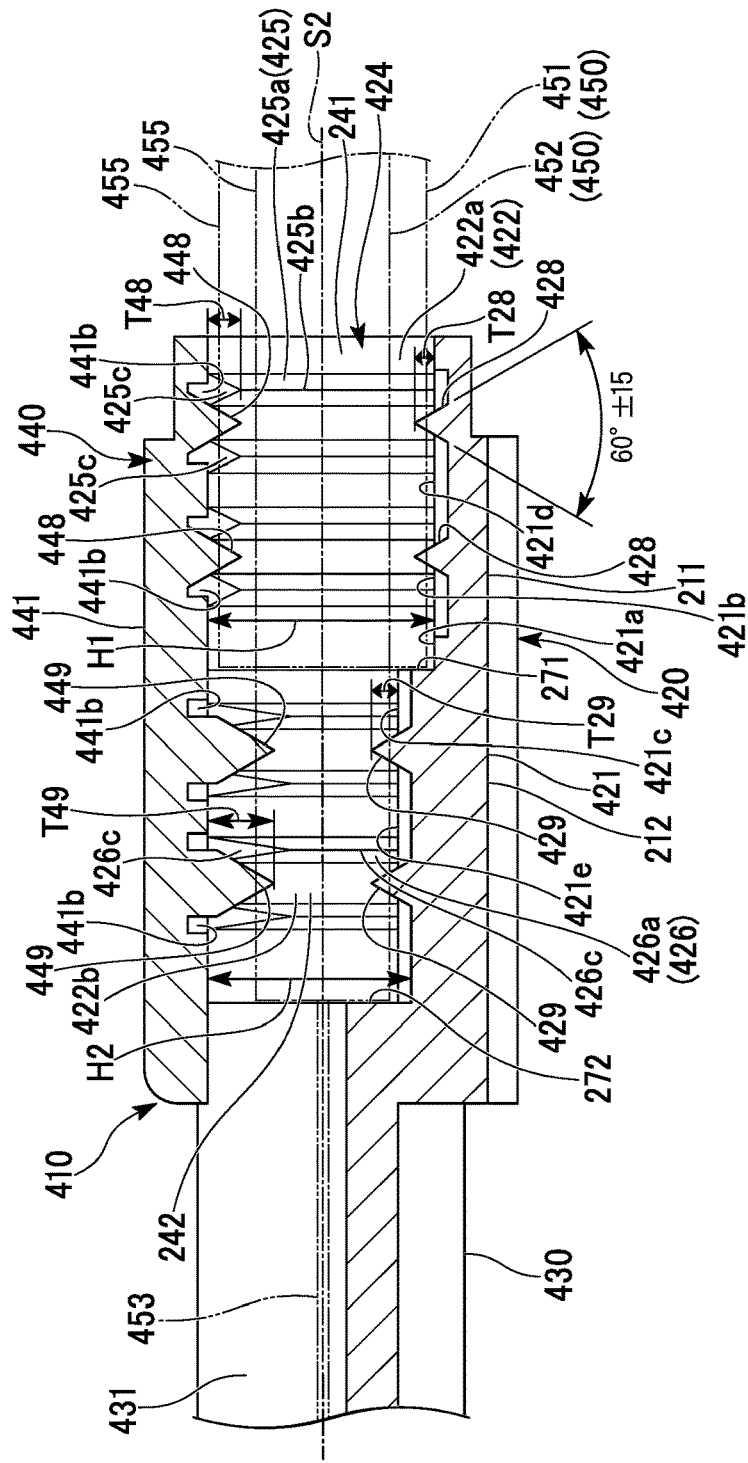
FIG. 24 is a vertical cross-sectional view showing a structure of the cable outer coating grasping member shown in FIG. 20.

As shown in FIGS. 21, 23, and 24, the cable-fitting groove 424 between both the side wall portions 422 and 423 of the grasping member main body 420 includes: a first cable groove 241; and a second cable groove 242 that is narrower in width than the first cable groove 241 and is formed so as to extend from one end (forward end) of the first cable groove 241 in the extending direction thereof.

The first cable groove 241 and the second cable groove 242 are formed in the grasping member main body 420 so as to extend in the longitudinal direction thereof.

The back end that is on the opposite side of the forward end of the first cable groove 241 which is communicated with the second cable groove 242 opens at the back end of the grasping member main body 420.

As shown in FIGS. 20 and 23, the optical fiber cable 450 is fitted into the cable-fitting groove 424.

Figure 25A:
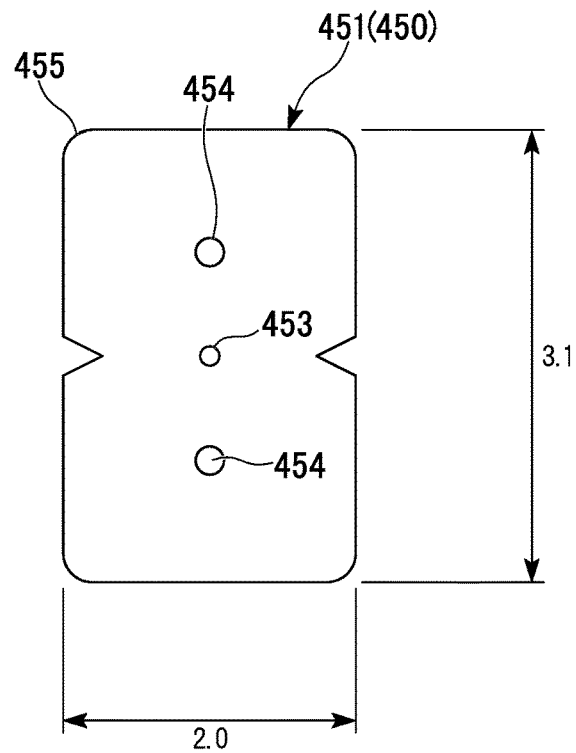
FIG. 25A is a cross-section structure of an optical fiber cable that is fitted into the cable outer coating grasping member shown in FIG. 20 and is a cross-sectional view showing a first optical fiber cable.
Figure 25B:
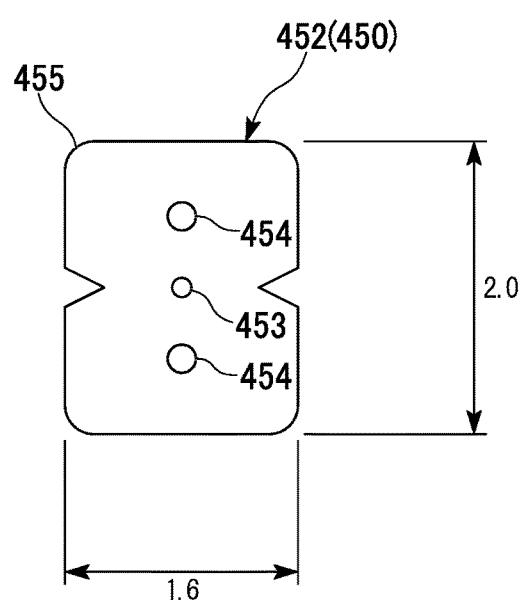
FIG. 25B is a cross-section structure of an optical fiber cable that is fitted into the cable outer coating grasping member shown in FIG. 20 and is a cross-sectional view showing a second optical fiber cable.

As shown in FIGS. 25A and 25B, the optical fiber cable 450 is configured so that an optical fiber 453 and a pair of tensile strength members 454 and 454 are implanted into an outer coating 455 that is made of a synthetic resin material and is formed in a rectangular shape in cross section.

As the optical fiber 453, for example, a bare optical fiber is adopted.

However, an optical core fiber may be adopted as the optical fiber 453.

As the optical fiber 453, a coated optical fiber may be adopted which is configured so that the periphery of a bare optical fiber 453a (refer to FIG. 20) such as a bare optical fiber or an optical core fiber is coated with a resin-coating member 453b.

As shown in FIGS. 20 and 23, the optical fiber cable 450 is fitted into the cable-fitting groove 424 in a state where the optical fiber 453 is exposed by removing the outer coating 455 from the terminal of the outer coating 455 and extends therefrom.

The first cable groove 241 is formed so that a first optical fiber cable 451 having a cross-sectional size shown in FIG. 25A can be fitted thereinto.

As shown in FIG. 25B, the second cable groove 242 is formed so that a second optical fiber cable 452 having a cross-sectional size smaller than the first optical fiber cable 451 can be fitted thereinto.

As shown in FIG. 25A, the first optical fiber cable 451 is an optical fiber cable that is formed in a rectangular shape in cross section and has a cross-sectional size of 2.0 mm in width×3.1 mm in height.

As shown in FIG. 25B, the second optical fiber cable 452 is an optical fiber cable that is formed in a rectangular shape in cross section and has a cross-sectional size of 1.6 mm in width×2.0 mm in height.

As shown in FIGS. 21 and 23, grasping claws 425 (hereinbelow, also referred to as a first grasping claw) are provided to protrude from the inner surfaces 422a and 423a that face each other via the first cable groove 241 of both the side wall portions 422 and 423 of the grasping member main body 420, and the claws are formed in a triangular shape in cross section and extend in the depth direction of the first cable groove 241.

The first grasping claws 425 of the inner surfaces 422a and 423a of both side wall portions face each other with a groove width center of the first cable groove 241 interposed therebetween and are formed at a plurality of portions along the extending direction of the first cable groove 241 between the inner surfaces 422a and 423a of both side wall portions.

Grasping claws 426 (hereinbelow, also referred to as a second grasping claw) are provided to protrude from the inner surfaces 422b and 423b that face each other via the second cable groove 242 of both the side wall portions 422 and 423 of the grasping member main body 420, and the claws are formed in a triangular shape in cross section and extend in the depth direction of the second cable groove 242.

The second grasping claws 426 of the inner surfaces 422b and 423b of both side wall portions face each other with a groove width center of the second cable groove 242 interposed therebetween and are formed at a plurality of portions along the extending direction of the second cable groove 242 between the inner surfaces 422b and 423b of both side wall portions.

Hereinbelow, the inner surfaces 422a and 423a that face each other via the first cable groove 241 of both the side wall portions 422 and 423 of the grasping member main body 420 is also referred to as a first inside surface, and the inner surfaces 422b and 423b that face each other via the second cable groove 242 of both the side wall portions 422 and 423 of the grasping member main body 420 is also referred to as a second inside surface.

As shown in FIGS. 21 and 23, the first inside surfaces 422a and 423a of the grasping member main body 420 are formed parallel to each other.

As shown in FIG. 23, the second inside surfaces 422b and 423b are parallel to each other and are formed parallel to the first inside surfaces 422a and 423a.

Furthermore, the first cable groove 241 and the second cable groove 242 are formed so that the groove width centers thereof coincide with each other, that is, the center between the second inside surfaces 422b and 423b that face each other coincide with the center between the first inside surfaces 422a and 423a that face each other.

As shown in FIGS. 21 and 22, each first grasping claw 425 of the grasping member main body 420 includes: a grasping claw body 425a that extends in the depth direction of the first cable groove 241 (in the vertical direction of grasping member) at a predetermined protruding length from the first inside surfaces 422a and 423a; and a tapered shape upper end 425c that is formed so as to extend upward from the grasping claw body 425a.

The protruding lengths of the grasping claw bodies 425a of the first grasping claws 425 from the first inside surfaces 422a and 423a are the same as each other.

The ridge lines 425b of the grasping claw bodies 425a of the first grasping claws 425 that face each other in the groove width direction of the first cable groove 241 extend parallel to each other.

The tapered shape upper end 425c is formed in a tapered shape such that the protruding lengths from the first inside surfaces 422a and 423a gradually become shorter in the direction upward from the upper end of the grasping claw body 425a.

The tapered shape upper end 425c is configured to cause the first optical fiber cable 451 to be smoothly pressed into the first cable groove 241 of the grasping member main body 420 from above.

As shown in FIGS. 21 and 22, each second grasping claw 426 of the grasping member main body 420 includes: a grasping claw body 426a that extends in the depth direction of the second cable groove 242 (in the vertical direction of grasping member) at a predetermined protruding length from the second inside surfaces 422b and 423b; and a tapered shape upper end 426c that is formed so as to extend upward from the grasping claw body 426a.

The protruding lengths of the grasping claw bodies 426a of the second grasping claws 426 from the second inside surfaces 422b and 423b are the same as each other.

The ridge lines 426b of the grasping claw bodies 426a of the second grasping claws 426 that face each other in the groove width direction of the second cable groove 242 extend parallel to each other.

As shown in FIG. 23, in a plan view showing the grasping member main body 420, the center between the ridge lines 426b of the grasping claw bodies 426a of the second grasping claws 426 that face each other in the groove width direction of the second cable groove 242 is positioned at the ideal vertical plane S1 that passes through the center between the ridge lines 425b of the grasping claw bodies 425a of the first grasping claws 425 that face each other and is perpendicular to the groove width direction of the first cable groove 241.

The tapered shape upper end 426c of the second grasping claws 426 is formed in a tapered shape such that the protruding lengths from the second inside surfaces 422b and 423b gradually become shorter in the direction upward from the upper end of the grasping claw body 426a.

The tapered shape upper end 426c is configured to cause the second optical fiber cable 452 to be smoothly pressed into the second cable groove 242 of the grasping member main body 420 from above.

As shown in FIG. 23, the first cable groove 241 is formed so as to be capable of fitting the first optical fiber cable 451 thereinto so that the width direction thereof in cross section is aligned along the groove width direction.

The separation distance between the first inside surfaces 422a and 423a (groove width W1 of the first cable groove 241) is determined slightly larger than the width size of the first optical fiber cable 451.

Moreover, the separation distance between the ridge lines 425b (ridge lines of the grasping claw body 425a) of the first grasping claws 425 that face each other in the groove width direction of the first cable groove 241 is determined slightly smaller than the width size of the first optical fiber cable 451.

As a result of fitting the leading-end portion of the first optical fiber cable 451 into the inside of the first cable groove 241, it is possible to attach the grasping member main body 420 to the leading-end portion of the first optical fiber cable 451.

The leading-end portion of the first optical fiber cable 451 is pressed and fitted into the first cable groove 241 so that the longitudinal direction thereof is aligned along the extending direction of the first cable groove 241 of the grasping member main body 420 and the width direction thereof in cross section is aligned along the groove width direction of the first cable groove 241.

The first grasping claws 425 of the grasping member main body 420 (particularly, the grasping claw body 425a) are cut into the outer coating 455 of the first optical fiber cable 451 pushed into the first cable groove 241 from both the sides thereof.

The first optical fiber cable 451 is grasped by the first grasping claws 425 (particularly, the grasping claw body 425*a*) that are cut into the outer coating 455 from both the sides thereof, and is fixed to the grasping member main body 420.

The first grasping claws 425 of the grasping member main body 420 effectively contribute to securement of a cable-holding force of holding the first optical fiber cable 451 with respect to the grasping member main body 420, that is, securement of a resistive force against backward movement of the first optical fiber cable 451 with respect to the grasping member main body 420.

As shown in FIG. 23, the second cable groove 242 is formed so as to be capable of fitting the second optical fiber cable 452 thereinto so that the width direction thereof in cross section is aligned along the groove width direction.

The separation distance between the second inside surfaces 422*b* and 423*b* (groove width W2 of the second cable groove 242) of the grasping member main body 420 is determined slightly larger than the width size of the second optical fiber cable 452. Moreover, the separation distance between the ridge lines 426*b* (ridge lines of the grasping claw body 426*a*) of the second grasping claws 426 that face each other in the groove width direction of the second cable groove 242 is determined slightly smaller than the width size of the second optical fiber cable 452.

As a result of fitting the leading-end portion of the second optical fiber cable 452 into the inside of the second cable groove 242 and accommodating the leading-end portion of the second optical fiber cable 452 in the first cable groove 241 and the second cable groove 242, it is possible to attach the grasping member main body 420 to the leading-end portion of the second optical fiber cable 452.

The leading-end portion of the second optical fiber cable 452 is pressed into the first cable groove 241 and the second cable groove 242 and is fitted into the second cable groove 242 so that the longitudinal direction thereof is aligned along the extending direction of the cable-fitting groove 424 of the grasping member main body 420 and the width direction thereof in cross section is aligned along the groove width direction of the first cable groove 241 and the second cable groove 242.

The second grasping claws 426 of the grasping member main body 420 (particularly, the grasping claw body 426*a*) are cut into the outer coating 455 of the second optical fiber cable 452 pushed into the second cable groove 242 from both the sides thereof.

The second optical fiber cable 452 is grasped by the second grasping claws 426 (particularly, the grasping claw body 426*a*) that are cut into the outer coating 455 from both the sides thereof, and is fixed to the grasping member main body 420.

Consequently, the second optical fiber cable 452 is in a state of being fitted into the second cable groove 242.

The second grasping claws 426 of the grasping member main body 420 effectively contribute to securement of a cable-holding force of holding the second optical fiber cable 452 with respect to the grasping member main body 420, that is, securement of a resistive force against backward movement of the second optical fiber cable 452 with respect to the grasping member main body 420.

Moreover, the second optical fiber cable 452 that is pushed into the first cable groove 241 and the second cable groove 242 and is fitted into the second cable groove 242 is drawn through the first cable groove 241 and is in a state of being extended from the back end of the first cable groove 241 to the back side of the grasping member main body 420.

As shown in FIG. 23, the first grasping claws 425 of the grasping member main body 420 shown as an example in the drawing protrudes toward the center side in the groove width of the first cable groove 241 from the virtual extension of the second inside surfaces 422*b* and 423*b* that faces each other with the second cable groove 242 interposed therebetween.

The distance between the ridge lines 425*b* of the first grasping claws 425 of the first cable groove 241 which are opposed to each other is determined slightly smaller than the distance between the second inside surfaces 422*b* and 423*b* of the grasping member main body 420 which are opposed to each other.

Here, the case will be described where the width size of the second optical fiber cable 452 is slightly larger than the distance between the ridge lines 425*b* of the first grasping claws 425 of the grasping member main body 420 which are opposed to each other shown in FIG. 23 as an example.

In this case, both the sides of the second optical fiber cable 452 that is pushed into the first cable groove 241 and the second cable groove 242 are held not only by the second grasping claws 426 of the second cable groove 242 which face each other but also by the first grasping claws 425 of the first cable groove 241 which face each other.

As the grasping member main body 420, a configuration is preferably adopted in which the protruding lengths of first grasping claws 425 from both the side wall portions 422 and 423 of the grasping member main body 420 are set so that the top portions of the first grasping claws 425 that face each other (near the ridge lines 425*b*) come into contact with both the sides of the outer coating 455 of the second optical fiber cable 452 at a weak pressing force.

As described above, in the configuration in which the distance between the ridge lines 425*b* of the first grasping claws 425 that face each other is 1.5±0.1 mm, the top portion of each first grasping claw 425 comes into contact with the outer coating 455 of the second optical fiber cable 452, which is pushed into the cable-fitting groove 424 and has the cross-sectional size of 1.6 mm×2.0 mm, at a weak pressing force.

Each first grasping claw 425 effectively contributes to stable support of the second optical fiber cable 452 at a predetermined position in the groove width direction of the first cable groove 241.

The first grasping claws 425 that face each other at the distance of 1.5±0.1 mm between the ridge lines 425*b* hardly function to improve a force of holding the second optical fiber cable 452 having the width size of 1.6 mm with respect to the grasping member main body 420.

In other cases, in the grasping member main body 420, not only the second grasping claws 426 but also the first grasping claws 425 can function to ensure a force of holding the second optical fiber cable 452.

In the grasping member main body 420 which holds and fix the first optical fiber cable 451 having the cross-sectional size of 2.0 mm×3.1 mm and holds and fix the second optical fiber cable 452 having the cross-sectional size of 1.6 mm×2.0 mm, for example, the distance between the first inside surfaces 422*a* and 423*a* (the groove width W1 of the first cable groove 241) is 2.3±0.15 mm, and the distance between the ridge lines 425*b* of the first grasping claws 425 that face each other is 1.5±0.1 mm.

Furthermore, in the grasping member main body 420, for example, the distance between the second inside surfaces 422*b* and 423*b* (the groove width W2 of the second cable groove 242) is 1.7±0.15 mm, and the distance between the ridge lines 426*b* of the second grasping claws 426 that face each other is 1.15±0.05 mm.

In other cases, regarding each of the first grasping claws 425 and the second grasping claws 426 of the grasping member main body 420 shown in FIG. 23 as an example, the aperture angles whose apexes are the ridge lines 425*b* and 426*b* in the cross section perpendicular to the ridge lines 425*b* and 426*b* are in the range of 70±15 degrees.

As shown in FIGS. 21 and 24, the second cable groove 242 of the grasping member main body 420 are formed shallower than the first cable groove 241 in groove depth.

The bottom wall inner surface 421*a* of the grasping member main body 420 includes: a first groove bottom surface 421*b* that is positioned on a groove bottom of the first cable groove 241; and a second groove bottom surface 421*c* that is formed parallel to the first groove bottom surface 421*b* on a groove bottom of the second cable groove 242.

The second groove bottom surface 421*c* is located nearer the forward side of the grasping member main body than the first groove bottom surface 421*b*.

The first inside surface 422*a* of the grasping member main body 420 is formed perpendicular to the first groove bottom surface 421*b*, and the second inside surface 423*a* is formed perpendicular to the second groove bottom surface 421*c*.

As shown in FIGS. 23 and 24, the first protruding claws 428 and 448 that are to be cut into the outer coating 455 of the first optical fiber cable 451 fitted into the first cable groove 241 and the second protruding claws 429 and 449 that are to be cut into the outer coating 455 of the second optical fiber cable 452 fitted into the second cable groove 242 are provided to protrude from the bottom wall inner surface 421*a* of the grasping member main body 420 and the inner surface 441*a* of the lid body 441 of the lid 440, respectively.

Hereinbelow, of the first protruding claws 428 and 448, the first protruding claw 428 that is provided to protrude from the bottom wall 421 of the grasping member main body 420 is also referred to as a main-body-side first protruding claw, and the first protruding claws 448 that is provided to protrude from the lid body 441 is also referred to a lid-side first protruding claw.

Furthermore, hereinbelow, of the second protruding claws 429 and 449, the second protruding claws 429 that is provided to protrude from the bottom wall 421 of the grasping member main body 420 is also referred to as a main-body-side second protruding claw, and the second protruding claw 449 that is provided to protrude from the lid body 441 is also referred to as a lid-side second protruding claw.

Hereinbelow, regarding the bottom wall 421 of the grasping member main body 420, the portion thereof that faces the first cable groove 241 is also referred to as a first bottom wall 211 (refer to FIGS. 21 to 24), and the portion thereof that faces the second cable groove 242 is also referred to as a second bottom wall 212 (refer to FIGS. 21 to 24).

As shown in FIGS. 21 to 24, in the outer coating grasping member 410 shown as an example in the drawing, the main-body-side first protruding claws 428 are provided to protrude from the first bottom wall 211 of the grasping member main body 420, and the main-body-side second protruding claw 429 are provided to protrude from the second bottom wall 212 of the grasping member main body 420.

As shown in FIGS. 21 to 24, a recess portion 421*d* (hereinbelow, also referred to as a first-recess-groove bottom portion) that is depressed from the first groove bottom surface 421*b* is formed on the first bottom wall 211 of the grasping member main body 420.

The main-body-side first protruding claws 428 protrude from the bottom surface of the first-recess-groove bottom portion 421*d*.

In the grasping member main body 420 shown as an example in the drawing, the first-recess-groove bottom portion 421*d* is formed in a groove shape that extends in the extending direction of the first cable groove 241 of the first bottom wall 211

The main-body-side first protruding claw 428 is formed at the two positions that are separated from each other in the extending direction of the groove-shaped first-recess-groove bottom portion 421*d*.

The main-body-side first protruding claw 428 is provided to protrude from the two positions that are separated from each other in the extending direction of the first cable groove 241 of the first bottom wall 211.

Each main-body-side first protruding claw 428 protrudes upward from the first groove bottom surface 421*b*, that is, protrudes toward the lid inner surface 441*a* of the lid 440 closing the grasping member main body 420, from the first groove bottom surface 421*b*.

As shown in FIGS. 21 to 24, a recess portion 421*e* (hereinbelow, also referred to as a second-recess-groove bottom portion) that is depressed from the second groove bottom surface 421*c* is formed on the second bottom wall 212 of the grasping member main body 420.

The main-body-side second protruding claws 429 protrude from the bottom surface of the second-recess-groove bottom portion 421*e*.

In the grasping member main body 420 shown as an example in the drawing, the second-recess-groove bottom portion 421*e* is formed in a groove shape that extends in the extending direction of the second cable groove 242 of the second bottom wall 212

The main-body-side second protruding claw 429 is formed at the two positions that are separated from each other in the extending direction of the groove-shaped second-recess-groove bottom portion 421*e* of the second bottom wall 212.

The main-body-side second protruding claw 429 is provided to protrude from the two positions that are separated from each other in the extending direction of the second cable groove 242 of the second bottom wall 212.

Each main-body-side second protruding claw 429 protrudes upward from the second groove bottom surface 421*c*, that is, protrudes toward the lid inner surface 441*a* of the lid 440 closing the grasping member main body 420, from the second groove bottom surface 421*c*.

In particular, the bottom wall inner surface 421*a* of the grasping member main body 420 includes not only the first groove bottom surface 421*b* and the second groove bottom surface 421*c* but also an inner surface of the first-recess-groove bottom portion 421*d* and an inner surface of the second-recess-groove bottom portion 421*e*.

The inner surface of the first-recess-groove bottom portion 421*d* and the inner surface of the second-recess-groove bottom portion 421*e* are part of the bottom wall inner surface 421*a*.

As shown in FIGS. 21 and 23, the first-recess-groove bottom portion 421*d* of the grasping member main body 420 of the outer coating grasping member 410 according to the embodiment is not limited to the groove shape having a bottom surface from which a plurality of main-body-side first protruding claws 428 protrude.

As the grasping member main body 420, a structure may also be adopted in which the main-body-side first protruding claws 428 protrude from the bottom surface of the first-recess-groove bottom portion 421d that is formed so as to correspond to each claw.

Moreover, the second-recess-groove bottom portion 421e is not limited to the groove shape having a bottom surface from which a plurality of main-body-side second protruding claws 429 protrude.

As the grasping member main body 420, a structure may also be adopted in which the main-body-side second protruding claws 429 protrude from the bottom surface of the second-recess-groove bottom portion 421e that is formed so as to correspond to each claw.

Moreover, as a grasping member main body, a structure may also be adopted in which the first-recess-groove bottom portion 421d and/or the second-recess-groove bottom portion 421e is not provided and the main-body-side first protruding claw 428 directly protrudes from the first groove bottom surface 421b; and/or a structure may also be adopted in which the main-body-side second protruding claw 429 directly protrudes from the second groove bottom surface 421c.

As shown in FIG. 24, when the grasping member main body 420 is closed by the lid body 441, two lid-side first protruding claws 448 and tow lid-side second protruding claws 449 are provided on the lid body 441 of the lid 440 at the positions corresponding to the two main-body-side first protruding claws 428 and the two main-body-side second protruding claws 429 of the grasping member main body 420 so as to protrude therefrom.

When the rectangular cylindrical body 412 is formed, the lid-side first protruding claws 448 of the lid 440 are formed at the positions that are opposed to the main-body-side first protruding claws 428.

When the rectangular cylindrical body 412 is formed, the lid-side second protruding claws 449 of the lid 440 are formed at the positions that are opposed to the main-body-side second protruding claw 429.

As shown in FIGS. 21 and 24, recess portions 441b (hereinbelow, also referred to as a lid recess portion) are provided on the lid body 441, are depressed from the inner surface 441a thereof, and are formed at four positions that are separated from each other in the extending direction of the cable-fitting groove 424.

When the rectangular cylindrical body 412 is formed by closing the lid 440 of the lid inner surface 441a with respect to the grasping member main body 420, such lid recess portions 441b are formed the positions that are opposed to the first-recess-groove bottom portion 421d and the second-recess-groove bottom portions 421e of the grasping member main body 420.

In the outer coating grasping member 410 shown as an example in the drawing, each of the lid-side first protruding claw 448 and the lid-side second protruding claw 449 protrude from the bottom surface of the lid recess portion 441b.

In other cases, the lid 440 is not limited to the structure shown as an example in the drawing in which the lid recess portions 441b is formed on the lid body 441 so as to correspond to the lid-side first protruding claw 448 and the lid-side second protruding claw 449.

As the lid 440, a structure may also be adopted in which, for example, a plurality of protruding claws serving as the lid-side first protruding claw 448 and/or the lid-side second protruding claw 449 protrude from the bottom surface of the lid recess portion 441b that extends in the extending direction of the cable-fitting groove 424 and are formed in a groove shape.

Moreover, as the lid 440, a structure may also be adopted in which the lid recess portions 441b are not formed and the lid-side first protruding claw 448 and/or the lid-side second protruding claw 449 directly protrudes from the lid inner surface 441a.

As shown in FIG. 24 or the like, the entire portion that protrudes upward from the first groove bottom surface 421b (and the virtual extension thereof) of the main-body-side first protruding claw 428 and the entire portion that protrudes upward from the second groove bottom surface 421c (and the virtual extension thereof) of the main-body-side second protruding claw 429 are formed in a tapered cone shape (a circular cone shape in the drawing shown as an example).

The entire portion that protrudes from the lid-side first protruding claw 448 and the lid inner surface 441a of the lid-side second protruding claw 449 (and the virtual extension thereof) is also formed in a tapered cone shape (a circular cone shape in the drawing shown as an example).

The aperture angle whose apex is the circular-cone shaped portion of the first protruding claws 428 and 448 and the second protruding claws 429 and 449 is in the range of 60±5 degrees.

In other cases, the first protruding claws 428 and 448 and the second protruding claws 429 and 449 is not limited to a circular cone shape, a cone shape (tapered shape) such as a polyangular pyramid shape may be adopted.

As shown in FIG. 24, the center between apexes of the second protruding claws 429 and 449 which face each other passes through the center between apexes of the first protruding claws 428 and 448 which face each other and is positioned on the virtual plane S2 that is perpendicular to the direction of the interval between the apexes the first protruding claws 428 and 448.

The virtual plane S2 is perpendicular to the ideal vertical plane S1 that is described above (refer to FIG. 23) and is perpendicular to the groove width direction of the first cable groove 241 passing through the center between the ridge lines 425b of the grasping claw body 425a of the first grasping claws 425 that face each other.

Furthermore, the virtual plane S2 is parallel to the first groove bottom surface 421b and the second groove bottom surface 421c of the grasping member main body 420.

As shown in FIG. 24 or the like, when the rectangular cylindrical body 412 is formed by closing the lid 440 to the grasping member main body 420, the lid inner surface 441a is arranged parallel to the first groove bottom surface 421b and the second groove bottom surface 421c of the grasping member main body 420.

The separation distance (a groove depth H1 of a first cable groove 251) between the first groove bottom surface 421b of the grasping member main body 420 and the lid inner surface 441a is determined slightly larger than the size in height of the first optical fiber cable 451.

The separation distance (a groove depth H2 of a second cable groove 252) between the second groove bottom surface 421c of the grasping member main body 420 and the lid inner surface 441a is determined smaller than the groove depth H1 of the first cable groove 251 and slightly larger than the size in height of the second optical fiber cable 452.

As shown in FIG. 24, the apexes of the second protruding claws 429 and 449 which face each other with the second cable groove 242 interposed therebetween are mutually located at the same distance from the virtual plane S2 described above.

The distance between the apexes the first protruding claws 428 and 448 which face each other with the first cable groove 241 interposed therebetween is larger than the distance between the apexes of the second protruding claws 429 and 449 which face each other with the second cable groove 242 interposed therebetween.

The protruding length of the lid-side first protruding claw 448 from the inner surface 441a of the lid body 441 is larger than the protruding length of the main-body-side first protruding claw 428 from the first groove bottom surface 421b of the grasping member main body 420.

Additionally, the protruding length of the lid-side second protruding claw 449 from the inner surface 441a of the lid body 441 is greater than the protruding length of the main-body-side second protruding claw 429 from the second groove bottom surface 421b of the grasping member main body 420.

In the outer coating grasping member 410 which holds and fix the first optical fiber cable 451 having the cross-sectional size of 2.0 mm×3.1 mm and holds and fix the second optical fiber cable 452 having the cross-sectional size of 1.6 mm×2.0 mm, a configuration can be adopted in which, for example, the groove depth H1 of the first cable groove 251 is 3.4±0.2 mm, the protruding length T28 of the main-body-side first protruding claw 428 with respect to the first groove bottom surface 421b is 0.3±0.1 mm, and the protruding length T48 of the lid-side first protruding claw 448 with respect to the lid inner surface 441a is 0.5±0.3 mm.

Furthermore, as the outer coating grasping member 410, a configuration can be adopted in which, for example, the groove depth H2 of the second cable groove 252 is 2.85±0.2 mm, the protruding length T29 of the main-body-side second protruding claw 429 with respect to the second groove bottom surface 421c is 0.4±0.1 mm, and the protruding length T49 of the lid-side second protruding claw 449 with respect to the lid inner surface 441a is 1.0±0.3 mm.

The lid 440 of the outer coating grasping member 410 can close the grasping member main body 420 that is in a state where the first optical fiber cable 451 or the second optical fiber cable 452 is fitted into the cable-fitting groove 424.

The outer coating grasping member 410 causes the first optical fiber cable 451 or the second optical fiber cable 452 to be fitted into the cable-fitting groove 424 of the grasping member main body 420 in a state where the lid 440 opens the grasping member main body 420, and can be incorporated into the optical fiber cable 450 by closing the lid 440 on the grasping member main body 420.

As the lid 440 closes the grasping member main body 420, the outer coating grasping member 410 forms the rectangular cylindrical body 412 which accommodates the first optical fiber cable 451 or the second optical fiber cable 452 therein.

As shown in FIGS. 22 to 24, the grasping member main body 420 includes difference 271 in level (stepped surface) between the first cable groove 241 and the second cable groove 242.

By causing the difference 271 in level to come into contact with the end face of the outer coating 455 of the first optical fiber cable 451 to be fitted into the first cable groove 241, it is utilized to position the first optical fiber cable 451 with respect to the grasping member main body 420 in the longitudinal direction of the grasping member main body 420.

As shown in FIGS. 22 to 24, the fiber accommodation groove 431 that extends from the forward end of the second cable groove 242 of the grasping member main body 420 to the leading end (forward end) of the front-side fiber support portion 430 is formed in the outer coating grasping member 410.

The fiber support portion 430 is formed a rod shape having the size in the horizontal direction smaller than the grasping member main body 420.

The optical fiber 453 that protrudes from the front end of the outer coating 455 of the optical fiber cable 450 that is fitted into the cable-fitting groove 424 of the grasping member main body 420 is to be accommodated in the fiber accommodation groove 431.

As shown in FIGS. 22 and 23, the fiber accommodation groove 431 is formed so as to be narrower in width than that of the second cable groove 242 of the grasping member main body 420.

As shown in FIGS. 22 to 24, the grasping member main body 420 includes difference 272 in level (stepped surface) between the fiber accommodation groove 431 and the second cable groove 242.

By causing the difference 272 in level to come into contact with the end face of the outer coating 455 of the second optical fiber cable 452 to be fitted into the second cable groove 242, it is utilized to position the second optical fiber cable 452 with respect to the grasping member main body 420 in the longitudinal direction of the grasping member main body 420.

As shown in FIGS. 22 to 24, the outer coating grasping member 410 includes the grasping member main body 420 in which the first cable groove 241 and the second cable groove 242 are formed.

Furthermore, the outer coating grasping member 410 includes the first protruding claws 428 and 448 and the second protruding claws 429 and 449 described above on the grasping member main body 420 and the lid 440.

For this reason, the outer coating grasping member 410 can suitably grasp and fix two kinds of optical fiber cables 451 and 452 having the cross-sectional sizes different from each other, and furthermore, it is possible to easily ensure a large cable-holding force with respect to the optical fiber cables 451 and 452.

The grasping member main body 420 of the outer coating grasping member 410 is configured so that the first cable groove 241 and the second cable groove 242 which have groove widths different from each other and the first grasping claws 425 and the second grasping claws 426 which have the distances between the opposed ridges different from each other are formed in accordance with two kinds of optical fiber cables 451 and 452 having the cross-sectional sizes different from each other.

The configuration of the grasping member main body 420 is advantageous to reduce resistance of the optical fiber cable 450 being pushed to the cable-fitting groove as compared with, for example, a conventional configuration disclosed in Patent Document 2 which pushes a cable into between both side wall portions of the grasping member outer coating.

The outer coating grasping member 410 can be used for machining of an optical fiber, for example, removal of the coating of the end portion of the optical fiber 453 (coated optical fiber) that is exposed to the terminal of an optical fiber cable into which the outer coating grasping member 410 is incorporated, or adjustment of the length thereof by cutting the bare optical fiber 453a that is exposed by removing of the coating.

Furthermore, for example, the outer coating grasping member 410 can be used for fixation of an optical fiber cable with respect to a housing of an optical connector having a grasping member locking portion that is to be engaged with the outer coating grasping member.

Third Embodiment

Hereinafter, a third embodiment of the invention will be described with reference to drawings.

In the third embodiment, identical reference numerals are used for the elements which are identical to those of the first embodiment and the second embodiment, and the explanations thereof are omitted or simplified here.

Figure 26:
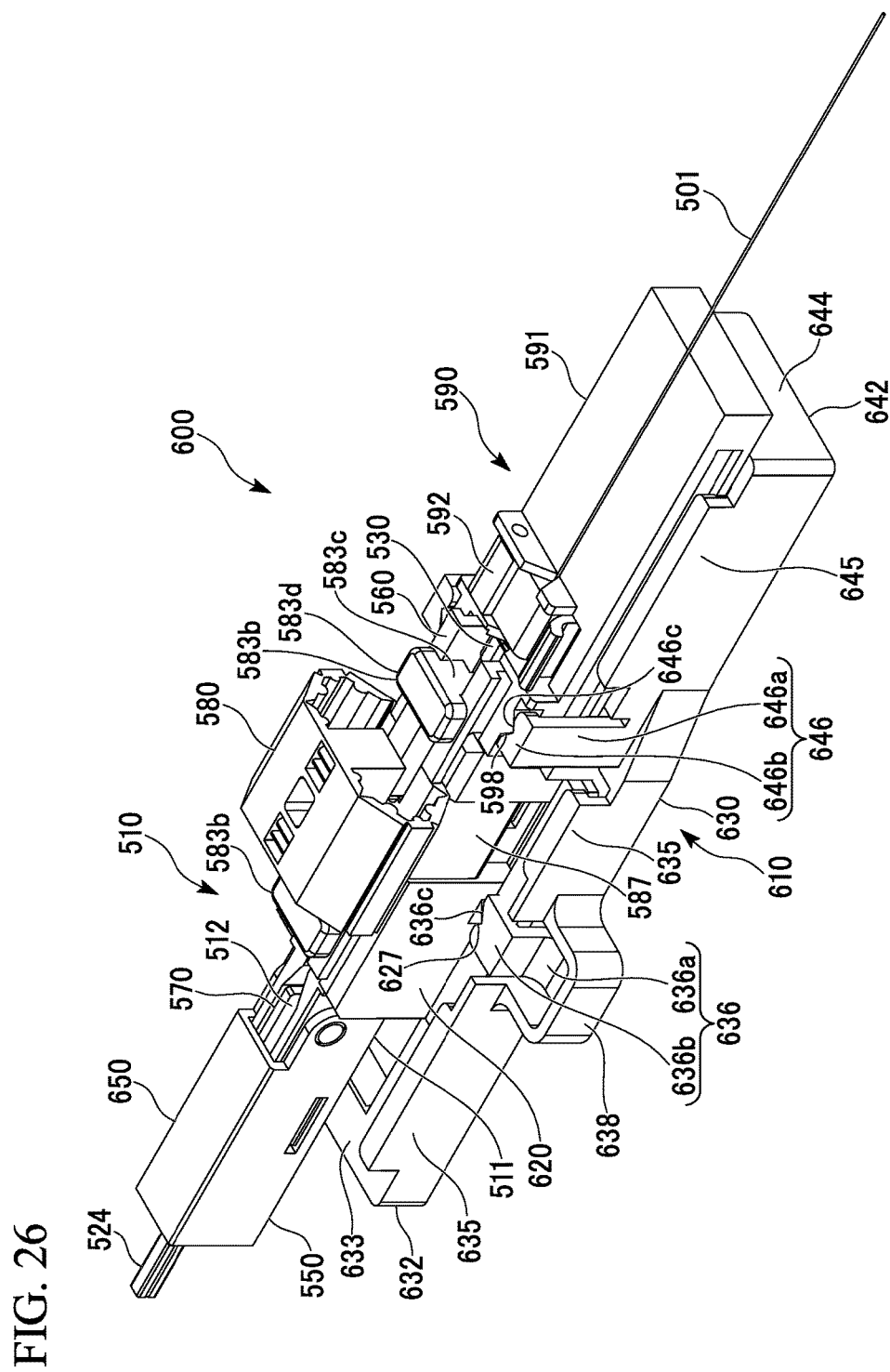
FIG. 26 is a perspective view showing an optical fiber splicing tool using a mechanical splicing tool according to a third embodiment of the invention.
Figure 27:
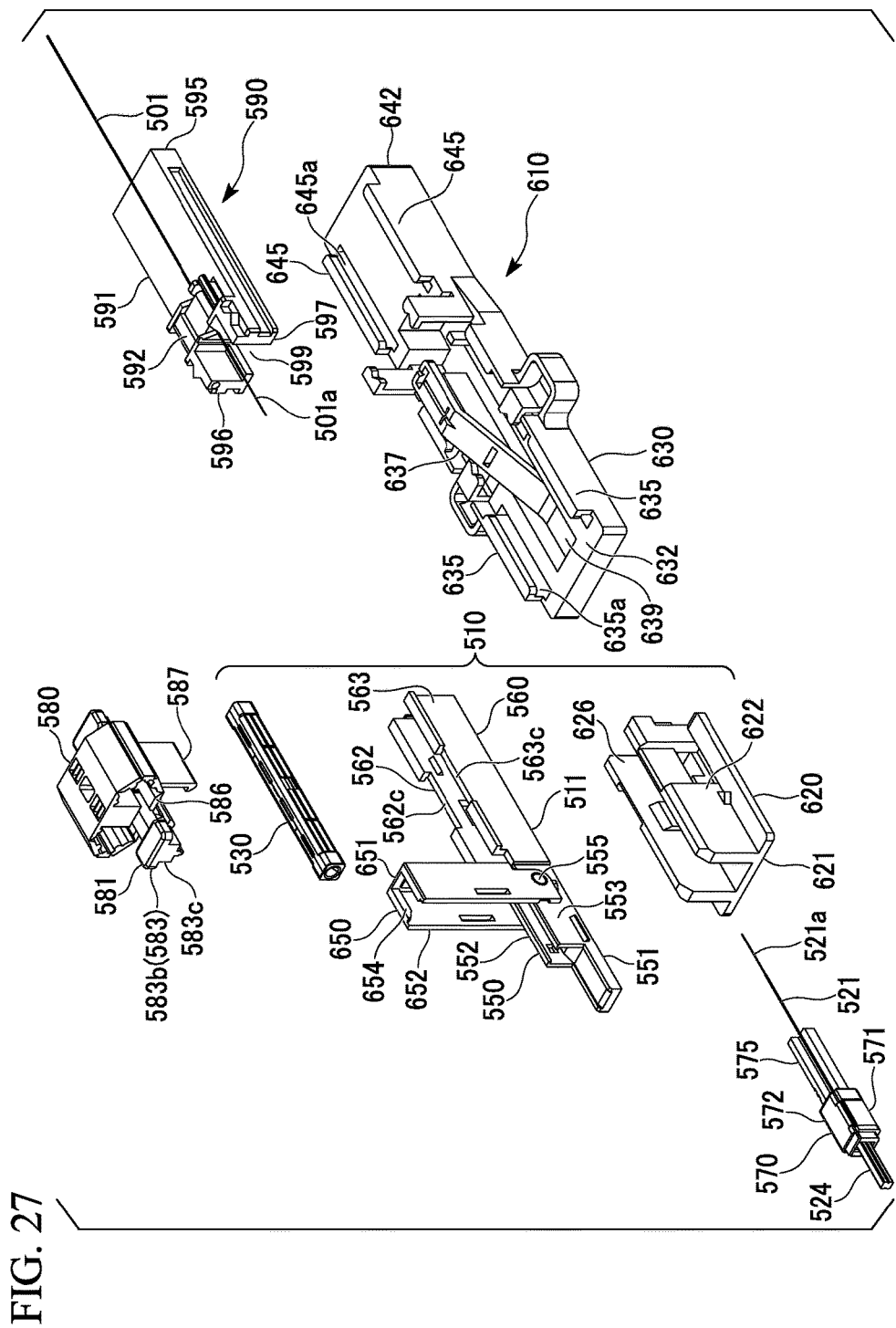
FIG. 27 is an exploded perspective view showing an optical fiber splicing tool according to the third embodiment of the invention.

As shown in FIGS. 26 and 27, an optical fiber splicing tool 600 includes: an optical fiber splicing unit 510 that is attached to a terminal 524a of an optical fiber cable 524; and a connecting jig 610 that holds a fiber holder 590 (optical fiber fixer) that grasps an inserted optical fiber 501 to be butt-jointed to an extended optical fiber 521 drawn from the terminal 524a.

The optical fiber splicing unit 510 includes: a mechanical splice 530 that causes the extended optical fiber 521 (first optical fiber) drawn from the terminal of the optical fiber cable 524 to be butt-jointed to the inserted optical fiber 501 (second optical fiber) and thereby grasps and fixes them; a cable grasping member 570 (optical fiber grasper) that grasps the optical fiber cable 524; a unit base 511 that holds them; and a slider 620 (guide target).

Regarding the optical fiber splicing unit 510, the direction of approaching the fiber holder 590 is referred to as front and the direction opposite thereto is referred to as rear.

In addition, the mechanical splice is simply referred to as "splice".

Figure 28:
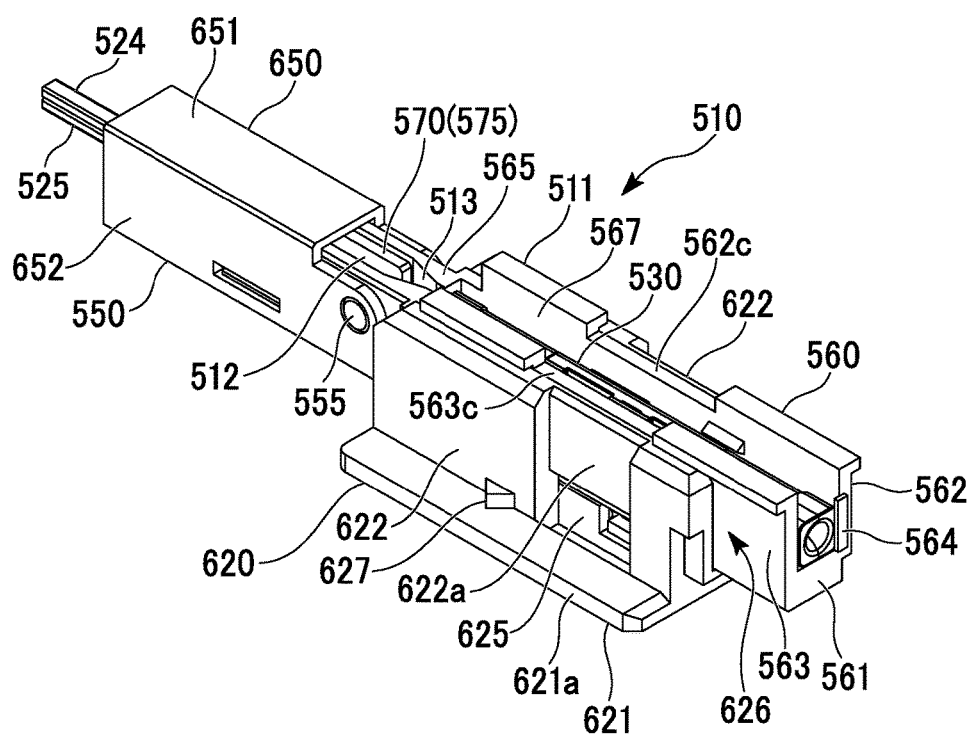
FIG. 28 is a perspective view showing an optical fiber splicing unit according to the third embodiment of the invention.

As shown in FIG. 28, the unit base 511 includes: a mechanical splice holder 560 (hereinbelow, referred to as a splice holder 560) that detachably holds the splice 530; and a grasping member holding portion 550 by which the cable grasping member 570 that detachably grasps the terminal 524a of the optical fiber cable 524 is held.

The splice holder 560 includes: a base body 561; a one-side-protruding wall portion 562 that is provided upright at one side edge of the base body 561; an another-side-protruding wall portion 563 that is provided upright at the other side edge of the base body 561; a front-side-protruding wall portion 564 that is provided at the forward end of the one-side-protruding wall portion 562; and a rear-side-protruding wall portion 565 that is provided at each of the back ends of the protruding wall portions 562 and 563.

The splice holder 560 accommodates the splice 530 in a splice storage space 567 that are ensured between the one-side-protruding wall portion 562 and the another-side-protruding wall portion 563, which are opposed to each other, and can and hold it.

Fitting recesses 562c and 563c into which an interposing member driving unit 582 (pressure-receiving wall 586) of a splicing tool 580 is fitted are formed on the upper edges of the protruding wall portions 562 and 563 and at the intermediate position in the longitudinal direction thereof.

The separation distance between the front-side-protruding wall portion 564 and the rear-side-protruding wall portion 565 is set depending on the length of the splice 530 in the longitudinal direction, and the displacement of the splice 530 with respect to the base body 561 in the front-back direction is restricted by the front-side-protruding wall portion 564 and the rear-side-protruding wall portion 565.

The splice holder 560 can removably hold the splice 530.

As shown in FIG. 27, the grasping member holding portion 550 includes: a base body 551; a one-side-protruding wall portion 552 that is provided upright one side edge of the base body 551; an another-side-protruding wall portion 553 that is provided upright at the other side edge of the base body 551; and a lever member 650 that positions the cable grasping member 570. The grasping member holding portion can hold the cable grasping member 570 on the base body 551.

The lever member 650 includes: a cover plate 651 with which the cable grasping member 570 held by the grasping member holding portion 550 is to be covered; side plates 652 provided at both the sides thereof; and a backward-movement restriction end 654.

Figure 31:
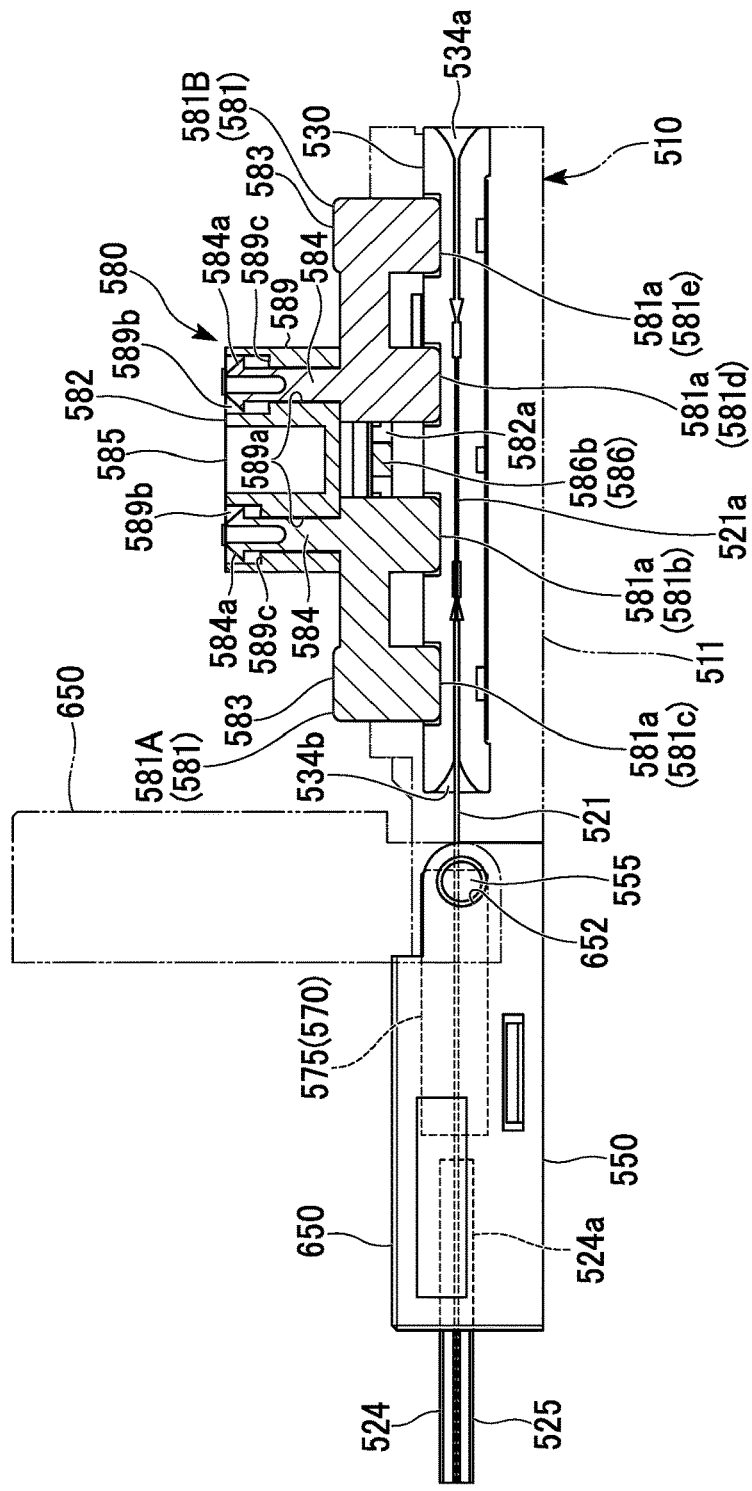
FIG. 31 is a cross-sectional view as seen from side, partially showing a state in which an interposing member according to the third embodiment of the invention is inserted between the elements of a mechanical splice.

The lever member 650 rotates around a rotation shaft 555 of both side portions of the grasping member holding portion 550 and thereby can switch between a regulated position at which the cable grasping member 570 is held and the backward movement thereof is restricted (position indicated by a solid line shown in FIG. 31) and a standby position at which the backward movement of the cable grasping member 570 is not restricted (position indicated by a chain double-dashed line shown in FIG. 31).

At the regulated position, the lever member 650 can restrict the backward movement of the cable grasping member 570 with respect to the unit base 511 as a result of disposing the backward-movement restriction end 654 at the back side of the cable grasping member 570.

As shown in FIG. 28, an optical fiber guiding portion 513 that guides the front end of the extended optical fiber 521 in a direction to a tapered-opening portion 534b of the splice 530 (refer to FIG. 35) is provided between the grasping member holding portion 550 and the splice holder 560 where the extended optical fiber protrudes from a front-side protrusion portion 575 of the cable grasping member 570.

The optical fiber guiding portion 513 has an inner surface inclined toward the center portion of the tapered-opening portion 534b and can guide the front end of the extended optical fiber 521 into the tapered-opening portion 534b of the splice 530 when inserts the cable grasping member 570 into the grasping member holding portion 550.

A flexible space 512 in which the extended optical fiber 521 can flexibly deform is ensured inside the unit base 511 and between the splice 530 and a grasping base 571 of the cable grasping member 570.

Figure 33:
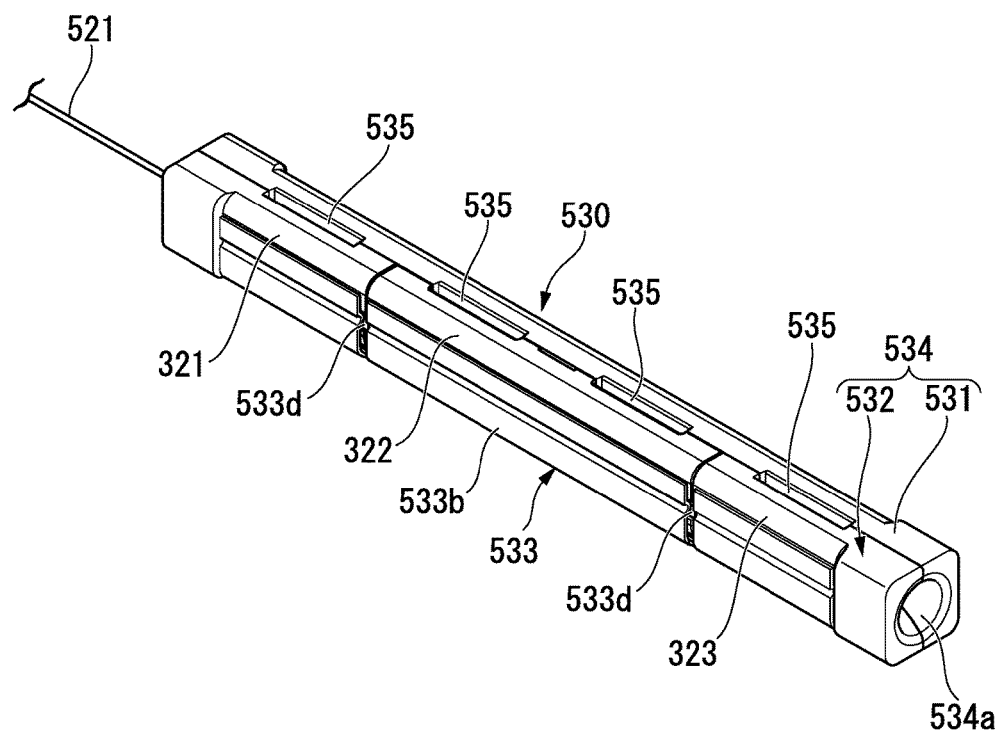
FIG. 33 is a perspective view showing an example of the mechanical splice according to the third embodiment of the invention.
Figure 34:
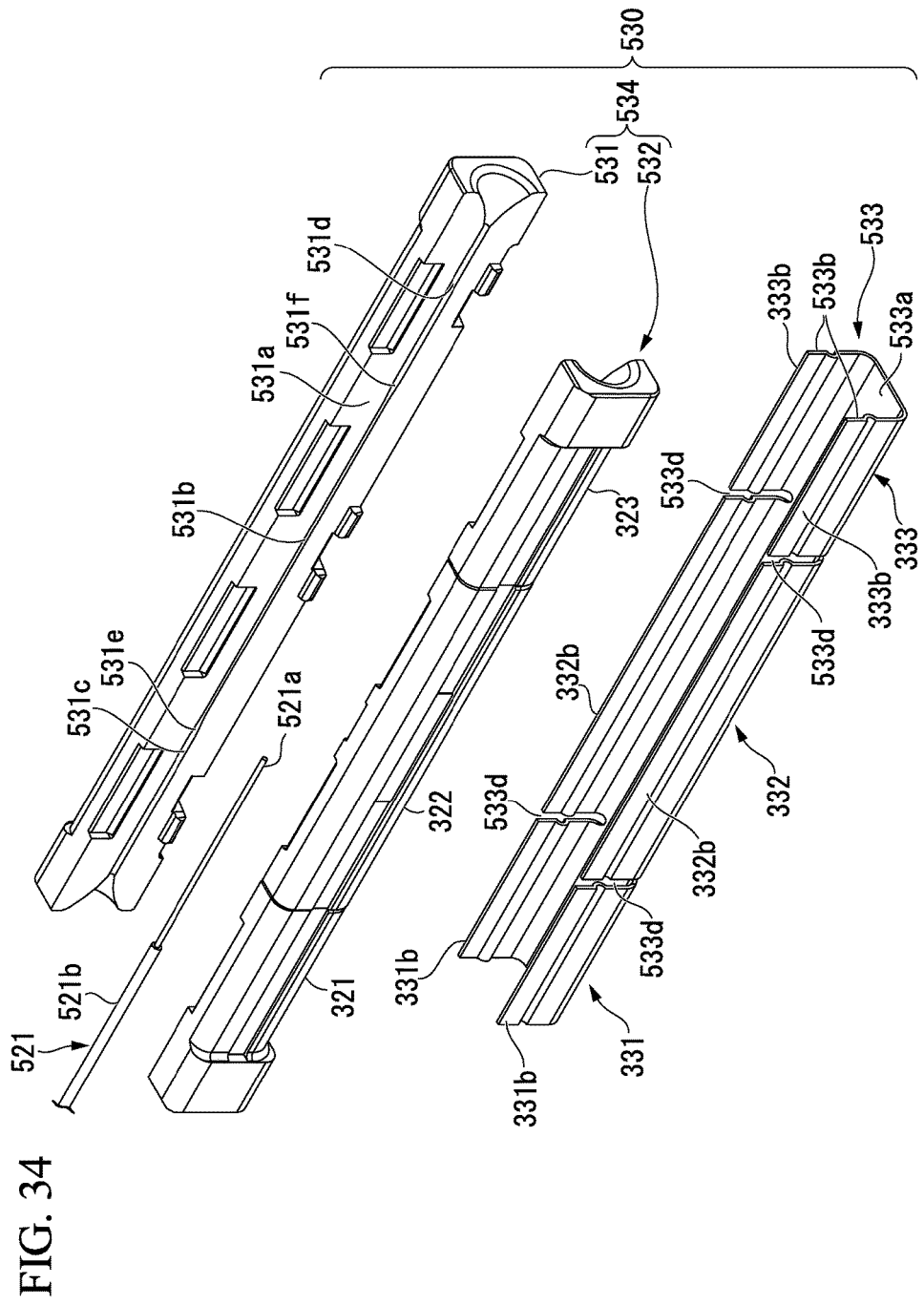
FIG. 34 is an exploded perspective view showing a structure of the mechanical splice according to the third embodiment of the invention.
Figure 35:
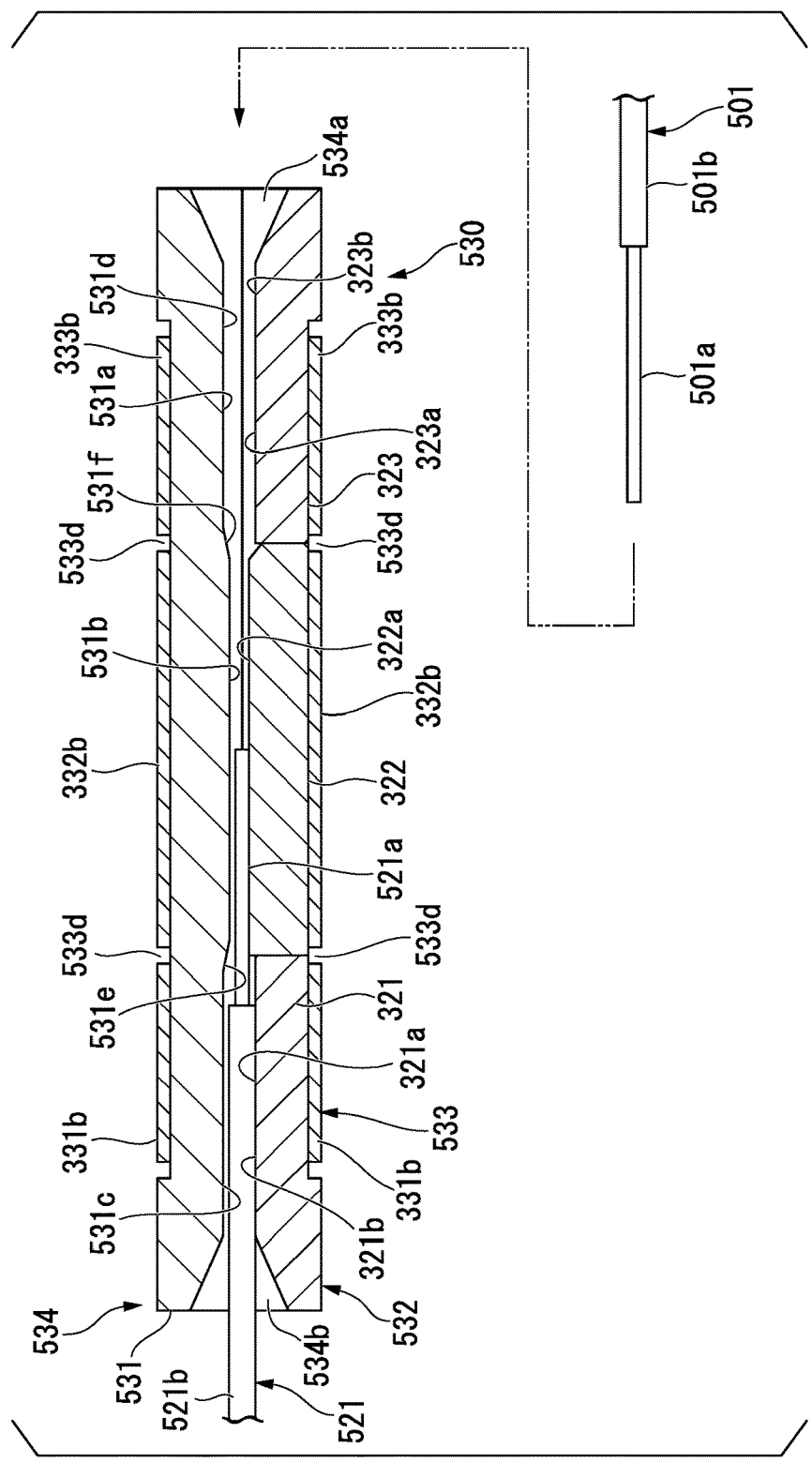
FIG. 35 is a cross-sectional view illustrating insert and grasping states of an optical fiber in the mechanical splice according to the third embodiment of the invention.

As shown in FIGS. 33 to 35, the splice 530 includes: an elongated-plate-shaped base member 531; a press lid 532 that is constituted of three lid members 321, 322, and 323 which are arrayed and placed along the longitudinal direction of the base member 531; and an elongated-shaped clamping spring 533 that elastically applies a force to them in a direction in which they connect to each other and are closed.

The base member 531 (base-side element) and the lid members 321, 322, and 323 (lid-side element) constitutes a halved grasping member 534.

The splice 530 will be described, particularly, the side thereof (the left side of FIG. 35) into which the extended optical fiber 521 is inserted is defined as back, and the opposite side thereof (the right side of FIG. 35) is defined as front in the longitudinal direction.

Of three lid members (lid side element) 321, 322, and 323 configuring the press lid 532 of the splice 530, a lid member that is located at the backmost position and represented as reference numeral 321 is also referred to as a rear lid member, and a lid member that is located at the foremost position and represented as reference numeral 323 is also referred to as a front lid member.

Additionally, a lid member that is located between the rear lid member 321 and the front lid member 323 and represented as reference numeral 322 is also referred to as a middle lid member.

As shown in FIGS. 34 and 35, an opposed face 531*a* facing the lid members 321, 322, and 323 is formed on the base member 531 of the splice 530 in the entire longitudinal direction thereof.

An alignment groove 531*b* that extends along the longitudinal direction of the base member 531 is formed on the center portion in the longitudinal direction of the opposed face 531*a* (in the extending direction thereof).

The alignment groove 531*b* positions a bare optical fiber 521*a* exposed at the front end of the extended optical fiber 521 and a bare optical fiber 501*a* exposed at the front end of the inserted optical fiber 501 to each other with a high level of precision so that they can be butt jointed (optical splice), and the alignment groove aligns the centers thereof with each other.

The alignment groove 531*b* is, for example, a V-groove (a groove having a V-shape in cross section).

The alignment groove 531*b* is not limited to the V-groove, for example, a groove having a semicircular shape in cross section, a U-groove, (a groove having a U-shape in cross section), or the like may be adopted.

The alignment groove 531*b* is formed at the portion that faces the middle lid member 322 of the opposed face 531*a* of the base member 531.

Coated-portion insertion grooves 531*c* and 531*d*, each of which has a groove width wider than that of the alignment groove 531*b*, are formed at the portion that faces the rear lid member 321 of the opposed face 531*a* and at the portion that faces the front lid member 323.

The coated-portion insertion grooves 531*c* and 531*d* are formed at both sides of the alignment groove 531*b* in the longitudinal direction of the base member 531 so as to extend along the longitudinal direction of the base member 531.

Tapered grooves 531*e* and 531 *f*, which have a tapered shape and have a groove width that gradually becomes small in the direction from the coated-portion insertion grooves 531*c* and 531*d* to the alignment groove side 531*b*, are formed between the coated-portion insertion groove 531*c* and the alignment groove 531*b* and between the coated-portion insertion groove 531*d* and the alignment groove.

The coated-portion insertion grooves 531*c* and 531*d* are communicated with the alignment groove 531*b* through the tapered grooves 531*e* and 531*f*, respectively.

A coated-portion insertion groove 323*b*, into which the coated portion of the inserted optical fiber 501 is inserted, is formed at the position corresponding to the coated-portion insertion groove 531*d* of the base member 531 and at the opposed face 323*a* of the front lid member 323.

A coated-portion insertion groove 321*b*, into which the coated portion of the inserted optical fiber 501 is inserted, is formed at the position corresponding to the coated-portion insertion groove 531*c* of the base member 531 and at the opposed face 321*a* of the rear lid member 321.

A tapered-opening portion 534*a*, which is provided at each of the front lid member 323 and the base member 531 and which is formed of a recess having a tapered shape gradually becomes fine in the direction from the front-edge face thereof to the rear side, opens at the front end of the halved grasping member 534 of the splice 530.

The rear end (back end) of the tapered-opening portion 534*a* is communicated with the coated-portion insertion grooves 323*b* and 531*d*.

A tapered-opening portion 534*b*, which is provided at each of the rear lid member 321 and the base member 531 and which is formed of a recess having a tapered shape gradually becomes fine in the direction from the rear-edge face thereof to the front side, opens at the back end of the halved grasping member 534 of the splice 530.

The front end (back end) of the tapered-opening portion 534*b* is communicated with the coated-portion insertion grooves 321*b* and 531*c*.

As shown in FIG. 33, in the halved grasping member 534 of the splice 530, interposing member insertion holes 535, into which an interposing-end portion 581*a* of an interposing member 581 to be inserted, open at the side face (hereinbelow, may be referred to as an exposed side) which is exposed to a side opposite to the back plate part 533*a* of the clamp spring 533.

The interposing member insertion holes 535 are formed at four portions in total, at two positions corresponding to a back-end portion and a forward-end portion of the middle lid member 322 and at positions corresponding to the centers of the rear lid member 321 and the front lid member 323 in the longitudinal direction of the base member 531.

As shown in FIGS. 33 to 35, the clamp spring 533 is formed of a single metal plate by shaping and is configured so that side plate parts 533*b* are provided at the entire longitudinal area of the elongated plate-shaped back plate part 533*a* in the longitudinal direction so as to protrude from both sides of the back plate part 533*a* and so as to be perpendicular to the back plate part 533*a*.

In the splice 530, opposed faces 531*a*, 321*a*, 322*a*, and 323*a*, at which the base member 531 faces the three lid members 321, 322, and 323, are sandwiched between the paired side plate parts 533*b* in the direction substantially perpendicular to the direction in which a pair of the side plate parts 533*b* of the clamp spring 533 makes a space.

One of the side plate parts 533*b* comes into contact with the base member 531, and the other of the side plate parts 533*b* comes into contact with the press lid 532.

The paired side plate parts 533*b* of the clamp spring 533 are separated into three parts corresponding to the three lid members 321, 322, and 323 of the press lid 532 of the splice 530 by cut portions 533*d*.

The clamp spring 533 includes: a first clamp spring portion 331 holding the rear lid member 321 and the base member 531; a second clamp spring portion 332 holding the middle lid member 322 and the base member 531; and a third clamp spring portion 333 holding the front lid member 323 and the base member 531.

A pair of side plate portions of the first clamping spring portion 331 is represented as reference numeral 331*b*, a pair of side plate portions of the second clamping spring portion 332 is represented as reference numeral 332*b*, and a pair of side plate portions of the third clamping spring portion 333 is represented as reference numeral 333*b*.

As shown in FIG. 35, an end of the extended optical fiber 521 is inserted through one end of the elongated halved grasping member 534 of the splice 530 in the longitudinal direction to the center portion thereof in the longitudinal direction.

Hereinbelow, a portion of the extended optical fiber 521 which is between the base member 531 and the press lid 532 forming the halved grasping member 534 may be referred to as an insertion end.

Regarding the insertion end of the extended optical fiber 521, the front-end thereof, that is, the part of the bare optical fiber 521*a* is located between the base member 531 and the middle lid member 322, and the portion having a coating 521b is disposed between the base member 531 and the rear lid member 321.

As a result of inserting the other optical fiber 501 between the base member 531 and the middle lid member 322 through the front side of the splice 530, the front end of the optical fiber 501 (hereinbelow, may be referred to as an inserted optical fiber) can be butt-jointed to the front end of the extended optical fiber 521 (the front end of the insertion end).

Additionally, due to elastic action of the clamp spring 533, it is possible to grasp and fix the extended optical fiber 521 and the inserted optical fiber 501 that was brought into contact with the optical fiber 521 between halved elements of the splice 530, that is, between the base member 531 (base-side element) and the press lid 532 (lid side element).

As shown in FIGS. 34 and 35, the portion of the bare optical fiber 501a of the insertion end of the inserted optical fiber 501 which is exposed at the front end is disposed between the base member 531 and the middle lid member 322 and the portion (coated portion) thereof having a coating 1b is disposed between the base member 531 and the front lid member 323.

As shown in FIG. 27, the cable grasping member 570 includes: a grasping base 571 that has a cable-fitting groove (not shown in the figure) into which the optical fiber cable 524 is fitted; a press lid 572 that is pivotally provided to one of side wall portions of the cable-fitting groove of the grasping base 571; and the front-side protrusion portion 575 that protrudes from the grasping base 571.

The cable grasping member 570 is preferably an integral molding product made of plastic.

As a result of locking the press lid 572 to the grasping base 571 to be in a closed state, the cable grasping member 570 is attached to the terminal 524a of the optical fiber cable 524.

As shown in FIG. 28, the slider 620 includes a substrate 621 and a pair of side wall portions 622 that are provided upright on an upper surface thereof.

The slider 620 can hold the unit base 511 in a unit storage space 626 that is a space between the side wall portions 622.

Recess portions 622a are formed on outer surfaces of the side wall portions 622. Engagement walls 587 of the splicing tool 580 are fitted into the recess portions 622a, and the positions of the Engagement walls 587 in the front-back direction thereof are determined.

The locking protrusions 627 that are to be engaged with engagement recesses 636c of elastic locking ends 636 of the connecting jig 610 are formed on outer surfaces of the side wall portions 622 so as to protrude outward therefrom.

The shape of the locking protrusion 627 when seen in a plan view is preferably a tapered shape (for example, triangular shape) having the length in the back and forth direction where the length thereof increases in the direction from the protuberance edge to the base end side.

Hole portions 625 into which protruding claws 587a of the Engagement walls 587 are to be inserted are formed on the side wall portions 622.

Figure 36:
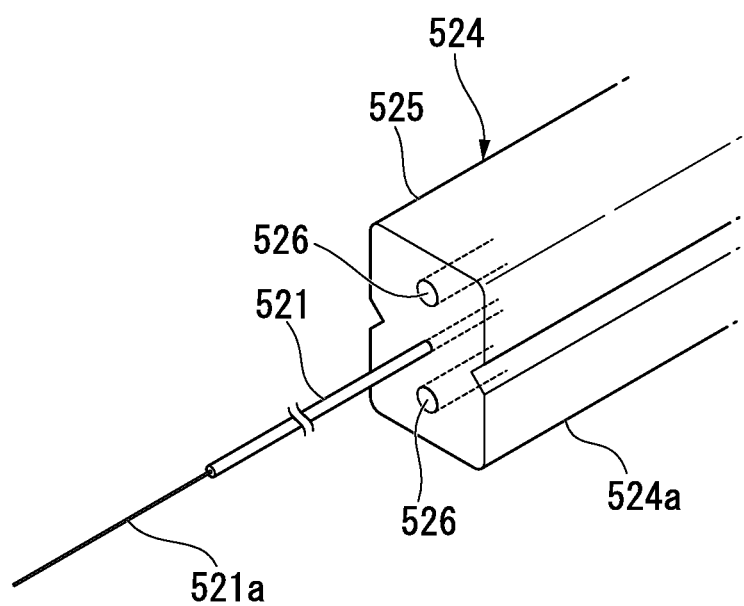
FIG. 36 is a flow sheet showing steps of assembling the optical fiber splicing tool according to the third embodiment of the invention.

As shown in FIG. 36, the optical fiber cable 524 is used as an optical drop cable, a light indoor cable, or the like, and is an optical fiber cable that has a substantially rectangular shape in cross section and has a structure in which, for example, the optical fiber 521 is integrally implanted in a resin-coating member 525 (may be referred to as an outer coating) with a pair of linear tensile strength bodies 526 that extends parallel to the optical fiber 521 in the longitudinal direction thereof.

The optical fiber 521 is disposed at the center portion in the cross-sectional face of the optical fiber cable 524, and the pair of tensile strength bodies 526 is located at the positions that are separated from the optical fiber 521 toward both sides of the optical fiber cable 524 in the longitudinal direction of the cross-sectional face.

The optical fiber 521 is a coated optical fiber such as an optical core fiber, a bare optical fiber, or the like.

The extended optical fiber 521 and the inserted optical fiber 501 are a coating-attached optical fiber such as an optical core fiber, a bare optical fiber, or the like.

In an example of the drawing, as the extended optical fiber 521 and the inserted optical fiber 501, a single core optical fiber is adopted.

A bare optical fiber 521a is exposed at the front end (fore end) of the insertion end of the extended optical fiber 521.

As a result of butt-jointing a bare optical fiber 501a exposed at the front end of the inserted optical fiber 501 to the bare optical fiber 521a located at the front end of the insertion end of the extended optical fiber 521, butt-jointing connection between the extended optical fiber 521 and the inserted optical fiber 501 in the splice 530 is realized.

As shown in FIGS. 26, 27, and 29 to 31, the splicing tool 580 can be attached to the splice 530.

The splicing tool 580 includes: the interposing member 581 that interposes the interposing-end portion 581a into between the base member 531 and the press lid 532 of the splice 530 and thereby maintains a state where they are pressed and opened; the ring-shaped interposing member driving unit 582 that is used to remove the interposing member 581; and the paired engagement walls 587 that protrude from the interposing member driving unit 582.

The splicing tool 580 is to be attached to the splice 530 so that the front-back direction of the splicing tool is aligned along the front-back direction of the splice.

In particular, the splicing tool 580 will be described such that the axis direction of the interposing member driving unit 582 is referred to as a front-back direction.

Figure 29:
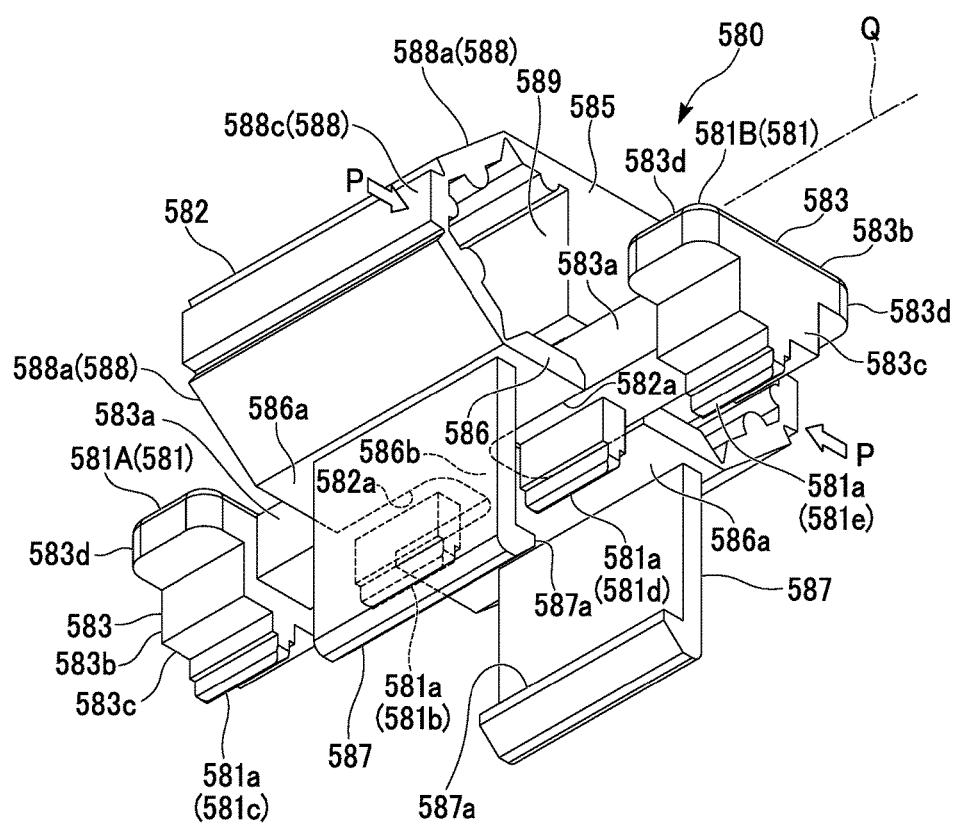
FIG. 29 is a perspective view showing the splicing tool according to the third embodiment of the invention.

As shown in FIGS. 29 and 31, the splicing tool 580 is provided with two interposing member 581.

One (also referred to as a first interposing member 581A) of the two interposing member 581 and the other (also referred to as a second interposing member 581B) are attached to the interposing member driving unit 582 in the axis line direction thereof (central axis line Q) so as to be separated from each other.

The interposing member 581 includes: trunks 584 that are supported by an interposing member support 589 provided on the interposing member driving unit 582; interposing-end supports 583, each of which extends from the trunk 584 in the center axis direction of the interposing member driving unit 582; and the interposing-end portions 581a that are provided at a plurality of portions on the interposing-end support 583 in the extending direction thereof so as to protrude therefrom.

The interposing member driving unit 582 includes: the pressure-receiving wall 586 that faces the splice 530; an opposed wall portion 585 that faces the pressure-receiving wall 586 via the inner space 582A; and drive-part side wall portions 588 that are located at both right and left sides and connect the pressure-receiving wall 586 and the opposed wall portion 585.

The pressure-receiving wall 586 is formed in a plate shape on which insertion holes 582a are formed. The interposing-end support 583 is to be inserted into the hole.

The size of the pressure-receiving wall 586 in the front-back direction thereof is determined so that the wall can be fitted into the fitting recesses 562c and 563c of the protruding wall portions 562 and 563.

The insertion holes 582a are formed on the pressure-receiving wall 586 in a slit shape, which extend in the direction of approaching each other from both ends thereof in the front-back direction along the front-back direction.

Therefore, the pressure-receiving wall 586 is formed in a shape that includes: two plate-shaped main walls 586a that are arranged in back and forth; and a connection portion 586b that connects them.

The opposed wall portion 585 is formed at the position that is opposed to the insertion holes 582a with the inside space 582A interposed therebetween.

Figure 30:
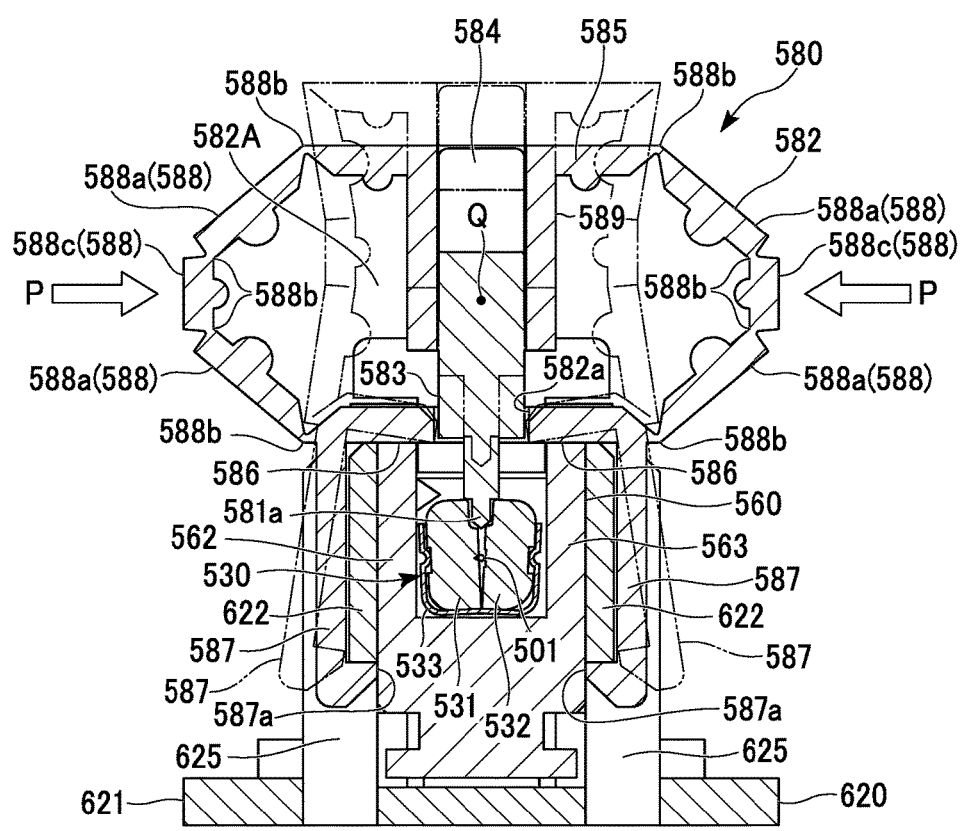
FIG. 30 is a cross-sectional front view showing the splicing tool according to the third embodiment of the invention.

As shown in FIG. 30, the drive-part side wall portion 588 is constituted of three plate parts 588a which are linked via thin portions 588b, and the center of the plate parts 588a is referred to as a pressing plate portion 588c.

As a result of applying a lateral pressure P to the right and left pressing plate portions 588c as indicated by the chain double-dashed line shown in FIG. 30 and thereby decreasing the separation distance between the pressing plate portions 588c, the plate parts 588a is displaced while the thin portion 588b serves as a hinge, the separation distance between the pressure-receiving wall 586 and the opposed wall portion 585 thereby increases.

As shown in FIG. 31, the interposing member support 589 is formed on a lower surface of the opposed wall portion 585 so as to protrude toward the pressure-receiving wall 586, and have through holes 589a that are formed therein and extend in this direction (vertical direction in FIG. 31).

An expanded recess portion 589b is formed inside the upper end of the through hole 589a.

The trunk 584 is attached to the interposing member driving unit 582 through the through hole 589a.

Engaging claws 584a are formed on the side surfaces of the end (extending end portion) of the trunk 584 so as to protrude outward therefrom.

The engaging claw 584a is engageable with a stepped surface 589c of the recess portion 589b in the through hole 589a.

A separation distance that is slightly longer than the length of the through hole 589a (vertical direction in FIG. 31) is ensured between the engaging claw 584a of the trunk 584 and the interposing-end support 583.

Consequently, the interposing member 581 is attached to the interposing member driving unit 582 while ensuring a slight movable range, with respect to the opposed wall portion 585, in the direction in which the through hole 589a is formed.

In other cases, the engaging claw 584a of the trunk 584 may be formed so that the separation distance with respect to the interposing-end support 583 is the same as the length of the through hole 589a of the opposed wall portion 585.

In the example shown in FIG. 31, the separation distances that are between the engaging claws 584a of the trunk 584 and the stepped surfaces 589c when the interposing-end support 583 of the interposing members 581A and 581B comes into contact with the protruding end of the interposing member support 589 are different from each other in the interposing member 581A and the interposing member 581B.

The separation distance between the engaging claw 584a of the trunk 584 and the stepped surface 589c in the interposing member 581A may be the same as that in the interposing member 581B.

As shown in FIGS. 29 and 31, the interposing-end support 583 extends from the lower end of the trunk 584 in the direction of the central axis line Q of the interposing member driving unit 582.

The interposing-end supports 583 of the two interposing member 581 extend in opposite directions.

In FIG. 31, the interposing-end support 583 of the interposing member 581A extends toward the left side and the interposing-end support 583 of the interposing member 581B extends toward the right side.

As shown in FIG. 29, the interposing-end support 583 includes: an arm 583a that extends from the lower end of the trunk 584 in the direction of the central axis line Q of the interposing member driving unit 582; and a head 583b that is provided at the extending end of the arm 583a.

The arm 583a is formed in a substantially rectangular pillar shape in cross section.

The arms 583a of the interposing members 581A and 581B extend backward from the back end and forward from the forward end of the interposing member driving unit 582, respectively.

It is preferable that the width size of the arm 583a be a width such that it can be inserted into between the protruding wall portions 562 and 563 of the unit base 511.

By means of this structure, since it is possible to locate the arm 583a between the protruding wall portions 562 and 563 when attachment of the splicing tool 580 is carried out, it is possible to insert the interposing-end portion 581a into the position close to the splice 530.

The head 583b includes: a body part 583c formed in a block shape; and a projected piece 583d that protrudes outward from both side faces of the upper portion thereof.

As shown in FIG. 26, it is preferable that the width size of the body part 583c be equal to or slightly smaller than a gap between the protruding wall portions 562 and 563 of the splice holder 560 of the unit base 511.

Because of this, it is possible to stably position the interposing member 581 to the optical fiber splicing unit 510 in the width direction by fitting the body part 583c into between the protruding wall portions 562 and 563 of the splice holder 560.

The interposing-end portion 581a is formed in a plate shape and is formed on the interposing member driving unit 582 so that the thickness direction thereof is directed perpendicular to the axis direction (front-back direction) of the interposing member driving unit 582.

The interposing-end portion 581a is formed in a tapered shape.

The interposing-end portion 581a can cause the front end thereof to be interposed between the base member 531 and the press lid 532 by pushing.

In the drawing shown as an example, the two interposing-end portions 581a are formed on the interposing-end support 583 at a distance in the front-back direction.

Particularly, one of the interposing-end portions 581a is formed on the arm 583a and the other of the interposing-end portions 581a is formed on the head 583b.

In other cases, the number of the interposing-end portions 581a to be formed on one interposing-end support 583 is not limited to 2 and may be greater than or equal to 3.

One (represented by reference numeral 581b) of the two interposing-end portions 581a of the first interposing member 581A is interposed between the back-end portion of the middle lid member 322 of the splice 530 and the base member 531, and the other thereof (represented by reference numeral 581c) is interposed between the rear lid member 321 and the base member 531.

One (represented by reference numeral 581*d*) of the two interposing-end portions 581*a* of the second interposing member 581B is interposed between the forward-end portion of the middle lid member 322 of the splice 530 and the base member 531, and the other thereof (represented by reference numeral 581*e*) is interposed between the front lid member 323 and the base member 531.

The splicing tool 580 causes the pressure-receiving wall 586 to come into contact with the halved grasping member 534 of the splice 530 and is attached to the splice 530.

As shown in FIG. 30, the splicing tool 580 presses both the side portions (drive-part side wall portions 588) of the interposing member driving unit 582 and can thereby cause them to come close to each other (refer to the lateral pressure P).

That is, as a result of applying a lateral pressure P to the right and left pressing plate portions 588*c* as indicated by the chain double-dashed line shown in FIG. 30 and thereby decreasing the separation distance between the pressing plate portions 588*c*, the plate parts 588*a* is displaced while the thin portion 588*b* serves as a hinge, the separation distance between the pressure-receiving wall 586 and the opposed wall portion 585 thereby increases.

In this way, the trunk 584 that is engaged with the stepped surface 589*c* shown in FIG. 31 moves upward, and it is possible to remove the interposing-end portions 581*a* from the splice 530.

The engagement walls 587 (holding wall portions) are formed to protrude from the side portions of the pressure-receiving wall 586, between which the insertion holes 582*a* are interposed, toward the outside of the interposing member driving unit 582.

The protruding claws 587*a* that protrude inward are formed on the protruding end portions of the Engagement walls 587.

The engagement walls 587 are to be disposed in the recess portions 622*a* of the slider 620 and can cause the protruding claws 587*a* to be engaged with the lower edges (inner edge of the hole portions 625) of the side wall portions 622

As shown in FIGS. 26 and 27, the connecting jig 610 is provided with a jig base 630 that includes: a first guide 632 that guides the optical fiber splicing unit 510; and a second guide 642 (fiber holder part) that holds the fiber holder 590.

The first guide 632 includes: a table 634 having a slide surface 633 formed thereon and causes the optical fiber splicing unit 510 to slidably move; and guide wall portions 635 that are provided on both the side ends thereof so as to protrude therefrom.

The paired guide wall portions 635 are formed so as to extend in the direction (front-back direction) in which the first guide 632 is formed; as both side edges 621*a* of the substrate 621 of the slider 620 mounted on the slide surface 633 come into contact with the guide wall portions, movement of the optical fiber splicing unit 510 in the width direction thereof can be restricted.

Grooves 635*a*, which restrict the optical fiber splicing unit 510 from being removed upward (restricts movement of the optical fiber splicing unit 510 in a direction away from the connecting jig 610), are formed on the lower inner surfaces of the guide wall portions 635.

The groove 635*a* is formed in the direction (front-back direction) in which the first guide 632 is formed. As both the side edge portions 621*a* of the substrate 621 are inserted into the grooves, it is possible to restrict the slider 620 from being removed upward.

As shown in FIG. 26, the paired elastic locking ends 636 that position the optical fiber splicing unit 510 on the first guide 632 are formed on the jig base 630.

The elastic locking ends 636 are configured to include: curved-plate portions 636*a* protruding toward the slide surface 633 from the projected portions 638 that are provided to protrude outward from both sides of the first guide 632 in the width direction thereof; plate-shaped engagement end portions 636*b* that are provided to protrude from the front ends of the curved-plate portions; and engagement recesses 636*c* which are formed at the engagement end portions and into which the locking protrusions 627 of the slider 620 are to be inserted.

The curved-plate portion 636*a* is formed in a circular arc plate shape that is curved along the axis line extending in the front-back direction of the first guide 632.

The protruding end of the curved-plate portion 636*a* is located upper than the slide surface 633.

The engagement end portion 636*b* is formed above the slide surface 633 so as to protrude inward from the protruding end of the curved-plate portion 636*a*.

The engagement recesses 636*c* of the engagement end portions 636*b* are formed in a cut-off shape and at a substantially center portion between the back and forth positions of the engagement end portions 636*b*, at which the protuberance edges of the engagement end portions 636*b* are depressed.

When the locking protrusion 627 of the slider 620 is inserted into the engagement recess 636*c* and the elastic locking end 636 is engaged with the locking protrusion 627, it is possible to restrict the movement of the slider 620 relative to the first guide 632 in the front-back direction thereof.

In this state, the elastic locking ends 636 sandwiches the slider 620 therebetween due to the elastic action of the curved-plate portions 636*a* and stably holds the slider 620.

The elastic locking ends 636 function as a locking mechanism that engages with the optical fiber splicing unit 510 (slider 620) that moves forward along the first guide 632 and thereby restricts the forward and backward movement thereof.

The second guide 642 includes: a table 644 having a slide surface 643 formed thereon and causes the fiber holder 590 to slidably move; and guide wall portions 645 that are provided on both the side ends thereof so as to protrude therefrom.

The paired guide wall portions 645 are formed so as to extend in the direction (front-back direction) in which the second guide 642 is formed; as both side edges of the fiber holder 590 mounted on the slide surface 643 come into contact with the guide wall portions, movement of the fiber holder 590 in the width direction thereof can be restricted.

A pair of elastic locking ends 646 that position the fiber holder 590 are formed on the jig base 630.

The elastic locking ends 646 are configured to include: protruding plates 646*a* that protrude from the jig base 630; plate-shaped engagement end portions 646*b* that are provided to protrude from the front ends of the protruding plates; and engagement recesses 646*c* which are formed at the engagement end portions and into which locking protrusions 598 of the fiber holder 590 are to be inserted.

The engagement end portion 646*b* is formed above the slide surface 643 so as to protrude inward from the protruding end of the protruding plate 646*a*.

The engagement recesses 646*c* of the engagement end portions 646*b* are formed in a cut-off shape and at a substantially center portion between the back and forth positions of the engagement end portions 646b, at which the protuberance edges of the engagement end portions 646b are depressed.

When the locking protrusion 598 of the fiber holder 590 is inserted into the engagement recess 646c and the elastic locking end 646 is engaged with the locking protrusion 598, it is possible to restrict the movement of the fiber holder 590 relative to the second guide 642 in the front-back direction thereof.

In this state, the elastic locking ends 646 sandwiches the fiber holder 590 therebetween due to the elastic action of the protruding plate 646a and stably holds the fiber holder 590.

The elastic locking ends 646 function as a locking mechanism that engages with the fiber holder 590 that moves forward along the second guide 642 and thereby restricts the forward and backward movement thereof.

Groove 639 which extends in the direction (front-back direction) in which the first guide 632 is formed is formed on the slide surface 633 of the first guide 632.

An elastic protrusion 637 that protrudes upward from the slide surface 633 is formed on the bottom portion of the groove 639.

The elastic protrusion 637 can elastically bend and deform at a base part; therefore, when the optical fiber splicing unit 510 moves forward on the slide surface 633, since the elastic protrusion is pressed downward by the optical fiber splicing unit 510 and is accommodated in the groove 639, and it does not interfere with the forward movement of the optical fiber splicing unit 510.

As shown in FIG. 27, an optical fiber holder 590 includes: a base 591; and a lid 592 that is rotatably coupled to the base 591, presses the inserted optical fiber 501 provided on the base 591 onto the base 591 by the lid 592, and can grasp and fix the optical fiber.

Regarding the fiber holder 590, the direction of approaching the optical fiber splicing unit 510 may be referred to as forward and the opposite direction thereof may be referred to as backward.

The base 591 includes: a base body 595; a one-side-extending wall portion 596 that extends forward from one side portion of the front-edge face thereof; and an another-side-extending wall portion 597 that extends forward from the other side portion of the front-edge face of the base body 595.

The forward-end portion of the optical fiber splicing unit 510 can be accommodated in the unit accommodation space 599 ensured between the one-side-extended portion 596 and the other-side-extended portion 597.

A positioning groove 591a is formed on the upper surface of the base 591 (base body 595).

The positioning groove 591a is a groove used to fix the position of the inserted optical fiber 501 and may be formed in, for example, in a substantially V-shape in cross section, in a substantially U-shape in cross section, a semicircular shape in cross section, or the like.

The locking protrusions 598 which are to be engaged with the engagement recesses 646c of the elastic locking ends 646 are formed on the outer-side faces of the one-side-extended portion 596 and the other-side-extended portion 597 so as to protrude toward the outside.

The shape of the locking protrusion 598 when seen in a plan view is preferably a tapered shape (for example, triangular shape) having the length in the back and forth direction where the length thereof increases in the direction from the protuberance edge to the base end side.

As shown in FIGS. 37A to 37E, a first flexure width L1 is formed between the back end of the splice 530 and the cable grasping member 570.

The flexure width means the length of the optical fiber at which there is a possibility that flexural deformation occurs when butt-jointing is carried out.

As described hereinbelow, when the optical fibers 501 and 521 are butt-jointed to each other in the splice 530, a predetermined flexure width (the second flexure width L2) is ensured between the front-end side of the splice 530 and the fiber holder 590.

In the case where the second flexure width L2 is shorter than the first flexure width L1, it is possible that, in the first flexure width L1, flexural deformation 521c occurs relatively easier than that in the second flexure width L2.

Next, a method of splicing the extended optical fiber 521 to the inserted optical fiber 501 using the optical fiber splicing tool 600 (optical splice) will be described.

As shown in FIG. 30, in advance, the interposing-end portions 581a is interposed in the grasping member 534 of the splice 530 by attaching the splicing tool 580 to the optical fiber splicing unit 510, and the splice 530 is in a state where the inserted optical fibers 501 and 521 freely move in the insertion and removal direction.

As shown in FIG. 26, in the case of attaching the splicing tool 580 to the optical fiber splicing unit 510, as a result of fitting the body part 583c of the interposing-end support 583 between the protruding wall portions 562 and 563 of the splice holder 560, movement of the interposing member 581 in the width direction is restricted.

For this reason, it is possible to stably position the interposing member 581 to the optical fiber splicing unit 510.

Furthermore, as a result of fitting the interposing member driving unit 582 (pressure-receiving wall 586) into the fitting recesses 562c and 563c of the protruding wall portions 562 and 563, movement of the splicing tool 580 with respect to the unit base 511 in the front-back direction thereof is restricted, and the position thereof is fixed.

Moreover, as a result of disposing the engagement walls 587 in the recess portions 622a of the slider 620 and causing the protruding claws 587a to be engaged with the lower edges of the side wall portions 622 (inner edge of the hole portion 625), the splicing tool 580 is in a state of holding the unit base 511 and the slider 620 and causes the relative movement thereof to be restricted.

As stated above, the splicing tool 580 fits the body part 583c of the interposing-end support 583 into the splice holder 560, causes the interposing member driving unit 582 (pressure-receiving wall 586) to be fitted into the fitting recesses 562c and 563c of the protruding wall portions 562 and 563, arranges the engagement walls 587 in the recess portions 622a of the slider 620, and can stably fix the positions thereof in the width direction and the front-back direction.

As shown in FIG. 26, the inserted optical fiber 501 is disposed in the positioning groove 591a of the base 591, is pressed onto the base 591 by the lid 592, and is thereby held and fixed.

The inserted optical fiber 501 is fixed to the fiber holder 590 while ensuring a predetermined forward protruding length.

In the case where flexure is not produced in the inserted optical fiber 501, the protruding length of the inserted optical fiber 501 from the fiber holder 590 is determined such that the bare optical fibers 501a and 521a are brought into contact with each other at the optimal position in the splice 530.

For example, when the positions of the optical fiber splicing unit 510 and the fiber holder 590 are fixed by the elastic locking ends 636 and 646, the protruding length can be the length at which the front end of the bare optical fiber 501a reaches the center position of the splice 530.

The fiber holder 590 is mounted on the slide surface 643 of a second rail portion 642 and causes the locking protrusions 598 to be engaged with of the engagement recesses 646c of the elastic locking ends 646.

Accordingly, the fiber holder 590 is sandwiched between the elastic locking ends 646 in a state of being stably held and positioned on the slide surface 643.

Next, as shown in FIGS. 27 and 28, as a result of causing the cable grasping member 570 grasping the optical fiber cable 524 to be mounted on the grasping member holding portion 550 and to move forward on the base body 551, the extended optical fiber 521 is inserted into one end side of the splice 530.

When the optical fiber splicing unit 510 is located at the forward-movement limit position (described below), the protruding length of the extended optical fiber 521 from the forward end of the cable-fitting groove 571a of the grasping base 571 is slightly longer than the distance up to the bare optical fiber 521a of the extended optical fiber 521 in the splice 530.

By rotating the lever member 650, the backward movement of the cable grasping member 570 is restricted.

Figure 37A:
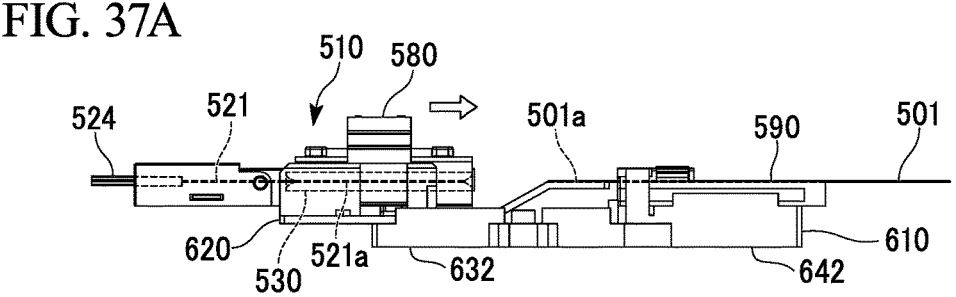
FIG. 37A is a flow sheet showing steps of assembling the optical fiber splicing tool according to the third embodiment of the invention.

As shown in FIG. 37A, the optical fiber splicing unit 510 is mounted on the slide surface 633 of the first guide 632 of the connecting jig 610.

Movement of the optical fiber splicing unit 510 in the width direction thereof is restricted by the guide wall portion 635.

Subsequently, the optical fiber splicing unit 510 moves forward in the direction toward the fiber holder 590.

In the movement of the optical fiber splicing unit 510, since both the side edge portions 621a of the substrate 621 are inserted into the grooves 635a of the inner surfaces of the side wall portions 635 and the slider 620 is thereby restricted from being removed upward, it is possible to position the inserted optical fiber 501 with precision.

Figure 37B:
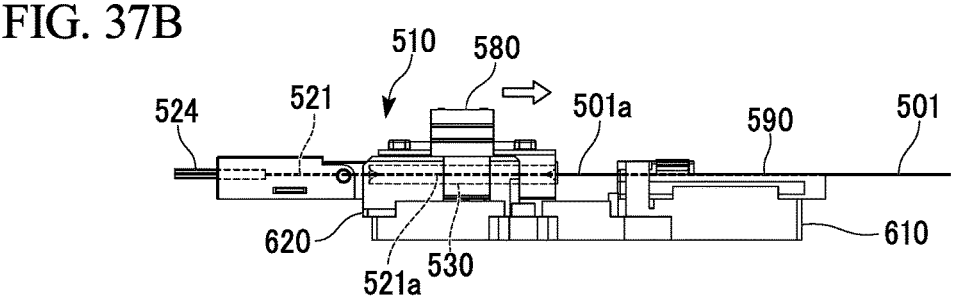
FIG. 37B is a flow sheet showing steps of assembling the optical fiber splicing tool according to the third embodiment of the invention.

As shown in FIG. 37B, due to the forward movement of the optical fiber splicing unit 510, the inserted optical fiber 501 is inserted into the coated-portion insertion grooves 531d and 323b of the splice 530 in the splice holder 560.

Figure 37C:
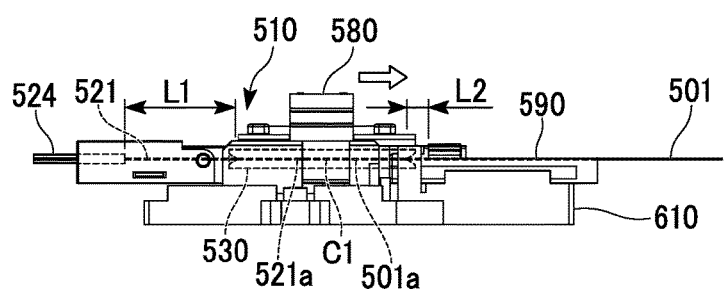
FIG. 37C is a flow sheet showing steps of assembling the optical fiber splicing tool according to the third embodiment of the invention.

As shown in FIG. 37C, as the optical fiber splicing unit 510 further moves forward, the bare optical fiber 501a of the inserted optical fiber 501 is inserted into the alignment groove 531b and is butt-jointed to contact with the front end of the bare optical fiber 521a of the extended optical fiber 521.

Reference sign C1 represents the butt-jointing position.

Figure 37D:
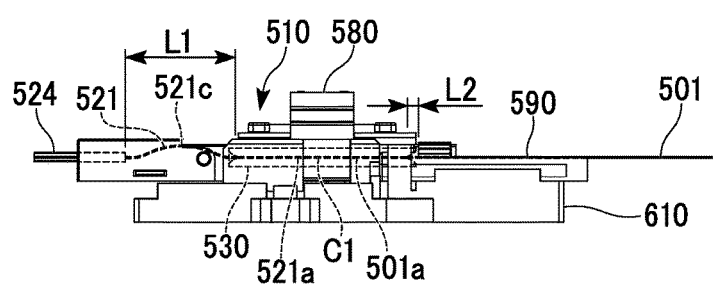
FIG. 37D is a flow sheet showing steps of assembling the optical fiber splicing tool according to the third embodiment of the invention.

As shown in FIG. 37D, the optical fiber splicing unit 510 further moves forward, the locking protrusions 627 are engaged with the engagement recesses 636c of the elastic locking ends 636.

Because of this, the optical fiber splicing unit 510 is sandwiched between the elastic locking ends 636 in a state of being stably held and positioned on the slide surface 633.

The position of the optical fiber splicing unit 510 is referred to as a forward-movement limit position.

The forward-end portion of the optical fiber splicing unit 510 is accommodated in the unit accommodation space 599 ensured between the one-side-extended portion 596 and the other-side-extended portion 597 of the fiber holder 590.

The second flexure width L2 shorter than the first flexure width L1 is ensured between the front-end side of the splice 530 and the fiber holder 590 in the process until the optical fiber splicing unit 510 further moves forward and reaches the forward-movement limit position (refer to FIG. 37D) after the optical fibers 501 and 521 are brought into contact with each other (refer to FIG. 37C).

Since the buckling stress of the extended optical fiber 521 having the relatively long first flexure width L1 is relatively low (however, in the case where the optical fibers 501 and 521 are the same kind of optical fiber), flexural deformation (buckling) is produced in the extended optical fiber 521 between the splice 530 and the cable grasping member 570 in advance.

The flexure once occurs in the extended optical fiber 521, thereafter, flexure does not occur in the inserted optical fiber 501 between the splice 530 and the fiber holder 590.

Figure 37E:
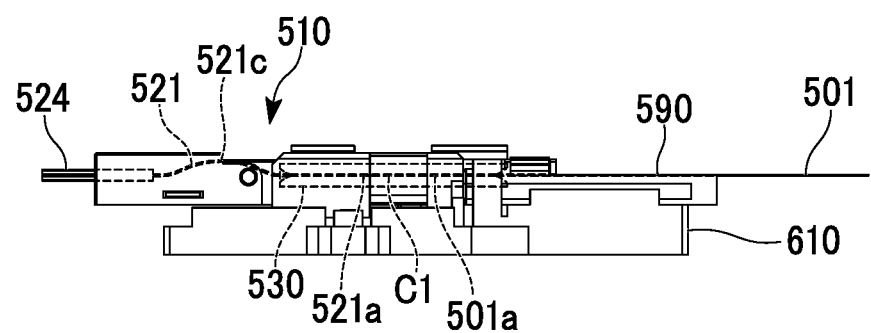
FIG. 37E is a flow sheet showing steps of assembling the optical fiber splicing tool according to the third embodiment of the invention.
Figure 38:
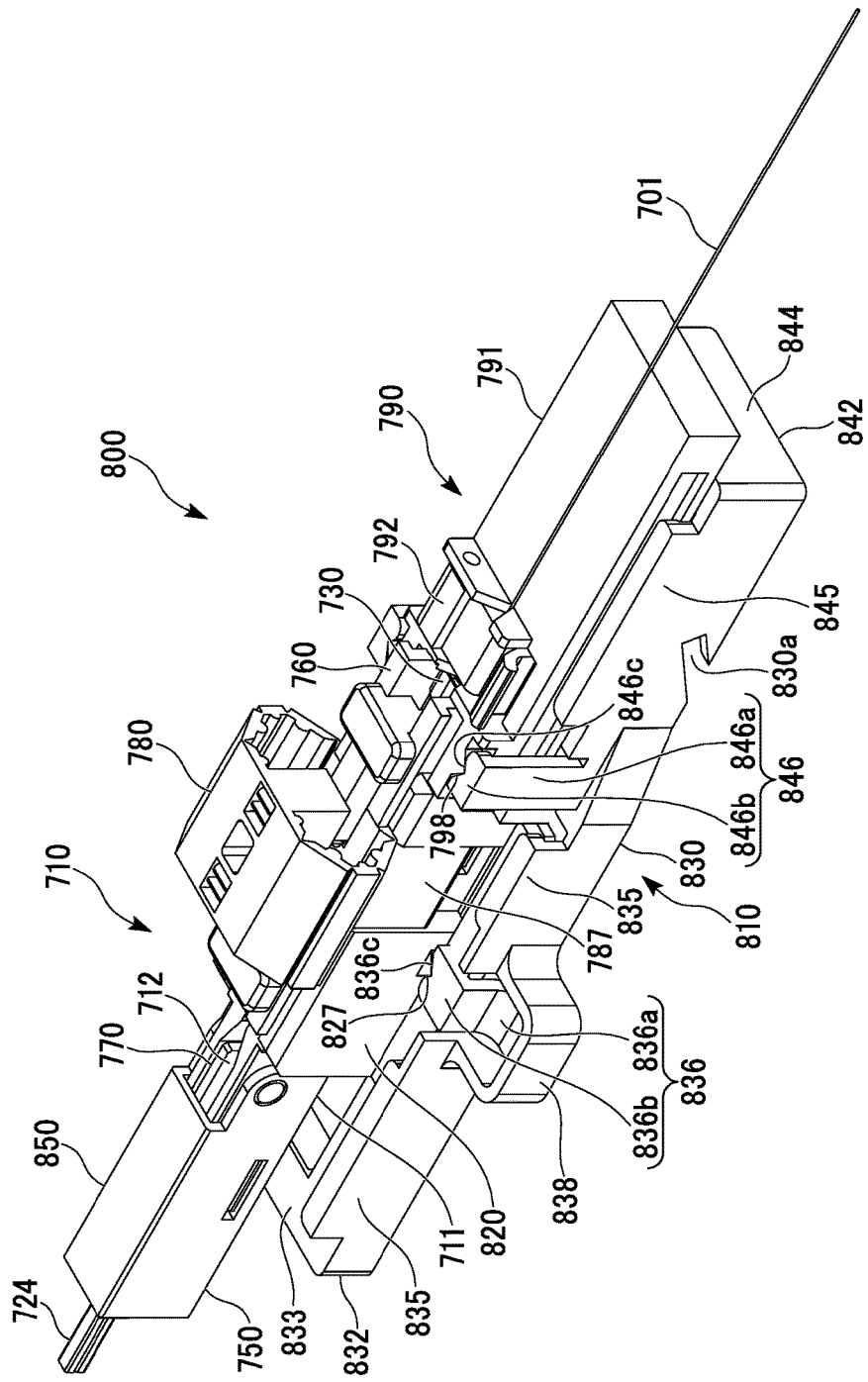
FIG. 38 is a perspective view showing an optical fiber splicing tool according to a fourth embodiment of the invention.
Figure 39:
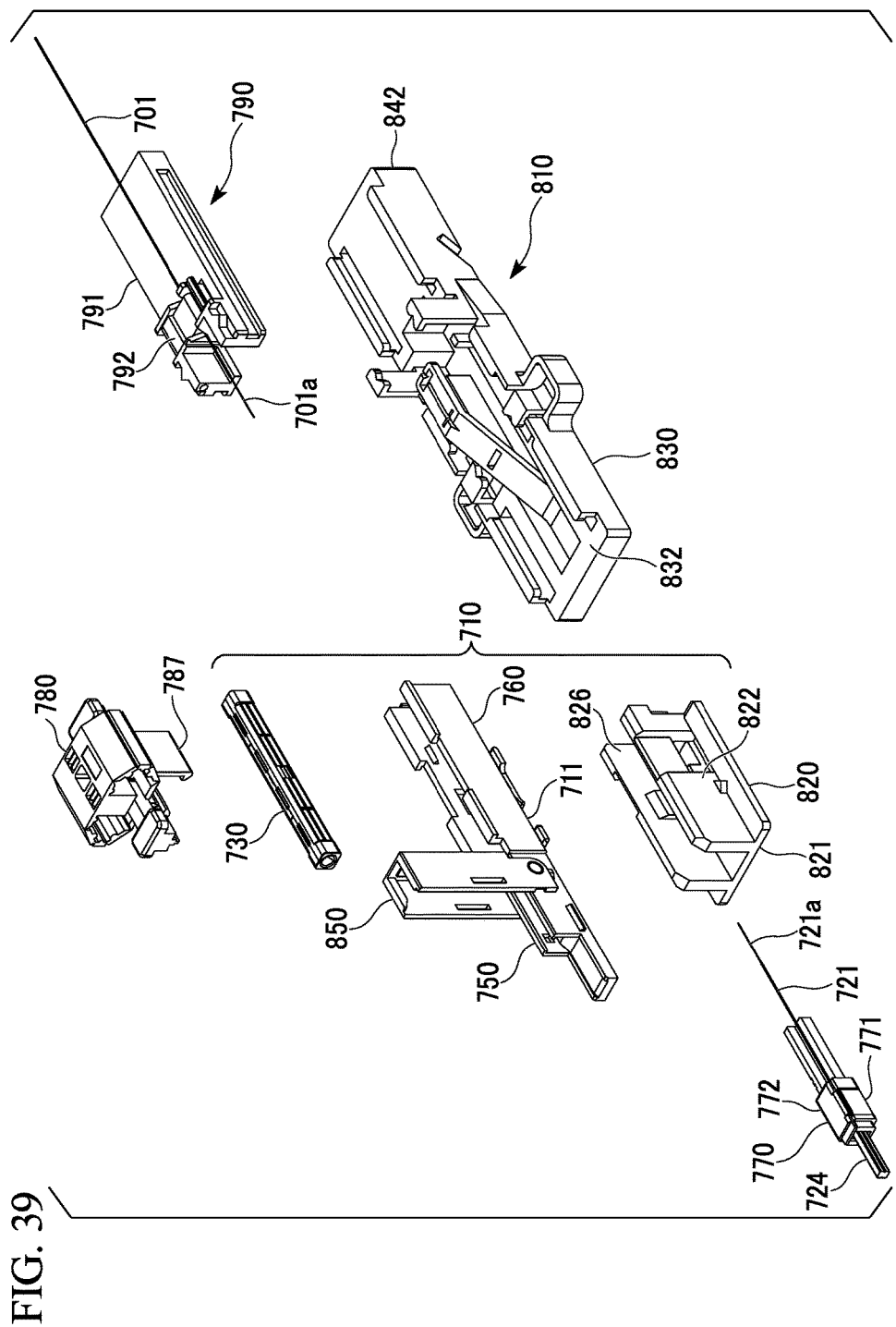
FIG. 39 is an exploded perspective view showing the optical fiber splicing tool according to the fourth embodiment of the invention.

Next, as shown in FIGS. 37E and 30, the separation distance between the pressing plate portions 588c decreases by applying a lateral pressure P to both sides of the interposing member driving unit 582 (the right and left pressing plate portions 588c) of the splicing tool 580, and the opposed wall portion 585 thereby moves upward.

As shown in FIG. 31, since the interposing member support 589 moves upward due to the upward movement of the opposed wall portion 585, the trunk 584 engaged with the stepped surface 589c is pushed up, and the interposing-end support 583 moves up.

Consequently, it is possible to remove the interposing-end portions 581a from the splice 530.

In the case where the two interposing members 581A and 581B simultaneously move up, it is possible to remove four interposing-end portions 581a from the splice 530 at substantially the same time.

As mentioned above, in the example shown in FIG. 31, the separation distances that are between the engaging claws 584a of the trunk 584 and the stepped surfaces 589c when the interposing-end support 583 is in contact with the protruding end of the interposing member support 589 are different from each other in the interposing member 581A and the interposing member 581B.

For this reason, time-difference removal can also be carried out such that removal of the interposing member 581A and removal of the interposing member 581B are not carried out the same time and are carried out at an interval.

For example, it is possible to carry out the removal of the first interposing member 581A before the removal of the second interposing member 581B.

In the case where the arms 583a of the interposing-end support 583 have sufficient rigidity, since the arms 583a moves upward while maintaining the orientation thereof, the two interposing-end portions 581a of each interposing member 581 simultaneously moves up.

Figure 32:
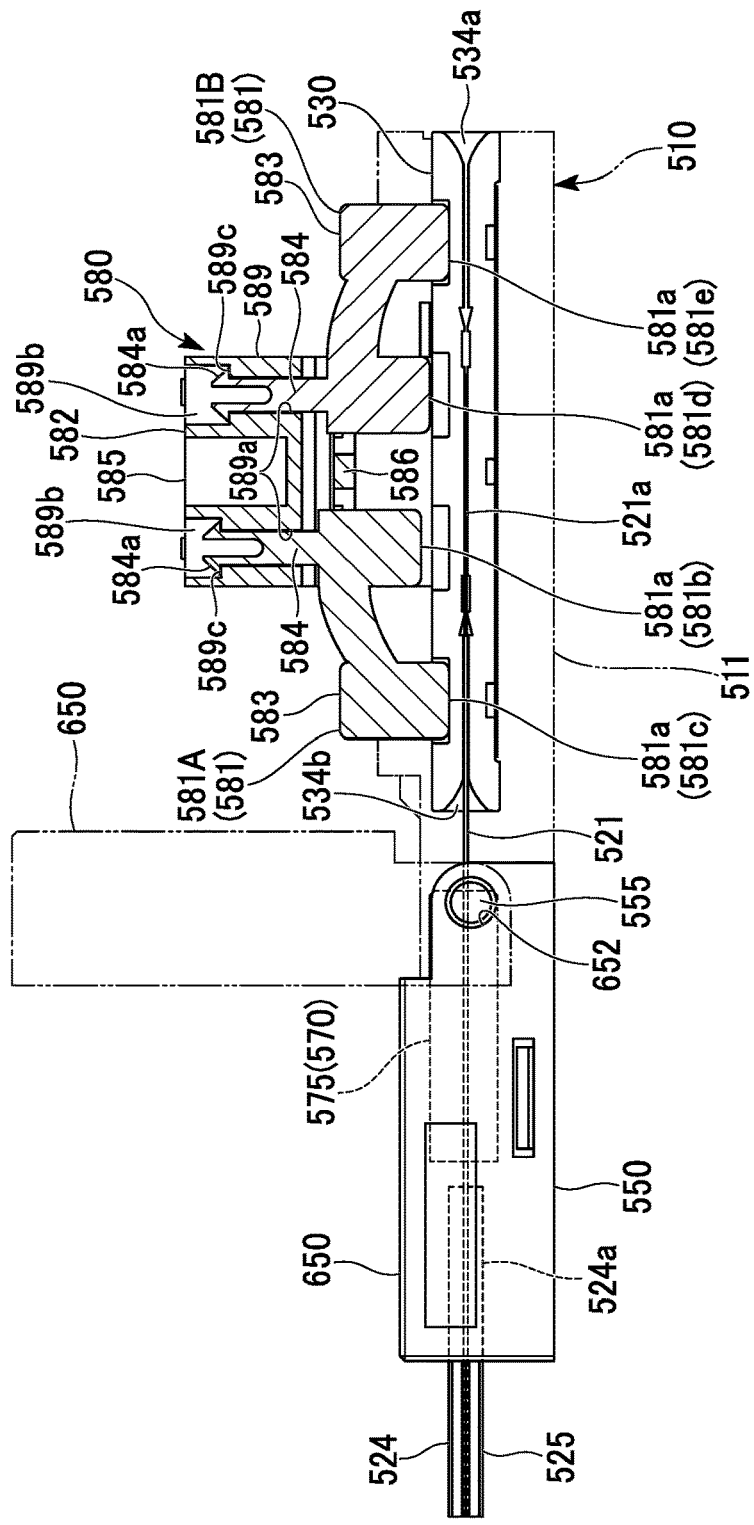
FIG. 32 is a cross-sectional view as seen from side, partially showing a state in which an interposing member according to the third embodiment of the invention is inserted between the elements of the mechanical splice.

On the other hand, as shown in FIG. 32, in the case where the arms 583a have rigidity to the extent that they slightly bends and can be deformed, if the trunk 584 moves upward by applying the lateral pressure P to both sides of the interposing member driving unit 582 and an upward force is thereby applied to the base part of the interposing-end support 583, the interposing-end portion 581a (interposing-end portion 581b) of the first interposing member 581A which is near the base end moves up in accordance with bending deformation of the arms 583a previous to movement of the interposing-end portion 581a (interposing-end portion 581c) which is near the extending end.

Furthermore, the interposing-end portion 581a (interposing-end portion 581d) of the second interposing member 581B which is near the base end moves up previous to movement of the interposing-end portion 581a (interposing-end portion 581e) which is near the extending end.

Accordingly, since it is possible to grasp in advance the portion (the center portion of the splice 530) including the position at which the optical fibers 501 and 521 (bare optical fibers 501a and 521a) are butt jointed and thereafter it is possible to grasp the optical fibers 501 and 521 which is near the end of the splice 530, it is possible to remove flexure of the optical fibers 501 and 521.

After the interposing-end portions 581a is removed from the splice 530, the halved grasping member 534 of the splice 530 holds and fixes the bare optical fibers 501a and 521a while maintaining a butt-jointed state due to elastic action of the clamping spring 533.

Therefore, the operation of butt-jointing (optical splicing) the extended optical fiber 521 to the inserted optical fiber 501 in the splice 530 is completed.

As a result of grasping and fixing the extended optical fiber 521 and the inserted optical fiber 501 by the halved grasping member 534 of the splice 530 after completion of the splicing operation, it is possible to stably maintain a state where the bare optical fibers 501a and 521a are butt-jointed to each other.

Most of the flexural deformation 521c of the extended optical fiber 521 is surrounded by the grasping member holding portion 550 of the unit base 511 and the lever member 650 and is protected from an external force.

The optical fiber splicing tool 600 that splices the extended optical fiber 521 and the inserted optical fiber 501 can be disposed and housed in an optical fiber splicing box (for example, a closure, an optical termination box, or the like).

Since the interposing-end portions 581a are provided to protrude from a plurality of positions in the extending direction of the interposing-end support 583 in the splicing tool 580, the interposing-end portions 581a can be easily removed from the splice 530 by applying a lateral pressure to the interposing member driving unit 582.

Since the interposing-end support 583 is formed so as to extend in the central axis direction of the interposing member driving unit 582, as a result of operating the interposing member driving unit 582, it is also possible to reliably operate the interposing-end portions 581a that are separated from the interposing member driving unit 582 in the extending direction thereof.

It is necessary to re-attach the splicing tool 580 that was removed one time to the optical fiber splicing unit 510 for, for example, replacement and connection or the like.

In this case, as shown in FIG. 26, as a result of fitting the body part 583c of the interposing-end support 583 between the protruding wall portions 562 and 563 of the splice holder 560 and fitting the interposing member driving unit 582 (pressure-receiving wall 586) into the fitting recesses 562c and 563c of the protruding wall portions 562 and 563, movement of the splicing tool 580 with respect to the unit base 511 in the front-back direction and the width direction thereof is restricted, and the position thereof is fixed.

Moreover, as a result of disposing the engagement walls 587 in the recess portions 622a of the slider 620 and causing the protruding claws 587a to be engaged with the lower edges of the side wall portions 622 (inner edge of the hole portion 625), the splicing tool 580 is in a state of holding the unit base 511 and the slider 620 and causes the relative movement thereof to be restricted.

As described above, it is possible to re-attach the splicing tool 580 to the unit base 511 by an easy operation.

Specific constitutions of a splice, an interposing member, and a fiber holder are not limited as long as they are applied to a technical concept of the invention.

The inserted optical fiber is not particularly limited and may be adopted to, for example, an optical fiber that is installed in a vertical hole (for example, a hoistway used for an elevator) provided at each floor of a construction including a plurality of floors, indoor optical fibers, optical fibers that are provided in an optical composite electronic device, or the like.

Fourth Embodiment

Hereinafter, an optical fiber splicing tool according to a fourth embodiment of the invention will be described.

In the fourth embodiment, identical reference numerals are used for the elements which are identical to those of the first embodiment, the second embodiment, and the third embodiment, and the explanations thereof are omitted or simplified here.

As shown in FIGS. 38 to 41, an optical fiber splicing tool 800 includes: an optical fiber splicing unit 710 that is attached to a terminal 724a of an optical fiber cable 724; a first fiber holder 790 (first optical fiber fixer) that grasps an inserted optical fiber 701 to be butt-jointed to an extended optical fiber 721 drawn from the terminal 724a; and a connecting jig 810 on which they are to be mounted.

Figure 40:
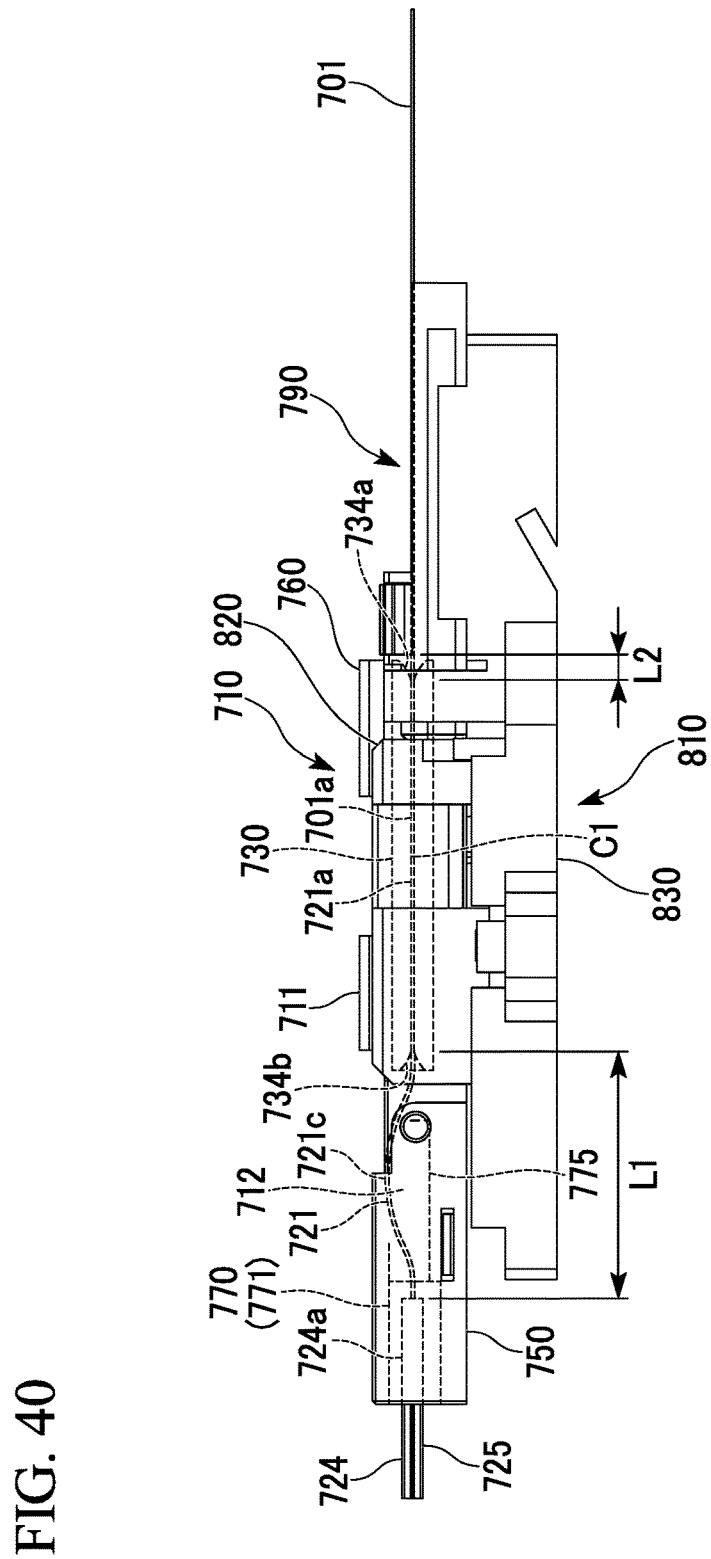
FIG. 40 is a side view showing the optical fiber splicing tool according to the fourth embodiment of the invention.

The vertical direction in the following explanation may be defined in accordance with the vertical direction shown in FIG. 40.

The optical fiber splicing unit 710 (first optical fiber splicing unit) includes: a mechanical splice 730 (first mechanical splice, splicing mechanism) that causes the extended optical fiber 721 (first optical fiber, one of optical fibers) drawn from the terminal of the optical fiber cable 724 to be butt-jointed to the inserted optical fiber 701 (second optical fiber, the other of the optical fibers) and thereby grasps and fixes them; a cable grasping member 770 (optical fiber grasper) that grasps the optical fiber cable 724; a unit base 711 that holds them; and a slider 820 (guide target).

Regarding the optical fiber splicing unit 710, the direction of approaching the fiber holder 790 (the right direction shown in FIG. 40) is referred to as front and the direction opposite thereto is referred to as rear.

In addition, the mechanical splice is simply referred to as "splice".

As shown in FIGS. 39, 42, 43, and 53, the unit base 711 includes: a mechanical splice holder 760 (hereinbelow, referred to as a splice holder 760) that detachably holds the splice 730; and a grasping member holding portion 750 by which the cable grasping member 770 that detachably grasps the terminal 724a of the optical fiber cable 724 is held.

The splice holder 760 includes: a base body 761; a one-side-protruding wall portion 762 that is provided upright at one side edge of the base body 761; an another-side-protruding wall portion 763 that is provided upright at the other side edge of the base body 761; a front-side-protruding wall portion 764 that is provided at the forward end of the one-side-protruding wall portion 762; and a rear-side-protruding wall portion 765 that is provided at each of the back ends of the protruding wall portions 762 and 763.

The splice holder 760 accommodates the splice 730 in a splice storage space 767 that are ensured between the one-side-protruding wall portion 762 and the another-side-protruding wall portion 763, which are opposed to each other, and can and hold it.

Fitting recesses 762c and 763c into which an interposing member driving unit 782 (pressure-receiving wall 786) of a splicing tool 780 is fitted are formed on the upper edges of the protruding wall portions 762 and 763 and at the intermediate position in the longitudinal direction thereof.

Figure 43:
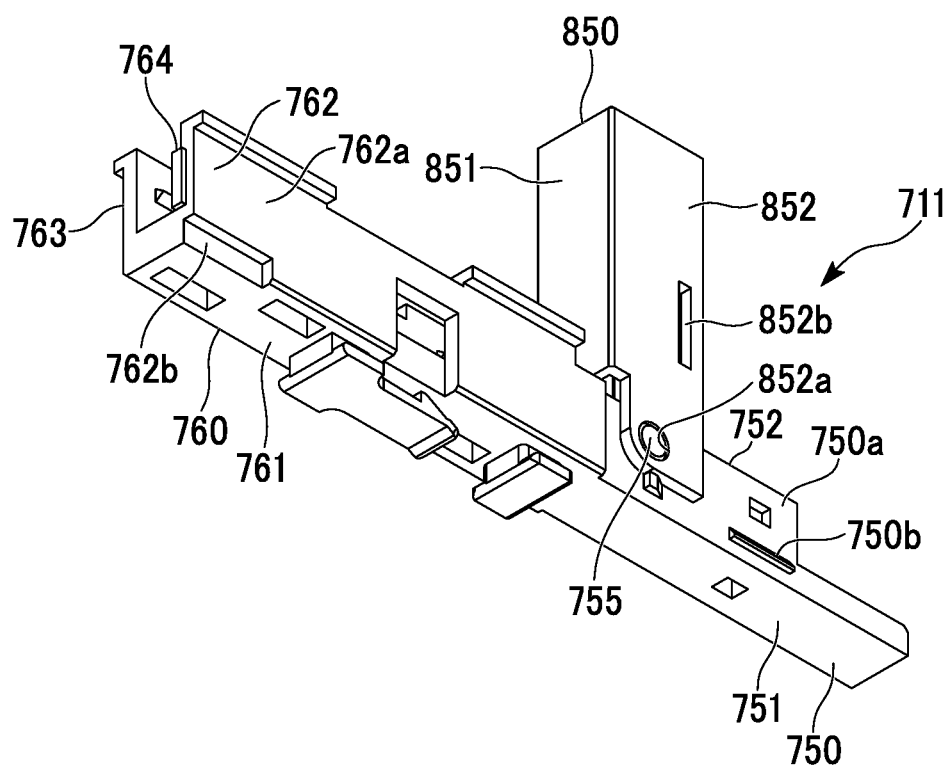
FIG. 43 is a perspective view showing a unit base according to the fourth embodiment of the invention.
Figure 63:
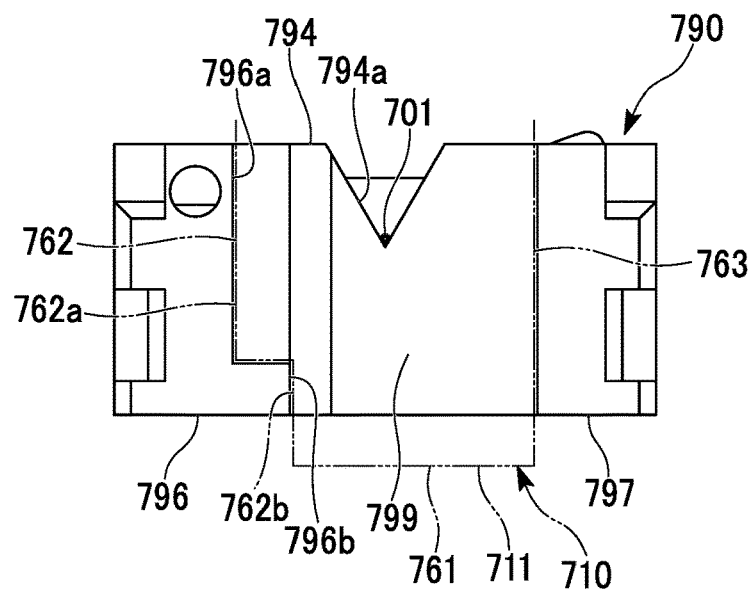
FIG. 63 is an anterior view showing a state in which a forward-end portion of a first optical fiber splicing unit is accommodated in a unit accommodation space of the first fiber holder used in the fourth embodiment.

As shown in FIGS. 43 and 63, a checking recess 762b, into which a checking protuberance 796b of the fiber holder 790 can be inserted when the forward-end portion of the optical fiber splicing unit 710 is accommodated in a unit accommodation space 799 of the fiber holder 790, is formed on an outer surface 762a of the one-side-protruding wall portion 762 (corresponding to the one-side-extended portion 796 of the fiber holder 790).

The checking recess 762b shown as an example in the drawing is formed in a rectangular shape in cross section along the checking protuberance 796b formed in a rectangular shape in cross section.

The checking recess 762b is formed in a groove shape extending in the front-back direction thereof.

The separation distance between the front-side-protruding wall portion 764 and the rear-side-protruding wall portion 765 is set depending on the length of the splice 730 in the longitudinal direction, and the displacement of the splice 730 with respect to the base body 761 in the front-back direction is restricted by the front-side-protruding wall portion 764 and the rear-side-protruding wall portion 765.

The splice holder 760 can removably hold the splice 730.

Figure 54:
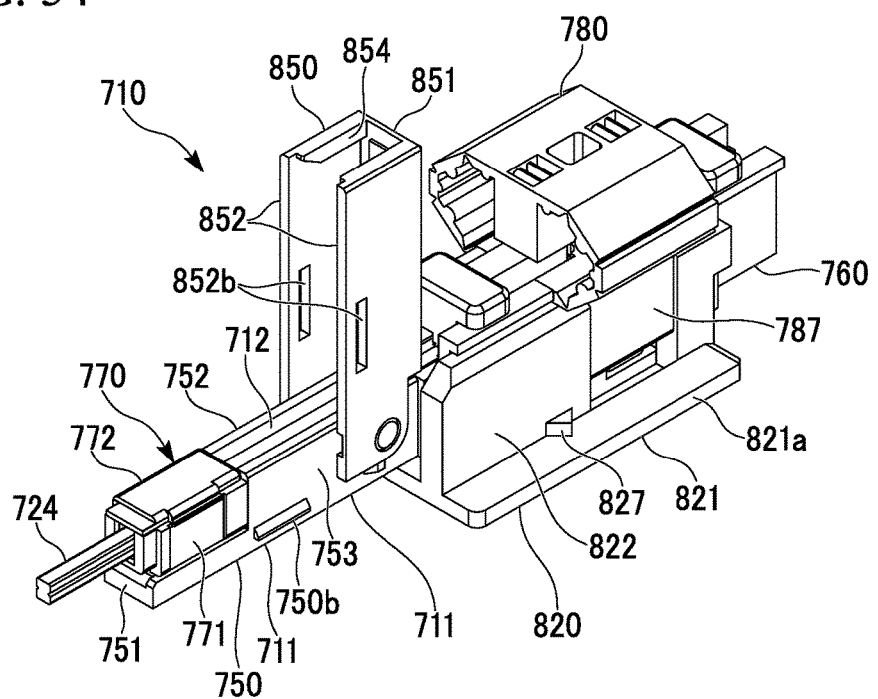
FIG. 54 is a flow sheet showing steps of assembling the optical fiber splicing tool according to the fourth embodiment of the invention.

As shown in FIGS. 43 and 54, the grasping member holding portion 750 includes: a base body 751; a one-side-protruding wall portion 752 that is provided upright one side edge of the base body 751; an another-side-protruding wall portion 753 that is provided upright at the other side edge of the base body 751; and a lever member 850 that positions the cable grasping member 770. The grasping member holding portion can hold the cable grasping member 770 on the base body 751.

Figure 49:
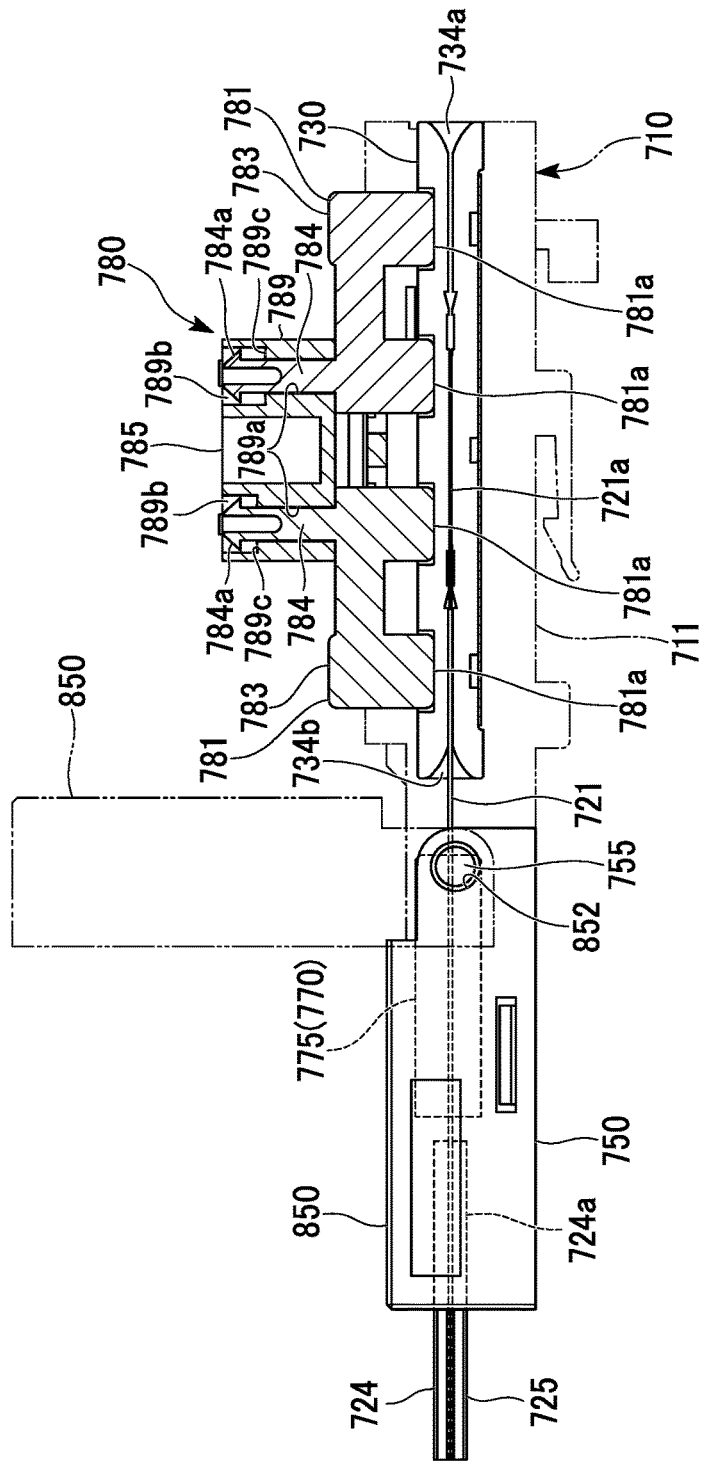
FIG. 49 is a cross-sectional view as seen from side, partially showing a state in which an interposing member according to the fourth embodiment of the invention is inserted between the elements of the mechanical splice.

As shown in FIGS. 43, 49, and 54, the lever member 850 includes: a cover plate 851 with which the cable grasping member 770 held by the grasping member holding portion 750 is to be covered; side plates 852 provided at both the sides thereof; and a backward-movement restriction end 854.

The lever member 850 rotates around a rotation shaft 755 of both side portions of the grasping member holding portion 750 and thereby can switch between a regulated position at which the cable grasping member 770 is held and the backward movement thereof is restricted (position indicated by a solid line shown in FIG. 49) and a standby position at which the backward movement of the cable grasping member 770 is not restricted (position indicated by a chain double-dashed line shown in FIG. 49).

The side plates 852 have bearing holes 852a into which the rotation shaft 755 provided to protrude from both the side portions of the grasping member holding portion 750 is inserted.

The lever member 850 is pivotally provided to the grasping member holding portion 750 by inserting the rotation shaft 755 into the bearing holes 852a.

At the regulated position, the lever member 850 can restrict the backward movement of the cable grasping member 770 with respect to the unit base 711 as a result of disposing the backward-movement restriction end 854 (refer to FIG. 54) at the back side of the cable grasping member 770.

The side plates 852 have engagement holes 852b that are to be engaged with engagement protrusions 750b protruding from external faces 750a of the grasping member holding portion 750.

The lever member 850 can be maintained to be positioned at the regulated position by causing the engagement protrusions 750b to engage with the engagement holes 852b.

It is preferable that the grasping member holding portion 750 and the splice holder 760 be integrally formed.

For example, they may be an integral molding product made of plastic.

In other cases, as modified examples, a structure may be adopted in which the grasping member holding portion 750 has a plate-shaped guide member (not shown in the figure) on which the cable grasping member 770 is slidably mounted.

As the guide member moves forward along with the cable grasping member 770, the guide member is accommodated inside the grasping member holding portion 750.

Figure 41:
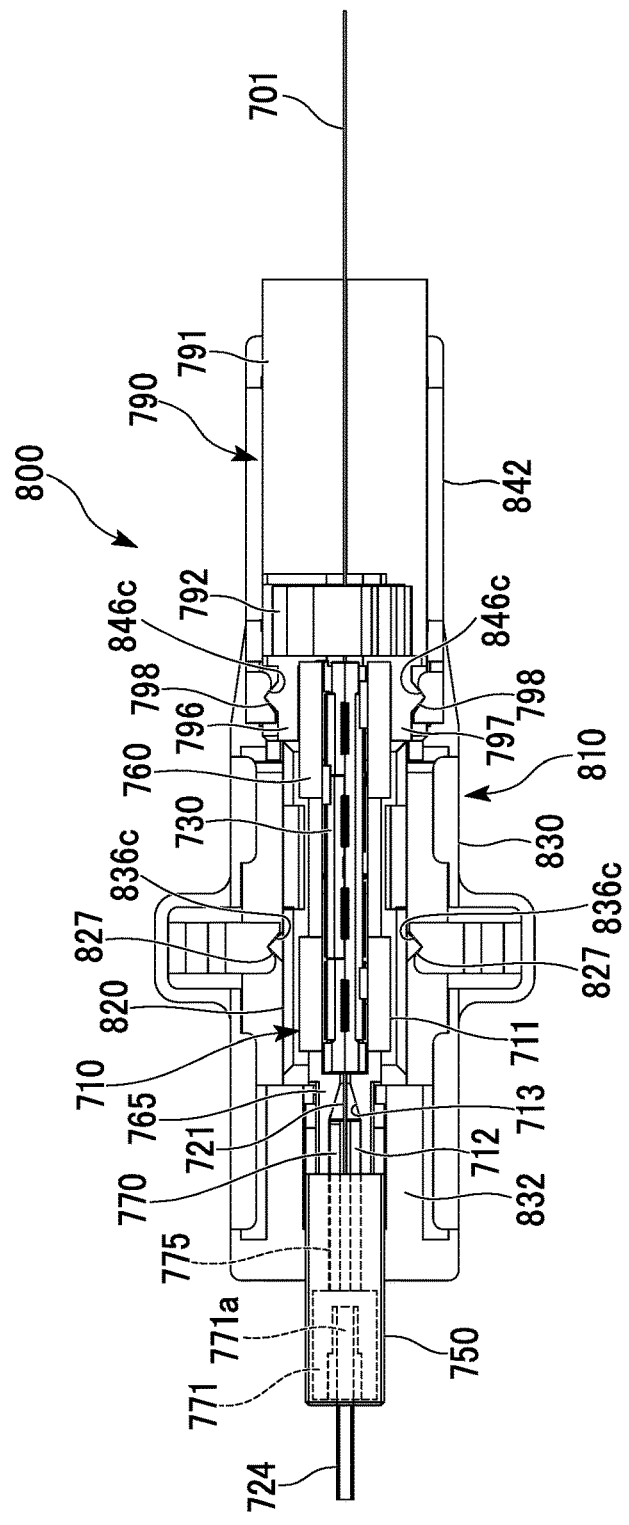
FIG. 41 is a plan view showing the optical fiber splicing tool according to the fourth embodiment of the invention.
Figure 42:
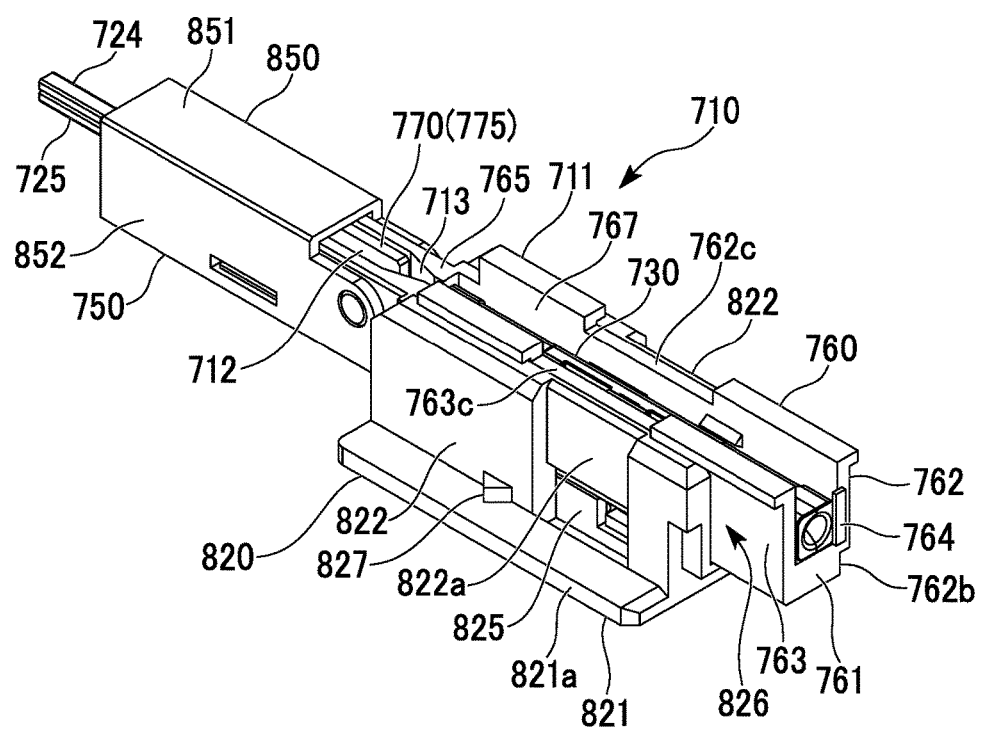
FIG. 42 is a perspective view showing an optical fiber splicing unit according to the fourth embodiment of the invention.

As shown in FIGS. 41 and 42, an optical fiber guiding portion 713 that guides the front end of the extended optical fiber 721 in a direction to a tapered-opening portion 734b of the splice 730 (refer to FIG. 40) is provided between the grasping member holding portion 750 and the splice holder 760 where the extended optical fiber protrudes from a front-side protrusion portion 775 of the cable grasping member 770.

The optical fiber guiding portion 713 has an inner surface inclined toward the center portion of the tapered-opening portion 734b and can guide the front end of the extended optical fiber 721 into the tapered-opening portion 734b of the splice 730 when inserts the cable grasping member 770 into the grasping member holding portion 750.

A flexible space 712 in which the extended optical fiber 721 can flexibly deform is ensured inside the unit base 711 and between the splice 730 and a grasping base 771 of the cable grasping member 770.

Figure 44:
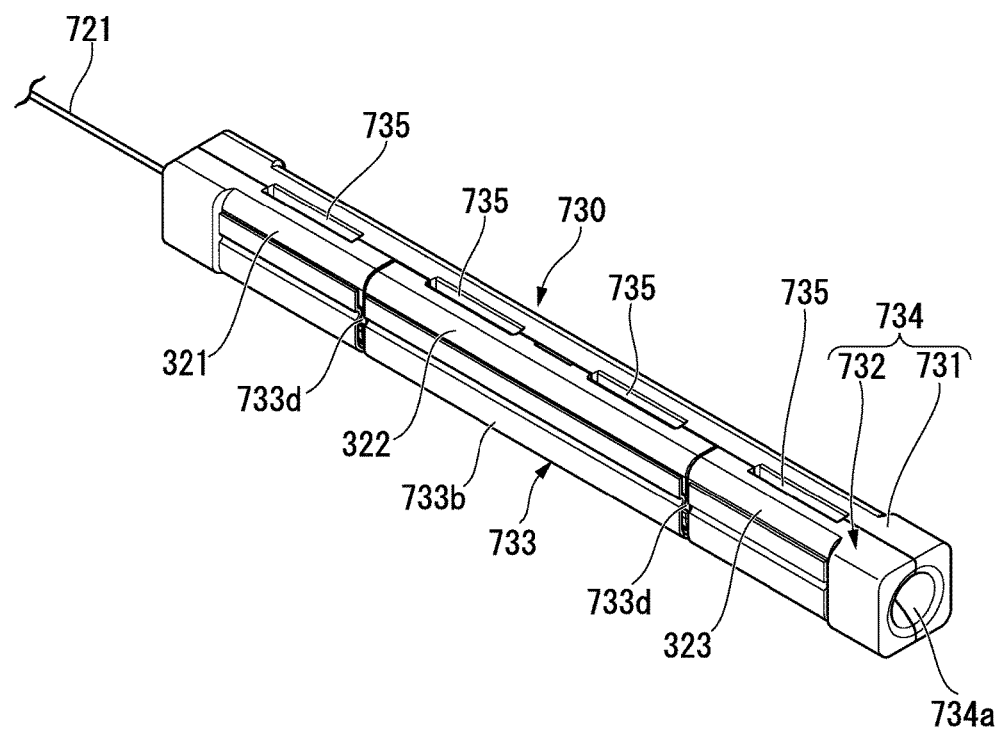
FIG. 44 is a perspective view showing an example of a mechanical splice according to the fourth embodiment of the invention.
Figure 45:
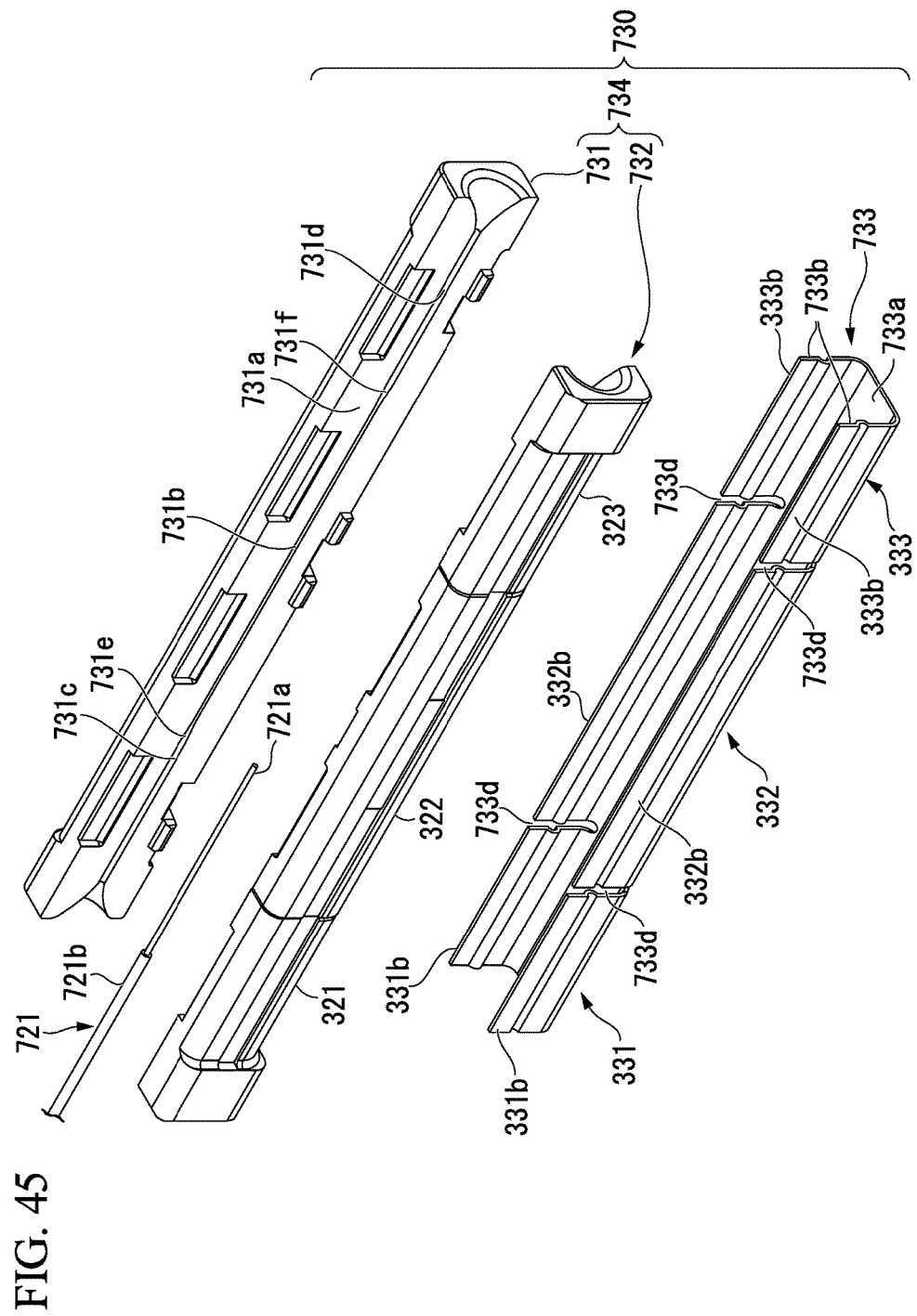
FIG. 45 is an exploded perspective view showing a structure of the mechanical splice according to the fourth embodiment of the invention.
Figure 46:
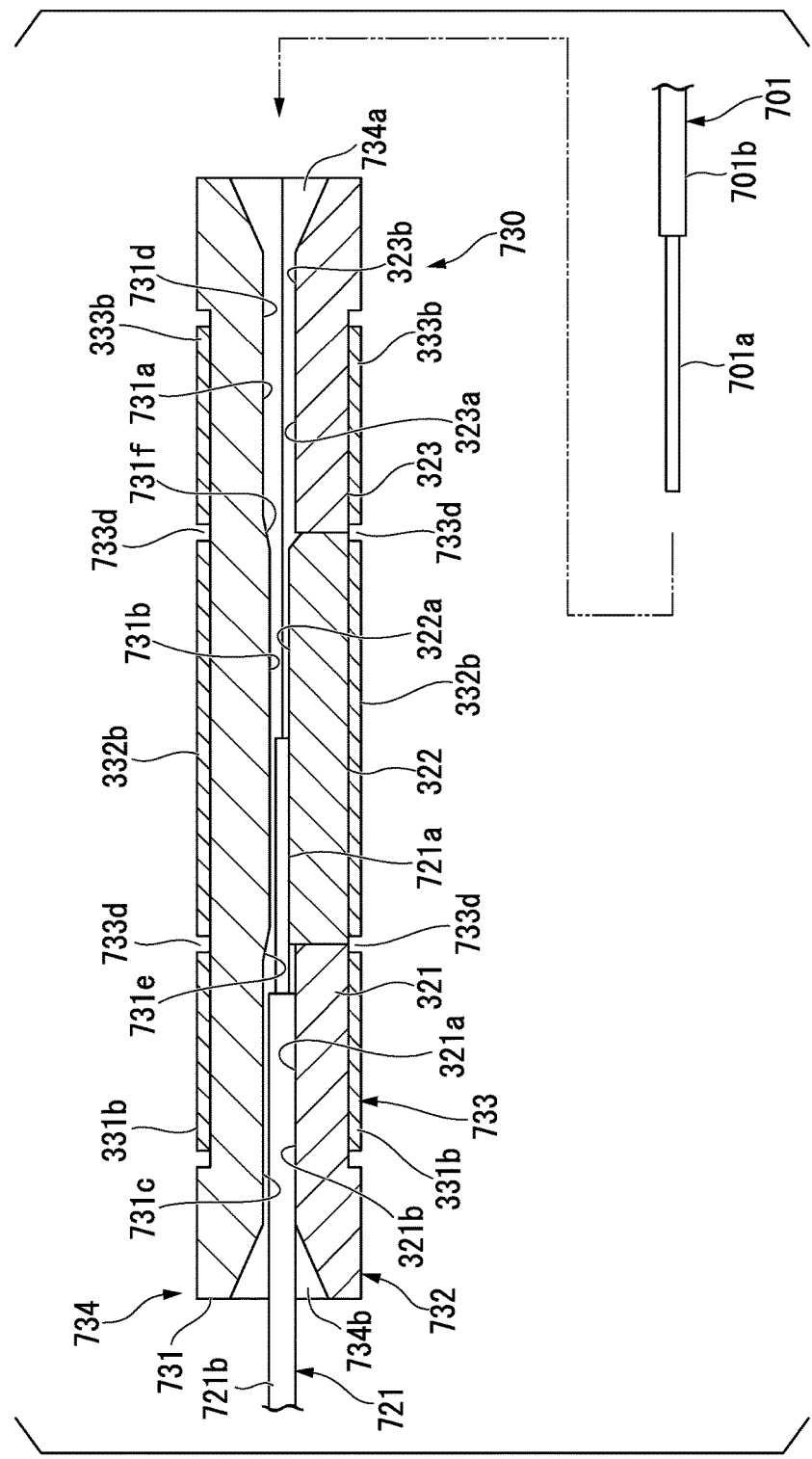
FIG. 46 is a cross-sectional view illustrating insert and grasping states of an optical fiber in the mechanical splice according to the fourth embodiment of the invention.

As shown in FIGS. 44 to 46, the splice 730 includes: an elongated-plate-shaped base member 731; a press lid 732 that is constituted of three lid members 321, 322, and 323 which are arrayed and placed along the longitudinal direction of the base member 731; and an elongated-shaped clamping spring 733 that elastically applies a force to them in a direction in which they connect to each other and are closed.

The base member 731 (base-side element) and the lid members 321, 322, and 323 (lid-side element) constitutes a halved grasping member 734.

The splice 730 will be described, particularly, the side thereof (the left side of FIG. 46) into which the extended optical fiber 721 is inserted is defined as back, and the opposite side thereof (the right side of FIG. 46) is defined as front in the longitudinal direction.

Of three lid members (lid side element) 321, 322, and 323 configuring the press lid 732 of the splice 730, a lid member that is located at the backmost position and represented as reference numeral 321 is also referred to as a rear lid member, and a lid member that is located at the foremost position and represented as reference numeral 323 is also referred to as a front lid member.

Additionally, a lid member that is located between the rear lid member 321 and the front lid member 323 and represented as reference numeral 322 is also referred to as a middle lid member.

As shown in FIGS. 45 and 46, an opposed face 731a facing the lid members 321, 322, and 323 is formed on the base member 731 of the splice 730 in the entire longitudinal direction thereof.

An alignment groove 731b that extends along the longitudinal direction of the base member 731 is formed on the center portion in the longitudinal direction of the opposed face 731a (in the extending direction thereof).

The alignment groove 731b positions a bare optical fiber 721a exposed at the front end of the extended optical fiber 721 and a bare optical fiber 701a exposed at the front end of the inserted optical fiber 701 to each other with a high level of precision so that they can be butt jointed (optical splice), and the alignment groove aligns the centers thereof with each other.

The alignment groove 731b is, for example, a V-groove (a groove having a V-shape in cross section).

The alignment groove 731b is not limited to the V-groove, for example, a groove having a semicircular shape in cross section, a U-groove, (a groove having a U-shape in cross section), or the like may be adopted.

The alignment groove 731b is formed at the portion that faces the middle lid member 322 of the opposed face 731a of the base member 731.

Coated-portion insertion grooves 731c and 731d, each of which has a groove width wider than that of the alignment groove 731b, are formed at the portion that faces the rear lid member 321 of the opposed face 731a and at the portion that faces the front lid member 323.

The coated-portion insertion grooves 731c and 731d are formed at both sides of the alignment groove 731b in the longitudinal direction of the base member 731 so as to extend along the longitudinal direction of the base member 731.

Tapered grooves 731e and 731f, which have a tapered shape and have a groove width that gradually becomes small in the direction from the coated-portion insertion grooves 731c and 731d to the alignment groove side 731b, are formed between the coated-portion insertion groove 731c and the alignment groove 731b and between the coated-portion insertion groove 731d and the alignment groove.

The coated-portion insertion grooves 731c and 731d are communicated with the alignment groove 731b through the tapered grooves 731e and 731f, respectively.

A coated-portion insertion groove 323b, into which the coated portion of the inserted optical fiber 701 is inserted, is formed at the position corresponding to the coated-portion insertion groove 731d of the base member 731 and at the opposed face 323a of the front lid member 323.

A coated-portion insertion groove 321b, into which the coated portion of the inserted optical fiber 701 is inserted, is formed at the position corresponding to the coated-portion insertion groove 731c of the base member 731 and at the opposed face 321a of the rear lid member 321.

A tapered-opening portion 734a, which is provided at each of the front lid member 323 and the base member 731 and which is formed of a recess having a tapered shape gradually becomes fine in the direction from the front-edge face thereof to the rear side, opens at the front end of the halved grasping member 734 of the splice 730.

The rear end (back end) of the tapered-opening portion 734a is communicated with the coated-portion insertion grooves 323b and 731d.

A tapered-opening portion 734b, which is provided at each of the rear lid member 321 and the base member 731 and which is formed of a recess having a tapered shape gradually becomes fine in the direction from the rear-edge face thereof to the front side, opens at the back end of the halved grasping member 734 of the splice 730.

The front end (back end) of the tapered-opening portion 734b is communicated with the coated-portion insertion grooves 321b and 731c.

As shown in FIG. 44, in the halved grasping member 734 of the splice 730, interposing member insertion holes 735, into which an interposing-end portion 781a of an interposing member 781 to be inserted, open at the side face (hereinbelow, may be referred to as an exposed side) which is exposed to a side opposite to the back plate part 733a of the clamp spring 733.

The interposing member insertion holes 735 are formed at four portions in total, at two positions corresponding to a back-end portion and a forward-end portion of the middle lid member 322 and at positions corresponding to the centers of the rear lid member 321 and the front lid member 323 in the longitudinal direction of the base member 731.

As shown in FIGS. 44 to 46, the clamp spring 733 is formed of a single metal plate by shaping and is configured so that side plate parts 733b are provided at the entire longitudinal area of the elongated plate-shaped back plate part 733a in the longitudinal direction so as to protrude from both sides of the back plate part 733a and so as to be perpendicular to the back plate part 733a.

In the splice 730, opposed faces 731a, 321a, 322a, and 323a, at which the base member 731 faces the three lid members 321, 322, and 323, are sandwiched between the paired side plate parts 733b in the direction substantially perpendicular to the direction in which a pair of the side plate parts 733b of the clamp spring 733 makes a space.

One of the side plate parts 733b comes into contact with the base member 731, and the other of the side plate parts 733b comes into contact with the press lid 732.

The paired side plate parts 733b of the clamp spring 733 are separated into three parts corresponding to the three lid members 321, 322, and 323 of the press lid 732 of the splice 730 by cut portions 733d.

The clamp spring 733 includes: a first clamp spring portion 331 holding the rear lid member 321 and the base member 731; a second clamp spring portion 332 holding the middle lid member 322 and the base member 731; and a third clamp spring portion 333 holding the front lid member 323 and the base member 731.

A pair of side plate portions of the first clamping spring portion 331 is represented as reference numeral 331b, a pair of side plate portions of the second clamping spring portion 332 is represented as reference numeral 332b, and a pair of side plate portions of the third clamping spring portion 333 is represented as reference numeral 333b.

As shown in FIG. 46, an end of the extended optical fiber 721 is inserted through one end of the elongated halved grasping member 734 of the splice 730 in the longitudinal direction to the center portion thereof in the longitudinal direction.

Hereinbelow, a portion of the extended optical fiber 721 which is between the base member 731 and the press lid 732 forming the halved grasping member 734 may be referred to as an insertion end.

Regarding the insertion end of the extended optical fiber 721, the front-end thereof, that is, the part of the bare optical fiber 721a is located between the base member 731 and the middle lid member 322, and the portion having a coating 721b is disposed between the base member 731 and the rear lid member 321.

As a result of inserting the other optical fiber 701 between the base member 731 and the middle lid member 322 through the front side of the splice 730, the front end of the optical fiber 701 (hereinbelow, may be referred to as an inserted optical fiber) can be butt-jointed to the front end of the extended optical fiber 721 (the front end of the insertion end).

Additionally, due to elastic action of the clamp spring 733, it is possible to grasp and fix the extended optical fiber 721 and the inserted optical fiber 701 that was brought into contact with the optical fiber 721 between halved elements of the splice 730, that is, between the base member 731 (base-side element) and the press lid 732 (lid side element).

As shown in FIGS. 45 and 46, the portion of the bare optical fiber 701a of the insertion end of the inserted optical fiber 701 which is exposed at the front end is disposed between the base member 731 and the middle lid member 322 and the portion (coated portion) thereof having a coating 1b is disposed between the base member 731 and the front lid member 323.

Figure 51A:
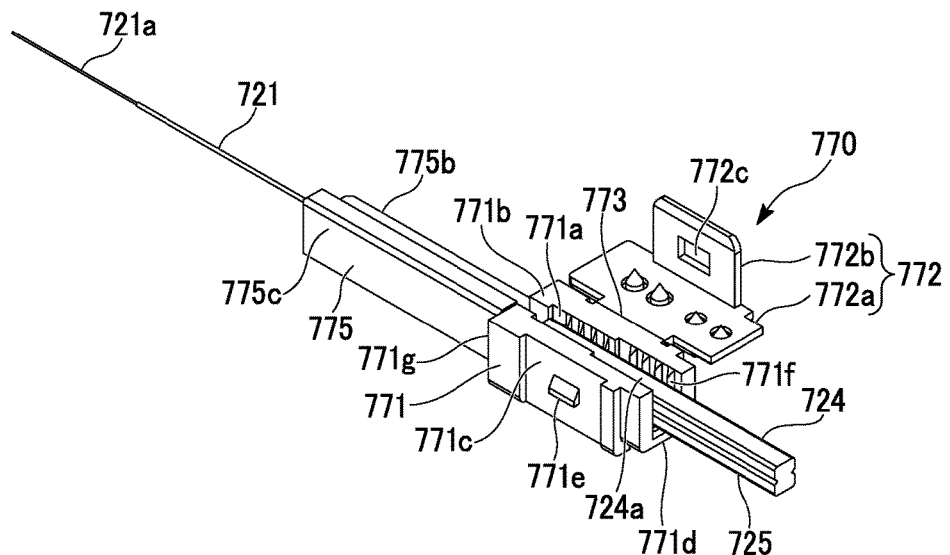
FIG. 51A is a perspective view as seen from one of sides, showing a cable grasping member according to the fourth embodiment of the invention.

As shown in FIG. 51A, the cable grasping member 770 includes: a grasping base 771 that has a cable-fitting groove 771a into which the optical fiber cable 724 is fitted; a press lid 772 that is pivotally provided to one of side wall portions 771b and 771c of the cable-fitting groove 771a in the groove-width direction of the grasping base 771; and the front-side protrusion portion 775 that protrudes from the grasping base 771.

In the grasping base 771, a pair of the side wall portions 771b and 771c are provided upright on a bottom wall 771d, and the cable-fitting groove 771a is ensured between them.

A plurality of grasping protrusions 771f that grasp the terminal 724a of the optical fiber cable 724 are formed on the surfaces at which the side wall portions 771b and 771c face each other.

The grasping protrusion 771f of the cable grasping member 770 shown as an example in the drawing are protuberances which have a triangular shape in the cross-sectional face and extend in the depth direction of the cable-fitting groove 771a.

The press lid 772 includes: a top panel portion 772a that is coupled to the first side wall portion 771b of the grasping base 771 via the thin portion 773; and a lock plate portion 772b that is formed at the top panel portion 772a vertically from the end portion of the top panel portion 772a on the opposite side of the thin portion 773.

Since the thin portion 773 functions as a hinge, the press lid 772 can rotate around the axis line extending along the extending direction of the cable-fitting groove 771a.

In particular, the other of the paired side wall portions 771b and 771c of the grasping base 771 is also referred to as a second side wall portion 771c.

Figure 51B:
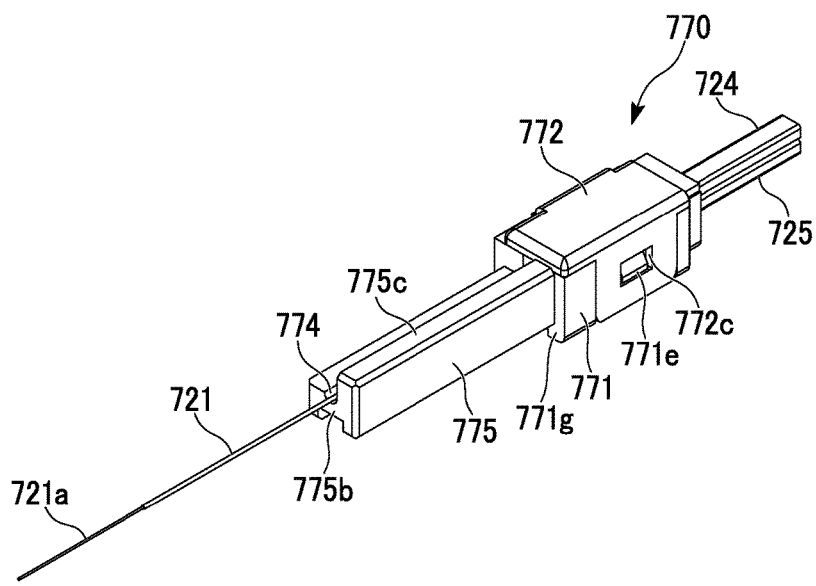
FIG. 51B is a perspective view as seen from the other of the sides, showing the cable grasping member shown in FIG. 51A in the fourth embodiment of the invention.

As shown in FIG. 51B, in the case where the top panel portion 772a closes the cable-fitting groove 771a (closed state), a locking claw 771e on the outer surface of the second side wall portion 771c is engaged with a locking window hole 772c, and the press lid 772 can thereby stably maintain the closed state with respect to the grasping base 771.

The cable grasping member 770 is preferably an integral molding product made of plastic.

The front-side protrusion portion 775 is formed by an L-shaped plate including a bottom wall 775b and a side wall portion 775c that is provided to protrude from an upper surface side of the bottom wall 775b and is formed to protrude from the forward-end portion 771g of the grasping base 771 in the extending direction of the cable-fitting groove 771a.

An optical-fiber holding groove 774 that accommodates the extended optical fiber 721 therein is formed on an upper surface of the bottom wall 775b in the extending direction of the front-side protrusion portion 775.

The optical-fiber holding groove 774 is formed to open upward and thereby does not restrict upward movement of the extended optical fiber 721 that is accommodated in the inside thereof.

Consequently, a portion of the extended optical fiber 721 which is held by the optical-fiber holding groove 774 can be flexibly deformed upward.

As shown in FIG. 51A, in the case where the press lid 772 is in an opened state and in the case of inserting the terminal 724a of the optical fiber cable 724 into the cable-fitting groove 771a, the grasping protrusions 771f of the side wall portions 771b and 771c of the grasping base 771 come into contact with the side surfaces of the outer coating 725 of the optical fiber cable 724, and the terminal 724a of the optical fiber cable 724 is thereby grasped and fixed thereto.

It is preferable that the forward end of the outer coating 725 of the optical fiber cable 724 reach to the forward end of the cable-fitting groove 771a.

As shown in FIG. 51B, as a result of locking the press lid 772 to the side wall portion 771c to be in a closed state, the cable grasping member 770 is attached to the terminal 724a of the optical fiber cable 724.

As shown in FIG. 42, the slider 820 includes a substrate 821 and a pair of side wall portions 822 that are provided upright on an upper surface thereof.

The slider 820 can hold the unit base 711 in a unit storage space 826 that is a space between the side wall portions 822.

Recess portions 822a are formed on outer surfaces of the side wall portions 822.

Engagement walls 787 of the splicing tool 780 are fitted into the recess portions 822a, and the positions of the Engagement walls 787 in the front-back direction thereof are determined.

The locking protrusions 827 that are to be engaged with engagement recesses 836c of elastic locking ends 836 of the connecting jig 810 are formed on outer surfaces of the side wall portions 822 so as to protrude outward therefrom.

The shape of the locking protrusion 827 when seen in a plan view is preferably a tapered shape (for example, triangular shape) having the length in the back and forth direction where the length thereof increases in the direction from the protuberance edge to the base end side.

Hole portions 825 into which protruding claws 787a of the Engagement walls 787 are to be inserted are formed on the side wall portions 822.

Figure 53:
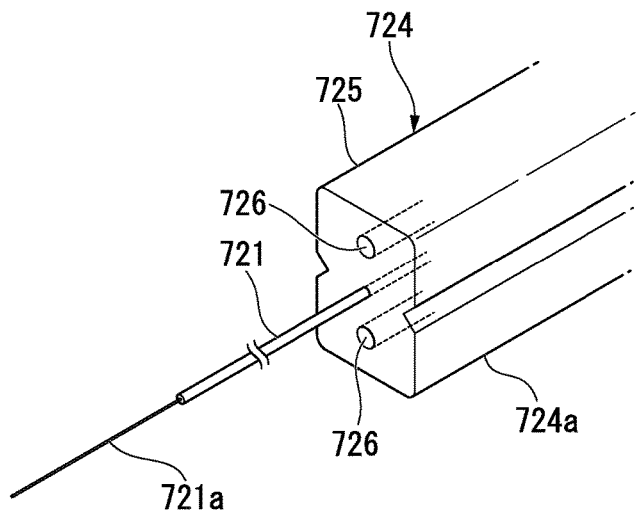
FIG. 53 is a perspective view showing an example of a structure of an optical fiber cable according to the fourth embodiment of the invention.

As shown in FIG. 53, the optical fiber cable 724 is used as an optical drop cable, a light indoor cable, or the like, and is an optical fiber cable that has a substantially rectangular shape in cross section and has a structure in which, for example, the optical fiber 721 is integrally implanted in a resin-coating member 725 (may be referred to as an outer coating) with a pair of linear tensile strength bodies 726 that extends parallel to the optical fiber 721 in the longitudinal direction thereof.

The optical fiber 721 is disposed at the center portion in the cross-sectional face of the optical fiber cable 724, and the pair of tensile strength bodies 726 is located at the positions that are separated from the optical fiber 721 toward both sides of the optical fiber cable 724 in the longitudinal direction of the cross-sectional face.

The optical fiber 721 is a coated optical fiber such as an optical core fiber, a bare optical fiber, or the like.

The extended optical fiber 721 and the inserted optical fiber 701 are a coating-attached optical fiber such as an optical core fiber, a bare optical fiber, or the like.

In an example of the drawing, as the extended optical fiber 721 and the inserted optical fiber 701, a single core optical fiber is adopted.

A bare optical fiber 721a is exposed at the front end (fore end) of the insertion end of the extended optical fiber 721.

As a result of butt-jointing a bare optical fiber 701a exposed at the front end of the inserted optical fiber 701 to the bare optical fiber 721a located at the front end of the insertion end of the extended optical fiber 721, butt-jointing connection between the extended optical fiber 721 and the inserted optical fiber 701 in the splice 730 is realized.

As shown in FIGS. 38 and 47 to 49, the splicing tool 780 can be attached to the splice 730.

The splicing tool 780 includes: two interposing members 781 that includes the interposing-end portions 781a that expand a space between the base member 731 of the splice 730 and the press lid 732; the sleeve-shaped interposing member driving unit 782 that drives the interposing members 781; and a pair of the Engagement walls 787 that protrude from the interposing member driving unit 782.

As shown in FIG. 49, the two interposing members 781 are attached to the interposing member driving unit 782 in the axis line direction thereof (front-back direction) so as to be separated from each other.

The interposing member 781 includes: trunks 784 that are supported by an interposing member support 789 provided on the interposing member driving unit 782; interposing-end supports 783, each of which extends from the trunk 784 in the center axis direction of the interposing member driving unit 782; and the interposing-end portions 781a that are provided at a plurality of portions (two portions shown as an example in the drawing) on the interposing-end support 783 in the extending direction thereof so as to protrude therefrom.

The interposing-end portions 781a are formed separately from each other in the longitudinal direction of an interposing-member main body 783.

Figure 47:
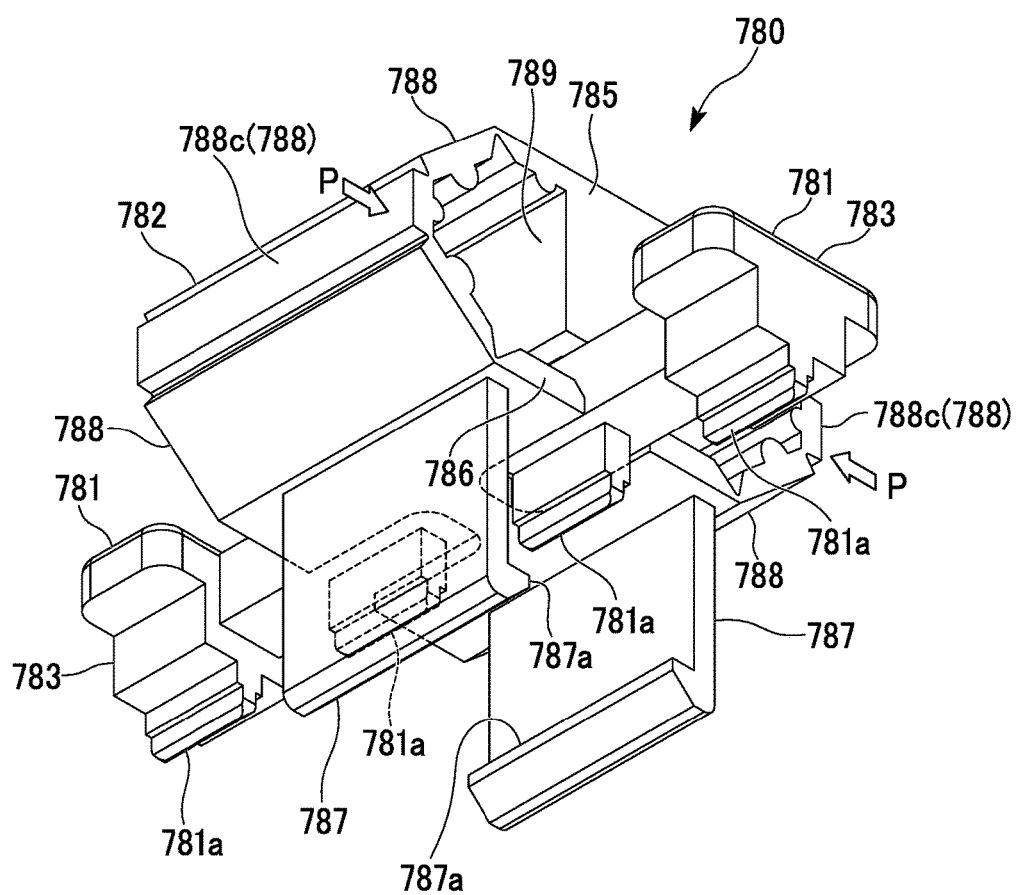
FIG. 47 is a perspective view showing a splicing tool according to the fourth embodiment of the invention.

As shown in FIGS. 47 and 49, the interposing member driving unit 782 includes: the pressure-receiving wall 786 that faces the splice 730; an opposed wall portion 785 that faces the pressure-receiving wall 786; and drive-part side wall portions 788 that are located at both right and left sides and connect the pressure-receiving wall 786 and the opposed wall portion 785.

As the pressure-receiving wall 786 fits into the fitting recesses 762c and 763c of the protruding wall portions 762 and 763, movement of the splicing tool 780 in the front-back direction thereof with respect to the unit base 711 is restricted, and the position thereof is fixed.

The interposing member support 789 is formed on a lower surface of the opposed wall portion 785 of the interposing member driving unit 782 so as to protrude toward the pressure-receiving wall 786, and have through holes 789a that are formed therein and extend in this direction (vertical direction).

In the through holes 789a, a recess portion 789b having a stepped surface 789c is formed.

As shown in FIG. 49, the trunk 784 is attached to the interposing member driving unit 782 through the through hole 789a.

Engaging claws 784a are formed on the side surfaces of the end (extending end portion) of the trunk 784 so as to protrude outward therefrom.

The engaging claw 784a is engageable with the stepped surface 789c in the through hole 789a.

Figure 48:
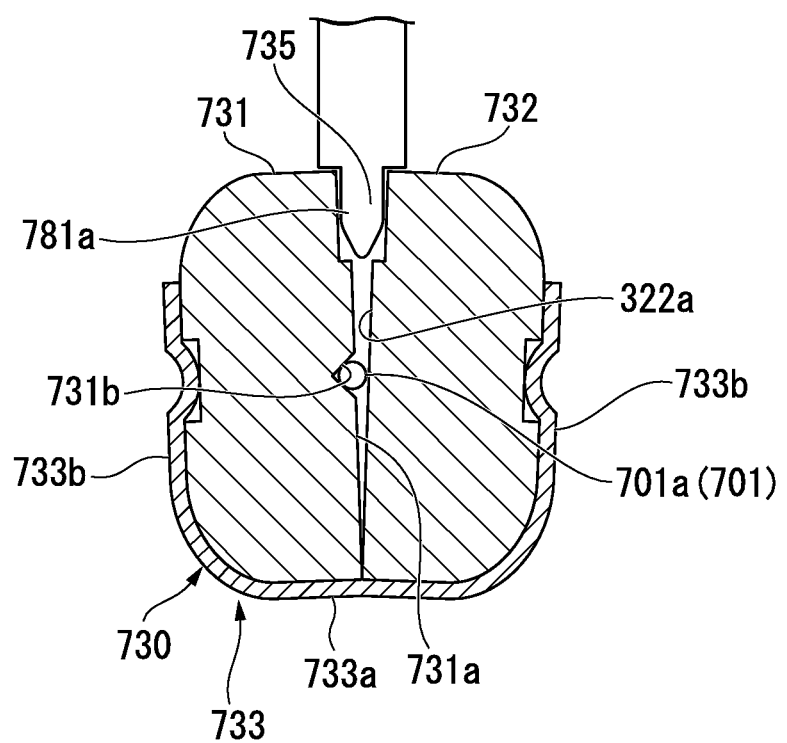
FIG. 48 is a cross-sectional view showing a state in which an interposing member according to the fourth embodiment of the invention is inserted between the elements of the mechanical splice.

As shown in FIG. 48, the splicing tool 780 is attached to the splice 730 in a state where the interposing-end portions 781a is interposed between the base member 731 of the splice 730 and the press lid 732.

As shown in FIG. 47, the splicing tool 780 presses both the side portions (drive-part side wall portions 788) of the interposing member driving unit 782 and can thereby cause them to come close to each other (refer to the lateral pressure P).

That is, as a result of applying the lateral pressure P to the drive-part side wall portions 788 (pressing plate portion 788c) and thereby making the separation distance between the pressing plate portions 788c shorter, the drive-part side wall portions 788 are deformed, the separation distance between the pressure-receiving wall 786 and the opposed wall portion 785 increases, the trunk 784 that is engaged with the stepped surface 789c moves upward, and it is possible to remove the interposing-end portions 781a from the splice 730.

The Engagement walls 787 are formed to protrude from the side portions of the pressure-receiving walls 786 toward the outside of the interposing member driving unit 782.

The protruding claws 787a that protrude inward are formed on the protruding end portions of the Engagement walls 787.

The Engagement walls 787 are to be disposed in the recess portions 822a of the slider 820 and can cause the protruding claws 787a to be engaged with the lower edges (inner edge of the hole portions 825) of the side wall portions 822; therefore, the splicing tool 780 is attached to the splice 730 in a state of holding the unit base 711 and the slider 820 and the relative movement thereof is restricted.

Figure 52:
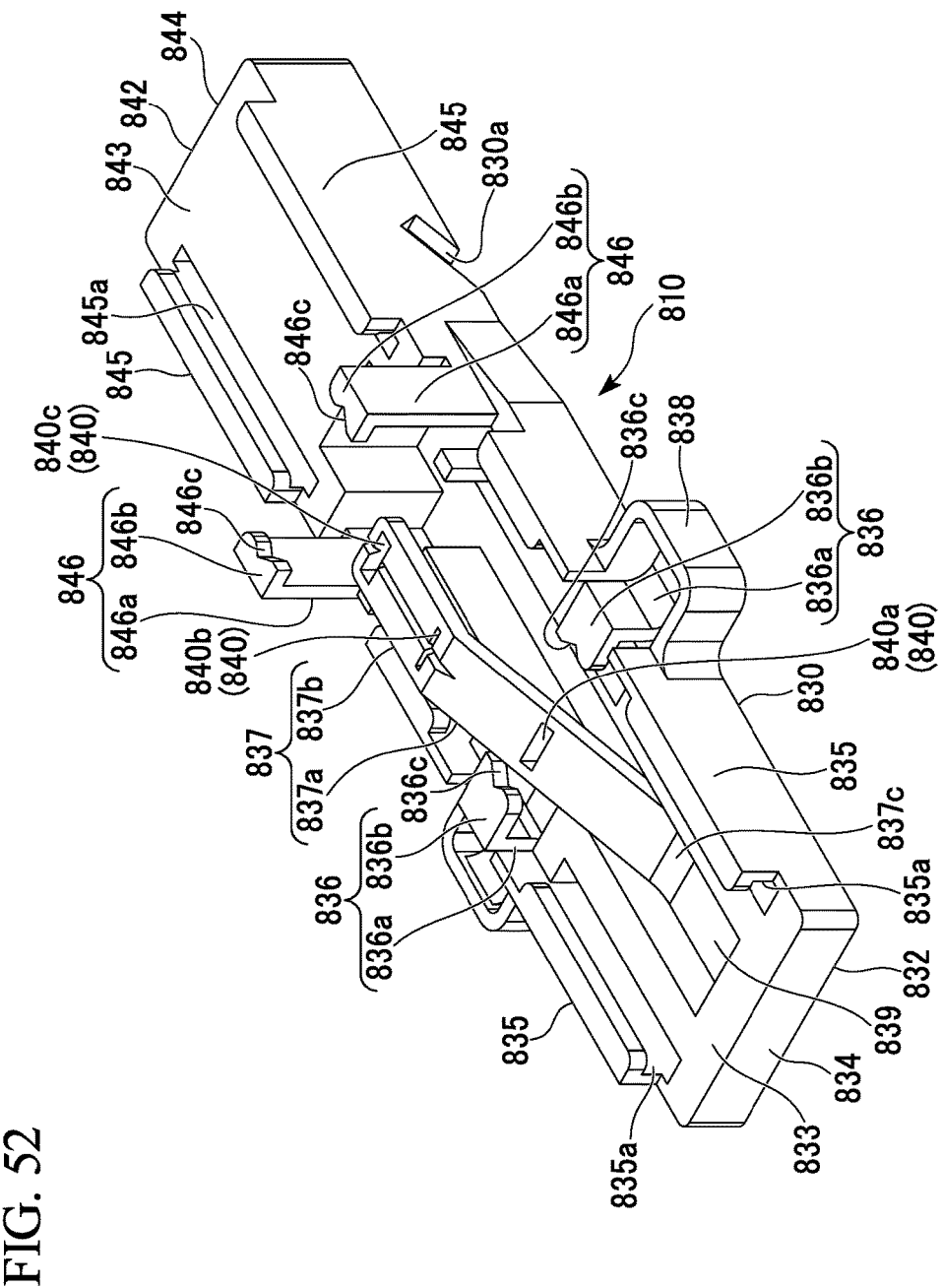
FIG. 52 is a perspective view showing a connecting jig according to the fourth embodiment of the invention.

As shown in FIG. 52, the connecting jig 810 is provided with a jig base 830 that includes: a first guide 832 that guides the optical fiber splicing unit 710; and a second guide 842 (fiber holder part) that holds the fiber holder 790.

The first guide 832 includes: a table 834 having a slide surface 833 formed thereon and causes the optical fiber splicing unit 710 to slidably move; and guide wall portions 835 that are provided on both the side ends thereof so as to protrude therefrom.

The paired guide wall portions 835 are formed so as to extend in the direction (front-back direction) in which the first guide 832 is formed; as both side edges 821a of the substrate 821 of the slider 820 mounted on the slide surface 833 come into contact with the guide wall portions, movement of the optical fiber splicing unit 710 in the width direction thereof can be restricted.

Grooves 835a, which restrict the optical fiber splicing unit 710 from being removed upward (restricts movement of the optical fiber splicing unit 710 in a direction away from the connecting jig 810), are formed on the lower inner surfaces of the guide wall portions 835.

The groove 835a is formed in the direction (front-back direction) in which the first guide 832 is formed. As both the side edge portions 821a of the substrate 821 are inserted into the grooves, it is possible to restrict the slider 820 from being removed upward.

The paired elastic locking ends 836 that position the optical fiber splicing unit 710 on the first guide 832 are formed on the jig base 830.

The elastic locking ends 836 are configured to include: curved-plate portions 836a protruding toward the slide surface 833 from the projected portions 838 that are provided to protrude outward from both sides of the first guide 832 in the width direction thereof; plate-shaped engagement end portions 836b that are provided to protrude from the front ends of the curved-plate portions; and engagement recesses 836c which are formed at the engagement end portions and into which the locking protrusions 827 of the slider 820 are to be inserted.

The curved-plate portion 836a is formed in a circular arc plate shape that is curved along the axis line extending in the front-back direction of the first guide 832.

The protruding end of the curved-plate portion 836a is located upper than the slide surface 833.

The engagement end portion 836b is formed above the slide surface 833 so as to protrude inward from the protruding end of the curved-plate portion 836a.

The engagement recesses 836c of the engagement end portions 836b are formed in a cut-off shape and at a substantially center portion between the back and forth positions of the engagement end portions 836b, at which the protuberance edges of the engagement end portions 836b are depressed.

When the locking protrusion 827 of the slider 820 is inserted into the engagement recess 836c and the elastic locking end 836 is engaged with the locking protrusion 827, it is possible to restrict the movement of the slider 820 relative to the first guide 832 in the front-back direction thereof.

In this state, the elastic locking ends 836 sandwiches the slider 820 therebetween due to the elastic action of the curved-plate portions 836a and stably holds the slider 820.

The elastic locking ends 836 function as a locking mechanism that engages with the optical fiber splicing unit 710 (slider 820) that moves forward along the first guide 832 and thereby restricts the forward and backward movement thereof.

The second guide 842 includes: a table 844 having a slide surface 843 formed thereon and causes the fiber holder 790 to slidably move; and guide wall portions 845 that are provided on both the side ends thereof so as to protrude therefrom.

The paired guide wall portions 845 are formed so as to extend in the direction (front-back direction) in which the second guide 842 is formed; as both side edges of the fiber holder 790 mounted on the slide surface 843 come into contact with the guide wall portions, movement of the fiber holder 790 in the width direction thereof can be restricted.

A pair of elastic locking ends 846 that position the fiber holder 790 are formed on the jig base 830.

The elastic locking ends 846 are configured to include: protruding plates 846a that protrude from the jig base 830; plate-shaped engagement end portions 846b that are provided to protrude from the front ends of the protruding plates; and engagement recesses 846c which are formed at the engagement end portions and into which locking protrusions 798 of the fiber holder 790 are to be inserted.

The engagement end portion 846b is formed above the slide surface 843 so as to protrude inward from the protruding end of the protruding plate 846a.

The engagement recesses 846c of the engagement end portions 846b are formed in a cut-off shape and at a substantially center portion between the back and forth positions of the engagement end portions 846b, at which the protuberance edges of the engagement end portions 846b are depressed.

When the locking protrusion 798 of the fiber holder 790 is inserted into the engagement recess 846c and the elastic locking end 846 is engaged with the locking protrusion 798, it is possible to restrict the movement of the fiber holder 790 relative to the second guide 842 in the front-back direction thereof.

In this state, the elastic locking ends 846 sandwiches the fiber holder 790 therebetween due to the elastic action of the protruding plate 846a and stably holds the fiber holder 790.

The elastic locking ends 846 function as a locking mechanism that engages with the fiber holder 790 that moves forward along the second guide 842 and thereby restricts the forward and backward movement thereof.

Groove 839 which extends in the direction (front-back direction) in which the first guide 832 is formed is formed on the slide surface 833 of the first guide 832.

An elastic protrusion 837 that protrudes upward from the slide surface 833 is formed on the bottom portion of the groove 839.

The elastic protrusion 837 includes: a sloped plate 837a that extends in the front-back direction and gradually rises up in the direction of approaching the second guide 842; and an extending plate 837b that extends parallel to the slide surface 833 from the extending end of the sloped plate 837a in the front-back direction.

Figure 56A:
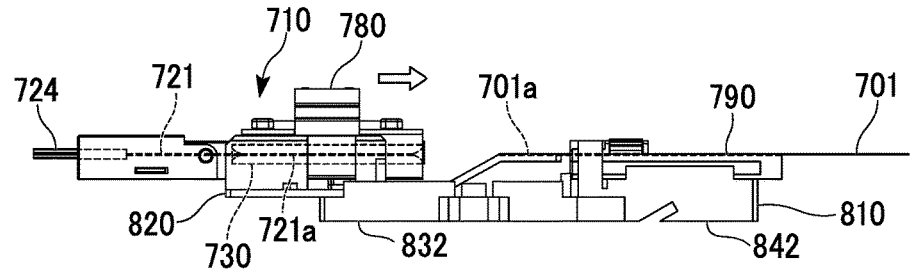
FIG. 56A is a flow sheet showing steps of assembling the optical fiber splicing tool according to the fourth embodiment of the invention.

It is preferable that the position in height of the upper surface of the extending plate 837b be the position adjacent to the inserted optical fiber 701 that extends from the fiber holder 790 which is positionally-fixed on the second guide 842 (refer to FIG. 56A).

The elastic protrusion 837 can elastically bend and deform at a base part 837c.

Therefore, when the optical fiber splicing unit 710 moves forward on the slide surface 833, the sloped plate 837a is pressed downward by the optical fiber splicing unit 710 and is accommodated in the groove 839, and the elastic protrusion 837 does not interfere with the forward movement of the optical fiber splicing unit 710.

It is possible to form, on the elastic protrusion 837, one or a plurality of displays 840 that are used to check the position of the inserted optical fiber 701 that protrudes from the fiber holder 790 toward the mechanical splice 730.

In the drawing shown as an example, the display 840 is a recess portion or a hole portion formed on the sloped plate 837a or the extending plate 837b.

In other cases, as long as the display 840 is identifiable, the configuration thereof is not limited to the drawing shown as an example, and the display may be a projected portion or may be formed by coloring.

In the drawing shown as an example, the display 840 includes: a display 840a used to check the position of the front end of the inserted optical fiber 701 before adjusting the length thereof by use of an optical fiber cutter (not shown in the figure); a display 840b used to check the position of the front end of the bare optical fiber 701a of the inserted optical fiber 701; and a display 840c used to check the position of the front end of the coating 1b of the inserted optical fiber 701.

The display 840a is formed on the sloped plate 837a.

The displays 840b and 840c formed on the extending plate 837b at different positions in the longitudinal direction thereof.

As a result of checking the front end of the inserted optical fiber 701 against the display 840 (840a to 840c), it is possible to easily check the length to be processed (the length of the inserted optical fiber 701 before adjusting the length thereof, the length up to the front end of the bare optical fiber 701a, and the length up to the front end of the coating 1b) of the inserted optical fiber 701 that protrudes from the fiber holder 790, it is possible to carry out a splicing operation with a high degree of accuracy.

A cutout 830a that is used to temporarily place the optical fiber splicing tool 800 therein is formed under the second guide 842 of the jig base 830.

The cutout 830a is formed so as to gradually rise from the lower edge of the second guide 842 rearward in the diagonal direction.

In a state where, for example, the edge portion of a case of a closure (not shown in the figure) is inserted into the cutout 830a, the optical fiber splicing tool 800 can be temporarily placed by being engaged with the case.

Figure 50:
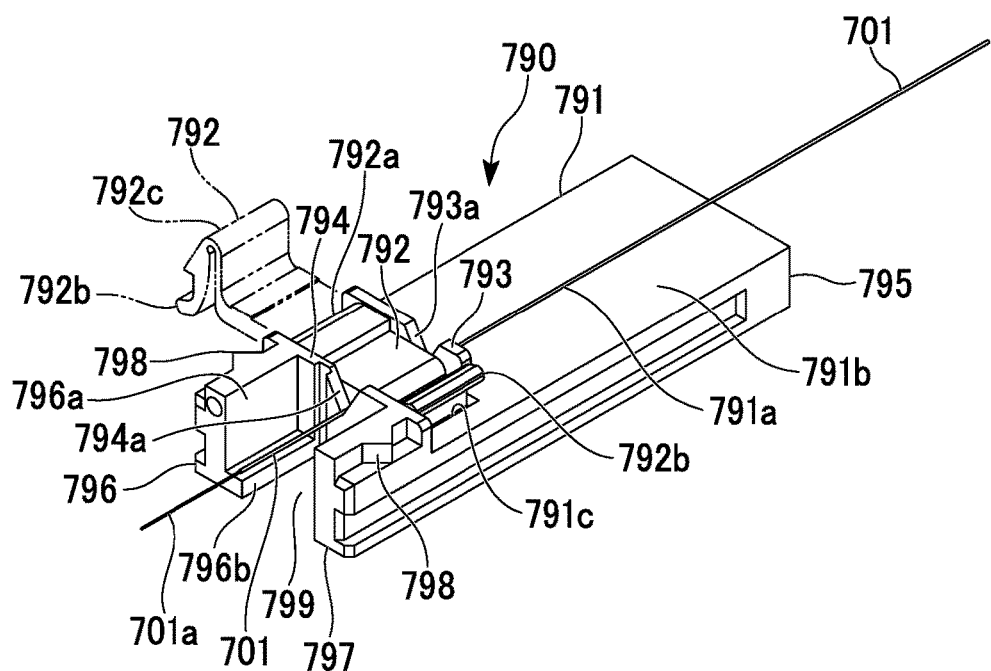
FIG. 50 is a perspective view showing a fiber holder according to the fourth embodiment of the invention.

As shown in FIG. 50, an optical fiber holder 790 (first optical fiber fixer) includes: a base 791; and a lid 792 that is rotatably coupled to the base 791 at a base part 792a serving as a hinge, presses the inserted optical fiber 701 provided on the base 791 onto the base 791 by the lid 792, and can grasp and fix the optical fiber.

Regarding the fiber holder 790, the direction of approaching the optical fiber splicing unit 710 may be referred to as forward (the left direction in FIG. 40) and the opposite direction thereof may be referred to as backward.

The base 791 includes: a base body 795; a one-side-extended portion 796 that extends forward from one side portion of the front-edge face thereof; and an another-side-extended portion 797 that extends forward from the other side portion of the front-edge face of the base body 795.

The forward-end portion of the optical fiber splicing unit 710 can be accommodated in the unit accommodation space 799 (first unit accommodation space) ensured between the one-side-extended portion 796 and the other-side-extended portion 797.

A first holding wall portion 793 including a positioning recess portion 793a that accommodates the inserted optical fiber 701 therein and a second holding wall portion 794 including a positioning recess portion 794a are formed on the upper surface 791b of the base 791 (base body 795).

The second holding wall portion 794 is formed in front of the first holding wall portion 793 so as to be separated from the first holding wall portions 793.

A linear positioning groove 791a that extends in the front-back direction from the positioning recess portion 793a through the positioning recess portion 794a is formed on the upper surface of the base 791 (base body 795).

The positioning groove 791a is a groove used to fix the position of the inserted optical fiber 701 and may be formed in, for example, in a substantially V-shape in cross section, in a substantially U-shape in cross section, a semicircular shape in cross section, or the like.

The locking protrusions 798 which are to be engaged with the engagement recesses 846c of the elastic locking ends 846 are formed on the outer-side faces of the one-side-extended portion 796 and the other-side-extended portion 797 so as to protrude toward the outside.

The shape of the locking protrusion 798 when seen in a plan view is preferably a tapered shape (for example, triangular shape) having the length in the back and forth direction where the length thereof increases in the direction from the protuberance edge to the base end side.

The checking protuberance 796b (first entry prevention portion) that protrudes inward is formed on the inner surface 796a of the one-side-extended portion 796 so as to extend in the front-back direction.

The checking protuberance 796b is formed in a shape that is inserted into the checking recess 762b of the optical fiber splicing unit 710, and prevents the forward-end portion thereof from entering the unit accommodation space 799 when being used in an optical fiber splicing unit (for example, an optical fiber splicing unit 720 shown in FIG. 59) other than the optical fiber splicing unit 710.

The checking protuberance 796b shown as an example in the drawing is formed in a rectangular shape in cross section.

In a state where the upper surface 791b of the base 791 is covered with the lid 792 (closed state), the lid 792 is disposed between the holding wall portions 793 and 794.

A locking protuberance 792c is formed near the leading-end portion 792b positioned at the end portion opposite to the base part 792a (hinge) of the lid 792. The locking protuberance can be detachably fitted into the locking recess portion 791c formed on the base 791.

The lid 792 causes the locking protuberance 792c to be engaged with the locking recess portion 791c of the base 791 in a state where the upper surface 791b of the base 791 is covered with the lid (closed state), presses the inserted optical fiber 701 onto the base 791 (base body 795), and can grasp and fix the optical fiber.

The lid 792 and the base 791 may be integrally formed together.

Next, a method of splicing the extended optical fiber 721 to the inserted optical fiber 701 using the optical fiber splicing tool 800 (optical splice) will be described with reference to FIGS. 54 to 56E.

As shown in FIG. 54, in advance, the interposing-end portions 781a is interposed in the grasping member 734 of the splice 730 by attaching the splicing tool 780 to the optical fiber splicing unit 710, and the splice 730 is in a state where the inserted optical fibers 701 and 721 freely move in the insertion and removal direction.

Figure 55:
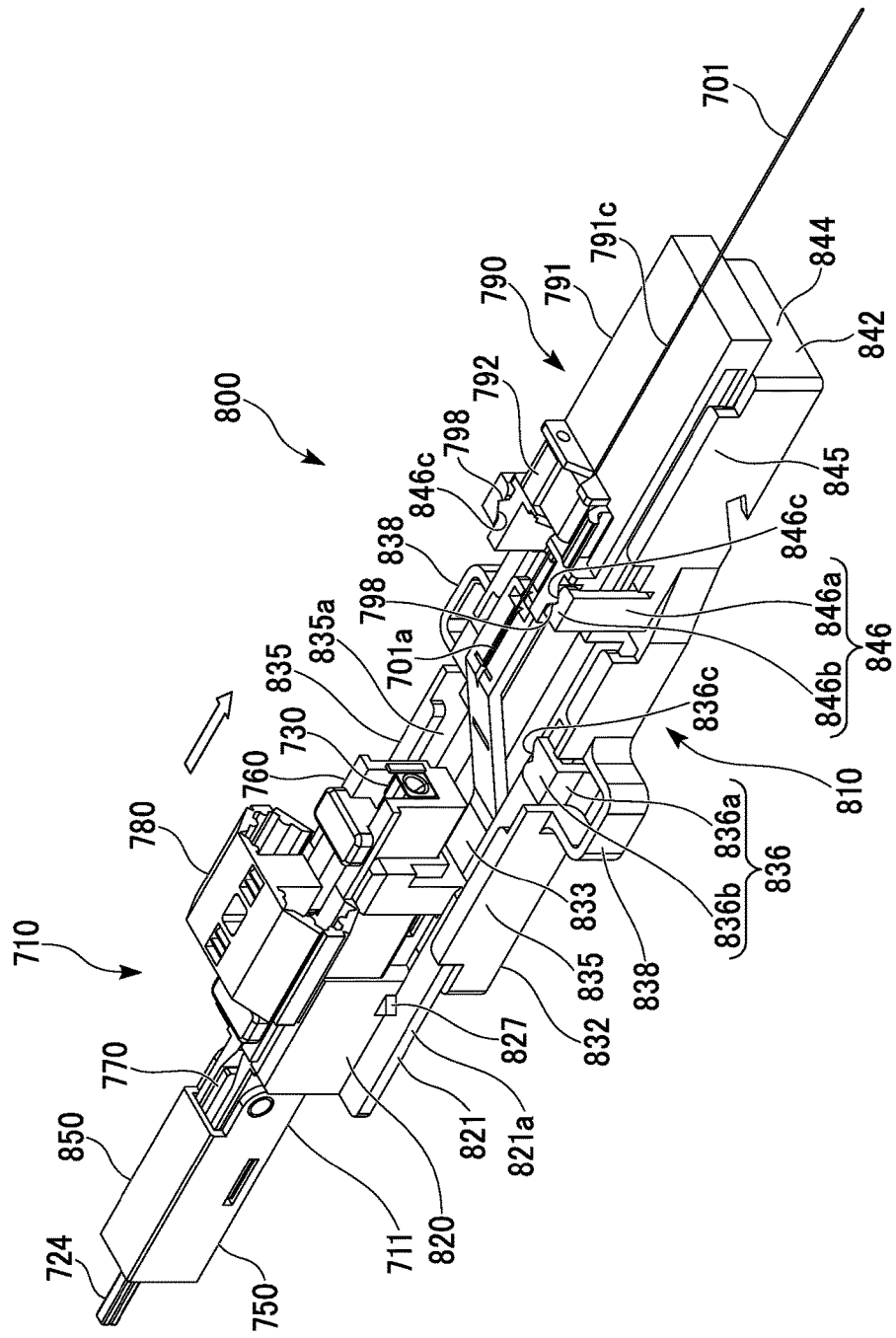
FIG. 55 is a flow sheet showing steps of assembling the optical fiber splicing tool according to the fourth embodiment of the invention.

As shown in FIG. 55, the inserted optical fiber 701 is disposed in the positioning groove 791a of the base 791, is pressed onto the base 791 by the lid 792, and is thereby held and fixed.

The inserted optical fiber 701 is fixed to the fiber holder 790 while ensuring a predetermined forward protruding length.

In the case where flexure is not produced in the inserted optical fiber 701, the protruding length of the inserted optical fiber 701 from the fiber holder 790 is determined such that the bare optical fibers 701a and 721a are brought into contact with each other at the optimal position in the splice 730.

For example, when the positions of the optical fiber splicing unit 710 and the fiber holder 790 are fixed by the elastic locking ends 836 and 846, the protruding length can be the length at which the front end of the bare optical fiber 701a reaches the center position of the splice 730.

The fiber holder 790 is mounted on the slide surface 843 of a second rail portion 842 and causes the locking protrusions 798 to be engaged with of the engagement recesses 846c of the elastic locking ends 846.

Accordingly, the fiber holder 790 is sandwiched between the elastic locking ends 846 in a state of being stably held and positioned on the slide surface 843.

Next, as shown in FIG. 54, as a result of causing the cable grasping member 770 grasping the optical fiber cable 724 to be mounted on the grasping member holding portion 750 and to move forward on the base body 751, the extended optical fiber 721 is inserted into one end side of the splice 730.

When the optical fiber splicing unit 710 is located at the forward-movement limit position (described below), the protruding length of the extended optical fiber 721 from the forward end of the cable-fitting groove 771a of the grasping base 771 is slightly longer than the distance up to the bare optical fiber 721a of the extended optical fiber 721 in the splice 730.

By rotating the lever member 850, the backward movement of the cable grasping member 770 is restricted.

As shown in FIGS. 55 and 56A, the optical fiber splicing unit 710 is mounted on the slide surface 833 of the first guide 832 of the connecting jig 810.

Movement of the optical fiber splicing unit 710 in the width direction thereof is restricted by the guide wall portion 835.

Subsequently, the optical fiber splicing unit 710 moves forward in the direction toward the fiber holder 790.

In the movement of the optical fiber splicing unit 710, since both the side edge portions 821a of the substrate 821 are inserted into the grooves 835a of the inner surfaces of the side wall portions 835 and the slider 820 is thereby restricted from being removed upward, it is possible to position the inserted optical fiber 701 with precision.

When the optical fiber splicing unit 710 on the slide surface 833 moves forward toward the fiber holder 790, since the sloped plate 837a of the elastic protrusion 837 is pressed downward by the optical fiber splicing unit 710 and is accommodated in the groove 839, the elastic protrusion 837 does not interfere with the forward movement of the optical fiber splicing unit 710.

Figure 56B:
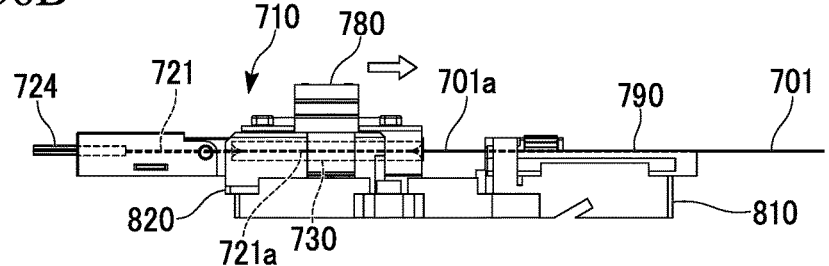
FIG. 56B is a flow sheet showing steps of assembling the optical fiber splicing tool according to the fourth embodiment of the invention.

As shown in FIG. 56B, due to the forward movement of the optical fiber splicing unit 710, the inserted optical fiber 701 is inserted into the coated-portion insertion grooves 731d and 323b of the splice 730 in the splice holder 760.

Figure 56C:
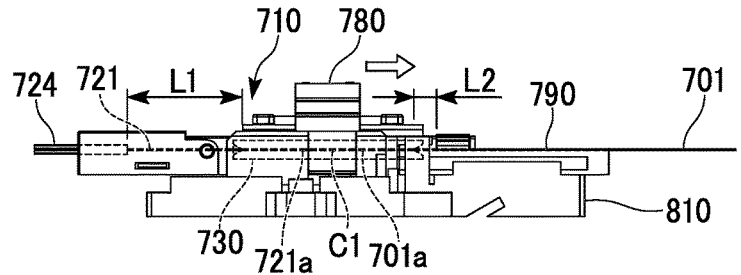
FIG. 56C is a flow sheet showing steps of assembling the optical fiber splicing tool according to the fourth embodiment of the invention.

As shown in FIG. 56C, as the optical fiber splicing unit 710 further moves forward, the bare optical fiber 701a of the inserted optical fiber 701 is inserted into the alignment groove 731b and is butt-jointed to contact with the front end of the bare optical fiber 721a of the extended optical fiber 721.

Reference sign C1 represents the butt-jointing position.

Figure 56D:
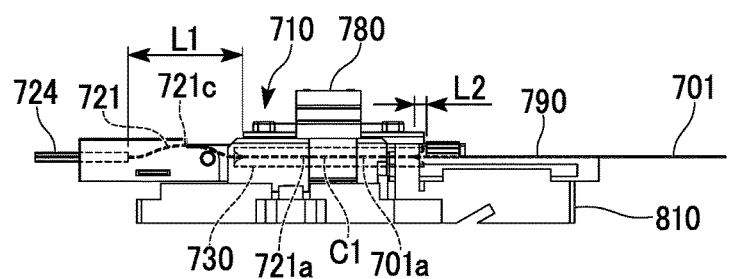
FIG. 56D is a flow sheet showing steps of assembling the optical fiber splicing tool according to the fourth embodiment of the invention.

As shown in FIG. 56D, the optical fiber splicing unit 710 further moves forward, the locking protrusions 827 are engaged with the engagement recesses 836c of the elastic locking ends 836.

Because of this, the optical fiber splicing unit 710 is sandwiched between the elastic locking ends 836 in a state of being stably held and positioned on the slide surface 833.

The position of the optical fiber splicing unit 710 is referred to as a forward-movement limit position.

At this time, flexural deformation 721c occurs in the extended optical fiber 721 between the splice 730 and the cable grasping member 770.

In FIG. 56C or the like, L1 is a first flexure width ensured between the back end of the splice 730 and the cable grasping member 770 and L2 is a second flexure width ensured between the splice 730 and the fiber holder 790.

As shown in FIGS. 41 and 50, at the forward-movement limit position, the forward-end portion of the optical fiber splicing unit 710 enters the unit accommodation space 799 between the one-side-extended portion 796 and the other-side-extended portion 797 of the fiber holder 790.

As shown in FIG. 63, at this time, since the checking protuberance 796b of the fiber holder 790 is inserted into the checking recess 762b of the optical fiber splicing unit 710, entry of the optical fiber splicing unit 710 is not prevented.

Therefore, the optical fiber splicing unit 710 can be sufficiently close to the grasping position of the inserted optical fiber 701.

Figure 56E:
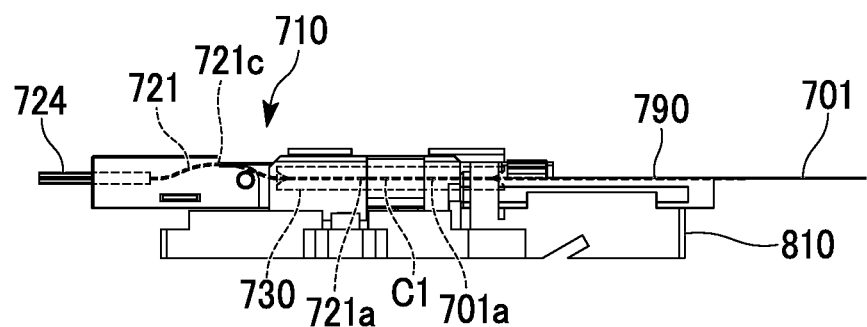
FIG. 56E is a flow sheet showing steps of assembling the optical fiber splicing tool according to the fourth embodiment of the invention.

Subsequently, as shown in FIGS. 56E and 47, the interposing-end portions 781a is detached from the splice 730 by applying the lateral pressure P to both sides of the interposing member driving unit 782 of the splicing tool 780.

After the interposing-end portions 781a is removed from the splice 730, the halved grasping member 734 of the splice 730 holds and fixes the bare optical fibers 701a and 721a while maintaining a butt-jointed state due to elastic action of the clamping spring 733.

Therefore, the operation of butt-jointing (optical splicing) the extended optical fiber 721 to the inserted optical fiber 701 in the splice 730 is completed.

As a result of grasping and fixing the extended optical fiber 721 and the inserted optical fiber 701 by the halved grasping member 734 of the splice 730 after completion of the splicing operation, it is possible to stably maintain a state where the bare optical fibers 701a and 721a are butt-jointed to each other.

Most of the flexural deformation 721c of the extended optical fiber 721 is surrounded by the grasping member holding portion 750 of the unit base 711 and the lever member 850 and is protected from an external force.

The optical fiber splicing tool 800 that splices the extended optical fiber 721 and the inserted optical fiber 701 can be disposed and housed in an optical fiber splicing box (for example, a closure, an optical termination box, or the like).

As adjustment of the protruding length and the exposed length of the inserted optical fiber 701, a method is adopted which puts, on an optical fiber cutter (not shown in the figure), the fiber holder 790 to which the inserted optical fiber 701 is fixed, cuts the inserted optical fiber 701 at a predetermined length, thereafter, moves the fiber holder 790 to a stripper (not shown in the figure), and removes the coating of the end portion of the inserted optical fiber 701.

Since the reference surface used to position the optical fiber in the optical fiber cutter and the stripper cannot be changed, generally, it is necessary to adjust the position of the fiber holder by putting a spacer having a predetermined size between the fiber holder and the reference surface, and the operation therefor becomes complicated.

In contrast, in the optical fiber splicing tool 800, since the fiber holder 790 is provided with the one-side-extended portion 796 and the other-side-extended portion 797, it is possible to adjust the position with respect to the reference surface of the optical fiber cutter and the stripper by the extended portions 796 and 797 without using a spacer.

That is, it is possible to fix the position of the base 791 (base body 795) at the position apart from the reference surface.

Since it is not necessary to use a spacer, an operation during adjustment of the protruding length and the exposed length from the fiber holder 790 becomes easy.

Moreover, since the forward-end portion of the optical fiber splicing unit 710 can enter between the extended portions 796 and 797, it is possible to cause the optical fiber splicing unit 710 to be sufficiently close to the grasping position of the inserted optical fiber 701 in a splicing operation.

Accordingly, regardless of provision of the extended portions 796 and 797, it is not necessary to ensure a longer excess length of the inserted optical fiber 701 more than required.

Fifth Embodiment

Subsequently, an optical fiber splicing tool according to a fifth embodiment will be described.

In the fifth embodiment, identical reference numerals are used for the elements which are identical to those of the fourth embodiment, and the explanations thereof are omitted or simplified here.

Figure 58:
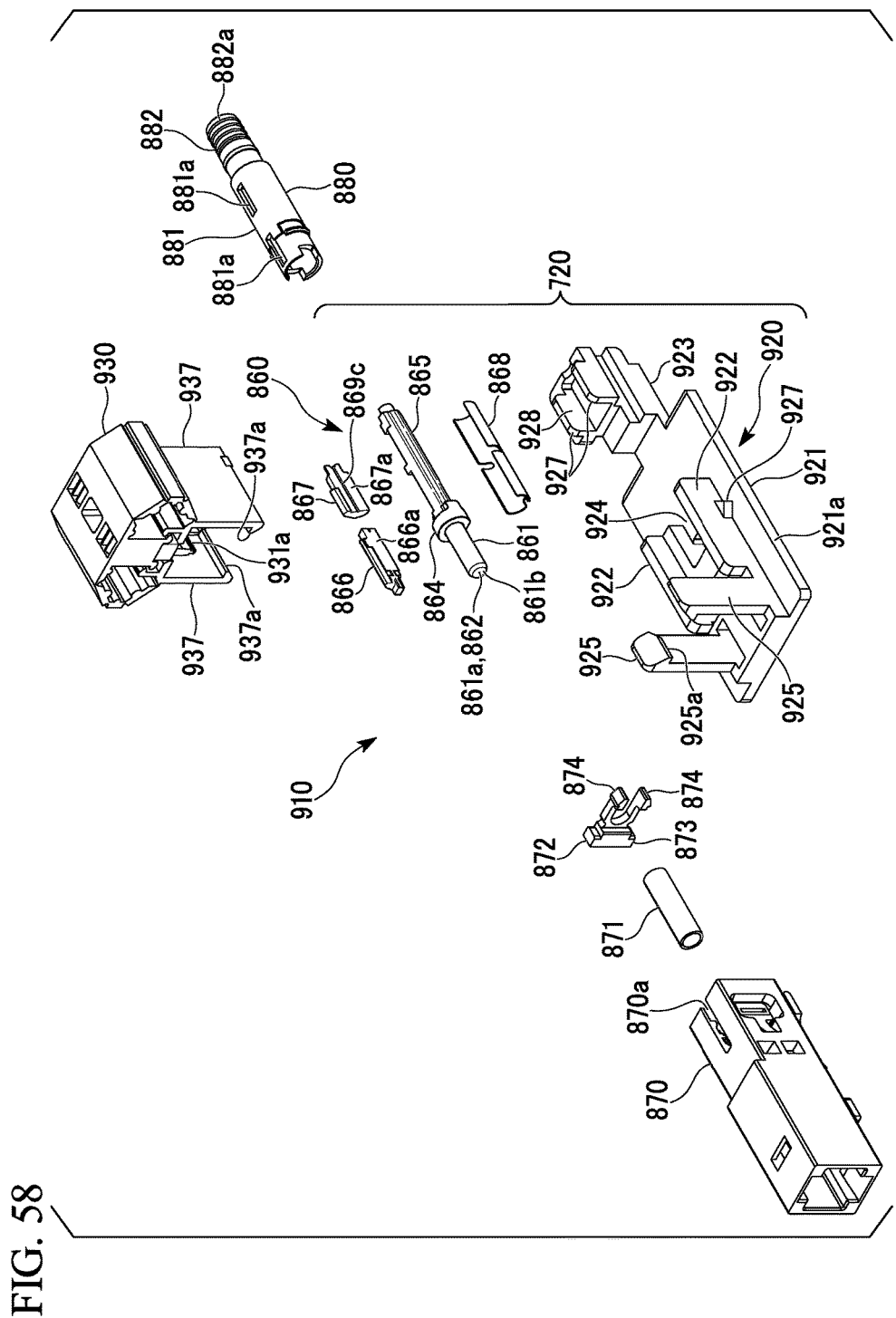
FIG. 58 is an exploded perspective view showing the optical fiber splicing tool according to the fifth embodiment of the invention.
Figure 59:
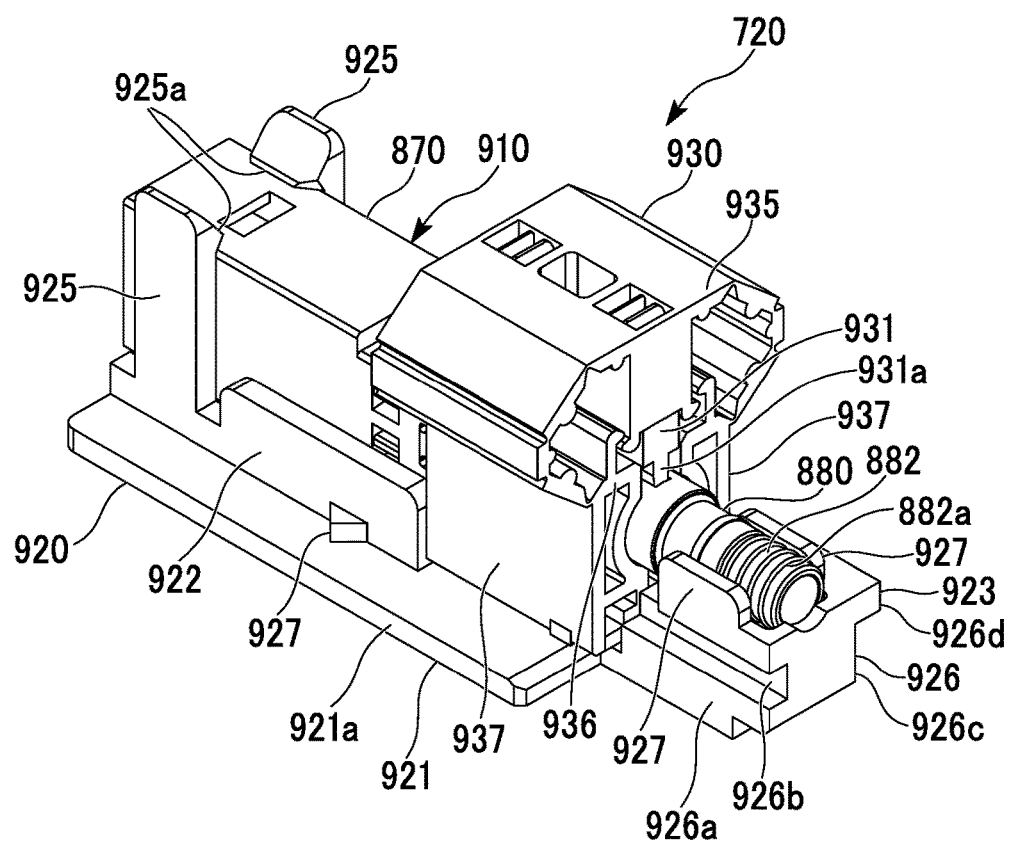
FIG. 59 is a perspective view showing an optical fiber splicing unit according to the fifth embodiment of the invention.

As shown in FIGS. 57 to 59, an optical fiber splicing tool 900 includes: the optical fiber splicing unit 720; a second fiber holder 890 (second optical fiber fixer) that grasps the inserted optical fiber 701; and the connecting jig 810 on which they are to be mounted.

The optical fiber splicing unit 720 (second optical fiber splicing unit) includes: an optical connector 910, and a slider 920 (guide target) that holds this.

Regarding the optical fiber splicing unit 720, the direction of approaching the fiber holder 890 is referred to as front and the direction opposite thereto is referred to as rear.

Additionally, only in explanation regarding a clamp-attached ferrule 860, the direction toward a connection edge face 861b of a ferrule 861 may be referred to as the forward.

The optical connector 910 includes: a sleeve-shaped finger grip 870 having a rectangular shape in cross section; a sleeve-shaped housing 880 provided in the finger grip 870; and the clamp-attached ferrule 860 provided in the housing 880.

Figure 60:
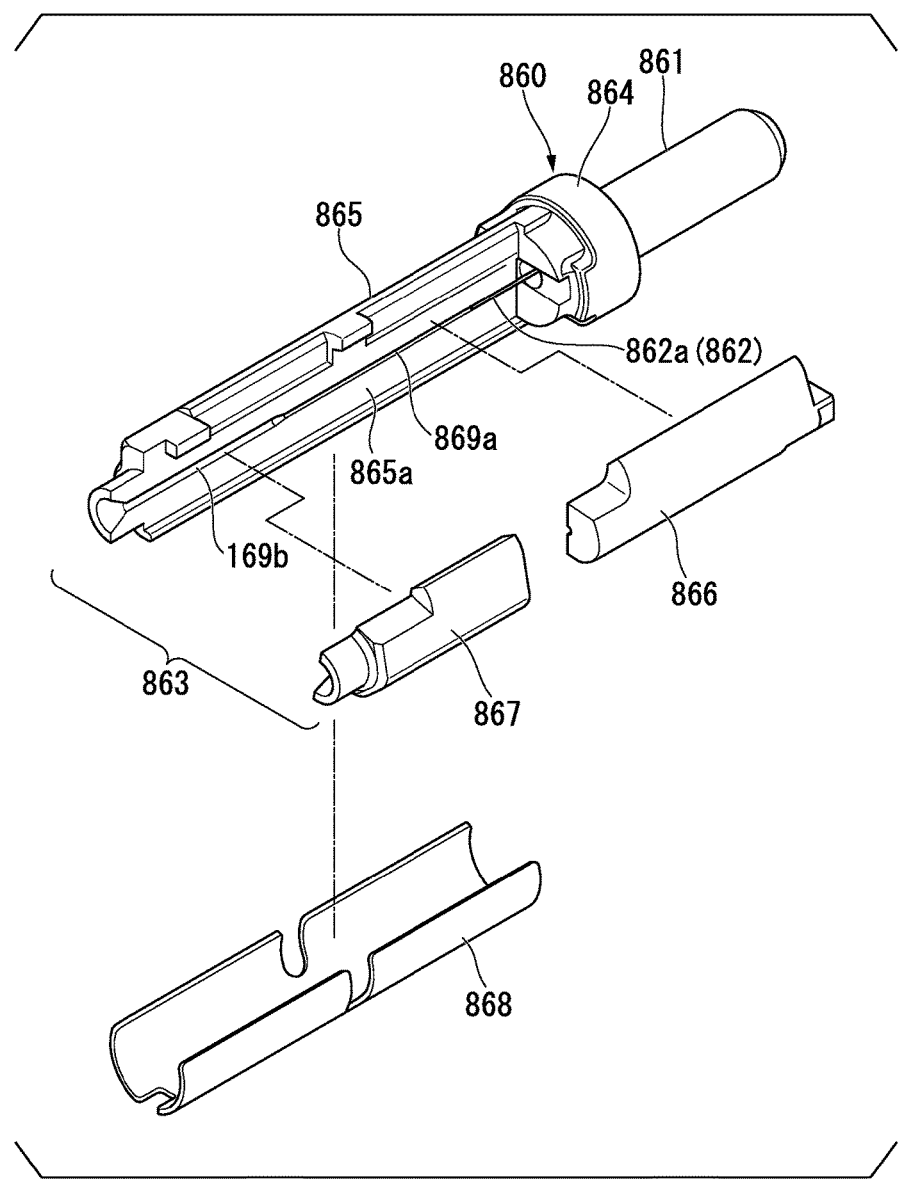
FIG. 60 is an exploded perspective view showing a structure of a clamp-attached ferrule according to the fifth embodiment of the invention.

As shown in FIGS. 58 and 60, in the clamp-attached ferrule 860, a clamp portion 863 (second mechanical splice, splicing mechanism) is incorporated into the back side of the ferrule 861 into which an optical fiber 862 (built-in optical fiber 862, first optical fiber, and one optical fiber) is inserted and fixed.

The clamp portion 863 holds and fixes a backward protruding portion 862a of the built-in optical fiber 862 and the leading-end portion of the optical fiber 701 that is inserted through the back side thereof and is brought into contact with the back end of the built-in optical fiber 862, and maintains a state where the optical fibers 862 and 1 are butt jointed to each other.

The clamp portion 863 includes: a base member 865 (rearward-extending portion 865) (base-side element) and lid members 866 and 867 (lid-side element) which extend rearward from a flange portion 864 of the ferrule 861; and a clamping spring 868 that collectively retains them thereinside.

The clamp portion 863 sandwiches, between the base member 865 and the lid members 866 and 867, the backward protruding portion 862a of the built-in optical fiber 862 and the leading-end portion of the inserted optical fiber 701 that is brought into contact with the back end of the built-in optical fiber 862, and thereby can hold and fix them.

The built-in optical fiber 862 is inserted into a fiber hole 861a that is a micro hole formed to penetrate therethrough on the same axis as that of the ferrule 861, and is fixed to the ferrule 861 by being adhesively-fixed using an adhesive or the like.

Therefore, the ferrule 861 functions as a positioning mechanism that fixes the position of the built-in optical fiber 862 at the front side of the clamp portion 863 with respect to the clamp portion 863.

The end face of the forward end of the built-in optical fiber 862 is exposed to the connection edge face 861b of the leading end (forward end) of the ferrule 861.

At the back-end portion of the ferrule 861, the flange portion 864 that is provided around the periphery thereof (provided to protrude therefrom) is integrated the ferrule.

The clamp portion 863 is configured to hold the rearward-extending portion 865 that extends from the flange portion 864 toward the back side of the ferrule 861 and the lid members 866 and 867 in the inside of the clamping spring 868.

On the opposed face 865a (groove formation face) that faces the lid members 866 and 867 of the rearward-extending portion 865, an alignment groove 869a that fixes the position of the backward protruding portion 862a of the built-in optical fiber 862 on a rearward extension of the fiber hole 861a of the ferrule 861 and a coated-portion accommodation groove 869b that extends rearward from the back end of the alignment groove 869a are formed.

A coated-portion accommodation groove 869c is extended and formed at the position corresponding to the coated-portion accommodation groove 869b of the rearward-extending portion 865 on the opposed face 867a of the rear lid member 867.

A flat opposed face 866a that faces the opposed face 865a of the rearward-extending portion 865 is formed on the front lid member 866.

Figure 61:
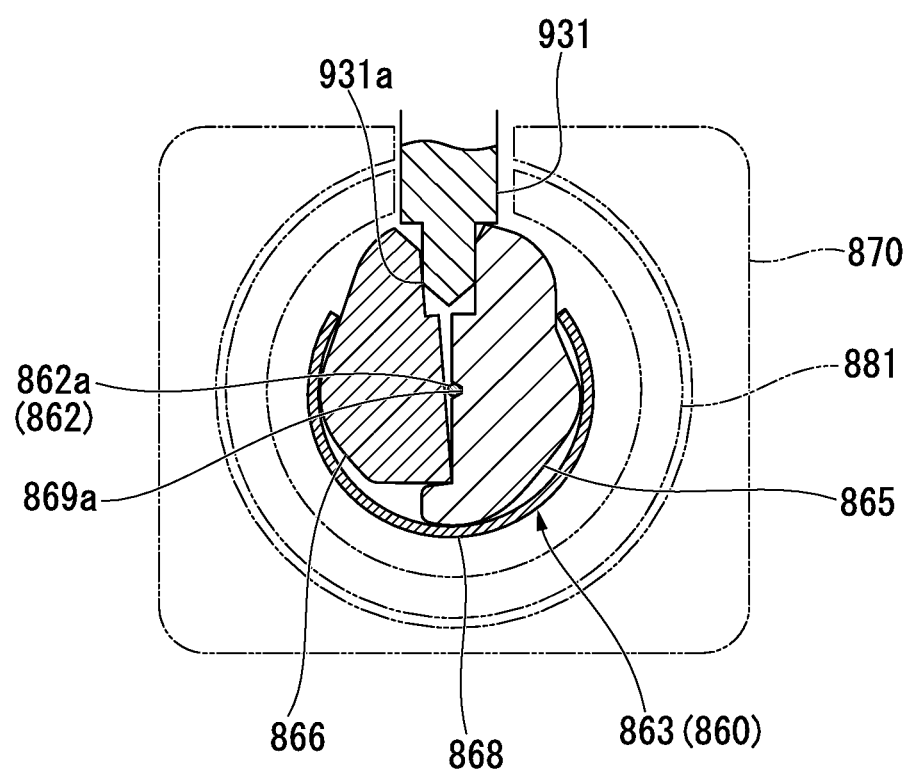
FIG. 61 is a cross-sectional view illustrating relationship between the clamp-attached ferrule according to the fifth embodiment of the invention and an interposing member.

An interposing-end portion 931a of a splicing tool 930 can be detachably interposed between the rearward-extending portion 865 and the lid members 866 and 867 (refer to FIG. 61).

As shown in FIG. 58, the interposing-end portion 931a can be inserted between the rearward-extending portion 865 of the clamp portion 863 and the lid members 866 and 867 through an insertion hole 870a of the finger grip 870 and an insertion hole 881a of the housing 880.

The housing 880 includes: a sleeve-shaped (cylindrical) body part 881; and a sleeve-shaped (cylindrical) extending cylinder 882 that extends rearward from the back end of the body part 881.

Two insertion holes 881a into which the interposing-end portion 931a is insertable are formed on the body part 881 at a distance in the axis direction thereof.

The two insertion holes 881a are formed at a distance in the axis direction of the body part 881.

It is preferable to form a recessed-and-projected portion 882a on the outer peripheral face of the extending cylinder 882.

The recessed-and-projected portion 882a shown as an example in the drawing includes a plurality of ring-shaped projecting portions that extend in the circumferential direction of the extending cylinder 882.

In FIG. 58, reference numeral 871 represents a positioning sleeve into which the ferrule 861 is to be inserted.

Reference numeral 872 represents a positioning tool that holds the clamp-attached ferrule 860 and fixes the position thereof.

The positioning tool 872 includes a base 873 and a pair of elastic portions 874 that extend from the base 873, and can hold the clamp-attached ferrule 860 between the elastic portions 874.

As shown in FIG. 58, the slider 920 includes: a substrate 921; a pair of side wall portions 922 provided upright on the top surface thereof; a housing support 923 that is formed to protrude forward from the forward end of the substrate 921; and a pair of elastic locking ends 925 that protrude upward from the substrate 921 and positions the optical connector 910.

The slider 920 can hold the optical connector 910 in a space 924 between the side wall portions 922.

The elastic locking ends 925 are formed in a plate shape that protrude upward from the upper edges of the side wall portions 922 and have leading-end portions having the inner surfaces on which locking projected portions 925a to be locked to the finger grip 870 of the optical connector 910 are formed.

The elastic locking ends 925 can elastically bend and deform.

The locking protrusions 927 that are to be engaged with engagement recesses 836c of elastic locking ends 836 of the connecting jig 810 are formed on outer surfaces of the side wall portions 922 so as to protrude outward therefrom.

As shown in FIGS. 58 and 59, the housing support 923 includes: a base body 926; and a pair of side plate portions 927 that protrude from the upper surface thereof, and can hold the extending cylinder 882 of the housing 880 in an accommodation space 928 between the side plate portions 927.

Figure 64:
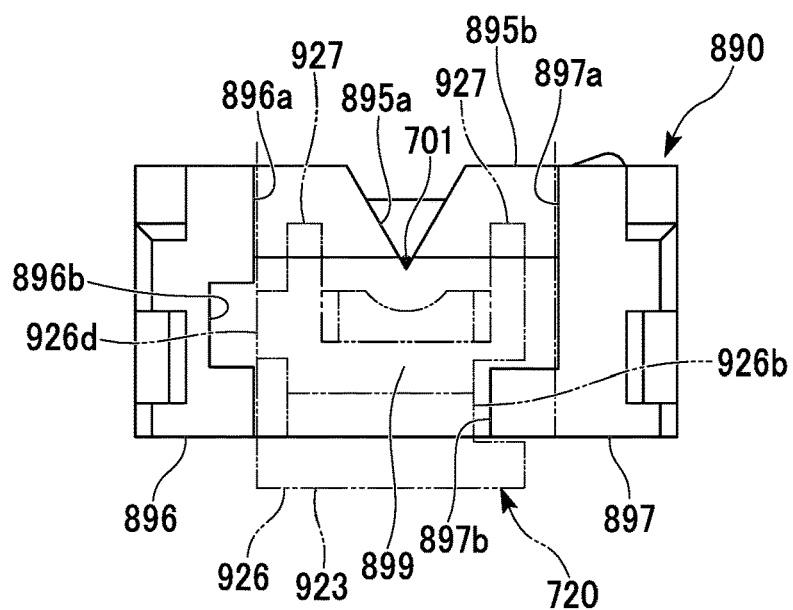
FIG. 64 is an anterior view showing a state in which a forward-end portion of a second optical fiber splicing unit is accommodated in a unit accommodation space of the second fiber holder used in the fifth embodiment.

As shown in FIGS. 59 and 64, a checking recess 926b into which a checking protuberance 897b of the other-side-extended portion 897 can be inserted is formed on the side surface 926a which is one surface of the base body 926 (near the other-side-extended portion 897 of the fiber holder 890).

The checking recess 926b shown as an example in the drawing is formed in a rectangular shape in cross section which is along the checking protuberance 897b formed in a rectangular shape in cross-section.

The checking recess 926b is formed in a groove shape extending in the front-back direction thereof.

A protuberance portion 926d that protrudes in the lateral direction and extends in the front-back direction is formed on the side surface 926c which is the other surface of the base body 926 (near the one-side-extended portion 896 of fiber holder 890).

As shown in FIGS. 58, 59, and 61, the splicing tool 930 can be attached to the clamp portion 863 of the clamp-attached ferrule 860.

The splicing tool 930 includes: two interposing members 931 that includes the interposing-end portions 931a that expand a space between the rearward-extending portion 865 of the clamp portion 863 and the lid members 866 and 867; the sleeve-shaped interposing member driving unit 932 that drives the interposing members 931; and a pair of the engagement walls 937 that protrude from the interposing member driving unit 932.

The two the interposing members 931 are provided on the interposing member driving unit 932 so as to be separated from each other in the axis direction of thereof.

The splicing tool 930 is attached to the clamp portion 863 in a state of causing the interposing-end portion 931a to be interposed between the rearward-extending portion 865 and the lid members 866 and 867.

The splicing tool 930 presses both the side portions of the interposing member driving unit 932 (refer to FIG. 47) and thereby causes they to approach each other, it is possible to move upward an opposed wall portion 935 with respect to the pressure-receiving wall 936 of the interposing member driving unit 932.

In this way, it is possible to remove the interposing-end portion 931a from the clamp portion 863.

Protruding claws 937a that are to be engaged with the optical fiber splicing unit 720 and protrude inward are formed at the protruding end portions of the engagement walls 937.

The splicing tool 930 can hold the optical fiber splicing unit 720 between the engagement walls 937.

Figure 62:
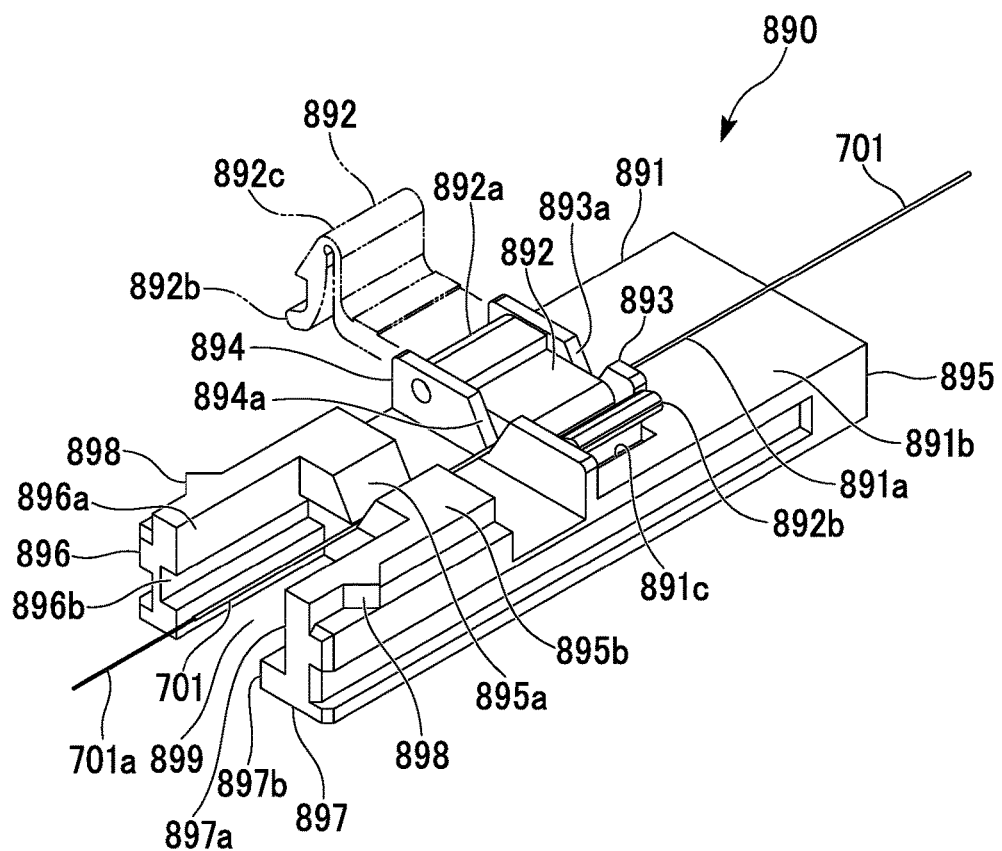
FIG. 62 is a perspective view showing a fiber holder according to the fifth embodiment of the invention.

As shown in FIG. 62, an optical fiber holder 890 that is to be mounted on the second guide 842 includes: a base 891; and a lid 892 that is rotatably coupled to the base 891 at a base part 892a serving as a hinge, presses the inserted optical fiber 701 provided on the base 891 onto the base 891 by the lid 892, and can grasp and fix it.

The lid 892 and the base 891 may be integrally formed together.

Regarding the fiber holder 890, the direction of approaching the optical fiber splicing unit 720 is referred to as front and the direction opposite thereto is referred to as rear.

The base 891 includes: a base body 895; a one-side-extended portion 896 that extends forward from one side portion of the front-edge face thereof; and the other-side-extended portion 897 that extends forward from the other side portion of the front-edge face of the base body 895.

The one-side-extended portion 896 and the other-side-extended portion 897 can accommodate the forward-end portion of the optical fiber splicing unit 720 in a unit accommodation space 899 (second unit accommodation space) ensured therebetween.

A groove-shaped recess portion 896b that extends in the front-back direction is formed on the inner surface 896a of the one-side-extended portion 896.

As shown in FIGS. 62 and 64, the checking protuberance 897b (second entry prevention portion) that protrudes inward is formed on the inner surface 897a of the other-side-extended portion 897 so as to extend in the front-back direction.

The checking protuberance 897b is formed in a shape that is inserted into the checking recess 926b of the optical fiber splicing unit 720, and prevents the leading-end portion thereof from entering the unit accommodation space 899 in the case of being used in an optical fiber splicing unit (for example, an optical fiber splicing unit 710 shown in FIG. 42) other than the optical fiber splicing unit 720.

The checking protuberance 897b shown as an example in the drawing is formed in a rectangular shape in cross section.

A first holding wall portion 893 including a positioning recess portion 893a that accommodates the inserted optical fiber 701 therein, a second holding wall portion 894 including a positioning recess portion 894a, and a table 895b including a positioning recess portion 895a are formed on the upper surface 891b of the base 891 (base body 895).

The second holding wall portion 894 is formed in front of the first holding wall portion 893 so as to be separated from the first holding wall portions 893.

The table 895b is formed in front of the second holding wall portion 894 so as to be separated from the second holding wall portion 894.

A linear positioning groove 891a that extends in the front-back direction from the positioning recess portion 893a through the positioning recess portion 894a is formed on the upper surface of the base 891 (base body 895).

The positioning groove 891a is a groove used to fix the position of the inserted optical fiber 701 and may be formed in, for example, in a substantially V-shape in cross section, in a substantially U-shape in cross section, a semicircular shape in cross section, or the like.

The locking protrusions 898 which are to be engaged with the engagement recesses 846c of the elastic locking ends 846 are formed on the outer-side faces of the one-side-extended portion 896 and the other-side-extended portion 897 so as to protrude toward the outside.

The shape of the locking protrusion 898 when seen in a plan view is preferably a tapered shape (for example, triangular shape) having the length in the back and forth direction where the length thereof increases in the direction from the protuberance edge to the base end side.

In a state where the upper surface 891b of the base 891 is covered with the lid 892 (closed state), the lid 892 is disposed between the holding wall portions 893 and 894.

A locking protuberance 892c is formed near the leading-end portion 892b positioned at the end portion opposite to the base part 892a (hinge) of the lid 892. The locking protuberance can be detachably fitted into the locking recess portion 891c formed on the base 891.

The lid 892 causes the locking protuberance 892c to be engaged with the locking recess portion 891c of the base 891 in a state where the upper surface 891b of the base 891 is covered with the lid (closed state), presses the inserted optical fiber 701 onto the base 891 (base body 895), and can grasp and fix it.

It is preferable that the first fiber holder 790 and the second fiber holder 890 have different colors.

For example, the first fiber holder 790 may be black and the second fiber holder 890 may be white.

Consequently, it is possible to visually and easily identify the first fiber holder 790 and the second fiber holder 890.

It is preferable that at least one portion of a first optical fiber splicing unit 710 have the color similar to that of the first fiber holder 790 and at least one portion of the second optical fiber splicing unit 720 have the color similar to that of the second fiber holder 890.

The similar color means that the same color or the color having a close color phase.

As long as the color phase is the same as or close to each other, lightness or chroma may be different.

For example, in the case where the first fiber holder 790 is black, the unit base 711 or the slider 820 of the first optical fiber splicing unit 710 can be black.

Moreover, in the case where the second fiber holder 890 is white, the slider 920 of the second optical fiber splicing unit 720 can be white.

As a result, since the right combination between of the optical fiber splicing units 710 and 720 and the fiber holders 790 and 890 is visually and easily identified, it is possible to reliably prevent an erroneous operation.

As the colors that can be adopted to the optical fiber splicing units 710 and 720 and the fiber holders 790 and 890, not only white and black but also red, blue, yellow, green, orange, or the like is used.

Next, a method of splicing (optical splice) the built-in optical fiber 862 to the inserted optical fiber 701 using the optical fiber splicing tool 900 will be described with reference to FIGS. 65A to 65D.

As shown in FIGS. 59 to 61, in advance, the interposing-end portion 931a is inserted between the rearward-extending portion 865 of the clamp portion 863 and the lid members 866 and 867 by attaching the splicing tool 930 to the optical fiber splicing unit 720, and therefore the inserted optical fiber 701 is in a state of being insertable thereinto.

As shown in FIG. 62, the inserted optical fiber 701 is disposed in the positioning groove 891a of the base 891, is pressed onto the base 891 by the lid 892, and is thereby held and fixed.

The inserted optical fiber 701 is fixed to the fiber holder 890 while ensuring a predetermined forward protruding length.

The fiber holder 890 is mounted on the slide surface 843 of a second rail portion 842, causes the locking protrusions 898 to be engaged with of the engagement recesses 846c of the elastic locking ends 846, and fixes the position thereof.

Figure 65A:
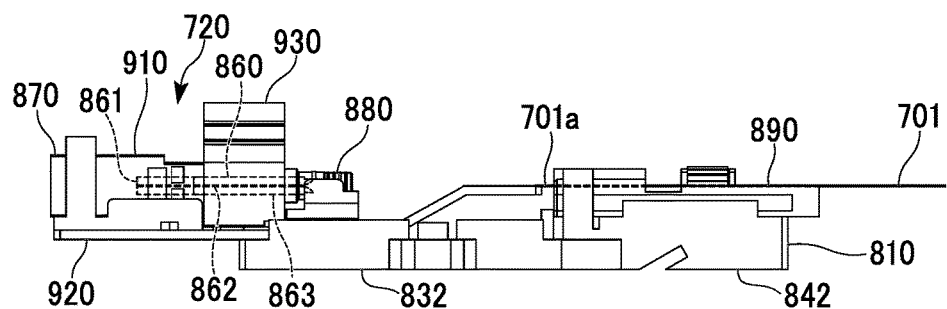
FIG. 65A is a flow sheet showing steps of assembling the optical fiber splicing tool.
Figure 65B:
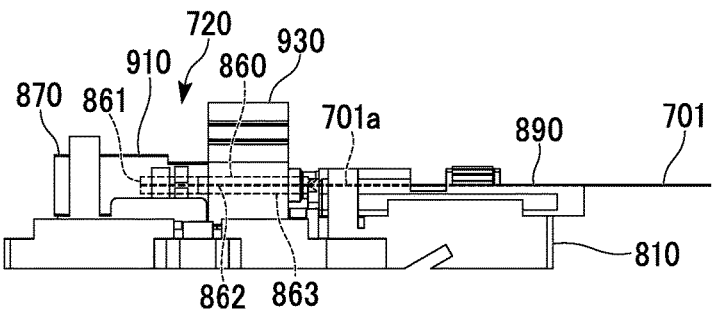
FIG. 65B is a flow sheet showing steps of assembling the optical fiber splicing tool.

Subsequently, as shown in FIGS. 65A and 65B, the optical fiber splicing unit 720 is mounted on the slide surface 833 of the first guide 832 of the connecting jig 810 and moves toward the fiber holder 890 in a state where movement thereof in the width direction thereof is restricted by the guide wall portions 835.

Figure 65C:
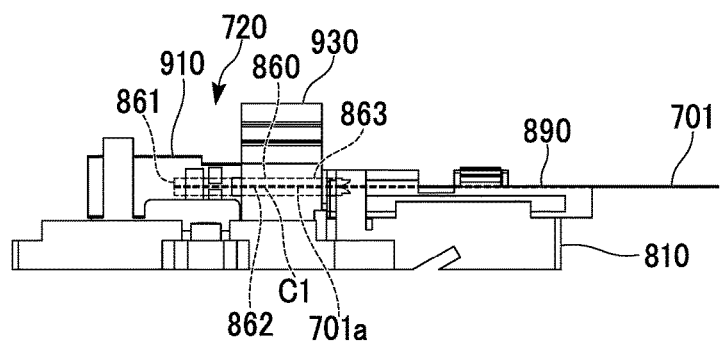
FIG. 65C is a flow sheet showing steps of assembling the optical fiber splicing tool.

In the movement of the optical fiber splicing unit 720, both the side edge portions 921a of the substrate 921 are inserted into the grooves 835a of the inner surfaces of the side wall portions 835, and the slider 920 is thereby restricted from being removed upward As shown in FIG. 65C, as a result of causing the locking protrusions 927 to be engaged with the engagement recesses 836c of the elastic locking ends 836 due to the forward movement of the optical fiber splicing unit 710, the optical fiber splicing unit 720 is sandwiched between the elastic locking ends 836 in a state of being stably held and positioned on the slide surface 833.

The position of the optical fiber splicing unit 720 is referred to as a forward-movement limit position.

The inserted optical fiber 701 is inserted into the alignment groove 869a of the clamp-attached ferrule 860 and is brought into contact with the back end of the built-in optical fiber 862.

Reference sign C1 represents the butt-jointing position.

Flexion may be produced in the inserted optical fiber 701 between the clamp-attached ferrule 860 and the fiber holder 890.

As shown in FIG. 62, at the forward-movement limit position, the forward-end portion of the optical fiber splicing unit 720 enters the second unit accommodation space 899 ensured between the one-side-extended portion 896 and the other-side-extended portion 897 of the fiber holder 890.

As shown in FIG. 64, at this time, since the checking protuberance 897b of the fiber holder 890 is inserted into the checking recess 926b of the optical fiber splicing unit 720, entry of the optical fiber splicing unit 720 is not prevented.

Therefore, the optical fiber splicing unit 720 can be sufficiently close to the grasping position of the inserted optical fiber 701.

Figure 65D:
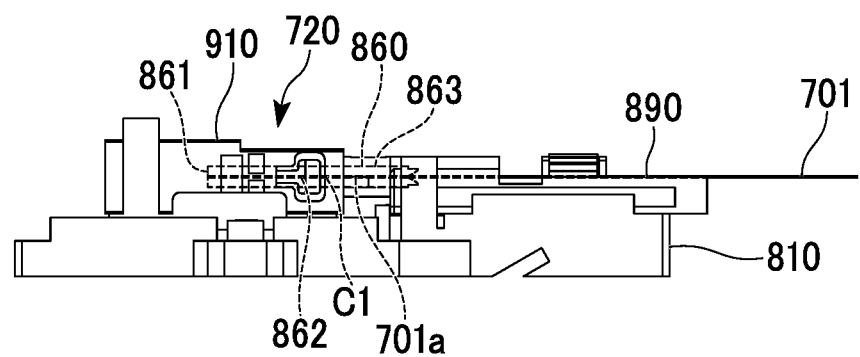
FIG. 65D is a flow sheet showing steps of assembling the optical fiber splicing tool.

As shown in FIG. 65D, the interposing-end portion 931a is removed from the clamp portion 863 by handling the splicing tool 930, and therefore the bare optical fiber 701a of the front end of the optical fiber 701 is held and fixed between the rearward-extending portion 865 and the lid members 866 and 867 due to elastic action of the clamping spring 868.

Because of this, it is possible to stably maintain a state where the optical fiber 701 is butt-jointed to the built-in optical fiber 862 of the clamp-attached ferrule 860.

As shown in FIG. 63, in the optical fiber splicing tool 800 according to the fourth embodiment, in the splicing of the optical fibers 701 and 721, since the checking protuberance 796b (first entry prevention portion) of the one-side-extended portion 796 of the first fiber holder 790 is inserted into the checking recess 762b of the first optical fiber splicing unit 710, the forward-end portion of the first optical fiber splicing unit 710 can enter the unit accommodation space 799 without difficulty.

On the other hand, as shown in FIG. 64, in the optical fiber splicing tool 900 according to the fifth embodiment, in the splicing of the optical fibers 862 and 721, since the checking protuberance 897b (second entry prevention portion) of the other-side-extended portion 897 of the second fiber holder 890 is inserted into the checking recess 926b of the second optical fiber splicing unit 720, the forward-end portion of the second optical fiber splicing unit 720 can enter the unit accommodation space 899 without difficulty.

As seen in FIGS. 63 and 64, a recess portion is not provided on the other side surface of the second optical fiber splicing unit 720; therefore, if the second optical fiber splicing unit 720 is attempted to be used to the first fiber holder 790, the second optical fiber splicing unit 720 is prevented from entering the unit accommodation space 799 by the checking protuberance 796*b* of the first fiber holder 790.

On the other hand, a recess portion is not provided on one side surface of the first optical fiber splicing unit 710; therefore, if the first optical fiber splicing unit 710 is attempted to be used to the second fiber holder 890, the first optical fiber splicing unit 710 is prevented from entering the unit accommodation space 899 by the checking protuberance 897*b* of the second fiber holder 890.

Figure 66:
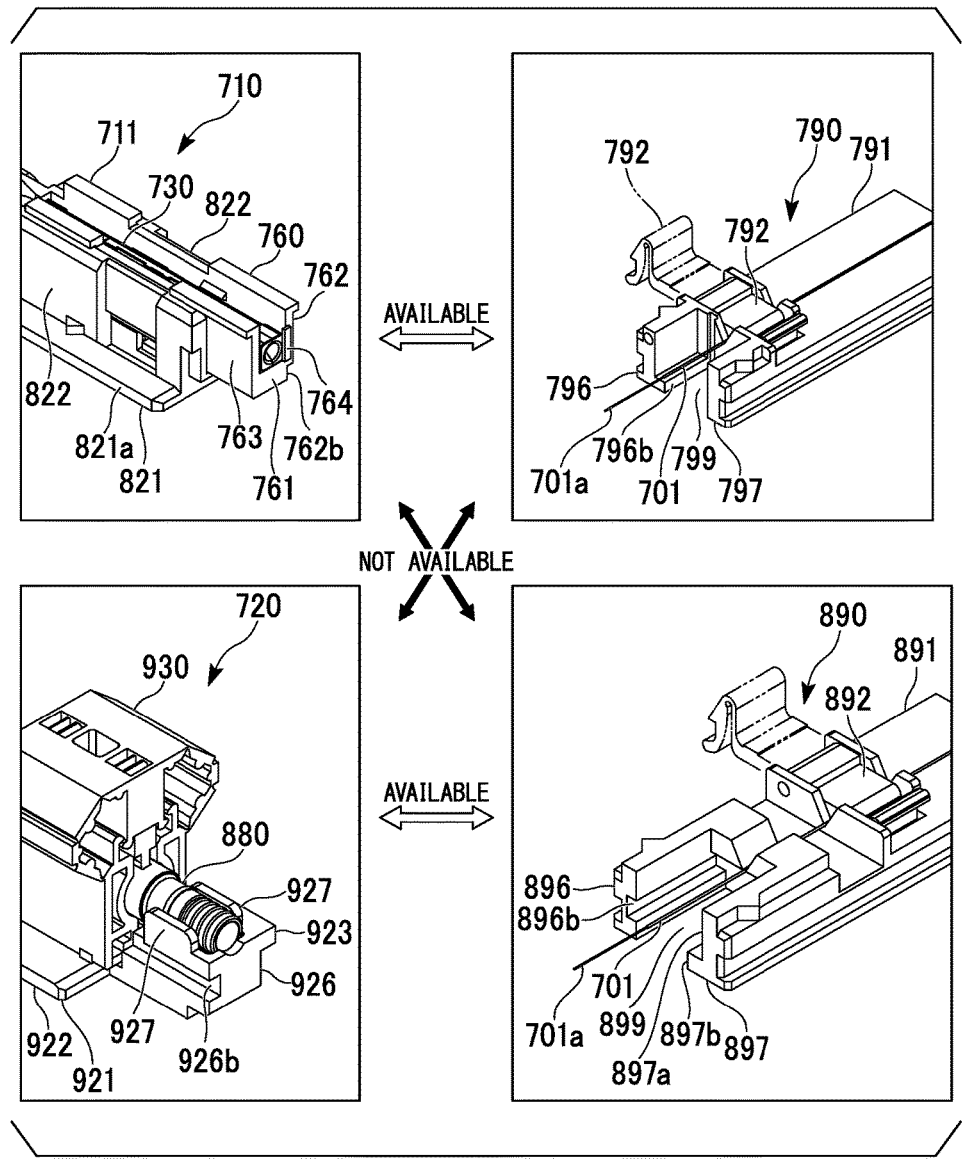
FIG. 66 is an explanatory diagram showing a combination of the optical fiber splicing unit and the fiber holder.

That is, as shown in FIG. 66, the combination of the first optical fiber splicing unit 710 and the second fiber holder 890 causes a trouble to a splicing operation. Similarly, the combination of the second optical fiber splicing unit 720 and the first fiber holder 890 also causes a trouble to a splicing operation.

In contrast, in the combination of the first optical fiber splicing unit 710 and the first fiber holder 890 and the combination of the second optical fiber splicing unit 720 and the second fiber holder 890, it is possible to uneventfully carry out splicing operation.

As described above, according to the optical fiber splicing tools 800 and 900, in the case where the combination of the optical fiber splicing units 710 and 720 or the combination of the fiber holders 790 and 890 is improper, it is not possible to carry out a splicing operation; therefore, it is possible to reliably prevent an erroneous operation.

In the aforementioned examples, the checking protuberance 796*b* (first entry prevention portion) is formed on the one-side-extended portion 796 of the first fiber holder 790 and the checking protuberance 897*b* (second entry prevention portion) is formed on the other-side-extended portion 897 of the second fiber holder 890.

Particularly, the first entry prevention portion of the first fiber holder 790 and the second entry prevention portion of the second fiber holder 890 are formed on the respective extended portions different from each other.

For this reason, even in the case where the entry positions of the optical fiber splicing units 710 and 720 with respect to the fiber holders 790 and 890 vary, it is possible to reliably prevent the optical fiber splicing units 710 and 720, whose combinations are different, from entering thereinto.

In the invention, as long as the first entry prevention portion comes into contact with the second optical fiber splicing unit and prevents the entry thereof, the configuration thereof is not limited to the examples shown in the drawings.

Similarly, as long as the second entry prevention portion comes into contact with the first optical fiber splicing unit and prevents the entry thereof, the configuration thereof is not limited to the examples shown in the drawings.

In the drawing shown as an example, a protuberance portion is formed on the fiber holder and the corresponding recess portion is formed on the optical fiber splicing unit; however, conversely, a recess portion may be formed on a fiber holder and the corresponding protuberance portion may be formed on the optical fiber splicing unit.

Furthermore, in the above-described example, the checking protuberance 796*b* (first entry prevention portion) is formed on the one-side-extended portion 796 of the first fiber holder 790 and the checking protuberance 897*b* (second entry prevention portion) is formed on the other-side-extended portion 897 of the second fiber holder 890; however, both the first and second entry prevention portions may be only formed on one of the one-side-extended portion and the other-side-extended portion.

In other cases, the shape of the first and second entry prevention portions is not limited to a rectangular shape in cross section, a circular arc shape in cross section, a polygonal shape in cross section, or the like may be adopted.

Specific constitutions of a splice, an interposing member, and a fiber holder are not limited as long as they are applied to a technical concept of the invention.

The inserted optical fiber is not particularly limited and may be adopted to, for example, an optical fiber that is installed in a vertical hole (for example, a hoistway used for an elevator) provided at each floor of a construction including a plurality of floors, indoor optical fibers, optical fibers that are provided in an optical composite electronic device, or the like.

Sixth Embodiment

Hereinafter, an optical fiber splicing tool according to one embodiment of the invention will be described.

In the sixth embodiment, identical reference numerals are used for the elements which are identical to those of the first embodiment, the second embodiment, the third embodiment, the fourth embodiment, and the fifth embodiment, and the explanations thereof are omitted or simplified here.

Figure 67:
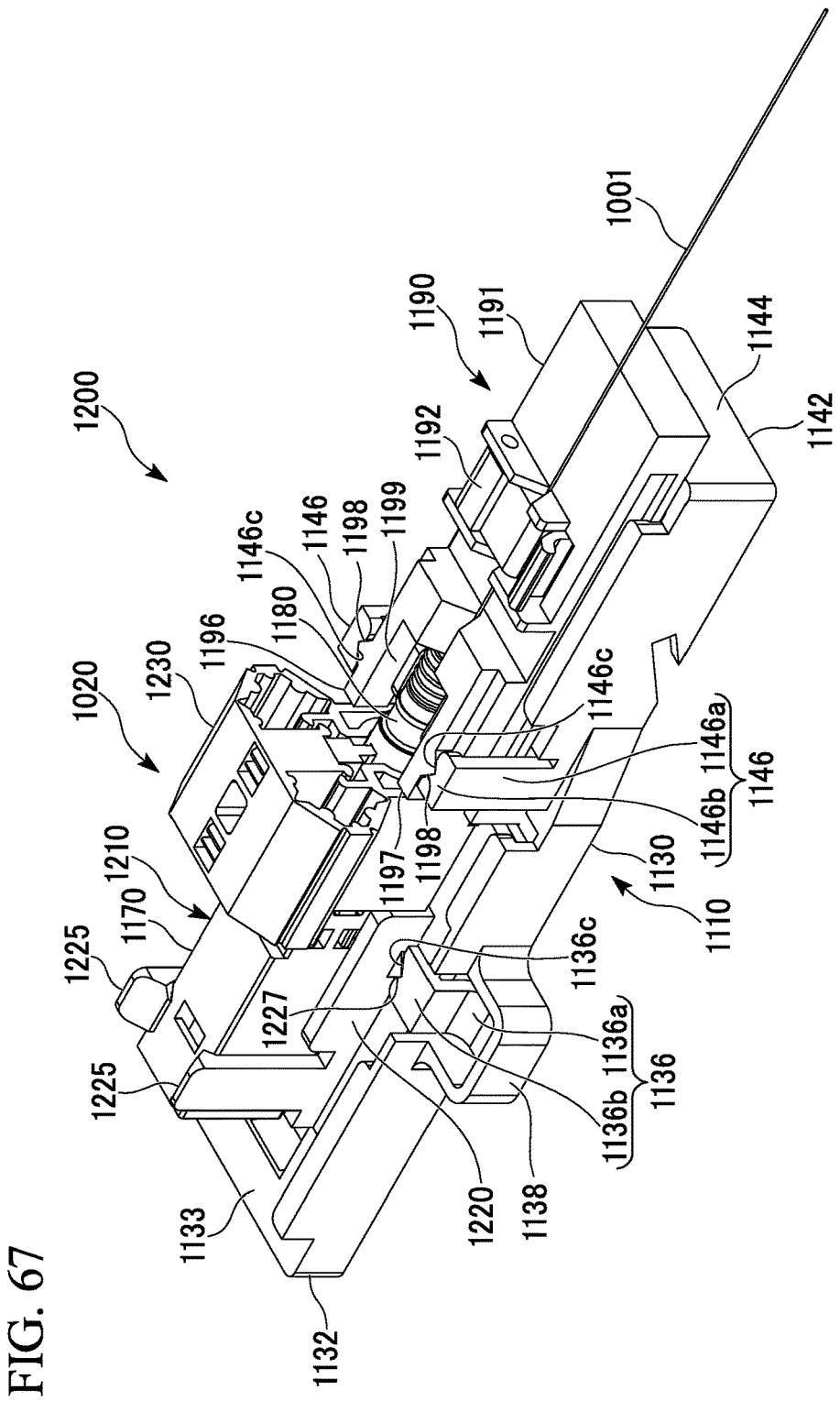
FIG. 67 is a perspective view showing an optical fiber splicing tool according to a sixth embodiment of the invention.
Figure 68:
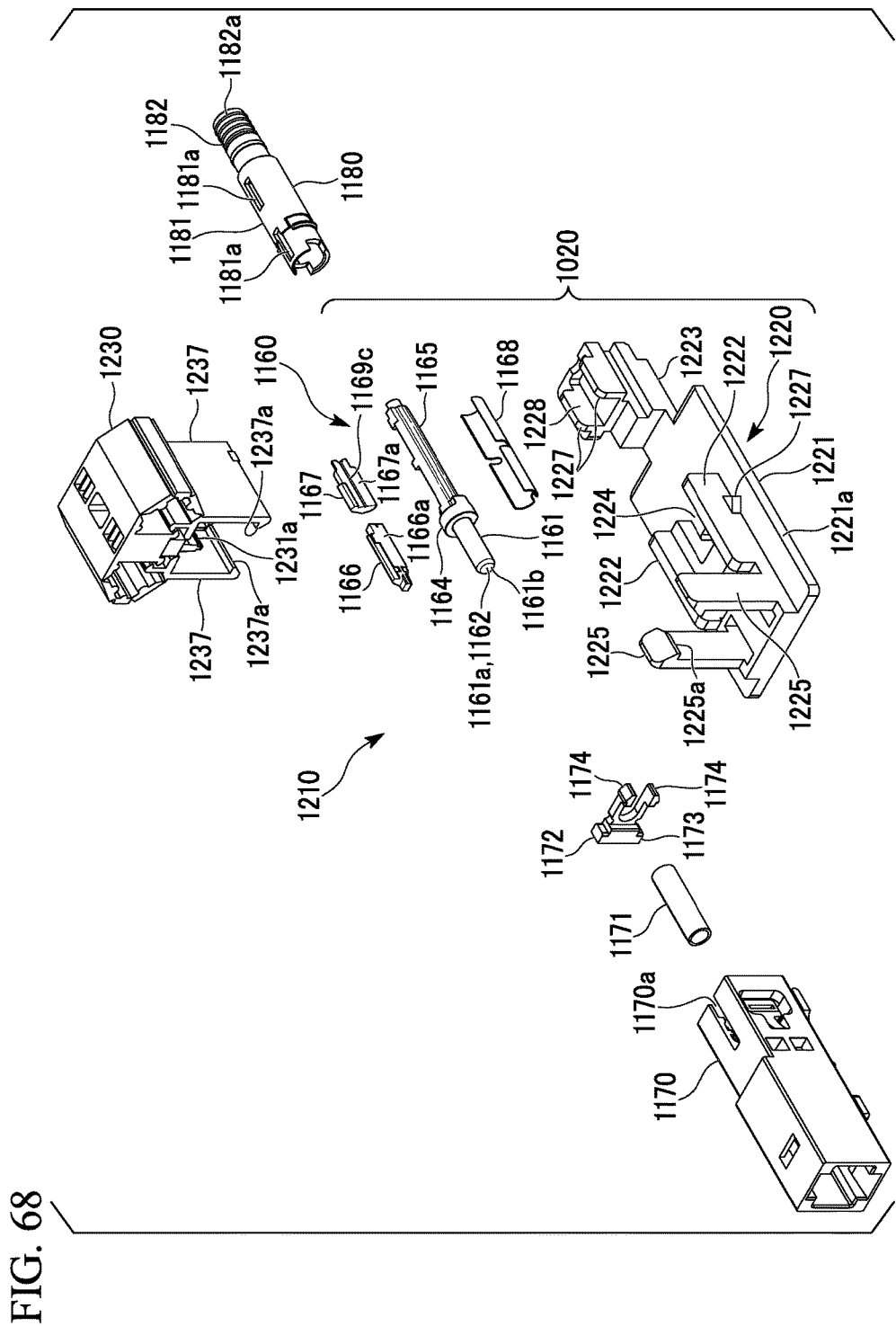
FIG. 68 is an exploded perspective view showing the optical fiber splicing tool according to the sixth embodiment of the invention.
Figure 69:
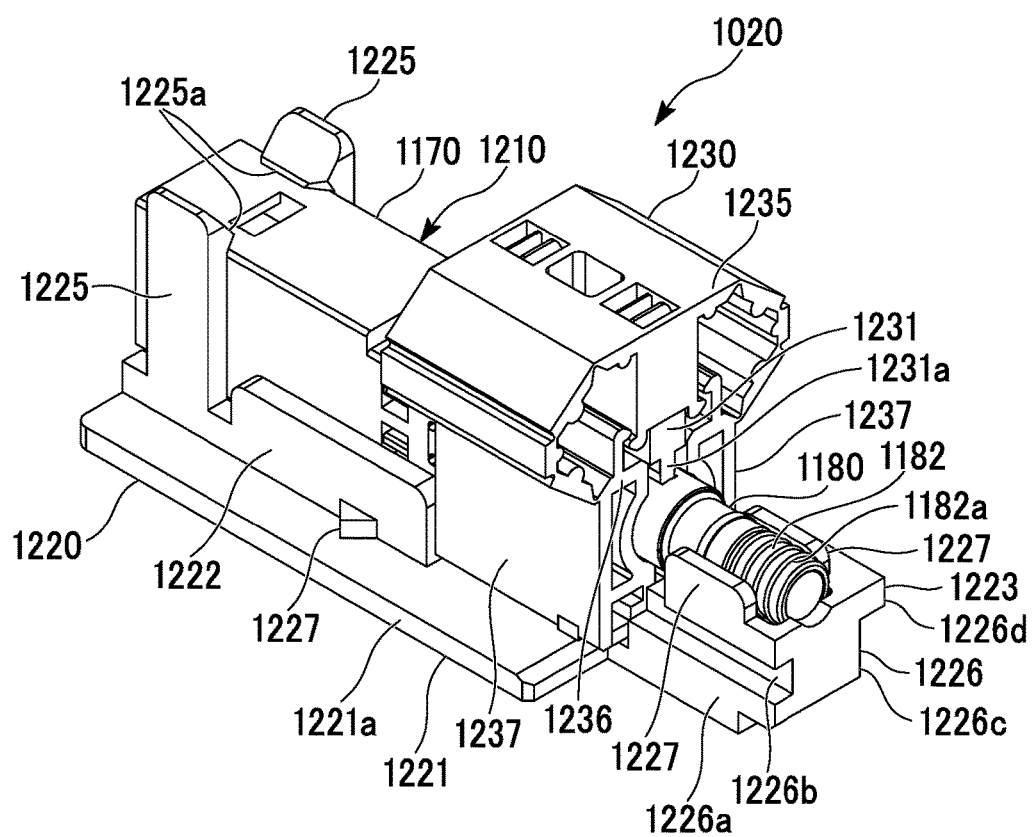
FIG. 69 is a perspective view showing an optical fiber splicing unit according to the sixth embodiment of the invention.

As shown in FIGS. 67 to 69, an optical fiber splicing tool 1200 includes: an optical fiber splicing unit 1020 provided with an optical connector 1210; and a connecting jig 1110 including a fiber holder 1190 grasping an inserted optical fiber 1001001.

The optical fiber splicing unit 1020 includes: the optical connector 1210; and a slider 1220 (guide target) that holds this.

Regarding the optical fiber splicing unit 1020, the direction of approaching the fiber holder 1190 is referred to as front and the direction opposite thereto is referred to as rear.

Additionally, only in explanation regarding a clamp-attached ferrule 1160, the direction toward a connection edge face 1161*b* of a ferrule 1161 may be referred to as the forward.

As shown in FIG. 68, the optical connector 1210 includes: a sleeve-shaped finger grip 1170 having a rectangular shape in cross section; a sleeve-shaped housing 1180 provided in the finger grip 1170; and the clamp-attached ferrule 1160 provided in the housing 1180.

Figure 70:
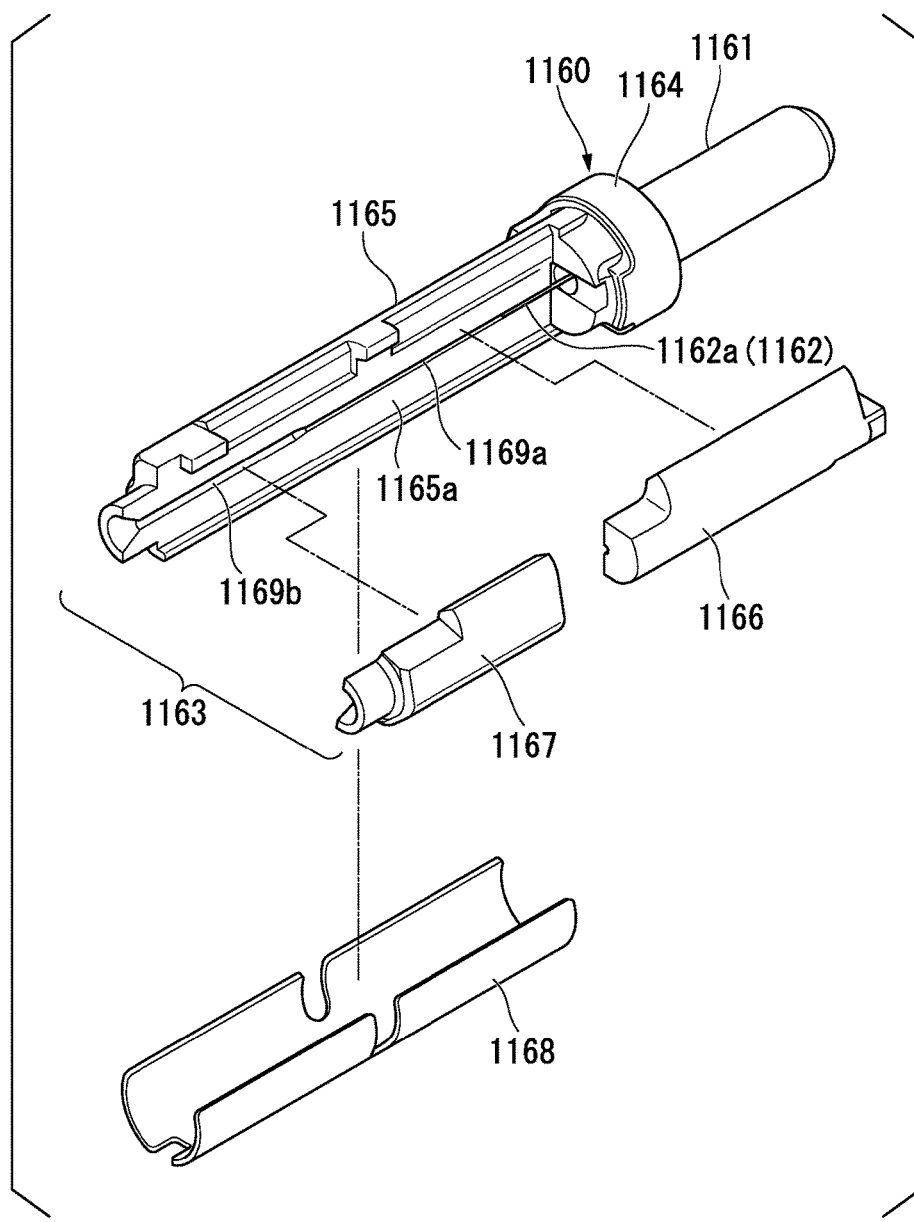
FIG. 70 is an exploded perspective view showing a structure of a clamp-attached ferrule according to the sixth embodiment of the invention.

As shown in FIGS. 68 and 70, in the clamp-attached ferrule 1160, a clamp portion 1163 (splicing mechanism) is incorporated into the back side of the ferrule 1161 into which fibers 1001 and 1162 (first optical fiber) are inserted and fixed.

The clamp portion 1163 holds and fixes a backward protruding portion 1162*a* of the built-in optical fibers 1001 and 1162 and the leading-end portion of the optical fiber 10011 that is inserted through the back side thereof and is brought into contact with the back ends of the built-in optical fibers 1001 and 1162, and maintains a state where the optical fibers 1001 and 1162 are butt jointed to each other.

The clamp portion 1163 includes: a base member 1165 (rearward-extending portion 1165) (base-side element) and lid members 1166 and 1167 (lid-side element) which extend rearward from a flange portion 1164 of the ferrule 1161; and a clamping spring 1168 that collectively retains them thereinside.

The clamp portion 1163 sandwiches, between the base member 1165 and the lid members 1166 and 1167, the backward protruding portion 1162*a* of the built-in optical fibers 1001 and 1162 and the leading-end portion of the inserted optical fiber 1001 that is brought into contact with the back ends of the built-in optical fibers 1001 and 1162, and thereby can hold and fix them.

The built-in optical fibers 1001 and 1162 are inserted into a fiber hole 1161a that is a micro hole formed to penetrate therethrough on the same axis as that of the ferrule 1161, and is fixed to the ferrule 1161 by being adhesively-fixed using an adhesive or the like.

Therefore, the ferrule 1161 functions as a positioning mechanism that fixes the position of the built-in optical fibers 1001 and 1162 at the front side of the clamp portion 1163 with respect to the clamp portion 1163.

The end face of the forward end of the built-in optical fibers 1001 and 1162 is exposed to the connection edge face 1161b of the leading end (forward end) of the ferrule 1161.

At the back-end portion of the ferrule 1161, the flange portion 1164 that is provided around the periphery thereof (provided to protrude therefrom) is integrated the ferrule.

The clamp portion 1163 is configured to hold the rearward-extending portion 1165 that extends from the flange portion 1164 toward the back side of the ferrule 1161 and the lid members 1166 and 1167 in the inside of the clamping spring 1168.

On the opposed face 1165a (groove formation face) that faces the lid members 1166 and 1167 of the rearward-extending portion 1165, an alignment groove 1169a that fixes the position of the backward protruding portion 1162a of the built-in optical fibers 1001 and 1162 on a rearward extension of the fiber hole 1161a of the ferrule 1161 and a coated-portion accommodation groove 1169b that extends rearward from the back end of the alignment groove 1169a are formed.

A coated-portion accommodation groove 1169c is extended and formed at the position corresponding to the coated-portion accommodation groove 1169b of the rearward-extending portion 1165 on the opposed face 1167a of the rear lid member 1167.

A flat opposed face 1166a that faces the opposed face 1165a of the rearward-extending portion 1165 is formed on the front lid member 1166.

Figure 71:
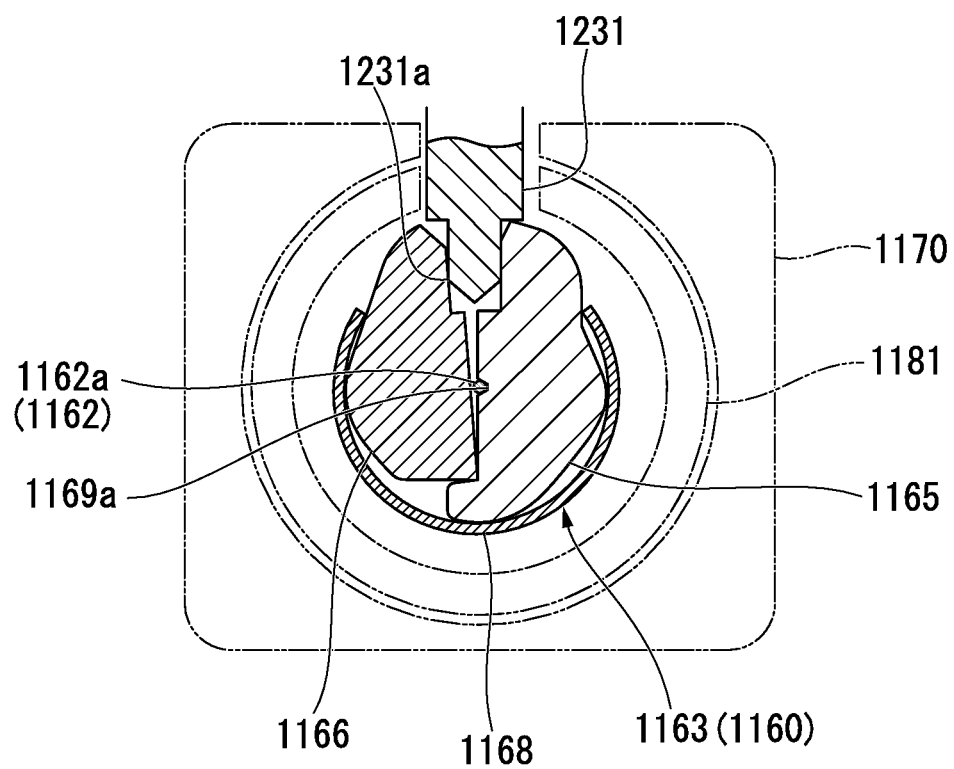
FIG. 71 is a cross-sectional view illustrating relationship between the clamp-attached ferrule according to the sixth embodiment of the invention and an interposing member.

An interposing-end portion 1231a of a splicing tool 1230 can be detachably interposed between the rearward-extending portion 1165 and the lid members 1166 and 1167 (refer to FIG. 71).

As shown in FIG. 68, the interposing-end portion 1231a can be inserted between the rearward-extending portion 1165 of the clamp portion 1163 and the lid members 1166 and 1167 through an insertion hole 1170a of the finger grip 1170 and an insertion hole 1181a of the housing 1180.

The housing 1180 includes: a sleeve-shaped (cylindrical) body part 1181; and a sleeve-shaped (cylindrical) extending cylinder 1182 that extends rearward from the back end of the body part 1181.

Two insertion holes 1181a into which the interposing-end portion 1231a is insertable are formed on the body part 1181 at a distance in the axis direction thereof.

The two insertion holes 1181a are formed at a distance in the axis direction of the body part 1181.

It is preferable to form a recessed-and-projected portion 1182a on the outer peripheral face of the extending cylinder 1182.

The recessed-and-projected portion 1182a shown as an example in the drawing includes a plurality of ring-shaped projecting portions that extend in the circumferential direction of the extending cylinder 1182.

In FIG. 68, reference numeral 1171 represents a positioning sleeve into which the ferrule 1161 is to be inserted.

Reference numeral 1172 represents a positioning tool that holds the clamp-attached ferrule 1160 and fixes the position thereof.

The positioning tool 1172 includes a base 1173 and a pair of elastic portions 1174 that extend from the base 1173, and can hold the clamp-attached ferrule 1160 between the elastic portions 1174.

Figure 72:
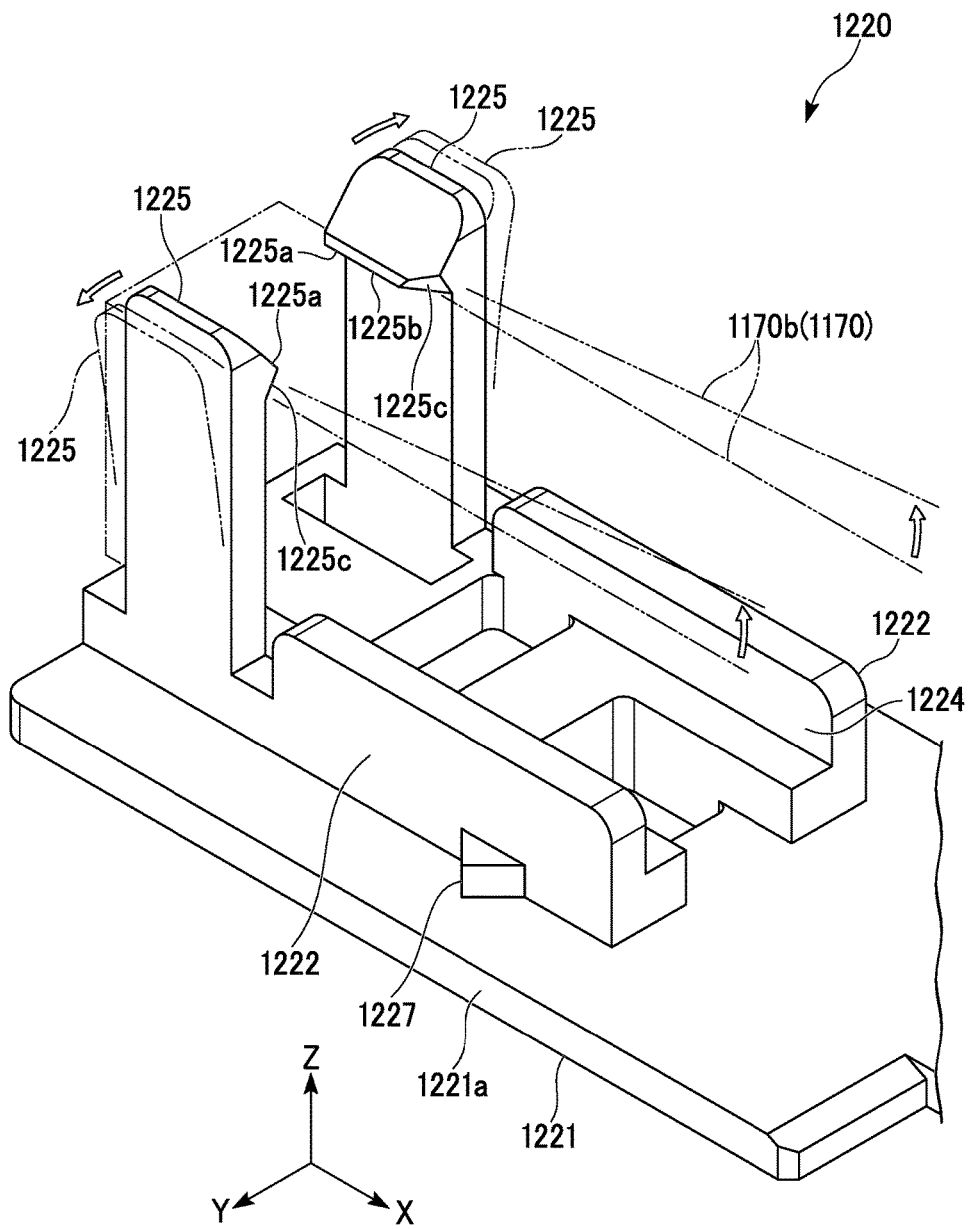
FIG. 72 is a perspective view showing a slider according to the sixth embodiment of the invention.

As shown in FIGS. 68 and 72, the slider 1220 includes: a substrate 1221 (base); a pair of side wall portions 1222 provided upright on the top surface thereof; a pair of elastic locking ends 1225 that protrude upward from the top surface of the substrate 1221 and positions the optical connector 1210; and a housing support 1223 that is formed to protrude forward from the forward end of the substrate 1221.

The slider 1220 can hold, between the side wall portions 1222, the optical connector 1210 that is in an orientation along the front-back direction in a space 1224.

As shown in FIG. 72, the elastic locking end 1225 is formed in a plate shape that protrudes upward from the substrate 1221 near the rearward of the side wall portion 1222.

Hereinafter, the structure will be described with reference to an XYZ orthogonal coordinate shown in FIG. 72.

The X-direction is a front-back direction and is a direction parallel to the side wall portion 1222 the elastic locking ends 1225.

The Y-direction is a direction orthogonal to the X-direction on a plane surface parallel to the substrate 1221 and the Z-direction is a height direction orthogonal to the X-direction and the Y-direction.

The elastic locking ends 1225 are formed in a long plate shape in which the width direction thereof is along the front-back direction (X-direction) and the longitudinal direction thereof is along the height direction (Z-direction), and locking projected portions 1225a to be engaged with side edge portions 1170b of the finger grips 1170 of the optical connector 1210 are formed on the inner surfaces of the leading-end portions thereof.

The elastic locking ends 1225 is formed in a plate shape that can be elastically bended, restricts lateral movement of the finger grip 1170, and can fix the position of the optical connector 1210.

Figure 73:
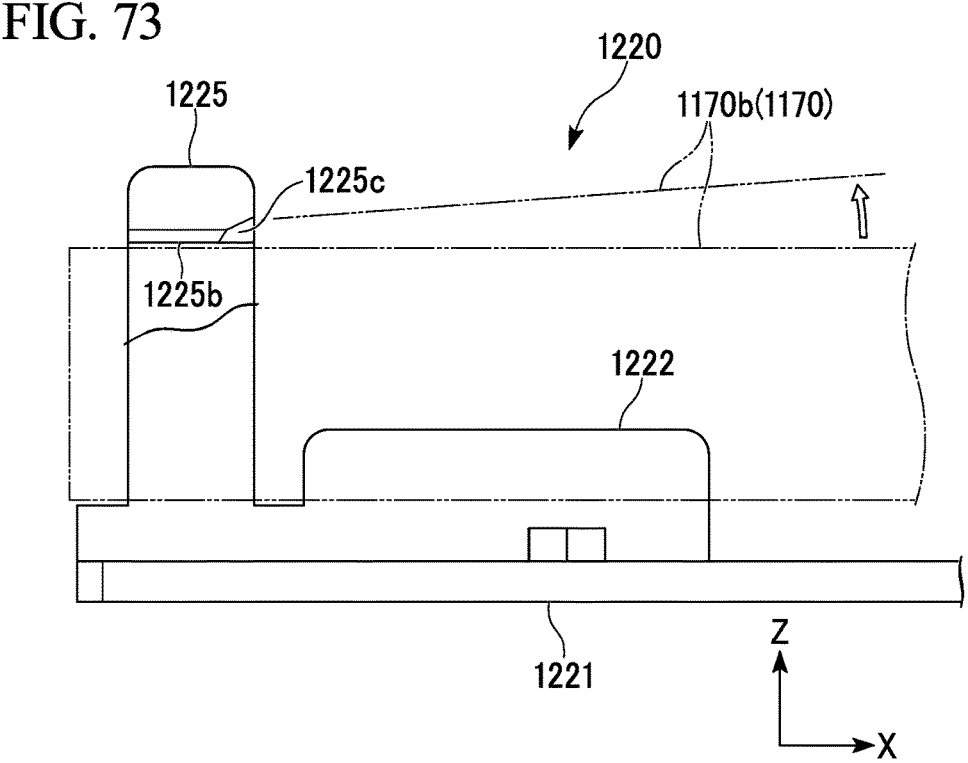
FIG. 73 is a side view showing the slider according to the sixth embodiment of the invention.
Figure 74:
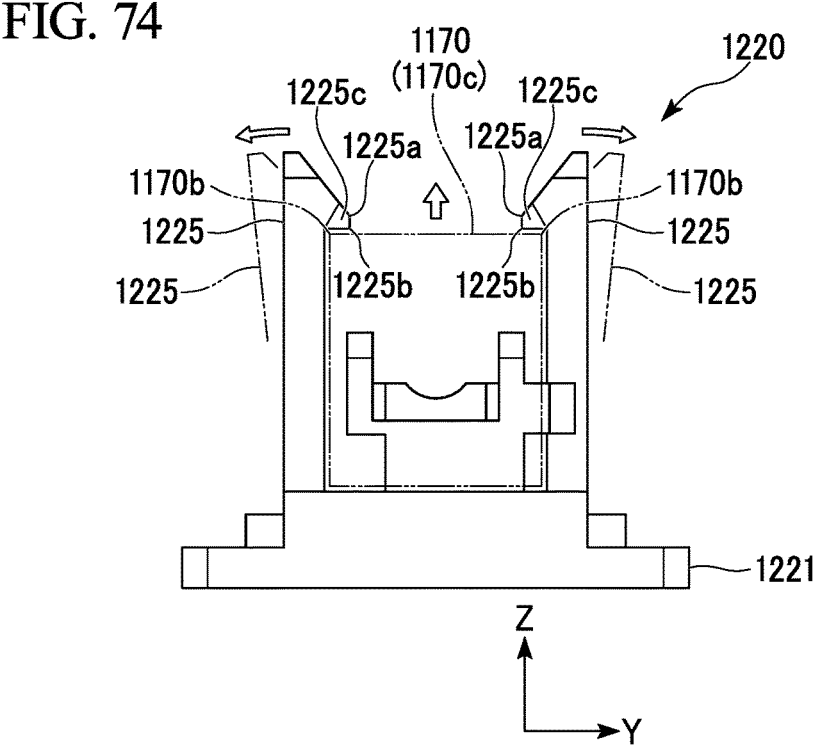
FIG. 74 is an anterior view showing the slider according to the sixth embodiment of the invention.

As shown in FIGS. 72 to 74, the locking projected portion 1225a is a protuberance that protrudes inward and has a substantially trapezoidal shape in cross section and is formed so as to extend in the width direction (X-direction) of the elastic locking end 1225.

The locking projected portion 1225a shown as an example in the drawing is formed in the substantially entire width range of the elastic locking end 1225.

Figure 75A:
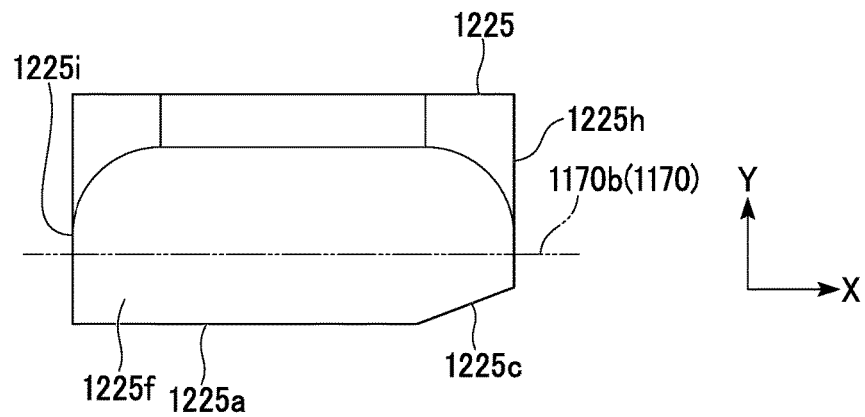
FIG. 75A is a plan view showing a locking projected portion of an elastic locking end according to the sixth embodiment of the invention.
Figure 75B:
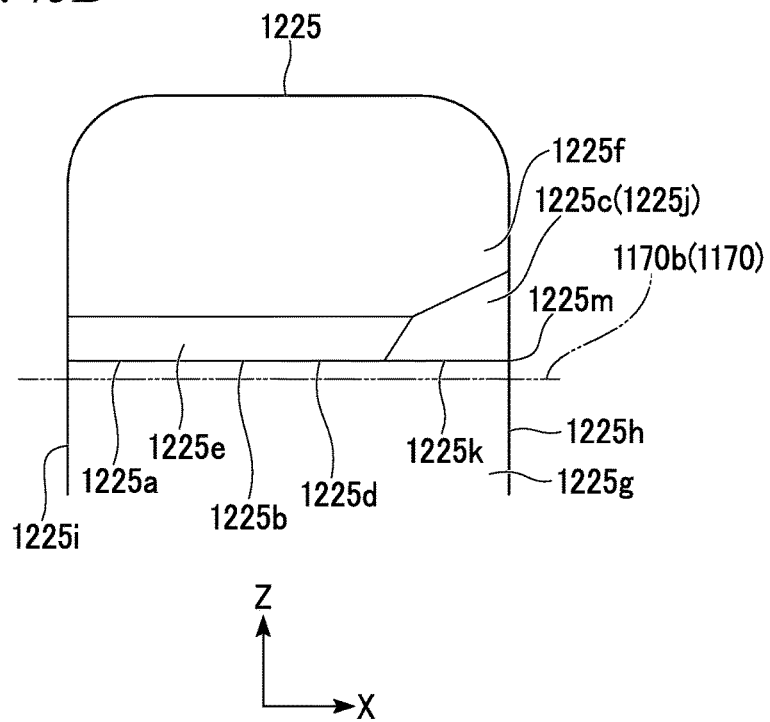
FIG. 75B is a side view showing the locking projected portion of the elastic locking end according to the sixth embodiment of the invention.
Figure 75C:
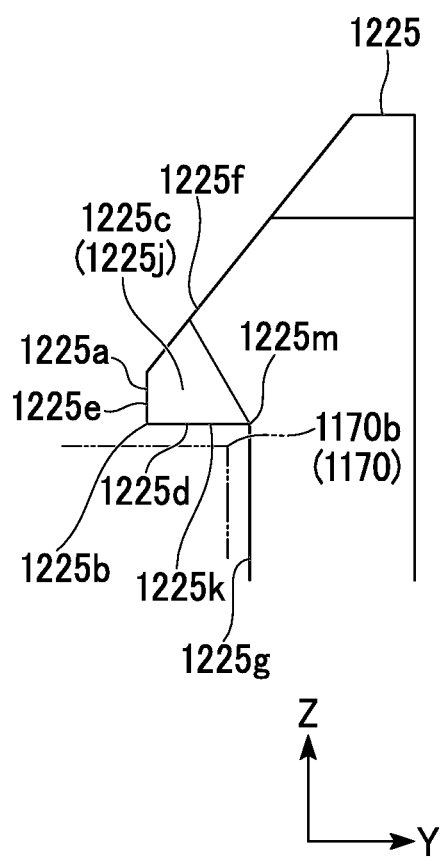
FIG. 75C is an anterior view showing the locking projected portion of the elastic locking end according to the sixth embodiment of the invention.

FIGS. 75A to 75C shows the locking projected portion 1225a, FIG. 75A is a plan view, FIG. 75B is a side view, and FIG. 75C is an anterior view.

As shown in FIG. 75C, the cross-sectional shape of the locking projected portion 1225a is a substantially trapezoidal shape having a lower surface 1225d along an XY plane, a side surface 1225e along an XZ plane, and an upper surface 1225f that is an inclined surface gradually directed downward to the protruding direction (inward).

The locking projected portion 1225a is formed to protrude upward from the upper surface 1170c of the finger grip 1170 in a state where the elastic locking ends 1225 are not deformed, restricts the upward movement of the finger grip 1170, and can position the optical connector 1210.

A cutout 1225c is formed at the forward-end portion of the locking projected portion 1225a.

A cutout surface 1225j formed by the cutout 1225c is an inclined surface such that the protruding height thereof (protruding height from the inner surface 1225g of the elastic locking end 1225) (refer to FIG. 75C) gradually decreases in the direction toward the forward thereof (the right in FIGS. 75A and 75B).

The lower edge 1225k (inclined inner edge) of the cutout surface 1225j is inclined so as to gradually approach the inner surface 1225g in the direction toward the forward thereof (the right in FIG. 75B).

The lower edge 1225k shown as an example in the drawing reaches the inner surface 1225g at the forward-most end 1225m thereof.

That is, the protruding height (protruding height from the inner surface 1225g) of the lower edge 1225k of the cutout surface 1225j gradually decreases in the direction toward the forward thereof and the protruding height becomes zero at the forward-most end 1225m.

The locking protrusions 1227 that are to be engaged with engagement recesses 1136c of elastic locking ends 1136 of the connecting jig 1110 are formed on outer surfaces of the side wall portions 1222 so as to protrude outward therefrom.

As shown in FIGS. 68 and 69, the housing support 1223 includes: a base body 1226; and a pair of side plate portions 1227 that protrude from the upper surface thereof, and can hold the extending cylinder 1182 of the housing 1180 in an accommodation space 1228 between the side plate portions 1227.

As shown in FIG. 69, a checking recess 1226b into which a checking protuberance 1197b of the other-side-extended portion 1197 can be inserted is formed on the side surface 1226a which is one surface of the base body 1226 (near the other-side-extended portion 1197 of the fiber holder 1190).

The checking recess 1226b is formed in a groove shape extending in the front-back direction thereof.

A protuberance portion 1226d that protrudes in the lateral direction and extends in the front-back direction is formed on the side surface 1226c which is the other surface of the base body 1226 (near the one-side-extended portion 1196 of fiber holder 1190). The slider 1220 may be an integral molding product made of plastic.

As shown in FIGS. 68, 69, and 71, the splicing tool 1230 can be attached to the clamp portion 1163 of the clamp-attached ferrule 1160.

The splicing tool 1230 includes: two interposing members 1231 that includes the interposing-end portions 1231a that expand a space between the rearward-extending portion 1165 of the clamp portion 1163 and the lid members 1166 and 1167; the sleeve-shaped interposing member driving unit 1232 that drives the interposing members 1231; and a pair of the engagement walls 1237 that protrude from the interposing member driving unit 1232.

The two the interposing members 1231 are provided on the interposing member driving unit 1232 so as to be separated from each other in the axis direction of thereof.

The splicing tool 1230 is attached to the clamp portion 1163 in a state of causing the interposing-end portion 1231a to be interposed between the rearward-extending portion 1165 and the lid members 1166 and 1167.

The splicing tool 1230 presses both the side portions of the interposing member driving unit 1232 and thereby causes they to approach each other, it is possible to move upward an opposed wall portion 1235 with respect to the pressure-receiving wall 1236 of the interposing member driving unit 1232.

In this way, it is possible to remove the interposing-end portion 1231a from the clamp portion 1163.

Protruding claws 1237a that are to be engaged with the optical fiber splicing unit 1020 and protrude inward are formed at the protruding end portions of the engagement walls 1237.

The splicing tool 1230 can hold the optical fiber splicing unit 1020 between the engagement walls 1237.

Figure 76:
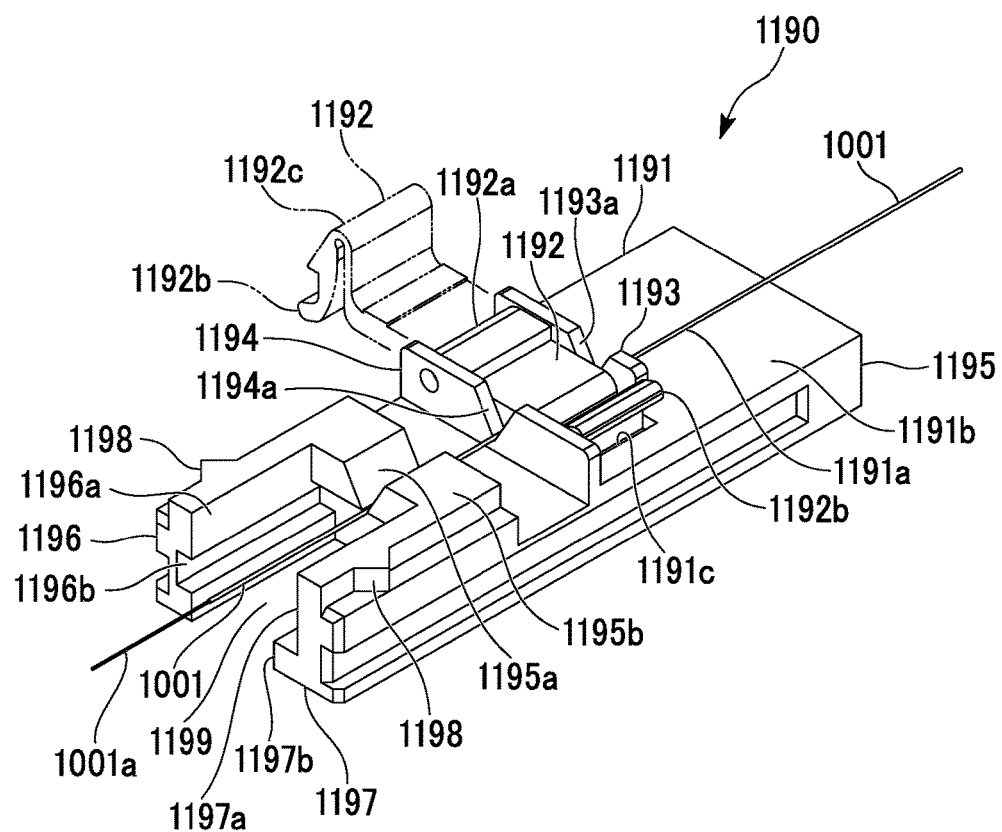
FIG. 76 is a perspective view showing a fiber holder according to the sixth embodiment of the invention.

As shown in FIG. 76, an optical fiber holder 1190 that is to be mounted on the second guide 1142 includes: a base 1191; and a lid 1192 that is rotatably coupled to the base 1191 at a base part 1192a serving as a hinge, presses the inserted optical fiber 1001 provided on the base 1191 onto the base 1191 by the lid 1192, and can grasp and fix it.

Regarding the fiber holder 1190, the direction of approaching the optical fiber splicing unit 1020 is referred to as front and the direction opposite thereto is referred to as rear.

The base 1191 includes: a base body 1195; a one-side-extended portion 1196 that extends forward from one side portion of the front-edge face thereof; and the other-side-extended portion 1197 that extends forward from the other side portion of the front-edge face of the base body 1195.

The one-side-extended portion 1196 and the other-side-extended portion 1197 can accommodate the forward-end portion of the optical fiber splicing unit 1020 in a unit accommodation space 1199 (second unit accommodation space) ensured therebetween.

A groove-shaped recess portion 1196b that extends in the front-back direction is formed on the inner surface 1196a of the one-side-extended portion 1196.

The checking protuberance 1197b that protrudes inward is formed on the inner surface 1197a of the other-side-extended portion 1197 in the front-back direction.

The checking protuberance 1197b is formed in a shape that is to be inserted into the checking recess 1226b of the optical fiber splicing unit 1020.

A first holding wall portion 1193 including a positioning recess portion 1193a that accommodates the inserted optical fiber 1001 therein, a second holding wall portion 1194 including a positioning recess portion 1194a, and a table 1195b including a positioning recess portion 1195a are formed on the upper surface 1191b of the base 1191 (base body 1195).

The second holding wall portion 1194 is formed in front of the first holding wall portion 1193 so as to be separated from the first holding wall portions 1193.

The table 1195b is formed in front of the second holding wall portion 1194 so as to be separated from the second holding wall portion 1194.

A linear positioning groove 1191a that extends in the front-back direction from the positioning recess portion 1193a through the positioning recess portion 1194a is formed on the upper surface of the base 1191 (base body 1195).

The positioning groove 1191a is a groove used to fix the position of the inserted optical fiber 1001 and may be formed in, for example, in a substantially V-shape in cross section, in a substantially U-shape in cross section, a semicircular shape in cross section, or the like.

The locking protrusions 1198 which are to be engaged with the engagement recesses 1146c of the elastic locking ends 1146 are formed on the outer-side faces of the one-side-extended portion 1196 and the other-side-extended portion 1197 so as to protrude toward the outside.

The shape of the locking protrusion 1198 when seen in a plan view is preferably a tapered shape (for example, triangular shape) having the length in the back and forth direction where the length thereof increases in the direction from the protuberance edge to the base end side.

In a state where the upper surface 1191b of the base 1191 is covered with the lid 1192 (closed state), the lid 1192 is disposed between the holding wall portions 1193 and 1194.

A locking protuberance 1192c is formed near the leading-end portion 1192b positioned at the end portion opposite to the base part 1192a (hinge) of the lid 1192. The locking protuberance can be detachably fitted into the locking recess portion 1191c formed on the base 1191.

The lid 1192 causes the locking protuberance 1192c to be engaged with the locking recess portion 1191c of the base 1191 in a state where the upper surface 1191b of the base 1191 is covered with the lid (closed state), presses the inserted optical fiber 1001 onto the base 1191 (base body 1195), and can grasp and fix it.

The lid 1192 and the base 1191 may be integrally formed together.

Figure 77:
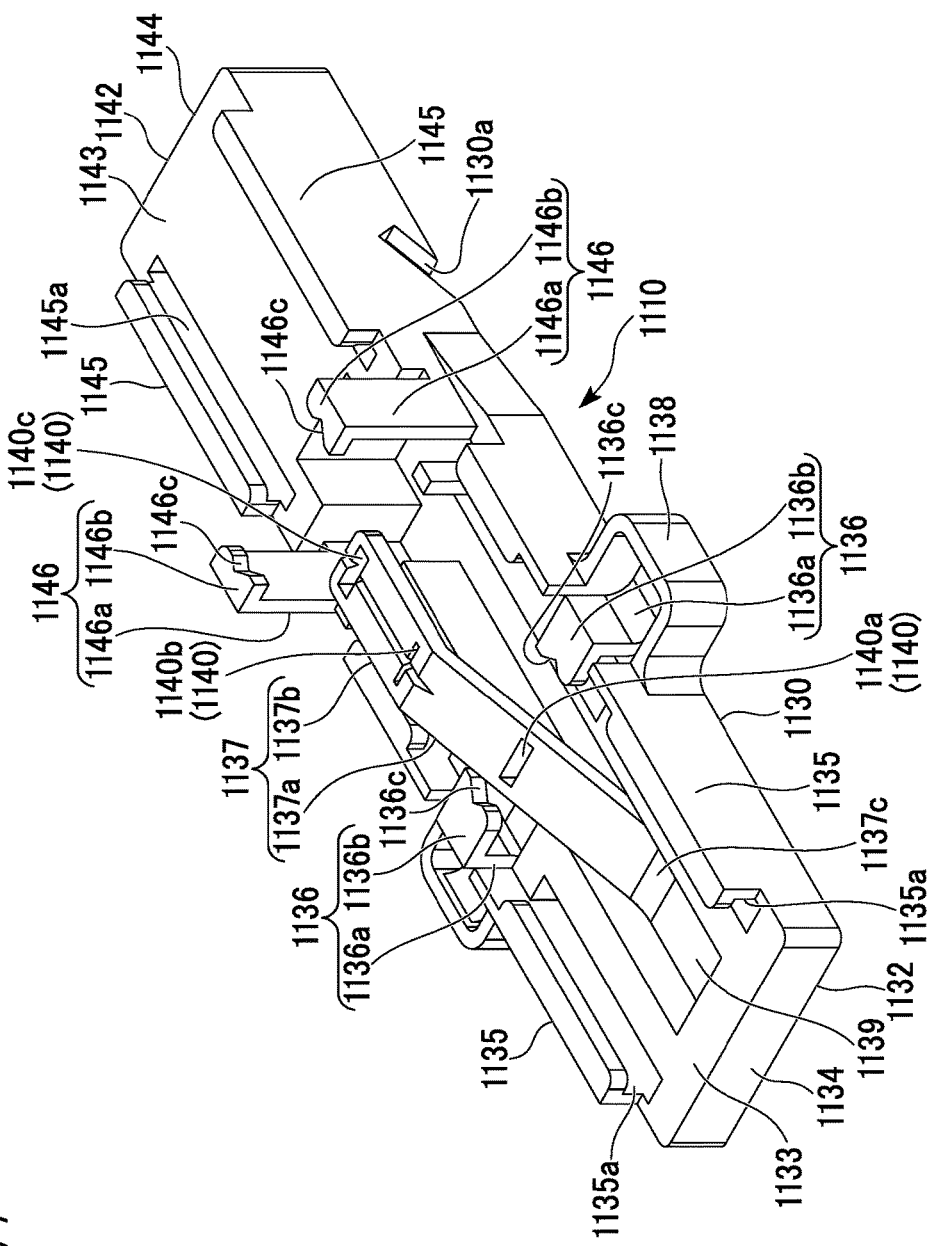
FIG. 77 is a perspective view showing a connecting jig according to the sixth embodiment of the invention.

As shown in FIG. 77, the connecting jig 1110 is provided with a jig base 1130 that includes: a first guide 1132 that guides the optical fiber splicing unit 1020; and a second guide 1142 (fiber holder part) that holds the fiber holder 1090.

The first guide 1132 includes: a table 1134 having a slide surface 1133 formed thereon and causes the optical fiber splicing unit 1020 to slidably move; and guide wall portions 1135 that are provided on both the side ends thereof so as to protrude therefrom.

The paired guide wall portions 1135 are formed so as to extend in the direction (front-back direction) in which the first guide 1132 is formed; as both side edges 1221a of the substrate 1221 of the slider 1220 mounted on the slide surface 1133 come into contact with the guide wall portions, movement of the optical fiber splicing unit 1020 in the width direction thereof can be restricted.

Grooves 1135a, which restrict the optical fiber splicing unit 1020 from being removed upward (restricts movement of the optical fiber splicing unit 1020 in a direction away from the connecting jig 1110), are formed on the lower inner surfaces of the guide wall portions 1135.

The groove 1135a is formed in the direction (front-back direction) in which the first guide 1132 is formed. As both the side edge portions 1221a of the substrate 1221 are inserted into the grooves, it is possible to restrict the slider 1220 from being removed upward.

The paired elastic locking ends 1136 that position the optical fiber splicing unit 1020 on the first guide 1132 are formed on the jig base 1130.

The elastic locking ends 1136 are configured to include: curved-plate portions 1136a protruding toward the slide surface 1133 from the projected portions 1138 that are provided to protrude outward from both sides of the first guide 1132 in the width direction thereof; plate-shaped engagement end portions 1136b that are provided to protrude from the front ends of the curved-plate portions; and engagement recesses 1136c which are formed at the engagement end portions and into which the locking protrusions 1227 of the slider 1220 are to be inserted.

The curved-plate portion 1136a is formed in a circular arc plate shape that is curved along the axis line extending in the front-back direction of the first guide 1132.

The protruding end of the curved-plate portion 1136a is located upper than the slide surface 1133.

The engagement end portion 1136b is formed above the slide surface 1133 so as to protrude inward from the protruding end of the curved-plate portion 1136a.

The engagement recesses 1136c of the engagement end portions 1136b are formed in a cut-off shape and at a substantially center portion between the back and forth positions of the engagement end portions 1136b, at which the protuberance edges of the engagement end portions 1136b are depressed.

When the locking protrusion 1227 of the slider 1220 is inserted into the engagement recess 1136c and the elastic locking end 1136 is engaged with the locking protrusion 1227, it is possible to restrict the movement of the slider 1220 relative to the first guide 1132 in the front-back direction thereof.

In this state, the elastic locking ends 1136 sandwiches the slider 1220 therebetween due to the elastic action of the curved-plate portions 1136a and stably holds the slider 1220.

The elastic locking ends 1136 function as a locking mechanism that engages with the optical fiber splicing unit 1020 (slider 1220) that moves forward along the first guide 1132 and thereby restricts the forward and backward movement thereof.

The second guide 1142 includes: a table 1144 having a slide surface 1143 formed thereon and causes the fiber holder 1190 to slidably move; and guide wall portions 1145 that are provided on both the side ends thereof so as to protrude therefrom.

The paired guide wall portions 1145 are formed so as to extend in the direction (front-back direction) in which the second guide 1142 is formed; as both side edges of the fiber holder 1090 mounted on the slide surface 1143 come into contact with the guide wall portions, movement of the fiber holder 1190 in the width direction thereof can be restricted.

A pair of elastic locking ends 1146 that position the fiber holder 1190 are formed on the jig base 1130.

The elastic locking ends 1146 are configured to include: protruding plates 1146a that protrude from the jig base 1130; plate-shaped engagement end portions 1146b that are provided to protrude from the front ends of the protruding plates; and engagement recesses 1146c which are formed at the engagement end portions and into which locking protrusions 1198 of the fiber holder 1190 are to be inserted.

The engagement end portion 1146b is formed above the slide surface 1143 so as to protrude inward from the protruding end of the protruding plate 1146a.

The engagement recesses 1146c of the engagement end portions 1146b are formed in a cut-off shape and at a substantially center portion between the back and forth positions of the engagement end portions 1146b, at which the protuberance edges of the engagement end portions 1146b are depressed.

When the locking protrusion 1198 of the fiber holder 1190 is inserted into the engagement recess 1146c and the elastic locking end 1146 is engaged with the locking protrusion 1198, it is possible to restrict the movement of the fiber holder 1190 relative to the second guide 1142 in the front-back direction thereof.

In this state, the elastic locking ends 1146 sandwiches the fiber holder 1190 therebetween due to the elastic action of the protruding plate 1146a and stably holds the fiber holder 1190.

The elastic locking ends 1146 function as a locking mechanism that engages with the fiber holder 1190 that moves forward along the second guide 1142 and thereby restricts the forward and backward movement thereof.

Groove 1139 which extends in the direction (front-back direction) in which the first guide 1132 is formed is formed on the slide surface 1133 of the first guide 1132.

An elastic protrusion 1137 that protrudes upward from the slide surface 1133 is formed on the bottom portion of the groove 1139.

The elastic protrusion 1137 includes: a sloped plate 1137a that extends in the front-back direction and gradually rises up in the direction of approaching the second guide 1142; and an extending plate 1137b that extends parallel to the slide surface 1133 from the extending end of the sloped plate 1137a in the front-back direction.

It is preferable that the position in height of the upper surface of the extending plate 1137b be the position adjacent to the inserted optical fiber 1001 that extends from the fiber holder 1190 which is positionally-fixed on the second guide 1142.

The elastic protrusion 1137 can elastically bend and deform at a base part 1137c.

Therefore, when the optical fiber splicing unit 1020 moves forward on the slide surface 1133, the sloped plate 1137a is pressed downward by the optical fiber splicing unit 1020 and is accommodated in the groove 1139, and the elastic protrusion 1137 does not interfere with the forward movement of the optical fiber splicing unit 1020.

It is possible to form, on the elastic protrusion 1137, one or a plurality of displays 1140 that are used to check the position of the inserted optical fiber 1001.

In the drawing shown as an example, the display 1140 includes: a display 1140a used to check the position of the front end of the inserted optical fiber 1001 before adjusting the length thereof by use of an optical fiber cutter (not shown in the figure); a display 1140b used to check the position of the front end of the bare optical fiber 1001a of the inserted optical fiber 1001; and a display 1140c used to check the position of the front end of the coating 1001b of the inserted optical fiber 1001.

A cutout 1130a that is used to temporarily place the optical fiber splicing tool 1200 therein is formed under the second guide 1142 of the jig base 1130.

The cutout 1130a is formed so as to gradually rise from the lower edge of the second guide 1142 rearward in the diagonal direction.

In a state where, for example, the edge portion of a case of a closure (not shown in the figure) is inserted into the cutout 1130a, the optical fiber splicing tool 1200 can be temporarily placed by being engaged with the case.

Next, a method of splicing (optical splice) the built-in optical fibers 1001 and 1162 to the inserted optical fiber 1001 using the optical fiber splicing tool 1200 will be described with reference to FIGS. 78A to 78D.

As shown in FIGS. 69 to 71, in advance, the interposing-end portion 1231a is inserted between the rearward-extending portion 1165 of the clamp portion 1163 and the lid members 1166 and 1167 by attaching the splicing tool 1230 to the optical fiber splicing unit 1020, and therefore the inserted optical fiber 1001 is in a state of being insertable thereinto.

As shown in FIG. 76, the inserted optical fiber 1001 is disposed in the positioning groove 1191a of the base 1191, is pressed onto the base 1191 by the lid 1192, and is thereby held and fixed.

The inserted optical fiber 1001 is fixed to the fiber holder 1190 while ensuring a predetermined forward protruding length.

The fiber holder 1190 is mounted on the slide surface 1143 of a second rail portion 1142, causes the locking protrusions 1198 to be engaged with of the engagement recesses 1146c of the elastic locking ends 1146, and fixes the position thereof.

Figure 78A:
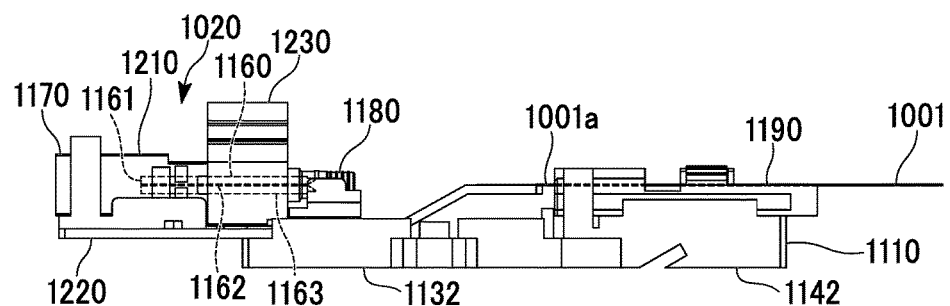
FIG. 78A is a flow sheet showing steps of assembling the optical fiber splicing tool according to the sixth embodiment of the invention.
Figure 78B:
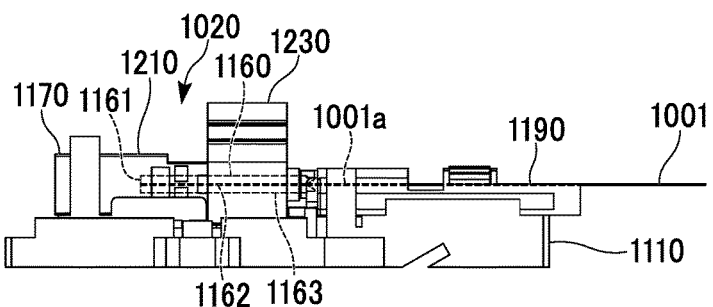
FIG. 78B is a flow sheet showing steps of assembling the optical fiber splicing tool according to the sixth embodiment of the invention.

Subsequently, as shown in FIGS. 78A and 78B, the optical fiber splicing unit 1020 is mounted on the slide surface 1133 of the first guide 1132 of the connecting jig 1110 and moves toward the fiber holder 1190 in a state where movement thereof in the width direction thereof is restricted by the guide wall portions 1135.

Figure 78C:
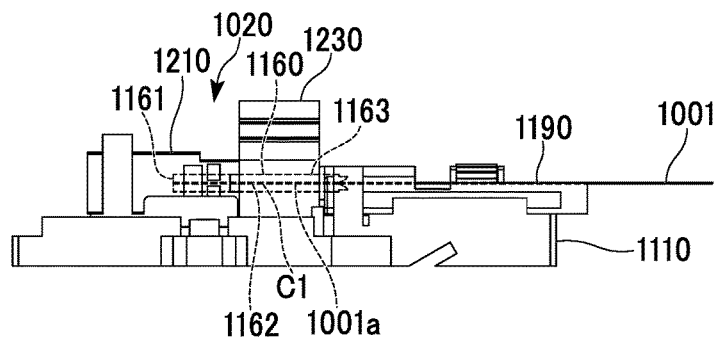
FIG. 78C is a flow sheet showing steps of assembling the optical fiber splicing tool according to the sixth embodiment of the invention.

In the movement of the optical fiber splicing unit 1020, both the side edge portions 1221a of the substrate 1221 are inserted into the grooves 1135a of the inner surfaces of the side wall portions 1135, and the slider 1220 is thereby restricted from being removed upward As shown in FIG. 78C, as a result of causing the locking protrusions 1227 to be engaged with the engagement recesses 1136c of the elastic locking ends 1136 due to the forward movement of the optical fiber splicing unit 1020, the optical fiber splicing unit 1020 is sandwiched between the elastic locking ends 1136 in a state of being stably held and positioned on the slide surface 1133.

The position of the optical fiber splicing unit 1020 is referred to as a forward-movement limit position.

The inserted optical fiber 1001 is inserted into the alignment groove 1169a of the clamp-attached ferrule 1160 and is brought into contact with the back end of the built-in optical fibers 1001 and 1162.

Reference sign C1 represents the butt-jointing position.

Flexion may be produced in the inserted optical fiber 1001 between the clamp-attached ferrule 1160 and the fiber holder 1190.

As shown in FIG. 76, at the forward-movement limit position, the forward-end portion of the optical fiber splicing unit 1020 enters the second unit accommodation space 1199 ensured between the one-side-extended portion 1196 and the other-side-extended portion 1197 of the fiber holder 1190.

At this time, the checking protuberance 1197b of the fiber holder 1190 is inserted into the checking recess 1226b of the optical fiber splicing unit 1020.

Figure 78D:
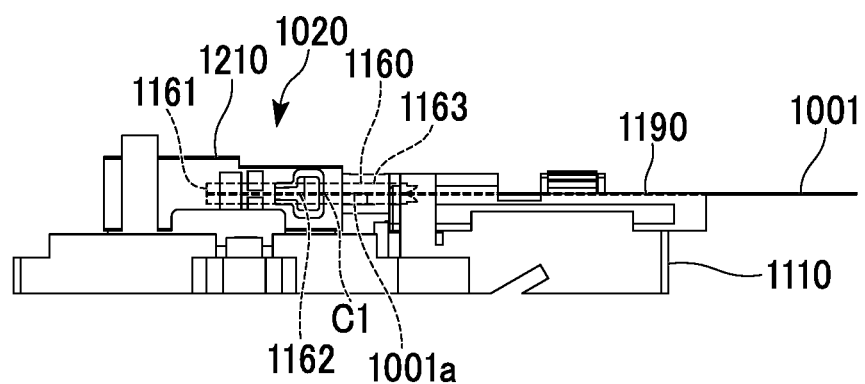
FIG. 78D is a flow sheet showing steps of assembling the optical fiber splicing tool according to the sixth embodiment of the invention.

As shown in FIG. 78D, the interposing-end portion 1231a is removed from the clamp portion 1163 by handling the splicing tool 1230, and therefore the bare optical fiber 1001a of the front end of the optical fiber 1001 is held and fixed between the rearward-extending portion 1165 and the lid members 1166 and 1167 due to elastic action of the clamping spring 1168.

Because of this, it is possible to stably maintain a state where the optical fiber 1001 is butt-jointed to the built-in optical fibers 1001 and 1162 of the clamp-attached ferrule 1160.

In the optical fiber splicing tool 1200, since the connecting jig 1110 includes the first guide 1132 that guides the optical fiber splicing unit 1020 toward the fiber holder 1190, it is possible to carry out the splicing of the optical fibers 1001 and 1162 as a result of causing the optical connector 1210 to move toward the fiber holder 1190 without moving the fiber holder 1190.

Consequently, even in the case where the excess length of the inserted optical fiber 1001 is short, it is possible to reliably splice the optical fibers 1001 and 1162.

Subsequently, the operation of attaching the optical connector 1210 to the slider 1220 and of removing the optical connector from the slider 1220.

As shown in FIG. 72, since the elastic locking ends 1225 of the slider 1220 can be elastically bended and deformed, the optical connector 1210 can be positioned between the elastic locking ends 1225 by bending and deforming the elastic locking ends 1225 in the direction in which they are separated from each other.

As shown in FIGS. 72 and 73, in the case of removing the optical connector 1210 from the slider 1220, the portion of the optical connector 1210 corresponding to the front portion of the slider 1220 moves upward.

Because of this, the optical connector 1210 comes into contact with the rear portion of the slider 1220 (the position behind the elastic locking ends 1225), this position functions as a fulcrum point, and the optical connector is in the orientation such that it is inclined so as to gradually move upward in the forward direction of the slider 1220.

As shown in FIGS. 75A to 75C, as the degree of inclination of the optical connector 1210 increases, the side edge portions 1170b of the finger grip 1170 of the optical connector 1210 come into contact with the lower edge 1225k of the cutout surface 1225j of the locking projected portion 1225a.

As mentioned above, the protruding height of the lower edge 1225k gradually increases in the direction toward the rearward (the left in FIG. 73). Therefore, the side edge portion 1170b is in the orientation in which it is further inclined, a force including the component in the lateral outer direction is applied to the locking projected portion 1225a from the lower edge 1225k.

As a result, as shown in FIGS. 72 and 74, the elastic locking ends 1225 are deformed in the direction in which they are separated from each other, engagement of the locking projected portion 1225a with respect to the finger grip 1170 is released, and it is in a state where the optical connector 1210 can be removed from the slider 1220.

On the other hand, in the case of causing the optical connector 1210 to move upward without being inclined, the finger grip 1170 comes into contact with the lower surface 1225d of the locking projected portion 1225a, and the upward movement is prevented.

As described above, since the locking projected portions 1225a including the cutouts 1225c are formed on the elastic locking ends 1225 in the optical fiber splicing unit 1020, the optical connector 1210 is less easily removed from the slider 1220 under normal condition, and the operation of removing the optical connector 1210 from the slider 1220 becomes easy.

In the optical fiber splicing tool 1200, since it is possible to splice the optical fibers 1001 and 1162 as a result of causing the optical fiber splicing unit 1020 to come close to the fiber holder 1190 on the connecting jig 1110, the fiber holder 1190 may be fixed to the jig base 1130.

In addition, the fiber holder 1190 may also be formed integrally with the jig base 1130.

Specific constitutions of a splicing mechanism, an interposing member, and a fiber holder are not limited as long as they are applied to a technical concept of the invention.

The inserted optical fiber is not particularly limited and may be adopted to, for example, an optical fiber that is installed in a vertical hole (for example, a hoistway used for an elevator) provided at each floor of a construction including a plurality of floors, indoor optical fibers, optical fibers that are provided in an optical composite electronic device, or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

DESCRIPTION OF REFERENCE NUMERAL

1 . . . inserted optical fiber (second optical fiber), 10 . . . optical fiber splicing unit, 21 . . . extended optical fiber (first optical fiber), 21c . . . flexural deformation, 24 . . . optical fiber cable, 30 . . . mechanical splice, 50 . . . grasping member holding portion, 60 . . . splice holder (mechanical splice holder), 70 . . . cable grasping member (optical fiber grasper), 90 . . . fiber holder (optical fiber fixer), 110 . . . connecting jig, 120 . . . slider (guide target), 132 . . . first guide, L1 . . . first flexure width, L2 . . . second flexure width, 410 . . . cable outer coating grasping member, 411 . . . hinge (thin hinge), 420 . . . grasping member main body, 421 . . . bottom wall, 422 . . . side wall portion (first side wall portion), 423 . . . side wall portion (second side wall portion), 241 . . . first cable groove, 242 . . . second cable groove, 425 . . . first grasping claw, 426 . . . second grasping claw, 271, 272 . . . a step difference (stepped surface), 428 . . . first protruding claw (main-body-side first protruding claw), 429 . . . second protruding claw (main-body-side second protruding claw), 440 . . . lid, 441 . . . lid body, 441a . . . lid inner surface, 448 . . . second protruding claw (lid-side second protruding claw), 449 . . . second protruding claw (lid-side second protruding claw), 450 . . . optical fiber cable, 451 . . . first optical fiber cable, 452 . . . second optical fiber cable, 501 . . . inserted optical fiber (second optical fiber), 521 . . . extended optical fiber (first optical fiber), 530 . . . mechanical splice, 531 . . . base member (base-side element), 532 . . . press lid (lid-side element), 562 . . . one-side-protruding wall portion, 563 . . . another-side-protruding wall portion, 562c, 563c . . . fitting recess, 581 . . . interposing member, 581a . . . interposing-end portion, 582 . . . interposing member driving unit, 582a . . . interposing-member inserting hole, 582a . . . inside space, 583 . . . interposing-end support, 584 . . . trunk, 585 . . . facing wall portion, 588 . . . drive-part side wall portion, 589 . . . interposing member support, 701 . . . inserted optical fiber (the other of optical fibers), 710 . . . optical fiber splicing unit (first optical fiber splicing unit), 720 . . . optical fiber splicing unit (second optical fiber splicing unit), 721 . . . extended optical fiber (one of optical fibers), 730 . . . mechanical splice (first mechanical splice), 790 . . . fiber holder (first optical fiber fixer), 795, 895 . . . base body, 796, 896 . . . one-side-extended portion, 797, 897 . . . the other-side-extended portion, 796b . . . checking protuberance (first entry prevention portion), 810 . . . connecting jig, 832 . . . first guide, 842 . . . second guide (holder), 861 . . . ferrule, 862 . . . built-in optical fiber (one of optical fibers), 863 . . . clamp portion (second mechanical splice), 890 . . . fiber holder (second optical fiber fixer), 897b . . . checking protuberance (second entry prevention portion), 1001 . . . inserted optical fiber (second optical fiber), 1020 . . . optical fiber splicing unit, 1110 . . . connecting jig, 1132 . . . first guide, 1161 . . . ferrule, 1162 . . . built-in optical fiber (first optical fiber), 1163 . . . clamp portion (splicing mechanism), 1190 . . . fiber holder (optical fiber fixer), 1220 . . . slider (guide target), 1221 . . . substrate (base), 1225 . . . elastic locking end, 1225a . . . locking projected portion, 1225c . . . cutout, 1225k . . . lower edge (inclined inner edge).

The invention claimed is:

1. An optical fiber splicing tool comprising:
an optical fiber splicing unit that comprises:
a mechanical splice holder that holds a mechanical splice;
an optical fiber grasper that grasps a first optical fiber at one end side of the mechanical splice; and a guide target that is slidable along a guide provided at a connecting jig that fixes a second optical fiber to be butt-jointed to the first optical fiber;
a connecting jig that comprises:
a guide that guides the optical fiber splicing unit; and
an optical fiber fixer that fixes the second optical fiber; and
a tool capable of switching a state of both ends of the mechanical splice from a non-holding fixation state to a holding fixation state, wherein
the optical fiber splicing unit provides a first flexure width to the first optical fiber located between one end side of the mechanical splice and the optical fiber grasper,
the second optical fiber has a second flexure width that is shorter than the first flexure width and is ensured between the other end side of the mechanical splice and the optical fiber fixer when butt-jointing is carried out, and flexural deformation thereby occurs in the first flexure width relatively easier than that in the second flexure width of the second optical fiber,
in a state where both ends of the mechanical splice are in the non-holding fixation state by use of the tool, the second optical fiber fixed to the optical fiber fixer of the connecting jig is inserted into the mechanical splice through the other end side of the mechanical splice,
in this state, the first optical fiber that is grasped by the optical fiber grasper and is inserted into the mechanical splice through one end side of the mechanical splice is butt-jointed to contact with the second optical fiber, the first flexure width is thereby formed on the first optical fiber at one end side of the mechanical splice, and
in this state, by use of the tool, both ends of the mechanical splice are in the holding fixation state.

2. The optical fiber splicing tool according to claim 1, wherein
the second flexure width is less than or equal to 10 mm when butt-jointing is carried out.

3. The optical fiber splicing tool according to claim 1, wherein
a groove that prevents the guide target from being separated from the connecting jig is formed in the guide.

4. The optical fiber splicing tool according to claim 1, wherein
the first optical fiber is an optical fiber that is drawn from a terminal of an optical fiber cable, and
the optical fiber grasper is a cable grasping member that grasps a terminal of the optical fiber cable.

5. The optical fiber splicing tool according to claim 1, further comprising a cable outer coating grasping member, wherein
the cable outer coating grasping member comprises: a grasping member main body including side wall portions that are provided on the respective right and left of a bottom wall;
and a lid that is openably and closably provided to the grasping member main body with a hinge interposed therebetween,
a first cable groove into which a first optical fiber cable is to be fitted and a second cable groove into which a second optical fiber cable is to be fitted are ensured between both the side wall portions of the grasping member main body so that centers of groove widths thereof coincide with each other, the second cable groove is formed so as to extend from one end of the first cable groove and has a width narrower than that of the first cable groove, and the second optical fiber cable has a cross-sectional size smaller than that of the first optical fiber cable,
a plurality of grasping claws that have a triangular cross section and extend in a depth direction of the first cable groove and the second cable groove are formed on inner surfaces of both the side wall portions of the grasping member main body so as to face each other, and
a first protruding claw that cuts into an outer coating of the first optical fiber cable accommodated in the first cable groove and a second protruding claw that cuts into an outer coating of the second optical fiber cable accommodated in the second cable groove are formed on an inner surface of a bottom wall of the grasping member main body and on an inner face side that is opposed to an inner surface of a bottom wall of the grasping member main body when the lid closes the grasping member main body.

6. The optical fiber splicing tool according to claim 5, wherein
of the grasping claws, first grasping claws which face each other at both sides of the first cable groove protrude, from virtual extensions of inner surfaces of side wall portions which face each other at both sides of the second cable groove, toward in a center side thereof in the groove width of the first cable groove.

7. The optical fiber splicing tool according to claim 6, wherein
the first cable groove is configured to be capable of fitting the first optical fiber cable having a rectangular shape in cross section, which has a width of 2.0 mm and a height of 3.1 mm in cross-sectional sizes, thereinto so that a width direction thereof is aligned along a groove width direction,
the second cable groove is configured to be capable of fitting the second optical fiber cable having a rectangular shape in cross section, which has a width 1.6 mm and a height 2.0 mm in cross-sectional sizes, thereinto so that a width direction thereof is aligned along a groove width direction,
as a result of closing the lid on the grasping member main body in the case where the first optical fiber cable is fitted into the first cable groove or in the case where the second optical fiber cable is fitted into the second cable groove, the grasping member main body and the lid are capable of forming a rectangular cylindrical body that accommodates the first optical fiber cable or the second optical fiber cable,
a distance between ridges of the first grasping claws which face each other is 1.5±0.1 mm,
a distance between the inner surfaces of the side wall portions which face each other with the second cable groove interposed therebetween is 1.7±0.15 mm, and
a distance between ridges of second grasping claws of the grasping claw which face each other at both sides of the second cable groove is 1.15±0.05 mm.

8. The optical fiber splicing tool according to claim 5, wherein
the second cable groove is formed to have a groove depth shallower than that of the first cable groove, the inner surface of the bottom wall of the grasping member main body includes: a first groove bottom surface that is positioned at a groove bottom of the first cable groove; and a second groove bottom surface that is formed at a groove bottom of the second cable groove and is parallel to the first groove bottom surface, and a virtual plane, that is parallel to the first and second groove bottom surfaces and passes through a center between apexes of the first protruding claws which face each other, passes through a center between apexes of the second protruding claws which face each other.

9. The optical fiber splicing tool according to claim 8, wherein
- regarding the first protruding claws which face each other, a protruding length of a lid-side first protruding claw provided to protrude from the lid, which is from a lid inner surface, is longer than a protruding length of a main-body-side first protruding claw provided to protrude from the grasping member main body, which is from the first groove bottom surface, and
- regarding the second protruding claws which face each other, a protruding length of a lid-side second protruding claw provided to protrude from the lid, which is from a lid inner surface, is longer than a protruding length of a main-body-side second protruding claw provided to protrude from the grasping member main body, which is from the second groove bottom surface.

10. The optical fiber splicing tool according to claim 8, wherein
- a difference in level that is contactable to an end face of the first optical fiber cable is provided between the first groove bottom surface and the second groove bottom surface.

11. The optical fiber splicing tool according to claim 5, wherein
- a distance between apexes of the first protruding claws which face each other is longer than a distance between apexes of the second protruding claws which face each other.

12. An optical fiber splicing method comprising:
- using an optical fiber splicing tool, the optical fiber splicing tool comprising: an optical fiber splicing unit that comprises: a mechanical splice holder that holds a mechanical splice; an optical fiber grasper that grasps a first optical fiber at one end side of the mechanical splice; and a guide target that is slidable along a guide provided at a connecting jig that fixes a second optical fiber to be butt-jointed to the first optical fiber; a connecting jig that comprises: a guide that guides the optical fiber splicing unit; and an optical fiber fixer that fixes the second optical fiber, and a tool capable of switching a state of both ends of the mechanical splice from a non-holding fixation state to a holding fixation state, wherein the optical fiber splicing unit provides a first flexure width to the first optical fiber located between one end side of the mechanical splice and the optical fiber grasper, and the second optical fiber has a second flexure width that is shorter than the first flexure width and is ensured between the other end side of the mechanical splice and the optical fiber fixer when butt-jointing is carried out;
- moving the optical fiber splicing unit along the guide of the connecting jig in a direction of approaching the optical fiber fixer in a state where both ends of the mechanical splice are in the non-holding fixation state by use of the tool;
- inserting the second optical fiber fixed to the optical fiber fixer of the connecting jig into the mechanical splice through the other end side of the mechanical splice;
- in this state, butt-jointing the first optical fiber, which is grasped by the optical fiber grasper and is inserted into the mechanical splice through one end side of the mechanical splice, to contact with the second optical fiber, thereby forming the first flexure width on the first optical fiber at one end side of the mechanical splice, and flexural deformation thereby occurs in the first flexure width relatively easier than that in the second flexure width of the second optical fiber; and
- in this state, by use of the tool, causing both ends of the mechanical splice to be in the holding fixation state.

\* \* \* \* \*